United States Patent
Hase et al.

(10) Patent No.: US 11,625,049 B2
(45) Date of Patent: Apr. 11, 2023

(54) PLURALITY OF VEHICLES PERFORMING PLATOON TRAVELLING AND CONTROL APPARATUS FOR CONTROLLING THE SAME

(71) Applicant: DENSO CORPORATION, Kariya (JP)

(72) Inventors: Tomomi Hase, Kariya (JP); Hirofumi Kano, Kariya (JP); Mitsuharu Higashitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 544 days.

(21) Appl. No.: 16/700,519

(22) Filed: Dec. 2, 2019

(65) Prior Publication Data
US 2020/0174496 A1    Jun. 4, 2020

(51) Int. Cl.
*G05D 1/02* (2020.01)
*H04W 4/46* (2018.01)
(Continued)

(52) U.S. Cl.
CPC ......... *G05D 1/0293* (2013.01); *G05D 1/0285* (2013.01); *G08G 1/22* (2013.01);
(Continued)

(58) Field of Classification Search
CPC .. G05D 1/0293; G05D 1/0285; G05D 1/0088; G05D 2201/0213; G08G 1/22;
(Continued)

(56) References Cited

U.S. PATENT DOCUMENTS

| 2002/0050072 A1 | 5/2002 | Akimoto et al. |
| 2013/0124064 A1 | 5/2013 | Nemoto |

(Continued)

FOREIGN PATENT DOCUMENTS

| JP | H11-86197 A | 3/1999 |
| JP | 2000-331296 A | 11/2000 |

(Continued)

OTHER PUBLICATIONS

ETSI, Digital cellular telecommunications system (Phase 2+); Universal Mobile Telecommunications System (UMTS); Numbering, addressing and identification 2013 (3GPP TS 23.003 version 10.7.0 Release 10) §19.5 (Year: 2013).*

(Continued)

*Primary Examiner* — Aniss Chad
*Assistant Examiner* — Chase L Cooley
(74) *Attorney, Agent, or Firm* — Oliff PLC

(57) ABSTRACT

A control apparatus that controls a plurality of vehicles performing platoon travelling is provided. Each of the vehicles is provided with an inter-vehicle communication apparatus that performs an inter-vehicle communication with an other vehicle included in a column of the platoon travelling. At least some of the vehicles is provided with an external communication apparatus that performs an external communication based on own identification information given by a telecommunication company. The control apparatus is configured to control respective vehicles such that the number of vehicles capable of simultaneously performing the external communication is less than the number of vehicles included in the column.

8 Claims, 68 Drawing Sheets

(51) Int. Cl.
  *G08G 1/00* (2006.01)
  *H04W 24/08* (2009.01)
  *H04W 4/44* (2018.01)
  *G05D 1/00* (2006.01)
(52) U.S. Cl.
  CPC .............. *H04W 4/44* (2018.02); *H04W 4/46* (2018.02); *H04W 24/08* (2013.01); *G05D 1/0088* (2013.01); *G05D 2201/0213* (2013.01)
(58) Field of Classification Search
  CPC ......... H04W 4/44; H04W 4/46; H04W 24/08; H04W 84/20
  See application file for complete search history.

(56) References Cited

U.S. PATENT DOCUMENTS

| | | | |
|---|---|---|---|
| 2014/0316865 A1 | 10/2014 | Okamoto | |
| 2019/0096264 A1* | 3/2019 | Park | B60W 30/165 |
| 2021/0125501 A1* | 4/2021 | Zhao | H04W 4/02 |
| 2021/0219116 A1* | 7/2021 | Perras | H04W 4/50 |
| 2022/0030038 A1* | 1/2022 | Condoluci | H04W 4/44 |

FOREIGN PATENT DOCUMENTS

| | | | |
|---|---|---|---|
| JP | 2003-217074 A | | 7/2003 |
| JP | 2003217074 A | * | 7/2003 |
| JP | 4509434 B2 | | 7/2010 |
| WO | 2014/111982 A1 | | 7/2014 |

OTHER PUBLICATIONS

Su, Dongliang and Ahn, Sanghyun; In-Vehicle Sensor-assisted Platoon Formation by Utilizing Vehicular Communications; 2017; International Journal of Distributed Sensor Networks; p. 5 (Year: 2017).*

* cited by examiner

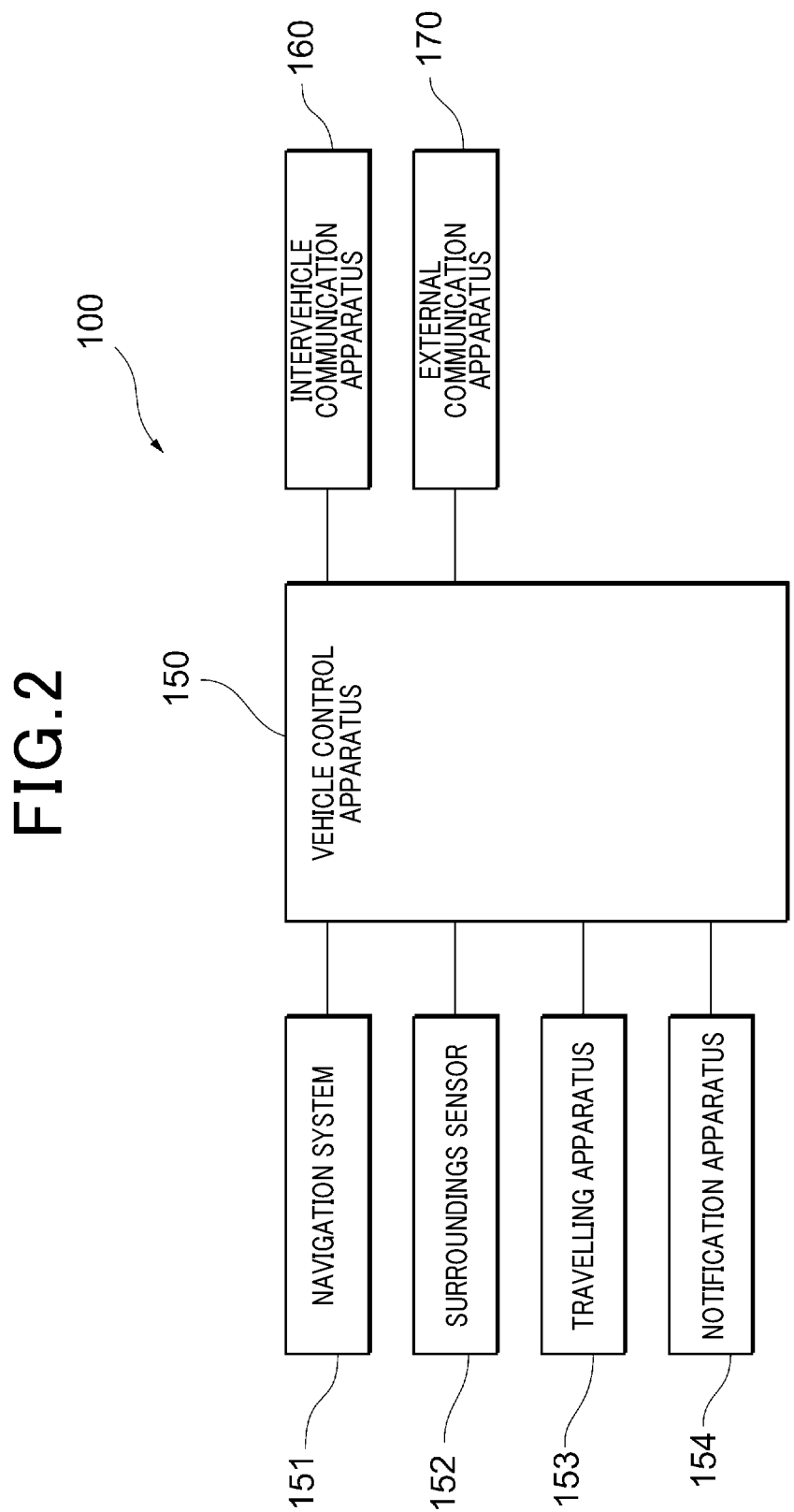

FIG.3A

| ID | IDENTIFICATION INFORMATION |
|---|---|
| 01 | AAAAA |
| 02 | – |
| 03 | – |
| ⋮ | ⋮ |

FIG.3B

| ID | IDENTIFICATION INFORMATION |
|---|---|
| 01 | – |
| 02 | AAAAA |
| 03 | – |
| ⋮ | ⋮ |

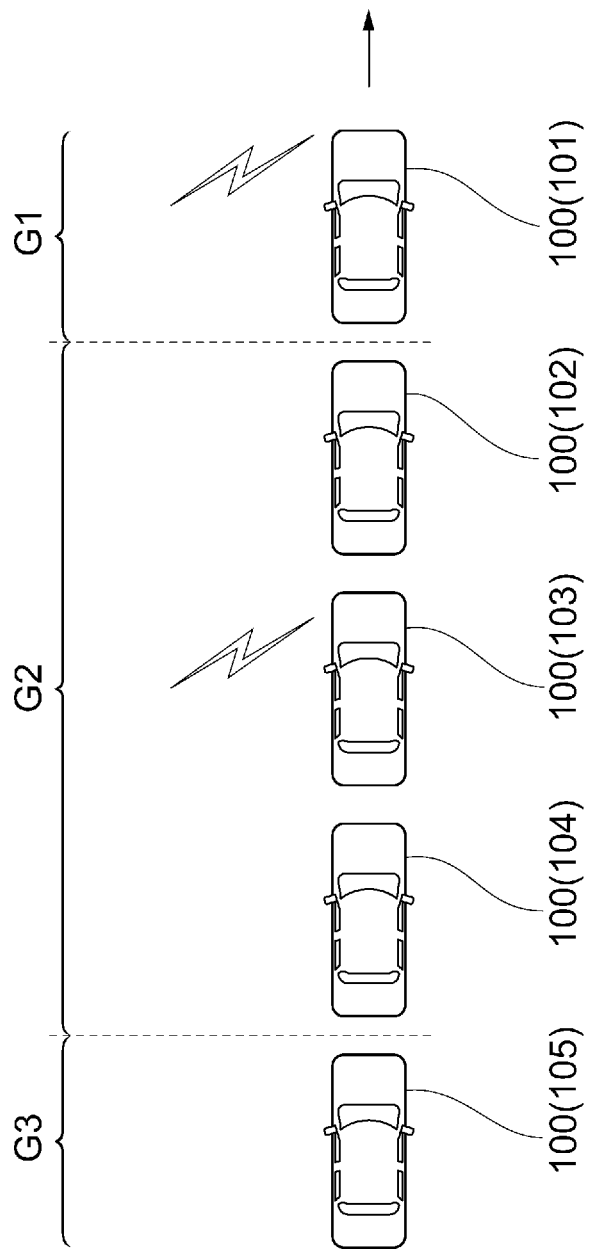

FIG.16A
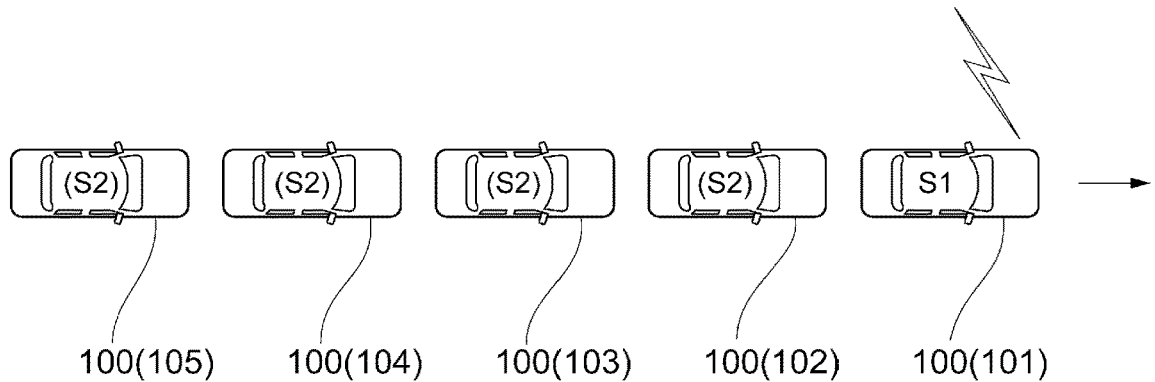
FIG.16B
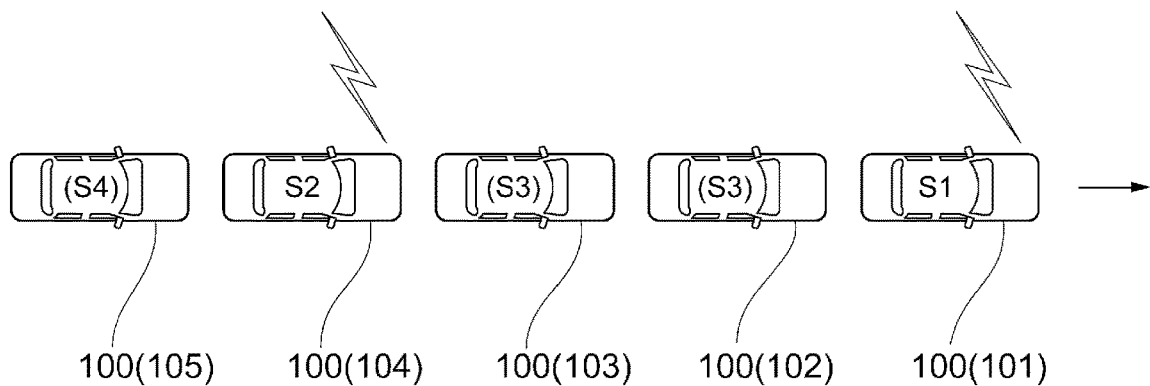
FIG.16C
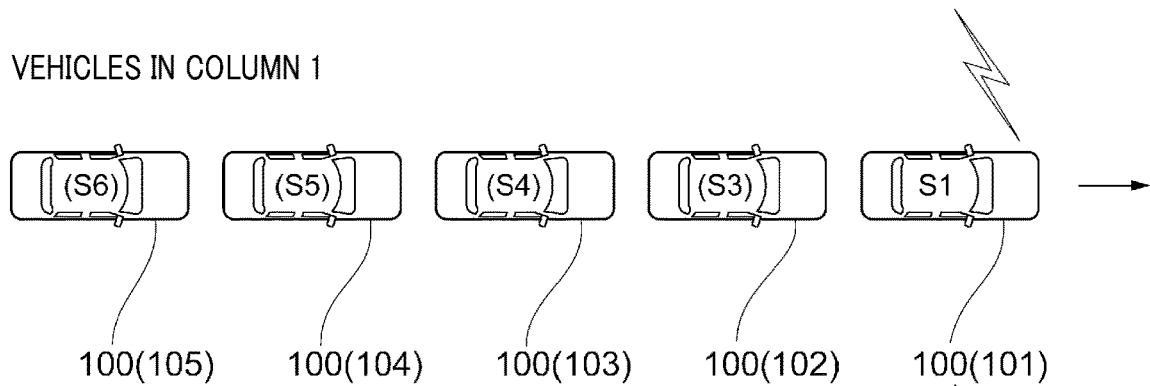
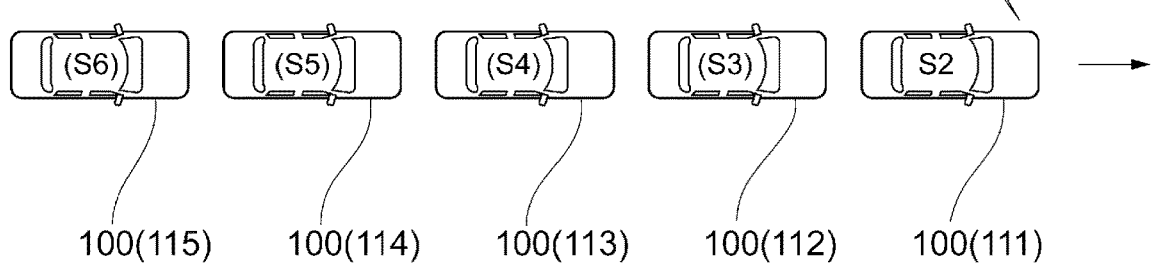

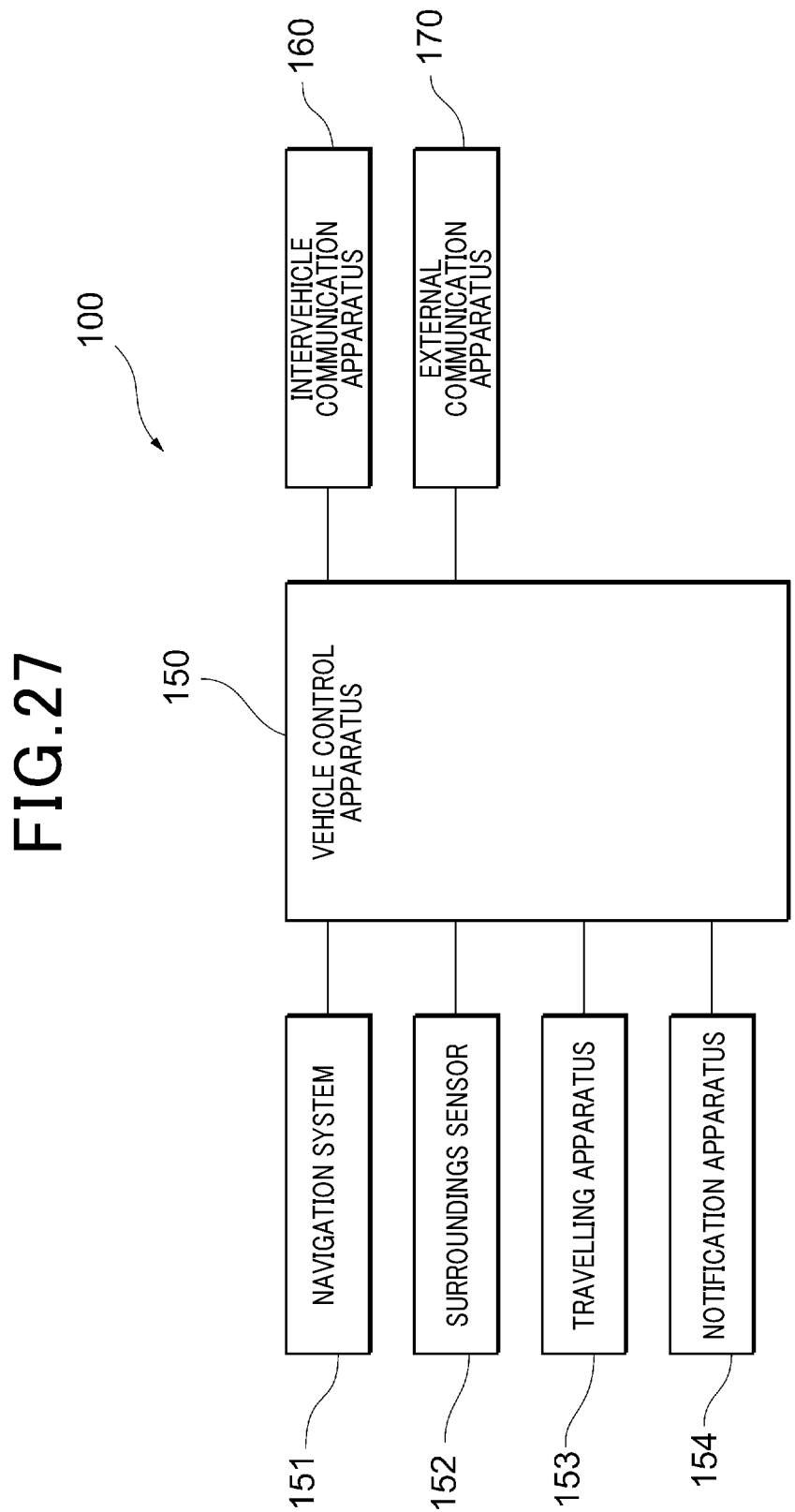

FIG.28A

| ID | IDENTIFICATION INFORMATION |
|---|---|
| 01 | AAAAA |
| 02 | – |
| 03 | – |
| ⋮ | ⋮ |

FIG.28B

| ID | IDENTIFICATION INFORMATION |
|---|---|
| 01 | – |
| 02 | AAAAA |
| 03 | – |
| ⋮ | ⋮ |

FIG.31A
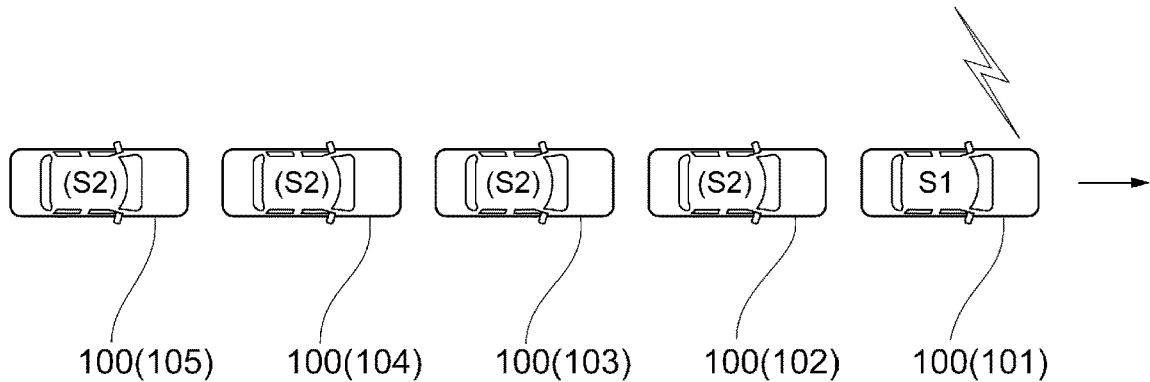
FIG.31B
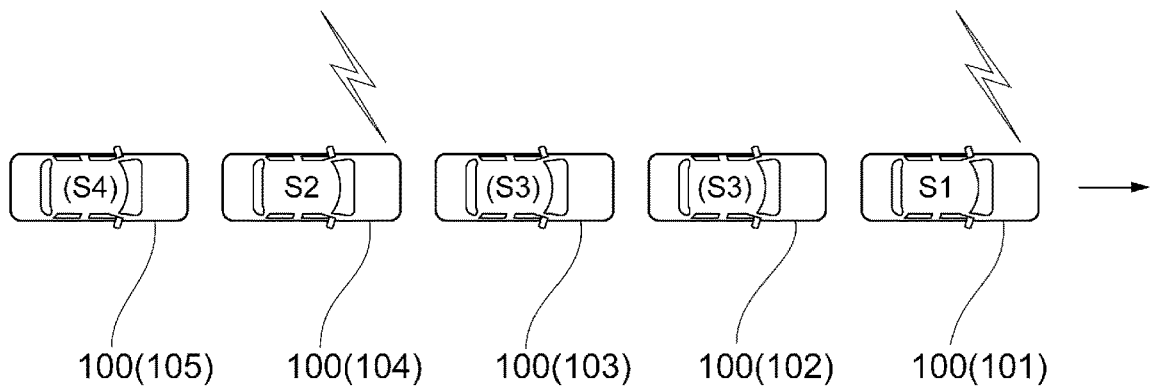
FIG.31C
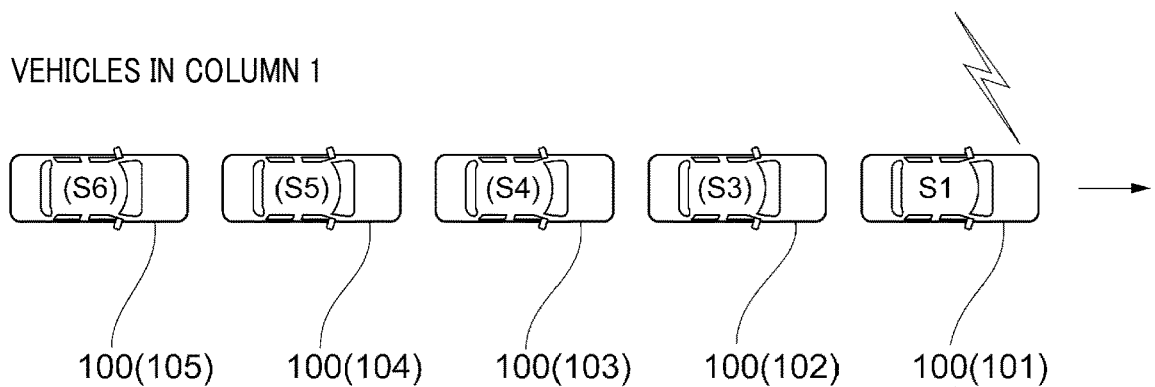
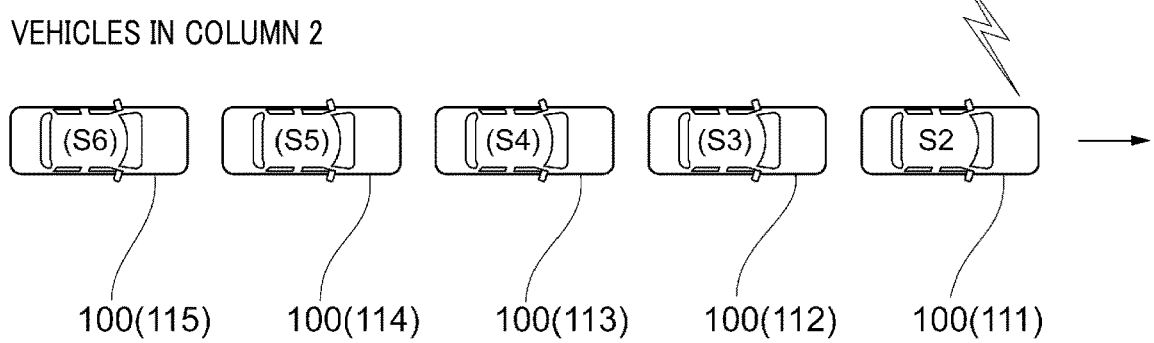

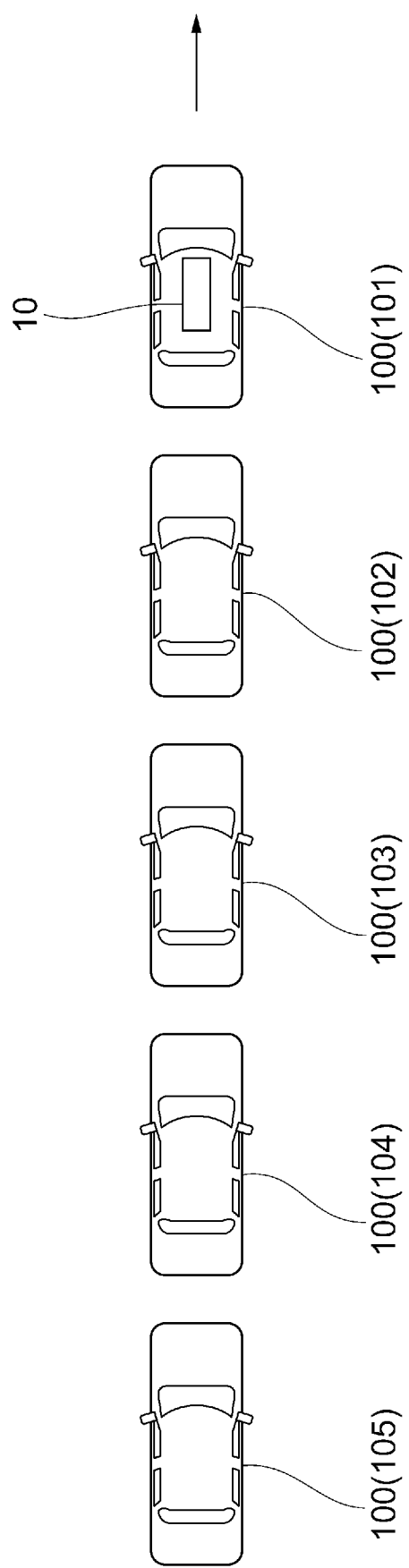

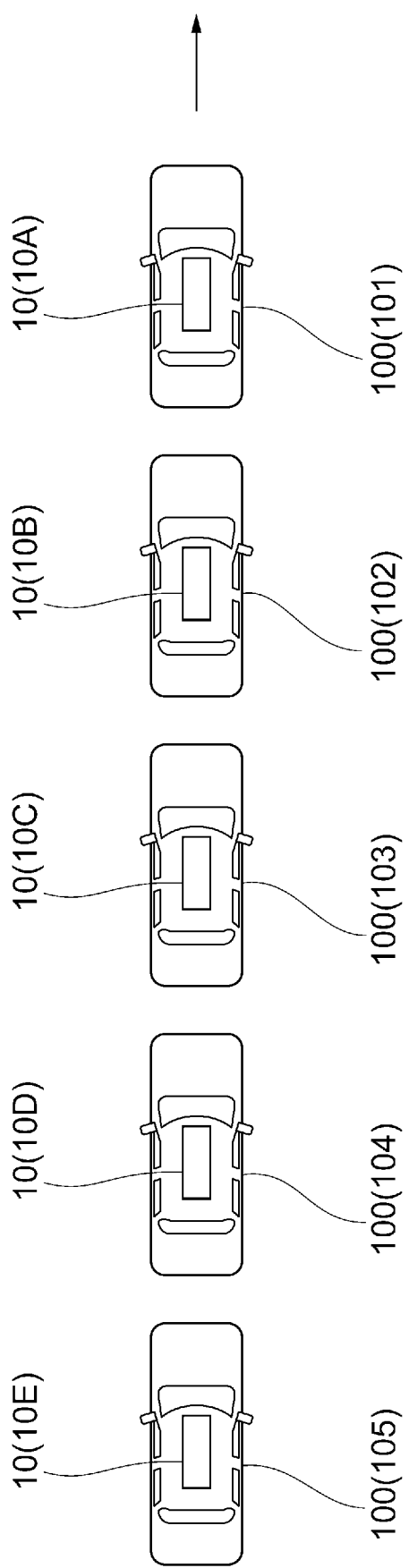

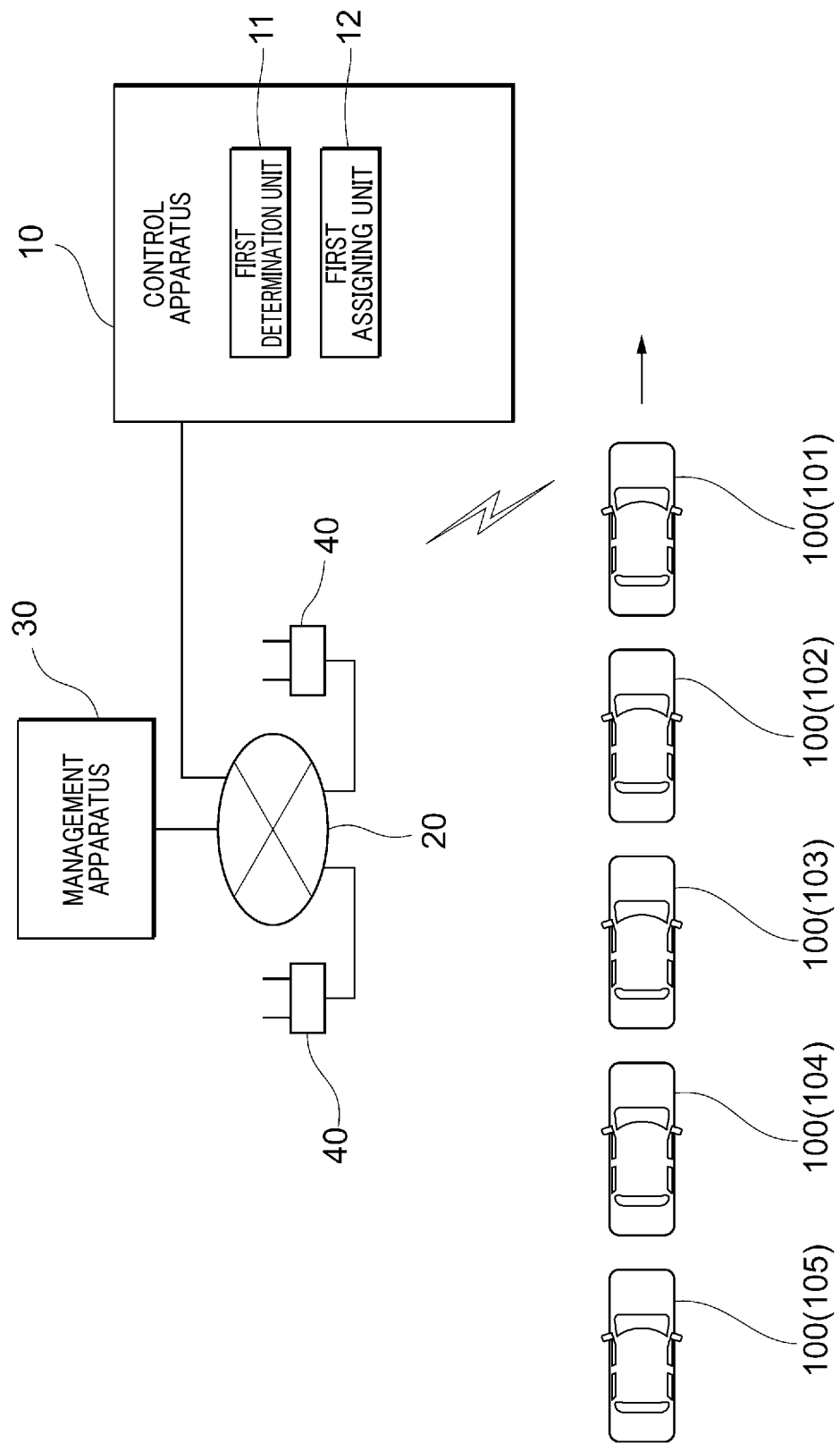

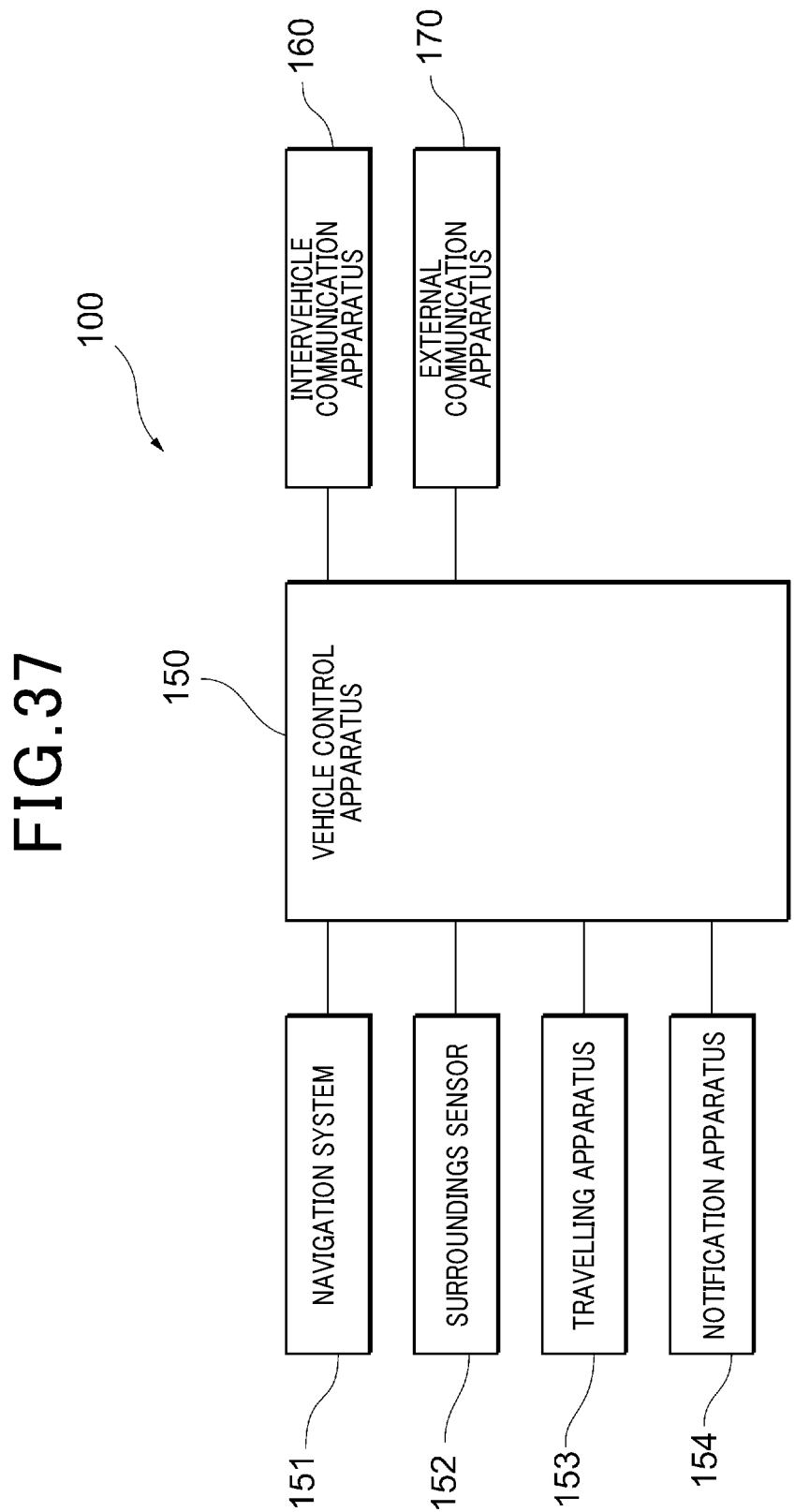

FIG.38A

| ID | IDENTIFICATION INFORMATION |
|---|---|
| 01 | AAAAA |
| 02 | – |
| 03 | – |
| ⋮ | ⋮ |

FIG.38B

| ID | IDENTIFICATION INFORMATION |
|---|---|
| 01 | – |
| 02 | AAAAA |
| 03 | – |
| ⋮ | ⋮ |

FIG.52A

| IDENTIFICATION INFORMATION | VEHICLE COMMUNICATION ID |
|---|---|
| S(1) | IDc21 |
| S(2) | |

FIG.52B

| IDENTIFICATION INFORMATION | VEHICLE COMMUNICATION ID |
|---|---|
| S(1) | IDc21 |
| S(2) | IDc23 | ately performed regardless of the driv-
PLURALITY OF VEHICLES PERFORMING PLATOON TRAVELLING AND CONTROL APPARATUS FOR CONTROLLING THE SAME

CROSS-REFERENCE TO RELATED APPLICATION

This application is based on and claims the benefit of priority from earlier Japanese Patent Application Nos. 2018-224887, 2018-224888, 2018-224889, 2018-224890, which are filed Nov. 30, 2018, the description of which is incorporated herein by reference.

BACKGROUND

Technical Field

The present disclosure relates to a plurality of vehicles performing platoon travelling, and a control apparatus for controlling the plurality of vehicles.

Description of the Related Art

Recently, development of vehicles capable of performing platoon traveling has advanced. Platooning refers to a travelling in which a plurality of vehicles are running in a column under a state where one or more vehicles are running while automatically tracking the head vehicle from behind. At least driving operation (steering operation, braking operation and the like) of vehicles other than the leading vehicle are automatically performed regardless of the driver's operation.

SUMMARY

The present disclosure provides a vehicle capable of reducing the communication cost accompanied by the external communication and a communication apparatus thereof, also provides a control apparatus of a vehicle capable of performing platoon travelling with high flexibility.

Specifically, according to the present disclosure, the control apparatus is configured to control respective vehicles such that the number of vehicles capable of simultaneously performing external communication is less than the number of vehicles included in the column.

BRIEF DESCRIPTION OF THE DRAWINGS

In the accompanying drawings:

FIG. 2 is a diagram schematically showing a configuration of a vehicle shown in FIG. 1;

FIGS. 3A and 3B are diagrams showing a modification of an assignment of identification information data;

FIG. 15 is a diagram showing an example of an assignment of the identification information data;

FIGS. 16A, 16B and 16C are diagrams showing an example of an assignment of the identification information data;

FIG. 27 is a diagram schematically showing a configuration of a vehicle shown in FIG. 26;

FIGS. 28A and 28B are diagrams showing a modification of an assignment of identification information data;

FIGS. 31A, 31B, and 31C are diagrams showing an example of an assignment of the identification information data;

FIG. 32 is a diagram schematically showing vehicles and a control apparatus according to an eighth embodiment;

FIG. 33 is a diagram schematically showing vehicles and a control apparatus according to a ninth embodiment;

FIG. 36 is a diagram schematically showing vehicles and a control apparatus according to a tenth embodiment;

FIG. 37 is a diagram schematically showing a configuration of a vehicle shown in FIG. 36;

FIGS. 38A and 38B are diagrams showing a modification of an assignment of identification information data;

FIGS. 52A and 52B are tables showing an example of identification information (SIM information) managed by a telecommunication company according to the thirteenth embodiment;

DETAILED DESCRIPTION OF THE PREFERRED EMBODIMENTS

Figure 1:
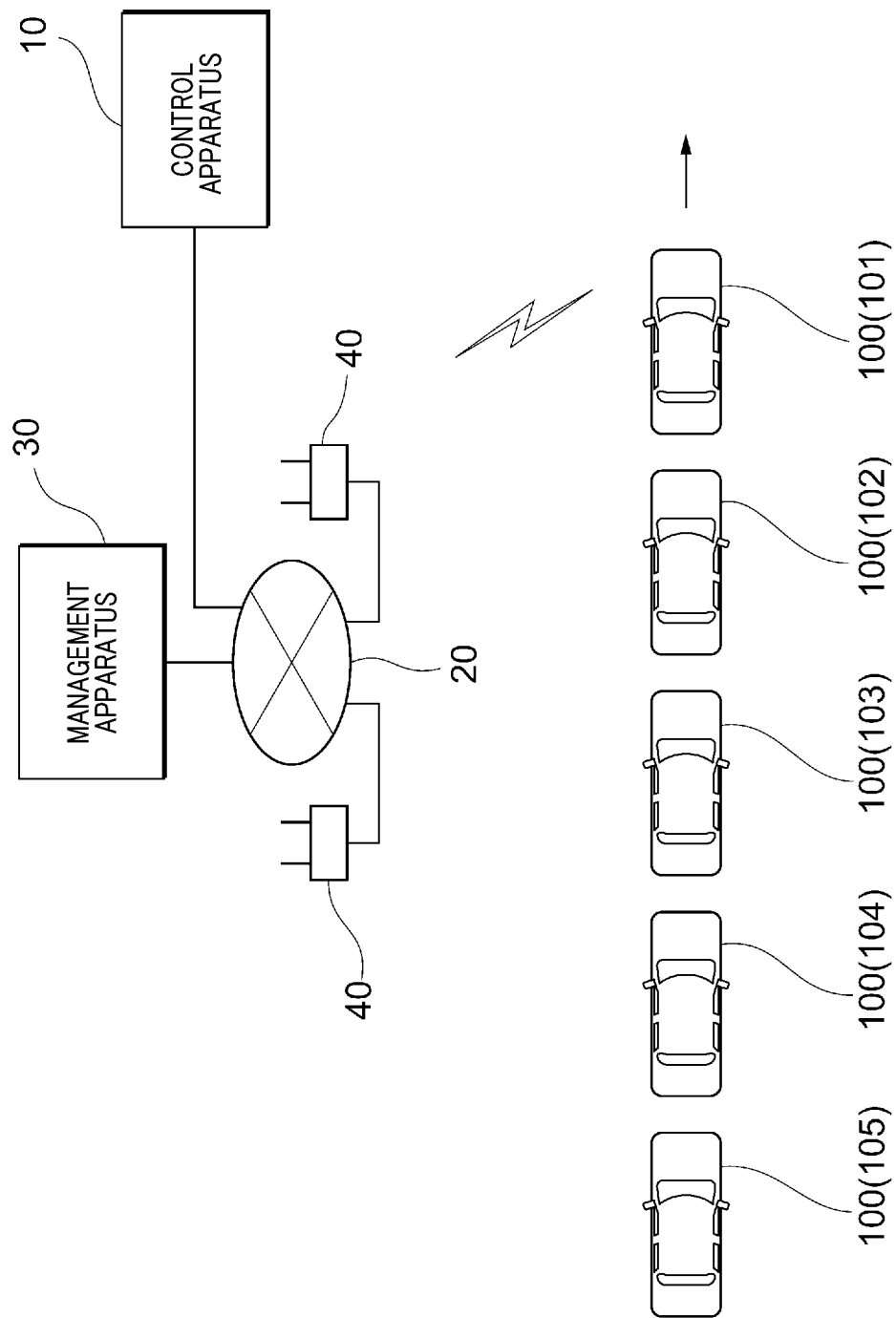
FIG. 1 is a diagram schematically showing vehicles and a control apparatus according to a first embodiment of the present disclosure.

In the platoon travelling, respective vehicles performing platoon travelling perform wireless communication with each other, thereby sharing information on the situation around the road on which the vehicles travel, or transmitting/receiving control signals. Hereinafter, the wireless communication performed between vehicles included in the column is also referred to as inter-vehicle communication. Inter-vehicle communication refers to wireless communication performed in a relatively small area such as a wireless communication LAN (local area network).

The respective vehicles performing the platoon travelling perform the above-mentioned inter-vehicle communication, and further perform wireless communication with a management apparatus (i.e. server) disposed outside the vehicle. Thus, information about a travelling route on which the vehicles in the column will travel can be acquired from the management apparatus. Hereinafter, such wireless communication is also referred to as external communication. The external communication is performed by using a wide-area wireless communication service (e.g. mobile communication network) provided by a telecommunication company.

Further, in the case where a fault occurs in the vehicles included in the column, for example, when the above-described inter-vehicle communication is unable to be performed between some of the vehicles, it may be difficult to maintain platoon travelling. In this respect, according to a conventional technique, it is disclosed, as another communication means capable of dealing with a fault in the inter-vehicle communication, a wide-area wireless communication means mounted on respective vehicles. The wide-area wireless communication means refers to a communication apparatus for communication utilizing the wide-area wireless telecommunication service provided by a telecommunication company. Hereinafter, communication utilizing such a wide-area wireless telecommunication service is also referred to as an external communication.

According to a conventional technique, a configuration is disclosed in which each vehicle travelling in the column is able to perform inter-vehicle communication and external communication. Further, discloses a configuration in which respective vehicles forming the platoon are provided with communication apparatuses, and the respective vehicles are capable of performing external communication individually.

In such a configuration, even when the column is divided into a plurality of groups, the vehicles belonging to each corresponding group are able to travel while performing external communication.

Further, as another example of conventional technique, it is disclosed a travelling system in which a plurality of vehicles forms a column to perform platoon travelling on a predetermined travelling route. The travelling system divides the plurality of vehicles into a leading vehicle group and an end line vehicle group based on information on a projected area of the vehicle. The traveling system is configured to determine the position of the plurality of vehicles in the respective vehicle groups deviation point information, in which the vehicle positions are determined in the leading vehicle group such that the closer to the deviation point, the closer to the leading position the vehicle is arranged, and the vehicle positions are determined in the last line vehicle group such that the closer to the deviation point, the closer to the last line position the vehicle is arranged. The travelling system performs short range inter-vehicle communication referred to as DSRC (Dedicated Short Range Communication), thereby sharing between vehicles various information necessary for platoon travelling.

Generally, external communication is performed based on own identification information data given by a telecommunication company. Note that the identification information data is given in advance based on a line contract with the telecommunication company, which is stored in a SIM card or an eSIM (i.e. embedded SIM) card. In order to perform simultaneous external communication between a plurality of vehicles, individual identification information data needs to be assigned to each communication apparatus in the respective vehicles.

In this respect, as in the example disclosed in the above-mentioned patent literature, when the respective vehicles in the column perform external communication, a plurality of line contracts is necessary for the number of vehicles present in the column of vehicles such that own identification information data need to be assigned to the communication apparatuses of the respective vehicles. However, according to such a configuration, a problem arises that a communication cost to be paid to the telecommunication company increases as the number of line contracts increases.

Moreover, according to the travelling system disclosed in a conventional technique, in the case where one vehicle in the plurality of vehicles travels at a location outside the communicable range of inter-vehicle communication for example, platoon travelling is unable to be performed because the necessary information for platoon travelling cannot be shared between vehicles. Therefore, the plurality of vehicles are required to organize the platoon within a communicable range of the inter-vehicle communication. In this case, for example, the plurality of vehicles may be required to park within a range not exceeding the communicable range of inter-vehicle communication. Hence, the platoon travelling is significantly limited in the above-described case. On the other hand, as a method for expanding the communicable range between a plurality of vehicles, it is considered that long-distance wireless communication via a mobile communication network may be utilized. However, when enabling all vehicles to use the mobile communication network, all of the vehicles are required to have contracts for receiving services of the telecommunication company of the mobile communication network. In other words, communication fees for using the mobile communication network are necessary for all of the vehicles. Hence, the communication cost significantly increases.

Conventional techniques for platoon travelling have been described. Hereinafter, with reference to the attached drawings, embodiments of the present disclosure will be described. To facilitate understanding of the explanation, the same reference numbers are applied to the same constituents in the respective drawings, and redundant explanation thereof will be omitted.

First Embodiment

Hereinafter, a first embodiment will be described. A plurality of vehicles 100 shown in FIG. 1 are configured to perform platoon travelling. Platoon travelling refers to travelling in which a plurality of vehicles run in a column under a state where one or more vehicles are running automatically tracking the head vehicle from behind. According to the present embodiment, each vehicle 100 is configured as an electric vehicle, but may be configured as a vehicle provided with an internal combustion engine.

In FIG. 1, a state where five vehicles 100 are running forming a column is schematically illustrated as a top view. In FIG. 1, respective vehicles 100 are labelled with reference numbers 100, 101, 102, 103, 104, and 105 in the order of vehicle positions from the head vehicle. In the following description, the head vehicle 100 to which a reference number 101 is applied may be referred to as a vehicle 101. Similarly, the second vehicle and subsequent vehicles 100 may be referred to as vehicle 102, vehicle 103 and the like. Note that the number of vehicles 100 which perform platoon travelling may be five or less or more.

A control apparatus 10 shown in FIG. 1 is configured to control each of the plurality of vehicles 100 which perform platoon travelling. The control apparatus 10 according to the present embodiment is disposed inside a building which is not shown. That is, the control apparatus is disposed separately from respective vehicles 100 included in the column, to be located at a location different from that of the respective vehicles. The control apparatus 10 performs wide-area wireless communication with one vehicle included in the vehicles 100, thereby controlling the platoon travelling by the vehicle 101 or the like. The control apparatus 10 performs control including a determination (switching) of the vehicle 100 as an object of the wide-area wireless communication, and switching of the running position of the vehicle 101 or the like in the column. The detailed contents of the control performed by the control apparatus 19 will be described later.

Wide-area wireless communication between the control apparatus 10 and the vehicle 100 is performed by a communication network 20 and a base station 40. The communication network 20 is a wired communication network provided throughout the country, operated by a telecommunication company which also operates the base station 40 and a management apparatus 30 described later. The telecommunication company provides wide-area wireless communication service with cellular phones and the like.

The base station 40 is a facility provided with an antenna used for performing the above-described wide-area wireless communication. A plurality of base stations 40 are provided. Each of the base stations 40 is connected to the above-described communication network 20. Each base station 40 is provided on a roof top of a building around the road so as to at least cover the road on which the vehicle 100 runs as a communicable range.

The management apparatus 30 is a server installed by the above-mentioned communication company. The management apparatus 30 is connected to the control apparatus 10 via the communication network 20. The management apparatus 30 is configured to be capable of performing wide-area wireless communication with the vehicle 100 via the communication network 20 and the base station 40. The management apparatus 30 is a server that manages the identification information data assigned to an external communication apparatus 170 (see FIG. 2) of the vehicle 100. The contents of the process executed by the management apparatus 30 will be described later.

With reference to FIG. 2, a configuration of the vehicle 100 will be described. According to the present embodiment, configurations of all of the vehicles 100 included in the column are the same. The vehicle 100 is provided with a vehicle control apparatus 150, a navigation apparatus 151, a surroundings detection sensor 152, a travelling apparatus 153, a notifying apparatus 154, an inter-vehicle communication apparatus 160 and an external communication apparatus 170.

The vehicle control apparatus 150 is configured to control the entire operation of the vehicle 100. The vehicle control apparatus 150 is configured as a computer system including CPU, ROM and RAM. The vehicle 100 is configured as a vehicle capable of automatically performing driving operation such as braking operation and steering operation without driver's operation, that is, a vehicle capable of performing automatic driving. The vehicle control apparatus 150 controls the entire operation of the vehicle 100, thereby mainly performing necessary processes to achieve the automatic driving.

The navigation system 151 acquires the current location of the vehicle 100 by using the GPS (global positioning system) and acquires a travelling route to the destination based on the acquired current location. The vehicle control apparatus 150 allows the vehicle 100 to perform automatic driving such that the vehicle 100 travels along the travelling route acquired by the navigation system 151 to reach the destination.

In the case where all of the vehicles 100 included in the column perform platoon travelling to the same destination, the navigation system 151 may be installed on a vehicle (e.g. head vehicle 101) among the vehicles 100.

The surroundings detection sensor 152 detects a situation surrounding the vehicle 100. For example, the surroundings detection sensor 152 is configured as an on-vehicle camera or a radar. The surroundings detection sensor 152 detects the boundary of the traffic lane on which the vehicle 100 is travelling, or detects an obstacle (e.g. other vehicle) existing on the travelling road. The situation of the surroundings detected by the surroundings detection sensor 152 is transmitted to the vehicle control apparatus 150. Thus, the vehicle control apparatus 150 is able to prevent the vehicle 100 from deviating from the boundary of the traffic lane, or from colliding with an obstacle.

In the case where the all of the vehicles 100 included in the column travel to the same destination, only one vehicle (e.g. head vehicle 101) among them may have the surroundings detection sensor 152.

The travelling apparatus 153 is configured to have the vehicle 100 travel. The travelling apparatus 153 is provided with a motor that produces a driving force of the vehicle 100, an electric brake for braking the vehicle 100, and an electric steering apparatus for performing a steering operation of the vehicle 100. The vehicle control apparatus 150 controls the above described apparatuses included in the travelling apparatus 153, thereby performing automatic driving of the vehicle 100.

The notifying apparatus 154 notifies the passengers in the vehicle 100 about a traveling state of the vehicle 100 (e.g. current location during travelling). The notifying apparatus 154 is, for example, a touch panel screen. Note that the notifying apparatus 154 may not be provided in the case where no passengers are present in the vehicle 100 because the vehicle 100 is configured as a cargo carrying vehicle.

The inter-vehicle communication apparatus 160 includes a transmitter/receiver having an antenna and performs a wireless communication between the vehicle 100 and other vehicles 100 included in the column. Respective vehicles 100 in the column perform wireless communication with each other using the inter-vehicle communication apparatus, thereby sharing information about the situation around the vehicles or transmitting/receiving control signals for adjusting a brake timing and the like. Note that such a wireless communication is also referred to as inter-vehicle communication hereinafter. For example, inter-vehicle communication is performed in a relatively small range such as that for wireless LAN (local area network).

The external communication apparatus 170 includes a transmitter/receiver having an antenna and utilizes a wide-area wireless communication service provided by the above-mentioned communication company to perform wide-area wireless communication with equipment outside the vehicle such as the management apparatus 30 and the control apparatus 10. Hereinafter, this wide-area wireless communication is also referred to as external communication in order to differentiate with the above-described inter-vehicle communication.

The external communication is performed based on own identification information data given by the telecommunication company. The identification information data is given in advance based on a line contract with the telecommunication company, in which the information is stored in a SIM (subscriber identity module) card or an eSIM card for cellular phones. In order to allow a plurality of vehicles 100 to simultaneously perform external communication, a plurality of identification information data sets corresponding to the number of vehicles have to be given, and dedicated identification information data has to be assigned to the external communication apparatus 170 of each vehicle 100.

According to the present embodiment, the external communication apparatus 170 is provided in the all of the vehicles 100 included in the column 100. Alternatively, the external communication apparatus 170 may not be provided in the all of the vehicles 100 but may be provided only in some of the vehicles 100.

The control apparatus 10 performs a process for managing the assignment of the identification information data to the respective external communication apparatuses 170. As will be described later, the control apparatus 10 may perform a process in which identification information data being assigned to a specific vehicle 100 is reassigned to an external communication apparatus 170 of another vehicle 100.

However, according to the present embodiment, the number of identification information data sets being given in advance by the telecommunication company is lower than the number of vehicles 100 included in the column. Hence, the control apparatus 10 controls the respective vehicles 100 (i.e. process of the above-described assignment) such that the number of vehicle 100 capable of simultaneously performing an external communication is always lower than the number of vehicles 100 included in the column.

In such a configuration, the number of line contracts of the telecommunication company (i.e. the number of given identification information data set) is lower than the number of vehicles 100 included in the column. Hence, compared to a case where the identification information data is assigned to the all of vehicles 100, the communication cost due to the external communication can be reduced.

In an example shown in FIG. 1, the identification information data is assigned to only the external communication apparatus 170 of the vehicle 101 in the head position of the column, the identification information data is not assigned to the external communication apparatus 170 of other vehicles 102 or the like. Therefore, only the vehicle 101 having the assigned identification information data is able to perform external communication directly with the control apparatus 10 or the management apparatus 30.

The vehicles 102 or the like which have not been assigned with the identification information data are not able to perform external communication with the control apparatus 10 or the management apparatus 30 directly. However, the vehicles 102 perform inter-vehicle communication with the vehicle 101 capable of performing external communication, thereby communicating with the control apparatus 10 or the management apparatus 30 via the vehicle 101. In other words, the vehicle 101 performs so called tethering, whereby the vehicle 102 or the like is able to communicate with the control apparatus 10 or the management apparatus 30.

With reference to FIGS. 3A and 3B, the assignment of the identification information data for the external communication apparatus 170 will be described. The table shown in FIG. 3A illustrates a correlation between ID in the left column and the identification information data in the right column. The ID refers to a unique number individually set in advance for the external communication apparatuses 170 mounted on the respective vehicles 100. According to the present embodiment, as an ID, 01 is assigned to the external communication apparatus 170 mounted on the vehicle 101, ID 02 is assigned to the external communication apparatus 170 mounted on the vehicle 102, and ID 03 is assigned to the external communication apparatus 170 mounted on the vehicle 103. The correlation shown in FIGS. 3A and 3B are stored in the management apparatus 30.

In the case where the correlation stored in the management apparatus 30 is like a correlation shown in FIG. 3A, AAAAA as the identification information data is assigned to the external communication apparatus 170 (ID=01) mounted on the vehicle 101. On the other hand, identification information data is not assigned to the external communication apparatus 170 mounted on the other vehicle 102 or the like. Hence, similar to the example shown in FIG. 1, only the vehicle 101 is able to perform the external communication.

When the correlation stored in the management apparatus 30 changes from the example shown in FIG. 3A, the assignment of the identification information data to the respective external communication apparatus 170 varies. In other words, the management apparatus 30 changes the stored correlation, thereby changing the assignment of the identification information data to the respective external communication apparatuses 170.

FIG. 3B exemplifies a correlation which has been changed. In the case where the correlation is a correlation shown in FIG. 3B, AAAAA as the identification information data is assigned to the external communication apparatus 170 (ID=02) mounted on the vehicle 102. On the other hand, identification information data is not assigned to the external communication apparatus 170 mounted on another vehicle 101 or the vehicle 103 or the like. Hence, only the vehicle 102 is able to perform external communication.

The management apparatus 30 changes the stored correlation from a correlation shown in FIG. 3A to a correlation shown in FIG. 3B, whereby the assignment of the identification information data to the vehicle 102 from the vehicle 101 is performed. As a result, the vehicle 100 performing the external communication is changed to vehicle 102 from vehicle 101. The management apparatus 30 changes the assignment in such a way in response to a requirement transmitted from the control apparatus 10.

According to the above-described example, the management apparatus 30 always manages the correlation between the identification information data and the ID, that is, the correlation between the identification information data and the external communication apparatus 170. The management apparatus 30 changes the correlation, thereby changing the assignment of the identification information data.

Alternatively, the above-described aspect may be changed to an aspect in which the correlation between the identification information data and the ID is not managed by the management apparatus 30. For example, the control apparatus 10 may directly assign, without going via the management apparatus 30, the identification information data such as AAAAA to a specific external communication apparatus 170. Also, the identification information data AAAAA may be directly transmitted to the vehicle 102 from the vehicle 101, thus changing an object to which the identification information data is assigned.

Figure 4A:
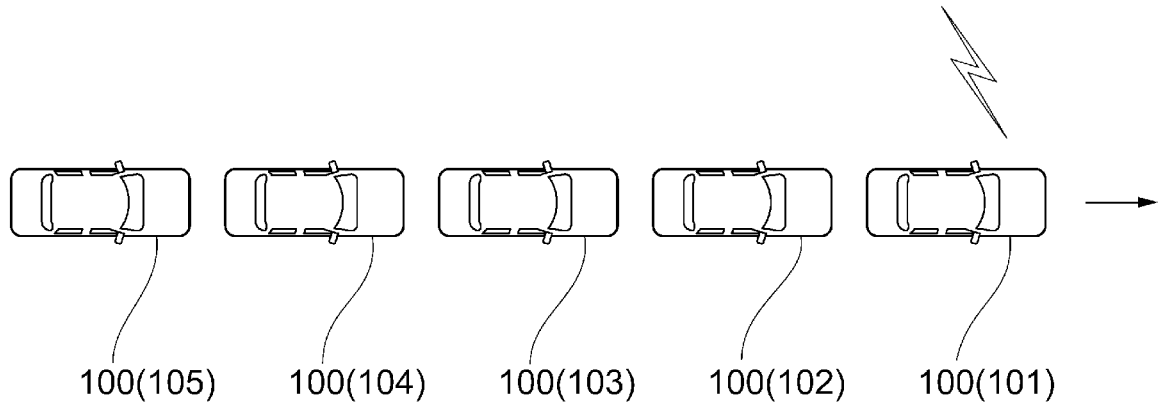
FIGS. 4A, 4B and 4C are diagrams for explaining an overall process executed by the control apparatus according to the first embodiment.

An overall process performed by the control apparatus 10 in order to change the object to be assigned with the identification information data will be described with reference to FIGS. 4A, 4B and 4C. FIG. 4A illustrates a state where five vehicles 100 are travelling in a column similar to that shown in FIG. 1. At this moment, the external communication apparatus 170 has assigned the identification information data only to the frontmost side vehicle in the column (i.e. head vehicle 101).

Figure 4B:
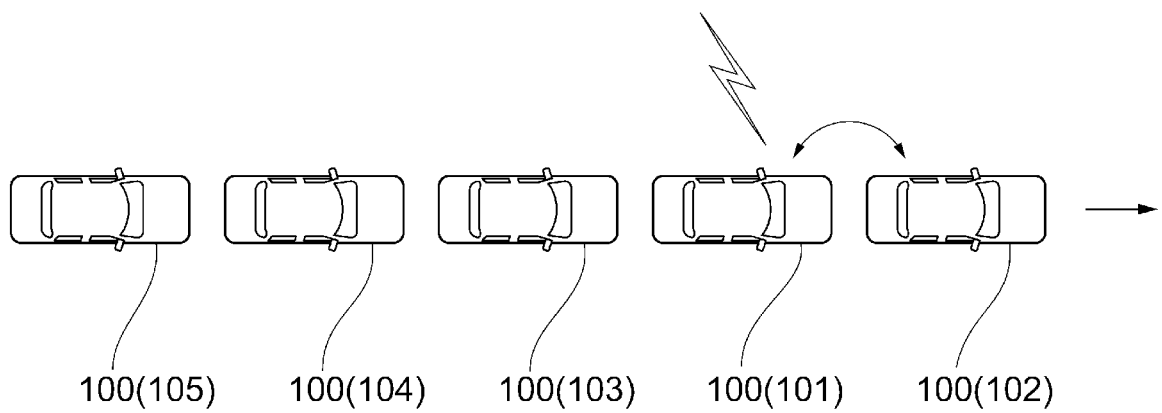

FIG. 4B illustrates a state immediately after the travelling position of the vehicle 101 and the travelling position of the vehicle 102 are exchanged from each other, which has been changed from a state shown in FIG. 4A. In this state, the vehicle 102 is travelling at the frontmost position in the column, and the vehicle 101 is travelling at the second frontmost position in the column. Hence, according to a state shown in FIG. 4B, only the vehicle 101 travelling at the second frontmost position in the column performs external communication. Note that such an exchange between travelling positions is performed, for example, when an abnormality occurs in the head vehicle 101.

In a state shown in FIG. 4B, the control apparatus 10 performs a process to change the assignment of the identification. Specifically, the control apparatus 10 performs a process that requires the management apparatus 30 to perform an assignment such that the identification information data assigned to the external communication apparatus 170 of the vehicle 101 is assigned to the external communication apparatus 170 of the vehicle 102 travelling at the head position in the column. As described with reference to FIG. 3, the management apparatus 30 changes the correlation between the ID and the identification information data. As a result, the identification information data is assigned to the external communication apparatus 170 of the vehicle 102.

Figure 4C:
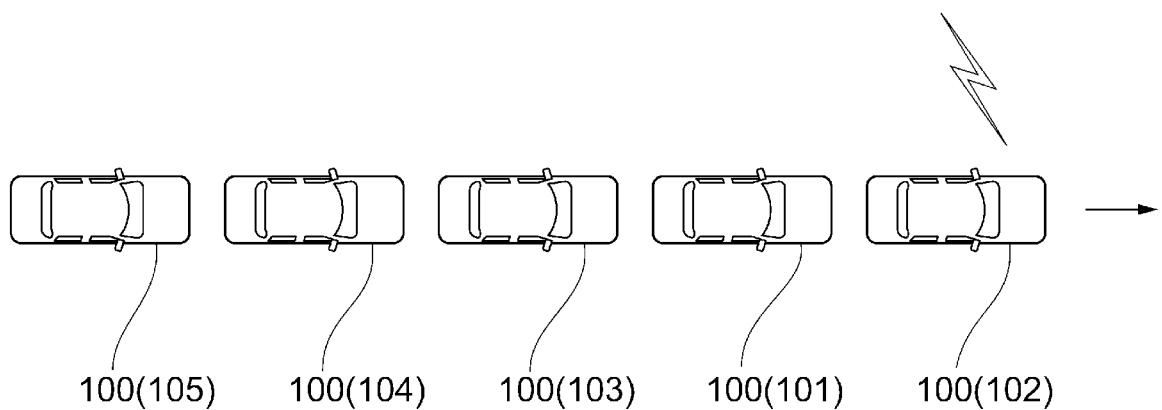

FIG. 4C illustrates a state after such a process is performed. In the state shown in FIG. 4C, similar to the state shown in FIG. 4A, only the vehicle 102 travelling at the frontmost position in the column performs external communication.

Thus, the control apparatus 10 according to the present embodiment assigns the identification information data to the external communication apparatus 170 of the vehicle 100 travelling at a specific position in the column, and performs a process that allows the vehicle 100 to perform external communication. Note that the specific position refers to a travelling position set in advance of the vehicle 100 that performs external communication during the platoon travelling. According to an example shown in FIG. 4, the frontmost side travelling position in the column is set as the above-described specific position.

The above-described travelling position refers to a travelling position where a vehicle is in the order of vehicle positions from the head vehicle while a plurality of vehicles are travelling in a row forming a platoon. In the following description, the travelling position of the vehicle 100 may merely refer to position.

As described above, the control apparatus 10 according to the present embodiment changes the vehicle 100 in the column which performs external communication. Specifically, the control apparatus 10 assigns the identification information data such that a vehicle 100 travelling at the frontmost position in the column performs external communication.

In the case where a plurality of vehicles 100 perform platoon travelling, the vehicle 100 travelling at the frontmost side may preferably perform a process of detecting obstacles, a process of adjusting steering/braking timing, and a process acquiring required information to perform these processes from the control apparatus 10 or the like via the communication. Hence, when only a vehicle 100 other than the head vehicle performs the external communication, the head vehicle 100 that performs the above-described processes is required to perform the communication with the control apparatus 100 or the like via the external communication apparatus 170 of the vehicle 100 performing external communion (i.e. indirect communication). In this operation, due to a communication time lag, there is a concern that the head vehicle 100 travelling at the frontmost position cannot acquire the information promptly.

In this respect, according to the present embodiment, when the head vehicle 100 is controlled to always perform external communication, the head vehicle 100 is able to perform direction communication with the control apparatus 10 or the like without communicating via the external communication apparatus 170 of another vehicle 100. Therefore, no communication time lag as described above occurs in the configuration of the present embodiment.

Figure 5:
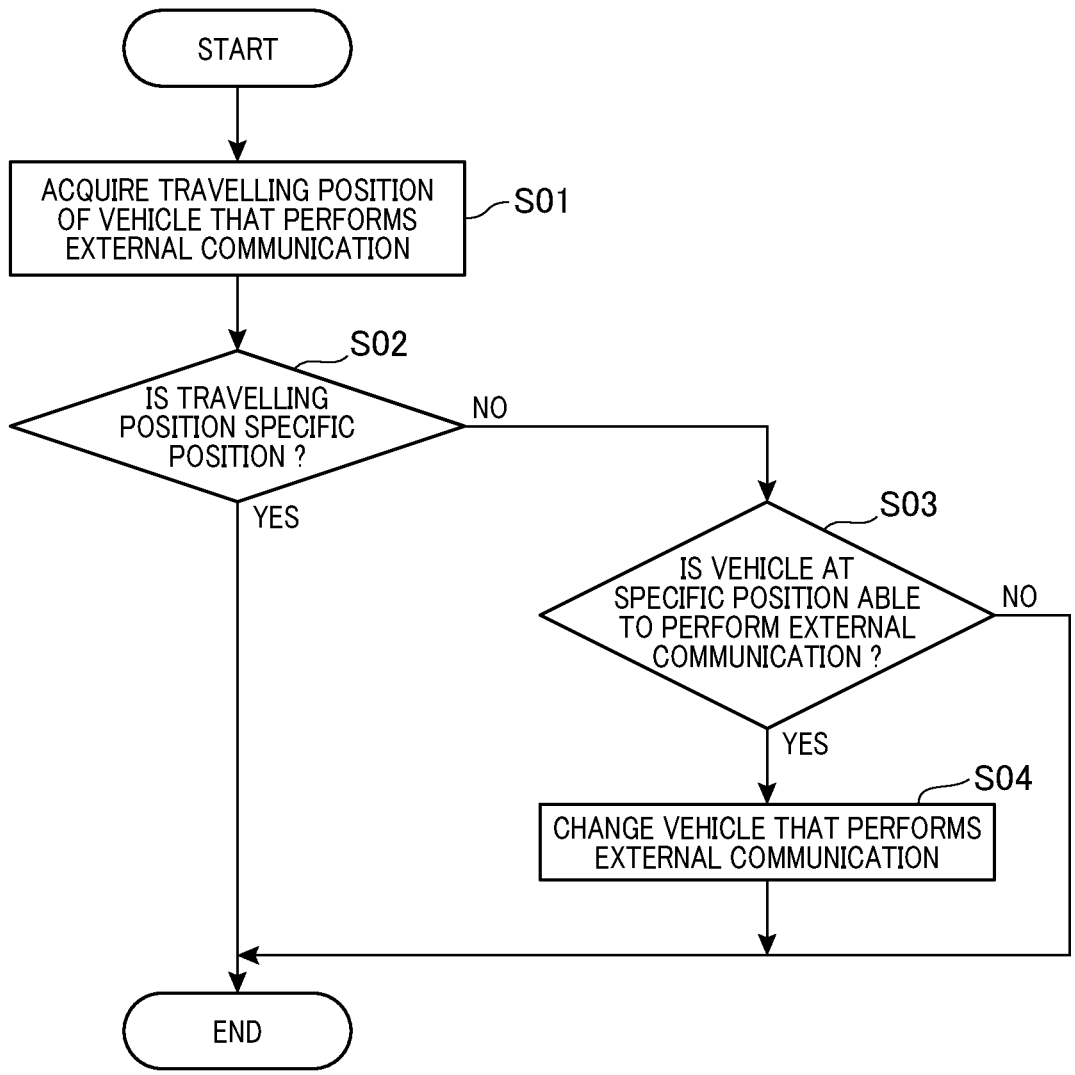
FIG. 5 is a flowchart showing a process executed by the control apparatus according to the first embodiment.

The processes executed by the control apparatus 10 in order to achieve the above-described control will be described with reference to FIG. 5. The series of processes shown in FIG. 5 are repeatedly executed at predetermined control periods.

At the first step S01 of the subject processes, a process for acquiring current travelling position is executed for the vehicle 100 where the identification information data is assigned to the external communication apparatus 170. This process is directly or indirectly performed by communicating with the respective vehicles 100.

At step S02, subsequent to step S01, the process determines whether or not the travelling position acquired at step S01 is the above-described specific position set in advance (head position in the column according to the present embodiment). When the acquired travelling position is the specific position, the vehicle 100 travelling at the specific position is regarded as a vehicle performing external communication based on the identification information data assigned to the external communication apparatus 170. In this case, since it is not necessary to reassign the identification information data, the series of processes shown in FIG. 5 is terminated.

In the case where the travelling position is different from that of the specific position, the process proceeds to step S03. At step S03, the process determines whether the vehicle 100 currently travelling at the specific position includes the external communication apparatus 170. In the case where the vehicle 100 does not include the external communication apparatus 170, the series of processes shown in FIG. 5 are terminated. When the vehicle 100 includes the external communication apparatus 170, the process proceeds to step S04. According to the present embodiment, since all of the vehicles 100 include the external communication apparatus 170, the process always proceeds to step S04 from step S03.

At step S04, the process assigns the vehicle 100 travelling at the specific position to be a vehicle 100 that performs external communication, from the currently assigned vehicle 100 that performs the external communication. Specifically, the process reassigns the identification information data currently assigned to the external communication apparatus 170 of the vehicle 100 currently performing the external communication, to an external communication apparatus 170 of the vehicle 100 currently travelling at the specific position 100. Thus, the state shown in FIG. 4B changes to a state shown in FIG. 4C.

Figure 6:
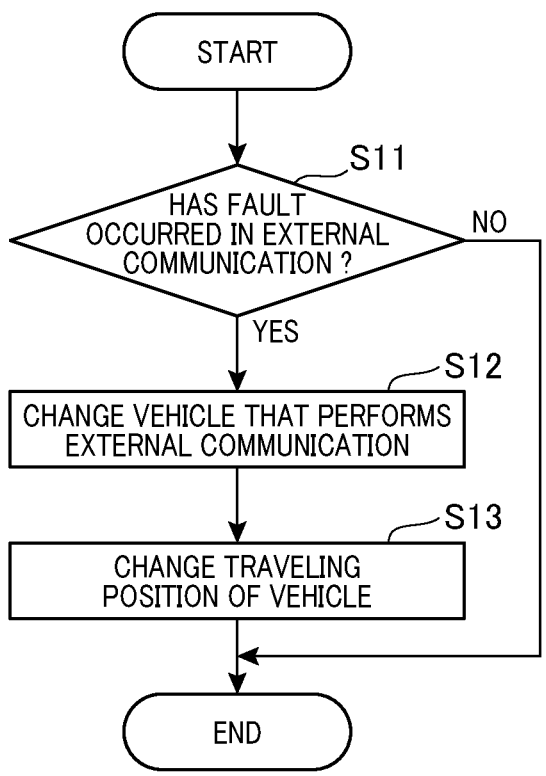
FIG. 6 is a flowchart showing a process executed by the control apparatus according to the first embodiment.

Other processes performed by the control apparatus 10 will be described. The series of processes shown in FIG. 6 is repeatedly executed at a predetermined period by the control apparatus 10. The series of processes are executed in parallel to the series of processes shown in FIG. 5.

At the first step S11 of this process, the process determines whether a fault has occurred in the external communication between the vehicle 100 in the column and the control apparatus 10. In the case where external communication has been performed normally, the series of processes shown in FIG. 5 is terminated. On the other hand, for example, in the case where a fault has occurred, for example, where no response from the vehicle 100 has been detected for a constant period, the process proceeds to step S12.

At step S12, the process switches (i.e. changes) the vehicle 100 which performs the external communication among the vehicles 100 performing platoon travelling. Specifically, the process cancels the assignment of the identification information data assigned to the external communication apparatus 170 which has been performing external communication, and then transmits a command to the management apparatus 30 such that the management apparatus 30 reassigns the identification information data to the external communication apparatus 170 of another vehicle 100. Thus, the vehicle 100 which performs external communication is changed. This process allows external communication to be continuously performed between the vehicle 100 in the column and the control apparatus 10, even when a fault occurs in some of external communication apparatuses 170.

At step S12 subsequent to step S13, the process changes the travelling position of the vehicle 100 in which the identification information data is assigned to the external communication apparatus 170. Specifically, the process changes the travelling positions of the respective vehicles 100 in the column such that the vehicle 100 in which the identification information data is assigned to the external communication apparatus 170 travels at a specific position in the column (head position according to the present embodiment).

The control apparatus 100 according to the present embodiment directly controls the steering operation or the like of the respective vehicles 100 via the communication with the vehicle communication apparatus 150, whereby the travelling position of the respective vehicles 100 are changed. Alternatively, the process may transmit only a signal designating target travelling positions to the respective vehicles 100 from the control apparatus 10 to control the steering operation or the like of the respective vehicles 100, thereby changing the travelling positions of the respective vehicles to be the target travelling positions.

According to the above-described example, the traveling position at the frontmost side position in the column is set as the specific position. However, another travelling position may be set as the specific position. In other words, external communication may be performed at a position other than from the frontmost side position in the column.

For example, any positions excluding the frontmost side and the most rear side in the column may be set as the specific position. These travelling positions are positions having low probability of collision (e.g. rear impact collision) with other vehicles existing at positions other than the platoon. Accordingly, since the above-described travelling positions are set as the specific positions, probability of disrupted external communication due to an accident can be lowered.

Figure 7:
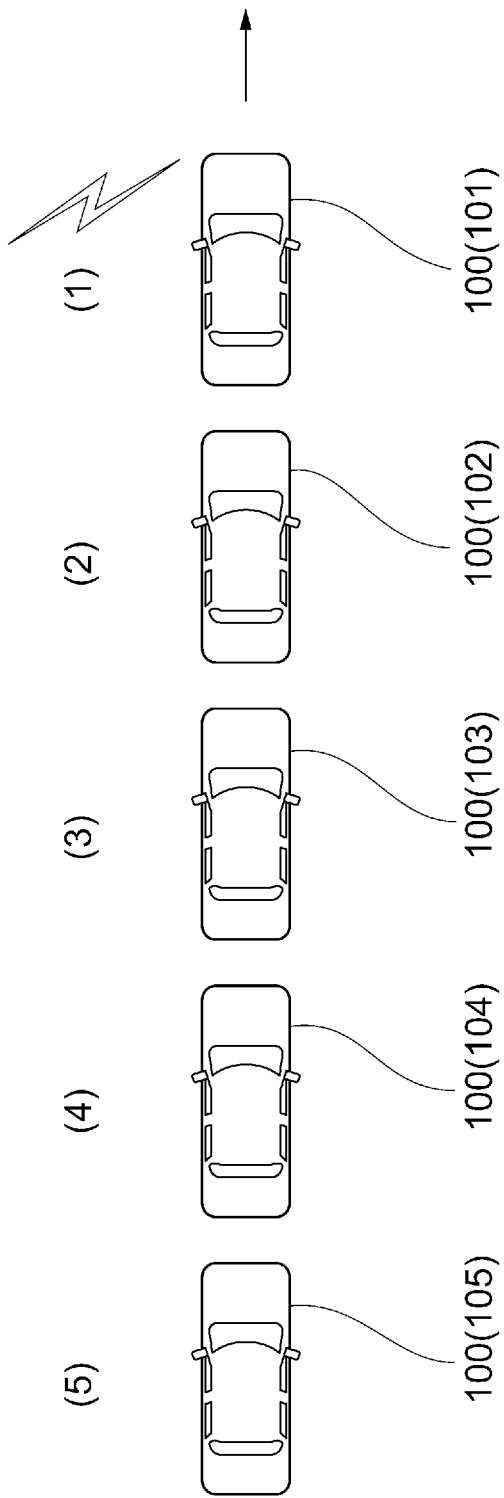
FIG. 7 is a diagram for explaining a priority set for running positions of vehicles.

According to the present embodiment, the priority of the vehicle 100 for performing external communication is set for each travelling position of the respective vehicles 100. The priority is used, in a process of step S12, as a reference for determining the vehicle 100 to which the identification information data is assigned. FIG. 7 illustrates an example of the priority. The numbers written in the parentheses in the above the respective vehicles represent the priorities set for corresponding travelling positions. The priority is set such that the smaller the number, the higher the priority.

As shown in FIG. 7, the travelling position of the vehicle 101, that is, the first travelling position with respect to the head position is set as 1 indicating the highest priority. The priority is set, in the order of vehicle positions from head to rear, as 1, 2, 3, 4 and 5.

The vehicle 101 having the highest priority 1 has identification information data in the external communication apparatus 170 from the first, and performs external communication. In the case where a fault occurs in the external communication performed by the vehicle 101, the identification information data assigned to the external communication apparatus 170 included in the vehicle 101 is cancelled, and then the vehicle 102 having the second highest priority performs external communication. Note that the priority set in advance for the respective travelling position in the column may be different from that of the example shown in FIG. 7.

Figure 8:
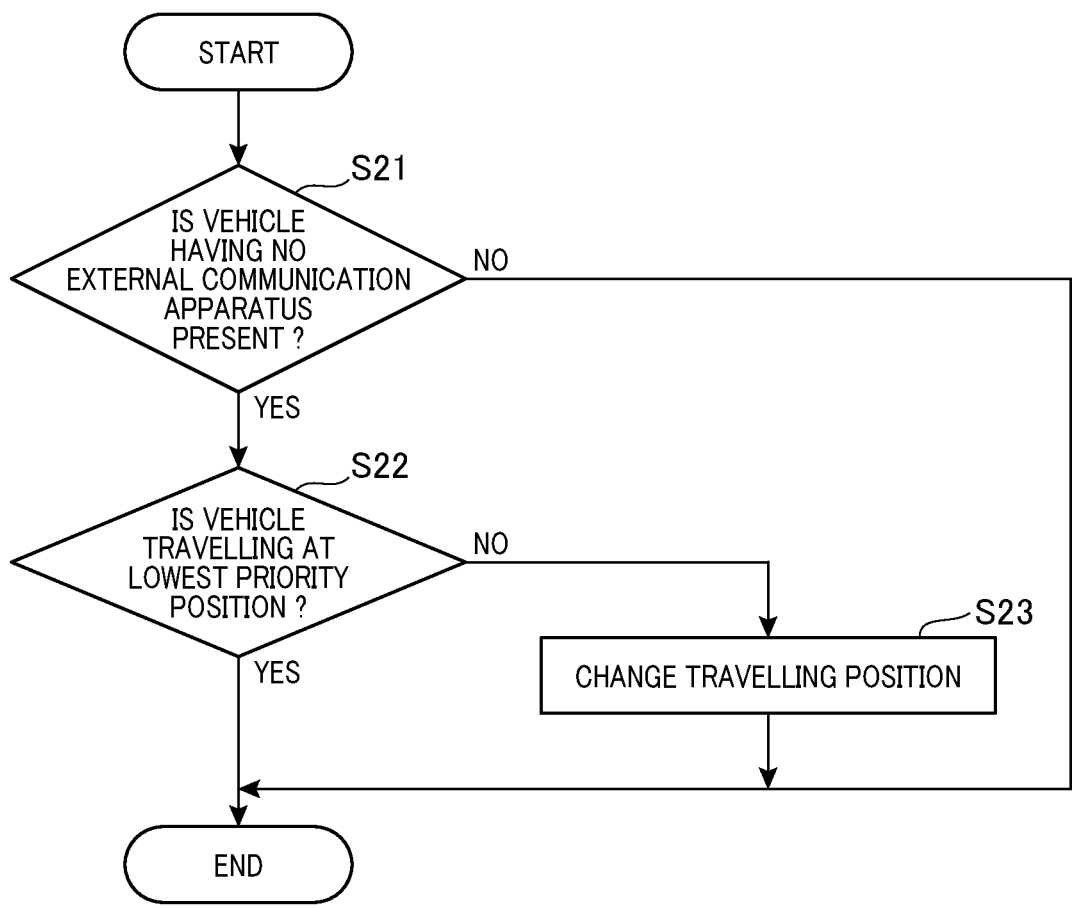
FIG. 8 is a flowchart showing a process executed by the control apparatus according to the first embodiment.

Hereinafter, other processes performed by the control apparatus 10 will be described. The series of processes shown in FIG. 8 is repeatedly executed at predetermined control periods by the control apparatus 10. The series of processes are executed in parallel to the series of processes shown in FIG. 5.

At the first step S21, the process determines whether a vehicle 100 having no external communication apparatus 170 is present among the plurality of vehicles 100 in the column. As an example according to the present embodiment, when a vehicle 100 having no external communication apparatus 170 is not present, the series of processes shown in FIG. 8 is terminated. On the other hand, when a vehicle 100 having no external communication apparatus 100 is present, the process proceeds to step S22.

At step S22, the process determines whether the vehicle 100 having no external communication apparatus travels at a position having the lowest priority in the column. In the example shown in FIG. 7, the position having the lowest priority refers to the most rear side position to which the priority 5 is set. In the case where the vehicle 100 having no external communication apparatus 170 is travelling at the position having the lowest priority, the process terminates the series of processes shown in FIG. 8. Otherwise, the process proceeds to step S23.

At step S23, the process changes the travelling position of the above-described vehicle 100. Specifically, the process changes the travelling positions of the respective vehicles 100 in the column such that the vehicle 100 having no external communication apparatus 170 travels at the position having the lowest priority.

Thus, the control apparatus 10 according to the present embodiment executes a process, when a vehicle 100 having no external communication apparatus 170 is present in the vehicles 100 included in the column, executes a process to allow the vehicle 100 having no external communication apparatus 170 to travel at the position having the lowest travelling position. In the case where such a process is executed, it is unlikely to change the travelling position of the vehicle 100 having no external communication apparatus 170, when the assignment of the identification information data is changed. As a result, the process of changing the travelling positions of the respective vehicles 100 can be simplified.

In the case where a plurality of vehicles 100 having no external communication apparatus 170 are present, the order of travelling in the column may be changed such that the respective vehicles travel at positions having lower priority. For example, if two vehicles 100 having no external communication apparatus 170 are present, the order of travelling for the vehicles in the column may be changed such that one vehicle 100 travels at a position having the lowest priority and other vehicle 100 travels at the second lowest position.

In the above-described configurations, the identification information data is assigned to the external communication apparatus 170 of only one vehicle 100 in the plurality of vehicles 100 in the column. However, the number of vehicles 100 in which the identification information data is assigned to the external apparatus 170 may be two or more. In other words, two or more identification information data items may be acquired from the telecommunication company, whereby two or more vehicles 100 may perform simultaneous external communication.

For the above-mentioned cases, an example of the priority set for respective travelling positions will be described with reference to FIG. 9. In the following, an example is shown in which two identification data item are acquired from the external communication company, and two vehicles 100 perform simultaneous external communication.

Also, in this example, priorities the same as those shown in FIG. 7 are set in advance for respective travelling positions. That is, initial priority is set as 1, 2, 3, 4 and 5 in the order of vehicle positions from head to rear. However, in the case where the first identification information data in two identification information data items is assigned to the external communication apparatus 170, the above-described priority is changed in response to this assignment.

Figure 9A:
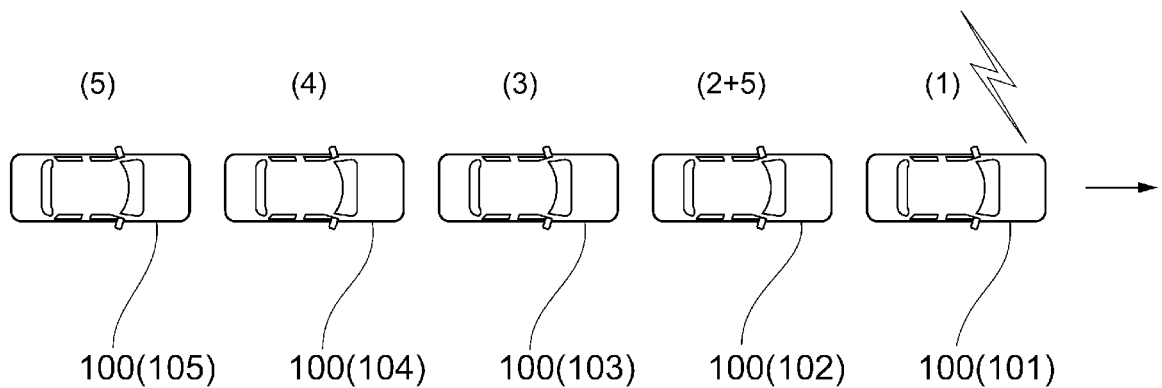
FIGS. 9A, 9B and 9C are diagrams explaining a change in the priority.

FIG. 9A illustrates a state where the first identification information data is assigned. The first identification information data is assigned to the vehicle 100 to which the priority 1 is set, that is the external communication apparatus 170 of the head vehicle 101.

In this example, once the identification information data is assigned to the external communication apparatus 170 of the specific vehicle 100, 5 (i.e. the number of vehicles included in the column) is added to the priority value at the travelling position adjacent to the specific vehicle in the back and forth direction. According to the example shown in FIG. 9A, a vehicle 102 travelling at a position immediately following the specific vehicle 101 is changed to the priority 7 (2+5) from the initial value 2. As a result, the priority of the travelling position of the vehicle 102 is the lowest in the column.

Therefore, the second identification information data is not assigned to the external communication apparatus 170 of the vehicle 102, but assigned to the external communication apparatus 170 of the vehicle 103 travelling at a position having the priority 3. The value 5 is added to the priority of the travelling position of the vehicle 102. This is because, the priority of the travelling position is set to be sufficiently low, in order to avoid a state where the vehicle 101 to which the first identification information data is assigned and the vehicle 100 to which the second identification information data is assigned are adjacent to each other in the backward and forward direction.

In the case where a pair of vehicles 100 capable of simultaneously performing external communication travel at adjacent positions in the back and forth positions, and the column is divided into two columns, it is possible that there is no vehicle 100 capable of performing external communication in the other column. In this respect, the control apparatus 10 according to the present embodiment appropriately sets the priority such that the pair of vehicles 100 capable of simultaneously performing the external communication do not travel at adjacent travelling positions in the back and forth direction in the column, and re-assigns the vehicle 100 that performs external communication based on the set priority among the vehicles 100 in the column. Thus, even in the case where the column is divided into two columns, the probability of a vehicle 100 capable of performing external communication being present in each of the divided columns can be higher.

Figure 9B:
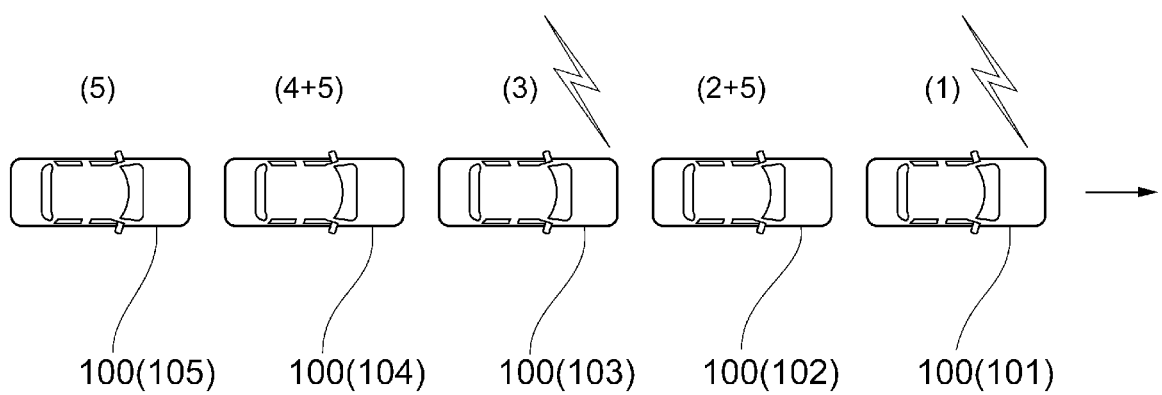

FIG. 9B illustrates a state where two identification information data items are assigned to the external communication apparatus 170 of the vehicle 103 after changing the priority shown in FIG. 9A. In association with the second identification information data which are assigned, 5 is added again to the priority value at the travelling positions of the vehicle 103 which are adjacent to each other in the back and forth direction. In the example shown in FIG. 9B, the priority of the travelling position of the vehicle 104 travelling at a position immediately following the vehicle 103 is changed to 9 (4+5) from the initial value 4. The value 5 may be added to the priority of the travelling position of the vehicle 102 travelling at the immediately preceding position of the vehicle 103. However, the value 5 is already added to the priority so that the priority is sufficiently low. Hence, in the example shown in FIG. 9B, this process is not executed in the example shown in FIG. 9B.

Assuming that the third identification information data is present, the identification information data is assigned to the external communication apparatus 170 of the vehicle 105 travelling at a position having the priority 5.

Figure 9C:
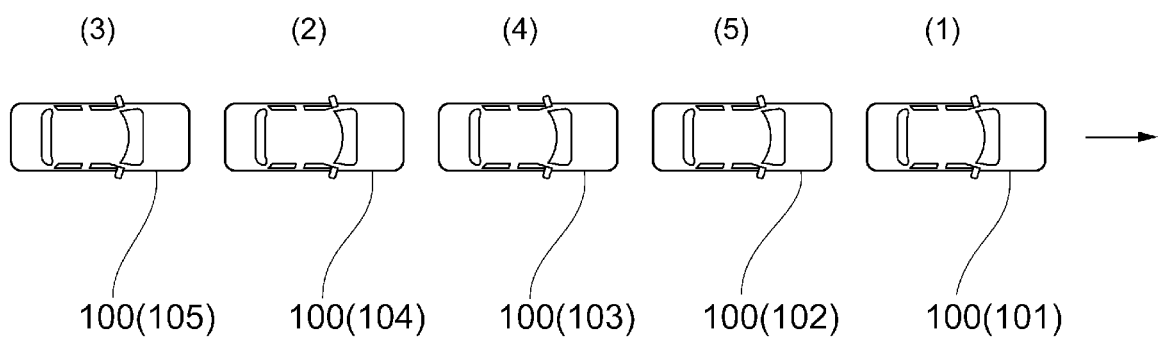

The initial priority set in advance for respective travelling positions before assigning the identification information data, may be different from that shown in FIG. 7. FIG. 9C illustrates other example of the initial priority.

According to an example shown in FIG. 9C, the priority 1 is set for the travelling position which is at the frontmost end of the column (position of the vehicle 101 in FIG. 9C). The priority 2 is set for the travelling position which is at the next-to-rearmost position of the column (travelling position of the vehicle 104 in FIG. 9C). The priority 3 is set for the travelling position at the rearmost end in the column (travelling position of the vehicle 105 in FIG. 9C). The priority 4 is set for the travelling position at the central position in remaining vehicle 100 (travelling position of the vehicle 103 according to FIG. 9C). The priority 5 is set for the travelling position of remaining vehicle 100 (travelling position of the vehicle 102 in FIG. 9C).

In the above-described example, the priority 1 is set for the travelling position in the frontmost side, and the priority is set for other travelling positions such that the closer to the rear side, the higher the priority is. This is because, when assigning the second identification information data to the external communication apparatus 170 of the vehicle 100 travelling at the rear side, even in the case where the column is divided into two columns, external communication is likely to be performed in each of the divided two columns.

However, according to the above-described example, the priority 2 is set not for the travelling position in the most rear side in the column but for the travelling position in the inner most rear side in the column (travelling position of the vehicle 104 in FIG. 9C). The reason why the travelling position is set as described above, is that external communication may be unable to be performed due to an accident.

Figure 10:
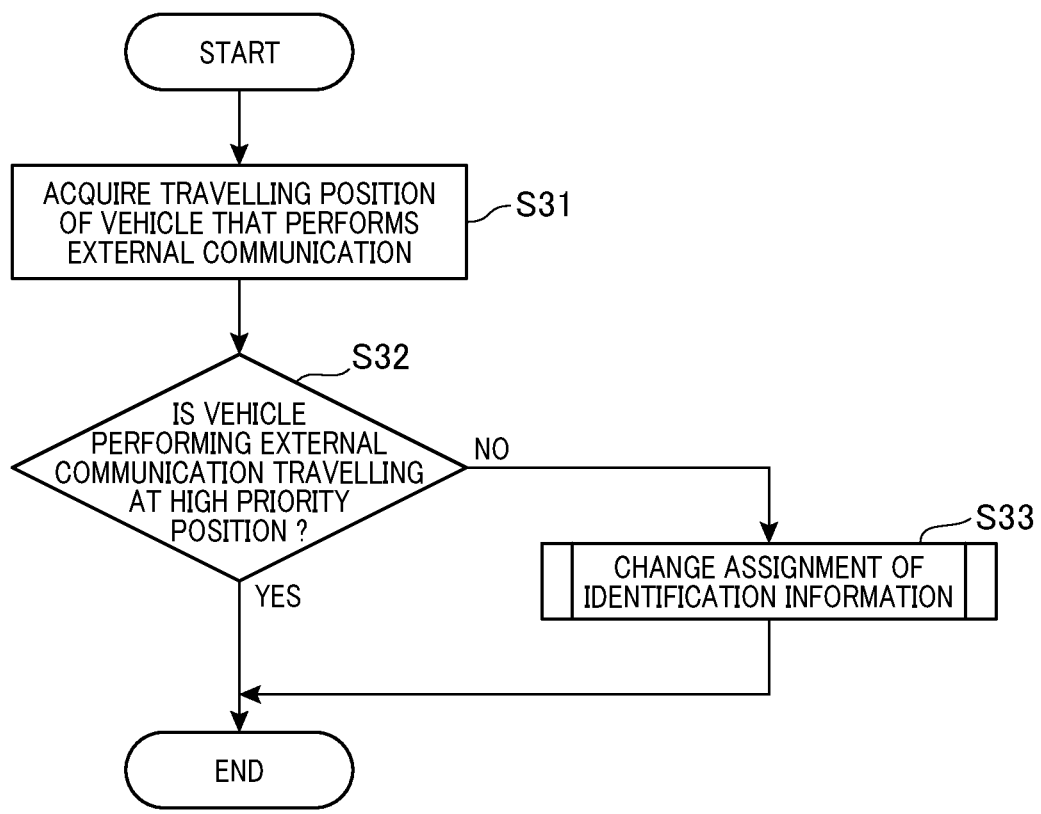
FIG. 10 is a flowchart showing a process executed by the control apparatus according to the first embodiment.

The processes executed by the control apparatus 10 for the case where two or more vehicles 100 simultaneously perform the external communication will be described with reference to FIG. 10. The series of processes shown in FIG. 10 is repeatedly executed by the control apparatus 10 at predetermined control periods. This series of processes is executed instead of executing the series of processes shown in FIG. 5.

At the first step S31, the process acquires the current travelling positions of the vehicles 100 performing external communication in the column, that is, the respective vehicles 100 in which identification information data is assigned to a communication apparatus 170. This process is performed by directly or indirectly communicating with the respective vehicles 100.

At step S32 subsequent to step S31, the process determines whether the travelling positions acquired at step S31 have high priority. The travelling positions having high priority refer to travelling positions having higher priorities than those of respective other vehicles 100 in which no identification information data is assigned to each external communication apparatus 170. For example, assuming a case where the column includes five vehicles 100 and the number of identification information data sets already assigned is two, the above-described travelling positions having high priority are the travelling positions having the highest priority (e.g. 1) or the second highest priority (e.g. 2).

In the case where the travelling positions acquired at step S31 have high priority, the process terminates the series of processes shown in FIG. 10. In the case where the travelling position acquired at step S31 do not have high priority, the process changes assignment of the identification information data at step S33.

Figure 11:
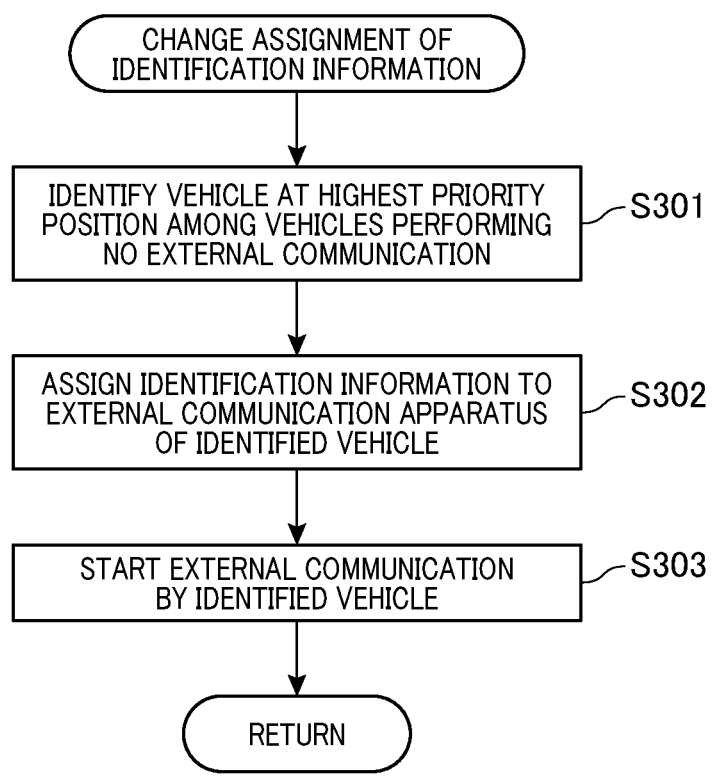
FIG. 11 is a flowchart showing a process executed by the control apparatus according to the first embodiment.

With reference to FIG. 11, specific contents of the process will be described. The flowchart shown in FIG. 11 illustrates a flow of the process executed at step S33 shown in FIG. 10.

At step S301, the process identifies the travelling positions of respective other vehicles 100 having no identification information data assigned to the external communication apparatus 170. Thereafter, the process identifies the travelling position having the highest priority among the identified travelling positions.

At step S302 subsequent to step S301, the process reassigns the identification information data to the external communication apparatus 170 of the vehicle 100 travelling at the specific travelling position as described above. At step S303 subsequent to step S302, the vehicle 100 to which the identification information data is assigned starts external communication. Thus, the vehicle 100 performing external communication is changed to a vehicle 100 travelling at the position having high priority as described above. Note that the process shown in FIG. 11 is repeatedly executed as needed until the respective vehicles 100 travelling at positions having high priorities are able to perform external communication.

Figure 12:
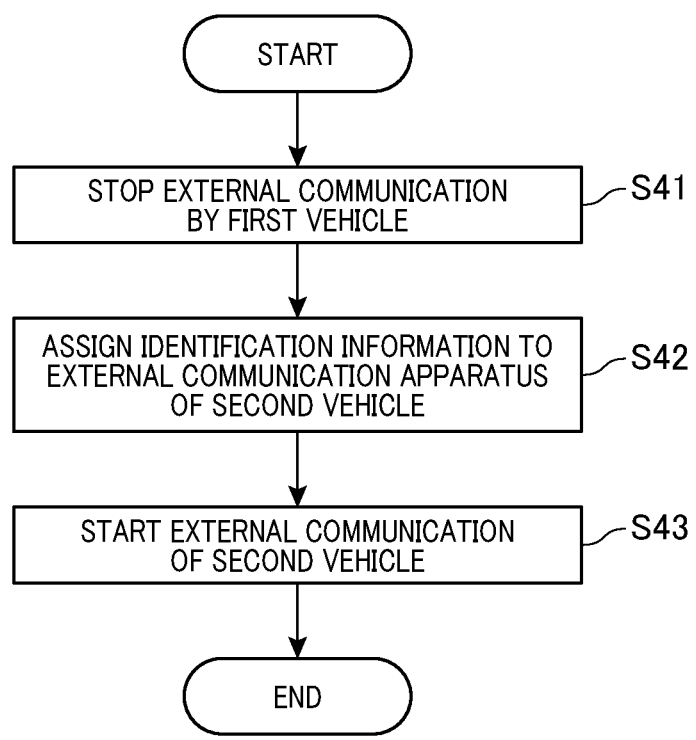
FIG. 12 is a flowchart showing a process executed by the control apparatus according to the first embodiment.

Hereinafter, with reference to FIG. 12, the specific flow will be described for the process executed in order to re-assign the identification information data such as step S302 shown in FIG. 11. Hereafter, the vehicle 100 which has been performing external communication among the plurality of vehicles 100 included in the column is referred to the first vehicle. Also, hereinafter, accompanying with an assignment of the identification information data, the vehicle 100 subsequently performing external communication will be referred to as the second vehicle. In other words, hereinafter will be described a process flow in order to re-assign the identification information data which has been assigned to the external communication apparatus 170 of the first vehicle, to the external communication apparatus 170 of the second vehicle.

At the first step S41, the process stops external communication of the first vehicle. At step S42 subsequent to step S41, the process assigns the identification information data which has been assigned to the eternal communication apparatus 170 of the first vehicle 170, to the external communication apparatus of the second vehicle. This process transmits a request to change the correlation between ID and the identification information data, to the management apparatus 30, thus allowing the second vehicle to perform external communication. At step S43 subsequent to step S42, the process allows the second vehicle to start external communication.

Thus, when changing to a state where the second vehicle performs external communication from a state where the first vehicle performs external communication, the control apparatus 10 is configured to stop external communication from the first vehicle (S41), assign the identification information data which has been assigned to the external communication apparatus 170 of the first vehicle to the external communication apparatus 170 of the second vehicle (S42), and allow the second vehicle to start external communication.

The above-described configuration makes it possible to reliably prevent external communication based on a single identification information data from being performed simultaneously at two respective external communication apparatuses 170. Also, since the identification information data used for communication by the first vehicle and the identification information data used for communication by the second vehicle are the same, the number of identification information data set given in advance by the telecommunication company can be lowered.

Figure 13:
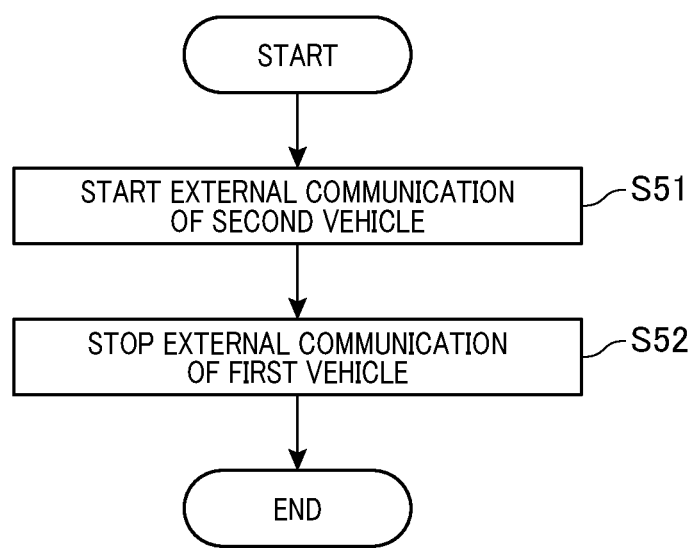
FIG. 13 is a flowchart showing a process executed by the control apparatus according to the first embodiment.

With reference to FIG. 13, other example of a process executed to reassign the identification information data will be described.

At the first step S51 in the example, the process allows the second vehicle to start the external communication. At this moment, external communication from the first vehicle is not stopped but it continues to perform external communication. Accordingly, the identification information data to be assigned to the external communication apparatus 170 of the second vehicle at step S51 is still stored for re-assignment, and is different from the identification information data which has been assigned to the external communication apparatus 170 of the first vehicle.

At step S52 subsequent to step S51, the process allows the first vehicle to stop external communication. Thus, the initial state where the first vehicle performs external communication changes to a state where the second vehicle performs external communication.

Thus, the control apparatus 10 according to the above-described example is configured to allow the second vehicle to start external communication (step S51), and then controls the first vehicle to stop external communication (step S52), when changing the state where the first vehicle performs the external communication to the state where the second vehicle performs the external communication.

According to the above-described configuration, a period where the first vehicle performs external communication and a period where the second vehicle performs external communication are not separated but are temporarily overlapped. Hence, the external communication can be continued without interruption.

Figure 14:
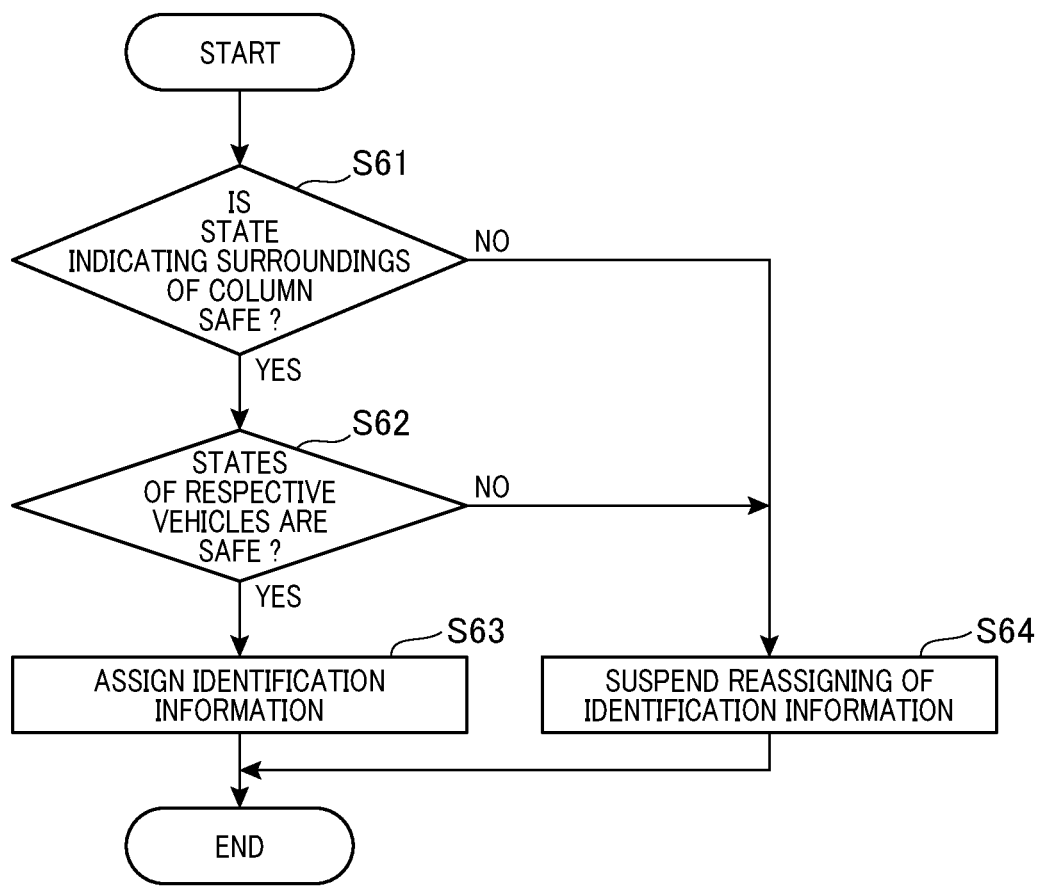
FIG. 14 is a flowchart showing a process executed by the control apparatus according to the first embodiment.

Note that depending on the state of the surroundings, it may be unfavorable to execute a process of reassigning identification information data such as step S04 shown in FIG. 5 or step S302 shown in FIG. 11. For example, when the column passes through an intersection, since the required volume of information to be processed by the vehicle control apparatus 150 increases, temporary interruption of the external communication due to the reassignment of the identification information data is not desirable. In this respect, the control apparatus 10 according to the present embodiment adjusts the executing timing when executing processes such as step S04 shown in FIG. 5. The process will be described with reference to FIG. 14.

At the first step S61, the process determines whether a state indicating the surroundings of the column is safe. Note that the determination is made based on the information transmitted from the vehicle control apparatus 150. For example, in the case where the vehicle is passing a junction point or an intersection, the process determines that the state indicating the surroundings is not safe. Also in the case where another vehicle is approaching the column and will possibly collide with a vehicle in the column, the process determines that the state indicating the surroundings is not safe.

When determined that the surroundings of the column are safe, the process proceeds to step S62. At step S62, the process determines whether the states of respective vehicles 100 in the column are safe, based on the information transmitted from the vehicle control apparatus 150 by the external communication. For example, when the process changes the travelling positions of some of or all of the vehicles 100 which form the column (that is, changing the travelling positions between back and forth positions), the process determines that the respective vehicles 100 are not in a safe condition. Also, in the case where the respective vehicles 100 in the column are changing traffic lane, or making a right turn or left turn, the process determines that the respective vehicles 100 are not in a safe state.

In the case where the process determines that the respective vehicles are safe, the process proceeds to step S63. At step S63, the process re-assigns the identification information data to the vehicles, that is, the process of step S04 shown in FIG. 5.

When the process determines that the surrounding of the column are not in safe state at step S61, or determines that surrounding of the respective vehicles 100 are not in safe state, the process proceeds to step S64. At step S64, a process of reassigning the identification information data, that is, a process of step S04 shown in FIG. 5 is suspended. Thereafter, the series of processes shown in FIG. 14 is executed again. The process for assigning the identification information data is executed at a time when the respective vehicles 100 are in a safe state.

Note that both of the processes of steps S61 and S62 may be executed. However, either one of processes may be executed.

In this way, the control apparatus 10 according to the present embodiment is configured to adjust the timing for re-assigning the vehicle 100 that performs external communication, depending on the state of surrounding of the column or the state of respective vehicles 100. Thus, the vehicle 100 that performs the external communication can be constantly re-assigned with appropriate timing.

According to the above-described example, the process assigns the vehicle 100 that performs the external communication at a time when the state of the surrounding the column becomes appropriate for the assignment. Alternatively, when it is required to re-assign the vehicle 100 that performs the external communication, the travelling state of the respective vehicles may be changed in advance to obtain an appropriate state. For example, all of the vehicles 100 included in the column are controlled to be stopped in a road shoulder, may re-assign the vehicle 100 performing the external communication after the state of the surroundings becomes safe. Moreover, lane-change and acceleration/deceleration of respective vehicles 100 may be prohibited to allow the vehicles 100 to travel at a constant speed, and then the process of re-assigning the vehicle 100 that performs the external communication may be activated.

Another example for re-assigning the vehicle 100 that performs the external communication will be described with reference to FIG. 15. According to the example, the travelling positions of the respective vehicles 100 included in the column are divided into three groups. As shown in FIG. 15, the group G1 includes only the frontmost position. The group G2 includes travelling positions from the second front position to the fourth front position. The group G3 includes only the most rear travelling position.

In this example, the process for re-assigning the vehicle 100 that performs the external communication is performed in each of the groups. For example, when the vehicle 103 travelling at the travelling position in group 2 performs the external communication, the identification information data assigned to the external communication apparatus 170 of the vehicle 103 will be assigned to only a vehicle (102 or 104) which is travelling at a travelling position in the same group 2. For the object to which the identification information data is assigned, such a restriction in this example may be applied.

Hereinafter, with reference to FIGS. 16A to 16C, an example in which the correlation between the identification information data and the ID is not managed by the management unit 40 will be described. In this example, identification information data is stored in advance to respective external communication apparatuses 170 regardless of whether actual external communication is performed. When the external communication apparatus 170 performs the external communication, the process controls the identification information data stored in the external communication apparatus 170 to be active, and starts the external communication based on the identification information data. Hence, in this example, making the stored identification information data stored as described above active corresponds to assigning the identification information data and performing the external communication. The process for making the identification active is executed by the vehicle control apparatus 150 based on a signal transmitted to each vehicle control apparatus 150 from the control apparatus 10. Note that making the identification information data active refers to that a state change from a state where the external communication based on the identification information data is prohibited to a state where the external communication based on the identification information data is enabled.

According to an example shown in FIG. 16A, S1 as the identification example is stored in the external communication apparatus 170 of the vehicle 101 travelling at the head travelling position. For respective external communication apparatuses 170 in four vehicles (102, 103, 104 and 105) travelling at travelling positions from the second position to the subsequent positions, S2 as the common identification information data is stored. Thus, the process storing the identification information data into the respective external communication apparatus 170 is executed in advance by the control apparatus 10.

According to an example shown in FIG. 16A, only S1 as the identification stored in the external communication apparatus 170 of the vehicle 101 is active, and only the vehicle 101 performs the external communication based on the stored identification information data. The identification information data S2 stored in the external communication apparatus 170 of other vehicles such as the vehicle 102 or the like are not active. Note that the identification information data S2 written in parenthesis shown in FIG. 16A indicates a non-active state. The same applies to those shown in FIG. 16B and FIG. 16C.

When re-assigning the vehicle 100 performing the external communication from the state shown in FIG. 16A, the control apparatus 10 stops the external communication by the vehicle 101 (that is, changes S1 to be inactive), and controls the identification information data (S2) stored in any of the external communication apparatus 170 of other vehicles 102, to be active.

Thus, the control apparatus 10 in the above-described example performs, in advance, a process storing common identification information data into the external communication apparatuses 170 of respective vehicles (102, 103, 104 and 105) which are not performing the external communication. According to this configuration, even when the correlation between the identification information data and the ID is not managed by the management apparatus 30, the control apparatus 10 can change the assignment of the identification information data.

According to an example shown in FIG. 16B, the identification information data S1 is stored in the external communication apparatus 170 of the vehicle 101 travelling at the head travelling position in the column. Further, as the identification information data, S2 is stored in the external communication apparatus 170 of the vehicle 104 travelling at the fourth travelling position with respect to the head vehicle.

For the external communication apparatus 170 of the vehicle 102 travelling at the second travelling position with respect to the head travelling position (i.e. second head position) and the external communication apparatus 170 of the vehicle 103 travelling at the third travelling position with respect to the head travelling position (i.e. third head position), S3 as the common identification information data is stored thereto. For the external communication apparatus 170 of the vehicle 105 travelling at the most rear side position, S4 is stored thereto as the identification information data.

According to an example shown in FIG. 16B, the identification information data S1 stored in the external communication 170 of the vehicle 101 and the identification information data S2 stored in the external communication apparatus 170 of the vehicle 104 are active. Accordingly, each of the vehicle 101 and the vehicle 104 performs the external communication. The identification information data S3 and S4 are not active.

When reassigning the vehicle 100 that performs the external communication from the state shown in FIG. 16B, the control apparatus 10 stops the external communication by the vehicle 101 or the vehicle 102 (that is, changes the state of S1 or S2 to be inactive), and controls the identification information data (S3) stored in the external communication apparatus 170 in either the vehicle 102 or the vehicle 103 to be active. Note that the identification information data S4 stored in the external communication apparatus 170 of the vehicle 105 is controlled to be active when re-assignment of the identification information data is further required after the above-described process are completed, thus stored as a spare.

FIG. 16C illustrates two columns (column 1 and column 2) each of which travels individually. The column 1 includes, similarly to the previous examples, 5 vehicles 100 (101, 102, 103, 104 and 105). In the external communication apparatuses 170 in the respective external communication apparatuses 170, S1, S3, S4, S5 and S6 are stored in the order of vehicle positions from the head vehicle. In this identification information data, only S1 is set to be active, and S3, S4, S5 and S6 are not active (i.e. inactive). Hence, only the vehicle 101 among the vehicles 100 included in the column 1 performs external communication based on S1, and other vehicles 100 do not perform the external communication.

The column 2 includes 5 vehicles (111, 112, 113, 114, 115). The external communication apparatuses 170 in the respective vehicles 100 each stores identification information data S2, S3, S4, S5 and S6 in the order of vehicle positions from the head vehicle. In these identification information data, only S2 is set to be active, and S3, S4, S5, and S6 are inactive. Accordingly, among these vehicles 100 included in the column 2, only the vehicle 111 performs the external communication based on S2, and other vehicles 100 do not perform external communication.

In the column 1, when re-assigning the vehicle 100 that performs the external communication, the control apparatus 10 stops the external communication (that is, changes the state S1 to be inactive), and controls the identification information data (S3 or the like) stored in the external communication apparatus 170 of any of other vehicles 102 to be active.

Similarly, in the column 2, when re-assigning the vehicle 100 that performs the external communication, the control apparatus 10 stops the external communication of the vehicle 111 (that is, controls S2 to be inactive), and controls the identification information data (S3 or the like) stored in the external communication apparatus 170 in any of other vehicles 112 to be active.

In the example shown in FIG. 16C, the identification information data (e.g. S3) which is not active is shared between the column 1 and column 2. Hence, in the case where the identification information data is reassigned in each column as described above, it is required to avoid simultaneous activation of the same identification information data between the column 1 and the column 2. In order to avoid simultaneous activation of the identification information data, each control apparatus 10 of respective columns may acquire, from the management apparatus 20 in advance, information whether the identification information data (S3 or the like) is active in another column.

The number of identification information data set stored in a plurality of columns may be larger than the number of identification information data set which are simultaneously active between the plurality of columns. For example, according to an example shown in FIG. 16C, the identification information data S1, S2, and S3 may be stored in the external communication apparatuses 170 of the respective vehicles 100 of the column 1 and the column 2. In this case, in the vehicle 101 of the column 1, S1 is set to be active, and in the vehicle 111 of the column 2, S2 is set to be active. Thereafter, in order to perform the external communication by the vehicle 100 other than the vehicle 101, S3 is set to be active in any vehicle among the vehicle 102 to vehicle 105, and S1 may be set to be inactive in the vehicle 101. The same applies to the column 2. Thus, the number of stored identification information data set can be lower than the number of vehicles 100. Preferably, two identification information data sets may be set to be active in the respective columns, and one or more inactive spare identification information data sets may be shared by the respective columns.

According to the example shown in FIGS. 16A and 16B, the identification information data stored in the external communication apparatus 170 of the vehicle 100 of which the identification information data is active, and the identification information data stored in the external communication apparatus 170 of the vehicle 100 of which the identification information data is not active, are mutually different. However, both of the external communication apparatuses 170 may store the same identification information data. In the example shown in FIG. 16A, the same identification information data S1 may be stored into the external communication apparatuses 170 of all of the vehicles 100.

According to the example shown in FIG. 16B, S1 or S2 as the identification information data may be stored into the external communication apparatuses 170 of respective vehicles 102, 102, and 105.

According to the example shown in FIG. 16C, the same identification information data S1 may be stored into the external communication apparatuses 170 in the respective vehicles 100 in the column 1, and the same identification information data S2 may be stored into the external communication apparatuses 170 of the respective vehicles 100 in the column 2. In this case, when re-assigning the identification information data in the column 1, the control apparatus 10 may set the identification information data (S1) stored in the external communication apparatus 170 to be inactive, and set the identification information data (S1) stored in the external communication apparatus 170 of the vehicle 102 for example, to be active. Similarly, when re-assigning the identification information data in the column 2, the control apparatus 10 may set the identification information data (S2) stored in the external communication apparatus 170 of the vehicle 111 to be inactive, and may set the identification information data (2) stored in the external communication apparatus 170 of the vehicle 112 for example, to be active.

The number of types of identification information data stored in the external communication apparatus 170 may be larger than the number of identification information data set which have been active in the same period. Thus, for example, according to the example shown in FIG. 16A, the identification information data (S2) stored in the external communication apparatus 170 of the vehicle 102 can be set to be active, and the identification information data (S1) stored in the external communication apparatus 170 of the vehicle 101 can be set to be inactive. In this case, even in a case where the identification information data is required to be inactive in multiple times, the identification information data is alternately switched to satisfy the requirement. The same applies to examples shown in FIG. 16B and FIG. 16C.

Alternatively, the identification information data may be stored initially into the external communication apparatus 170 and the communication function of the external communication apparatus 170 may be changed to be ON, thereby activating the identification information data.

The identification information data may be acquired via communication, and the acquired identification information data may be stored into an external memory unit. In this case, the identification information data is stored, thereby activating the identification information data. The identification information data may be stored in advance in the external communication apparatus 10 of any of vehicles 100 in the column, and may transmit/receive the stored identification information data. The external communication apparatus 170 may store a plurality of identification information data sets. Also, the identification information data may be acquired from the communication network 20 or the management apparatus 30. When acquiring the identification information data, the identification information data may be newly purchased.

Hereinafter, the second embodiment will be described. According to the present embodiment, the contents of the processes executed by the control apparatus 10 are different from that of the first embodiment.

Second Embodiment

Figure 17:
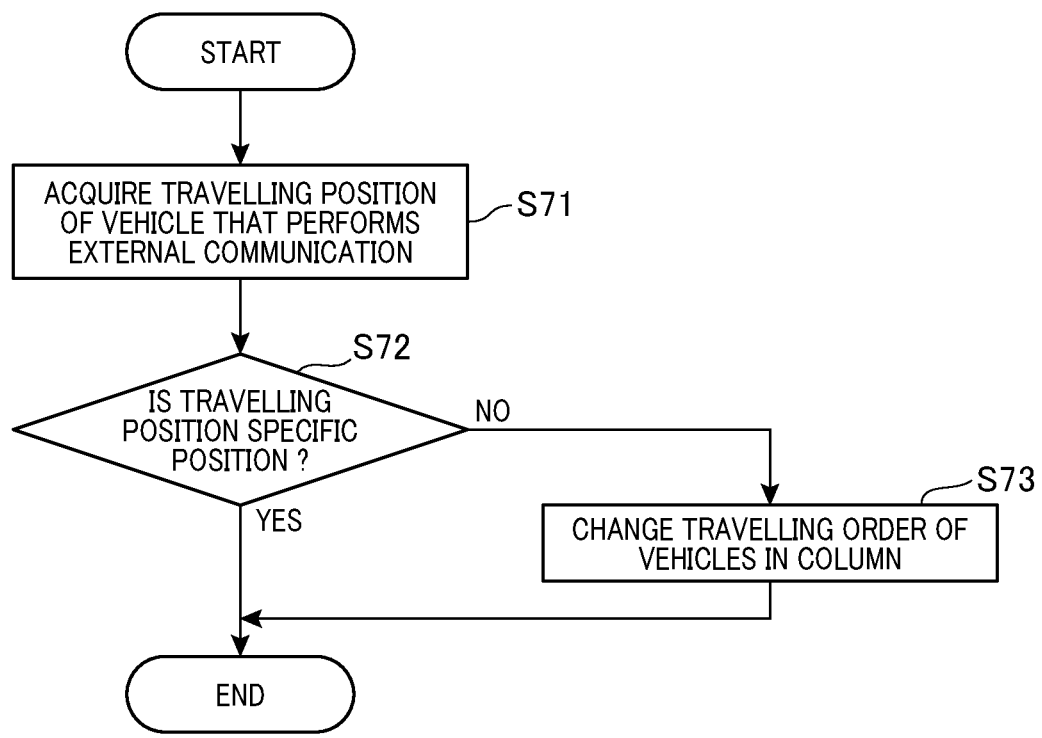
FIG. 17 is a flowchart showing a process executed by a control apparatus according to a second embodiment.

A series of processes executed by the control apparatus 10 according to the present embodiment will be described with reference to FIG. 17. The series of processes shown in FIG. 17 is repeatedly executed by the control apparatus 10 at predetermined control periods. This series of processes is executed instead of executing the series of processes shown in FIG. 5.

At the first step S71, the process acquires a current travelling position in the column for the vehicle 100 performing the external communication, that is, the vehicle 100 in which the identification information is assigned to the external communication apparatus 170. This process is directly or indirectly performed by communicating with the respective vehicles 100.

At step S72 subsequent to step S71, the process determines whether the travelling position acquired at step S71 is a predetermined specific position. Also, in the present embodiment, similar to the example of the first embodiment described with reference to FIG. 4, the travelling position at the frontmost side in the column is determined as the specific position.

When the travelling position acquired at step S71 is determined as the specific position, the vehicle 100 travelling at the specific position is performing the external communication based on the identification information assigned to the external communication apparatus 170. In this case, the series of processes shown in FIG. 17 is terminated. When the acquired travelling position is not determined as the specific position, the process proceeds to step S73.

At step S73, the process changes the travelling position of some of or all of the vehicles 100. Specifically, the process changes the travelling positions of the respective vehicles 100 included in the column such that the vehicle 100 performing the external communication travels at the specific position in the column. That is, the travelling order of the vehicles in the column is changed.

For example, as shown in the example of FIG. 4B, in the case where the vehicle 101 performing the external communication travels at the second travelling position from the head travelling position, the process switches the travelling positions between the traveling position of the vehicle 102 and the travelling position of the vehicle 101. The vehicle 101 changes the travelling position to be the specific position at the frontmost side, while maintaining the identification information assigned to the external communication apparatus 170.

As a result of the above-described processing, the vehicle 100 travelling at the specific position performs the external communication. Thus, the control apparatus 10 according to the present embodiment does not re-assign the identification information as described in the first embodiment, but changes the travelling position of the vehicle 100 in the column, thereby allowing the vehicle 100 travelling at the specific position to perform the external communication. Thus, the present embodiment obtains effects and advantages similar to those of the first embodiment. Also in the present embodiment, a travelling position different from the head position in the column may be set as the specific position.

Moreover, the number of vehicles 100 in which the identification information data is assigned to the external apparatus 170 may be two or more. In other words, two or more identification information data may be acquired from the telecommunication company, whereby two or more vehicles 100 may perform simultaneous external communication.

In such a case, a process executed by the control apparatus 10 will be described with reference to FIG. 18. Also, according to the present embodiment, the priority used for the external communication is set in advance for respective travelling positions in the column similar to the configuration described with reference to FIG. 9B or the like.

At the first step S81, the process acquires the current travelling positions of the respective vehicles 100 performing the external communication in the column. This process is executed by direct or indirect communication with the respective vehicles 100.

At step S82 subsequent to step S81, the process determines whether the travelling positions acquired at step S81 have high priority. The travelling positions having high priority refer to travelling positions having higher priorities than those of respective other vehicles 100 in which no identification information data is assigned to each external communication apparatus 170. For example, in the case where 5 vehicles 100 are included in the column and the number of identification information data is 2, the travelling position having high priority is a travelling position having the highest priority (e.g. 1), or the second highest priority (e.g. 2).

Figure 18:
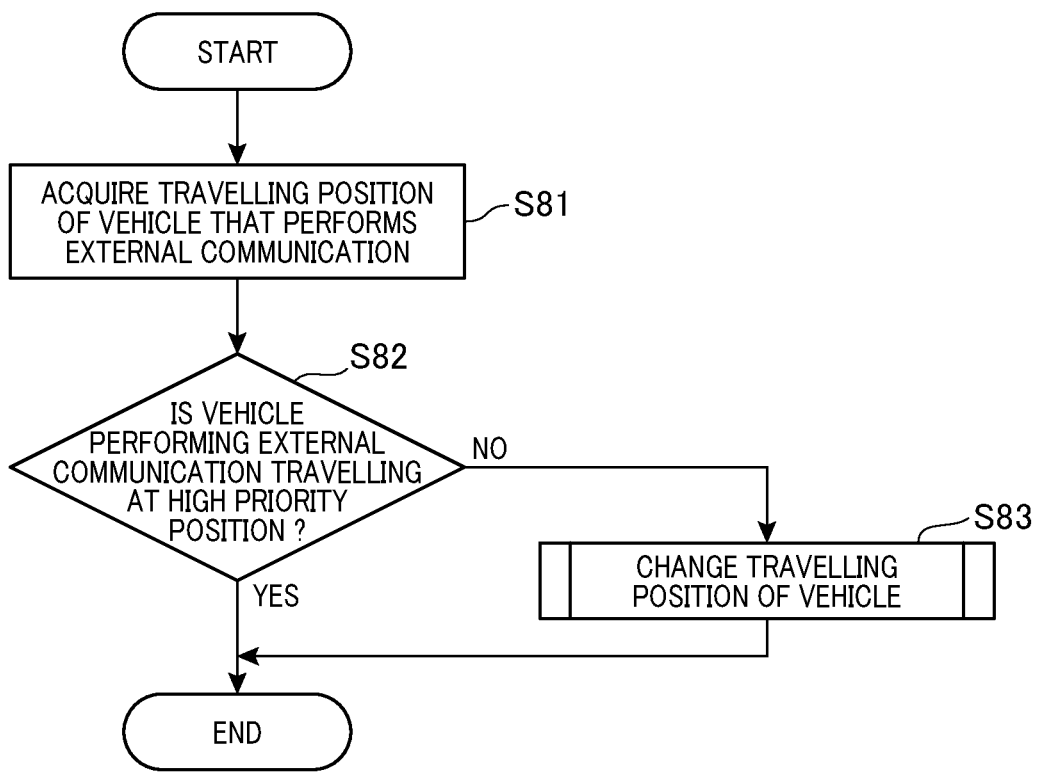
FIG. 18 is a flowchart showing a process executed by the control apparatus according to the second embodiment.

When the travelling position acquired at step S81 has high priority, the process terminates the series of processes shown in FIG. 18. When the travelling position acquired does not have high priority, the process proceeds to step S83. At step S83, the process changes the travelling position of the vehicle 100.

Figure 19:
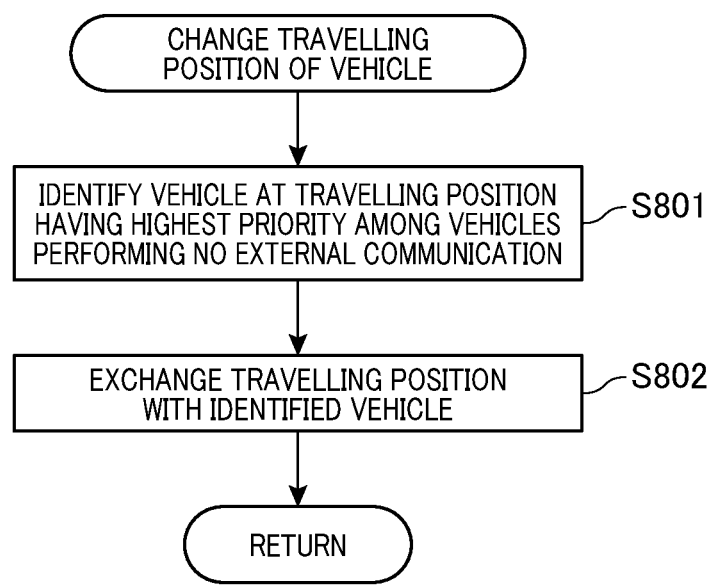
FIG. 19 is a flowchart showing a process executed by the control apparatus according to the second embodiment.

The specific content of the process will be described with reference to FIG. 19. The flowchart shown in FIG. 19 shows a process executed at step S83 shown in FIG. 18.

At the first step S801, the process identifies the travelling positions of other vehicles 100 in which no identification information data is assigned to respective external communication apparatuses, in the vehicles 100 included in the column. Thereafter, the process identifies the travelling position having the highest priority among identified travelling positions.

At step S802 subsequent to step S801, the process exchanges the travelling positions between the vehicle 100 travelling at the identified travelling position as described above, and the vehicle 100 in which the identification information data is assigned to the external communication apparatus 170. Thus, the vehicle 100 travelling at the position having high priority is able to perform the external communication. Note that the process shown in FIG. 19 is repeatedly executed as needed until the respective vehicles 100 travelling at the positions having high priorities are able to perform the external communication.

According to the present embodiment, the priority is set in advance to avoid the travelling positions having high priority being adjacent in the back and forth direction in the column. For example, similar to an example described with reference to FIG. 9B, the priority may be set as 1, 7, 3, 9 and 5 in the order of vehicle positions from the head vehicle. In the case where the processes described with reference to FIG. 18 or FIG. 19 are executed under a condition where such priorities are set, a pair of vehicles 100 capable of simultaneously performing the external communication can be prevented from travelling at adjacent travelling positions in the back and forth direction in the column.

Thus, the control apparatus 10 according to the present embodiment is configured to change the travelling positions of the respective vehicles 100 included in the column to prevent a pair of vehicles 100 capable of simultaneously performing the external communication from travelling at adjacent positions in the back and forth direction in the column. Thus, when the column is divided into two columns, probability of there being a vehicle 100 capable of performing external communication in the divided two columns can be high.

Third Embodiment

Figure 20:
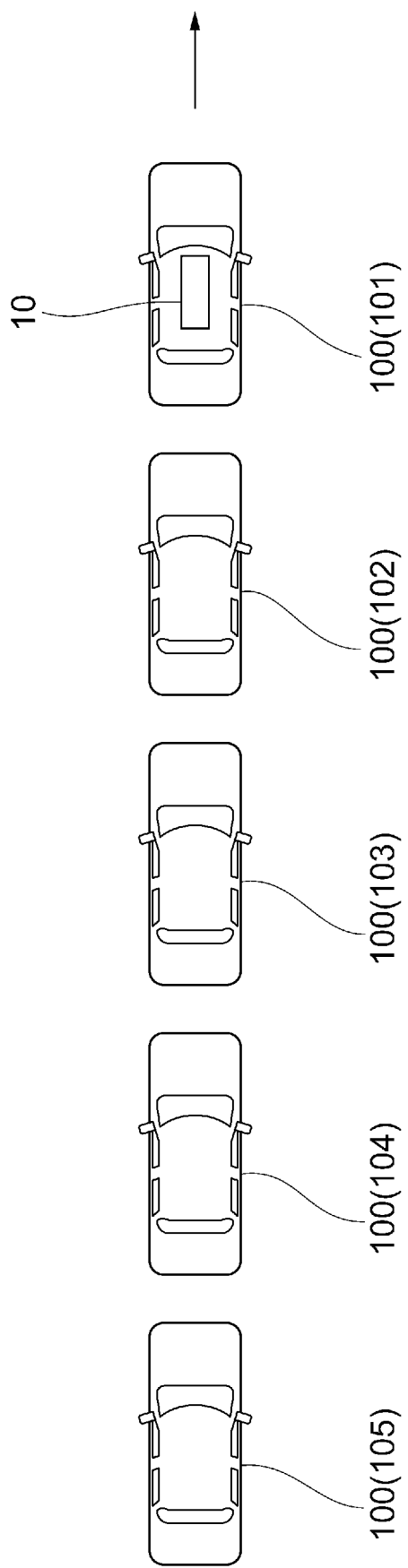
FIG. 20 is a diagram schematically showing vehicles and a control apparatus according to a third embodiment of the present disclosure.

With reference to FIG. 20, a third embodiment will be described. According to the present embodiment, the control apparatus 10 is not provided inside a building but provided in one vehicle among the plurality of vehicles included in the column. In the example shown in FIG. 20, the control apparatus 10 is mounted on the vehicle 101 travelling at the head position in the column. Instead of using such a configuration, a configuration may be utilized in which a control apparatus 10 is mounted on any of the vehicles 102 travelling at a position other than the head position.

The control apparatus 10 communicates with the vehicle control apparatuses 150 in the respective vehicles 100 with the inter-vehicle communication, and also communicates with the management apparatus 30 with the external communication. The specific processes executed by the control apparatus 10 are similar to those described in the first and second embodiments. Even in this configuration, the same effects and advantages as described in the first and second embodiments can be obtained.

Fourth Embodiment

Figure 21:
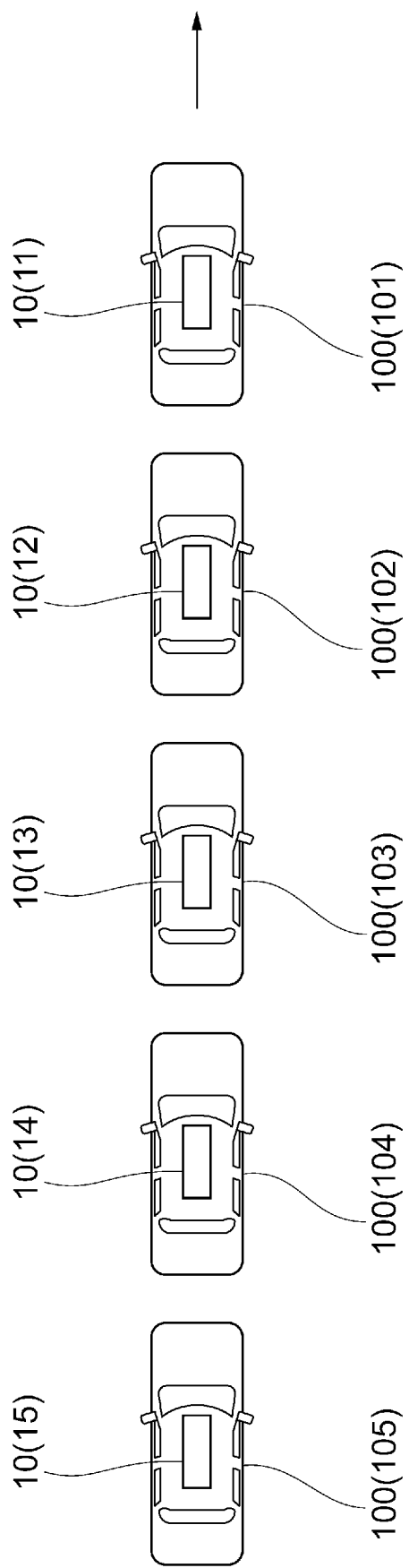
FIG. 21 is a diagram schematically showing vehicles and a control apparatus according to a fourth embodiment of the present disclosure.

Hereinafter, a fourth embodiment will be described. As shown in FIG. 21, according to the present embodiment, the control apparatus 100 as many as the number of vehicles 100 included in the column are prepared, and mounted to the respective vehicles 100 included in the column. In FIG. 21, a control apparatus 10 mounted to the vehicle 101 is illustrated as a control apparatus 11. Similarly, a control apparatus 10 mounted to the vehicle 102 is illustrated in the vehicle 102 is illustrated as a control apparatus 12, a control apparatus 10 mounted to the vehicle 103 is illustrated as a control apparatus 13, a control apparatus 10 mounted to the vehicle 104 is illustrated as a control apparatus 14, and a control apparatus 10 mounted to the vehicle 105 is illustrated as a control apparatus 15.

According to the present embodiment, each of the five control apparatuses 10 as described above is configured to perform each dedicated process in the respective vehicles 100, while sharing necessary information as needed with the inter-vehicle communication.

Next, processes executed by the control apparatus 10 will be described with reference to FIG. 22.

Figure 22:
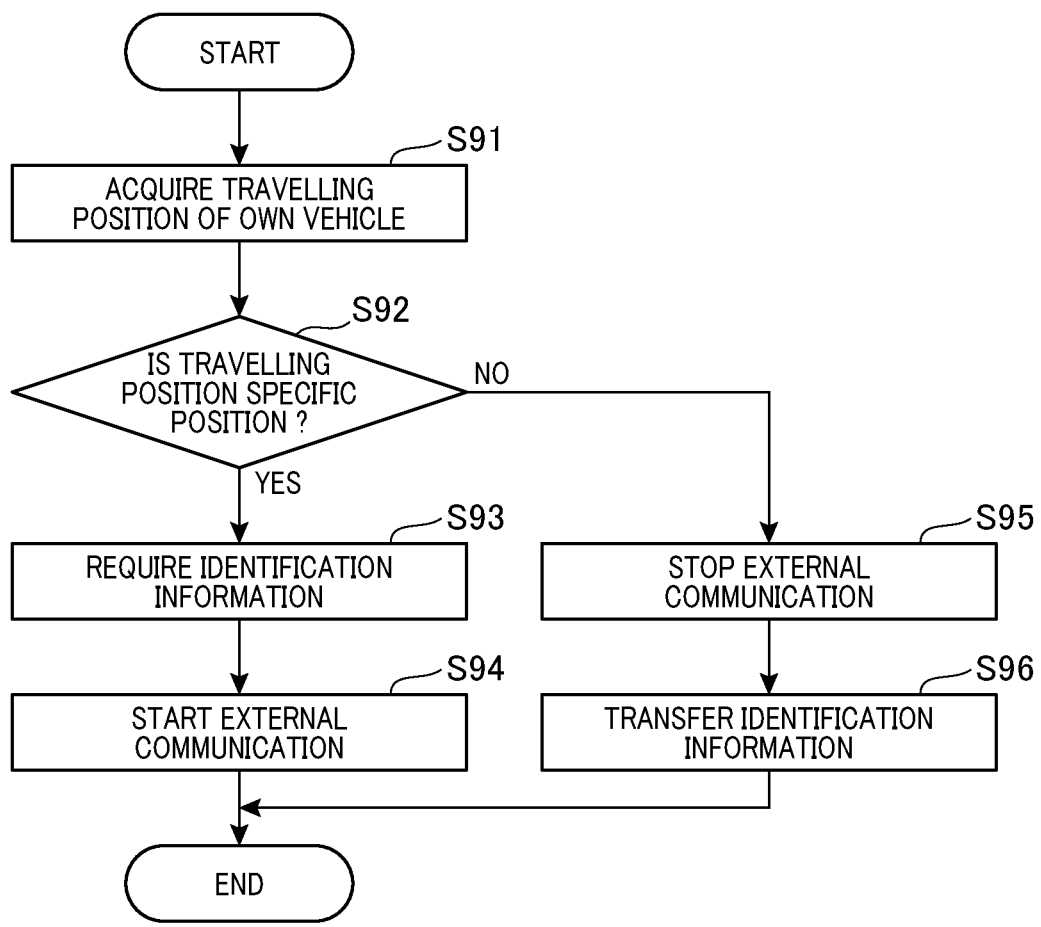
FIG. 22 is a flowchart showing a process executed by the control apparatus according to the fourth embodiment.

The series of processes shown in FIG. 22 is repeatedly executed by the respective control apparatuses 10 at predetermined control periods.

At the first step S91 of the series of processes, a process for acquiring the travelling position of the own vehicle is performed. Note that the own vehicle refers to a vehicle 100 to which the control apparatus 10 performing the processes shown in FIG. 22 is provided. In other words, the own vehicle refers to, for the control apparatus 10, the vehicle 100 to which the control apparatus 10 itself is mounted. Hereinafter, the term own vehicle will be used with the above-mentioned meaning.

At step S92 subsequent to step S91, the process determines whether the travelling position of the own vehicle acquired at step S91 is a predetermined specific position. Also, according to the present embodiment, similar to the example of the first embodiment described with reference to FIG. 4, a travelling position at the frontmost side in the column is determined as the predetermined specific position.

When the travelling position of the own vehicle is the specific position, the process proceeds to step S93. At step S93, the process requires the management apparatus 30 to assign the identification information. This process requires assignment of identification information to the external communication apparatus 170 to enable the external communication. Once this process is started, the management apparatus 30 changes the correlation between the identification information and the ID (FIGS. 3A and 3B), thereby assigning the identification information to the external communication apparatus 170 of the own vehicle. Alternatively, without using the management apparatus 30, the identification information may be directly transferred to the own vehicle from another vehicle 100.

At step S94 subsequent to S93, the process allows the external communication apparatus 170 of the own vehicle to start the external communication based on the assigned identification information.

Note that in the case where the process proceeds to step 93 from step 92, and the identification information has already been assigned to the external communication apparatus 170 of the own vehicle, the process does not execute the processes of steps 93 and 94.

At step S92, when the travelling position of the own vehicle is not the specific position, the process proceeds to step S95. At step S95, the process terminates the external communication performed by the external communication apparatus 170 of the own vehicle. At step S96 subsequent to step S95, the process requires the management apparatus 30 to transfer the identification information. This process transfers the identification information assigned to the external communication apparatus 170 of the own vehicle to the external communication apparatus 170 of other vehicle 100, whereby the identification information is assigned to the external communication apparatus 170 of the own vehicle 100 to enable the external communication by the vehicle 100. Once this process is started, the management apparatus 30 changes the correlation between the identification information and the ID (FIGS. 3A and 3B), thereby assigning the identification information to the external communication apparatus 170 of the own vehicle. Alternatively, without using the management apparatus 30, the identification information may be directly transferred to the own vehicle from another vehicle 100.

Note that in the case where the process proceeds to step S95 from step S92, and the identification information has not been assigned to the external communication apparatus 170 of the own vehicle, the process does not execute the processes of steps 95 and 96.

Figure 23:
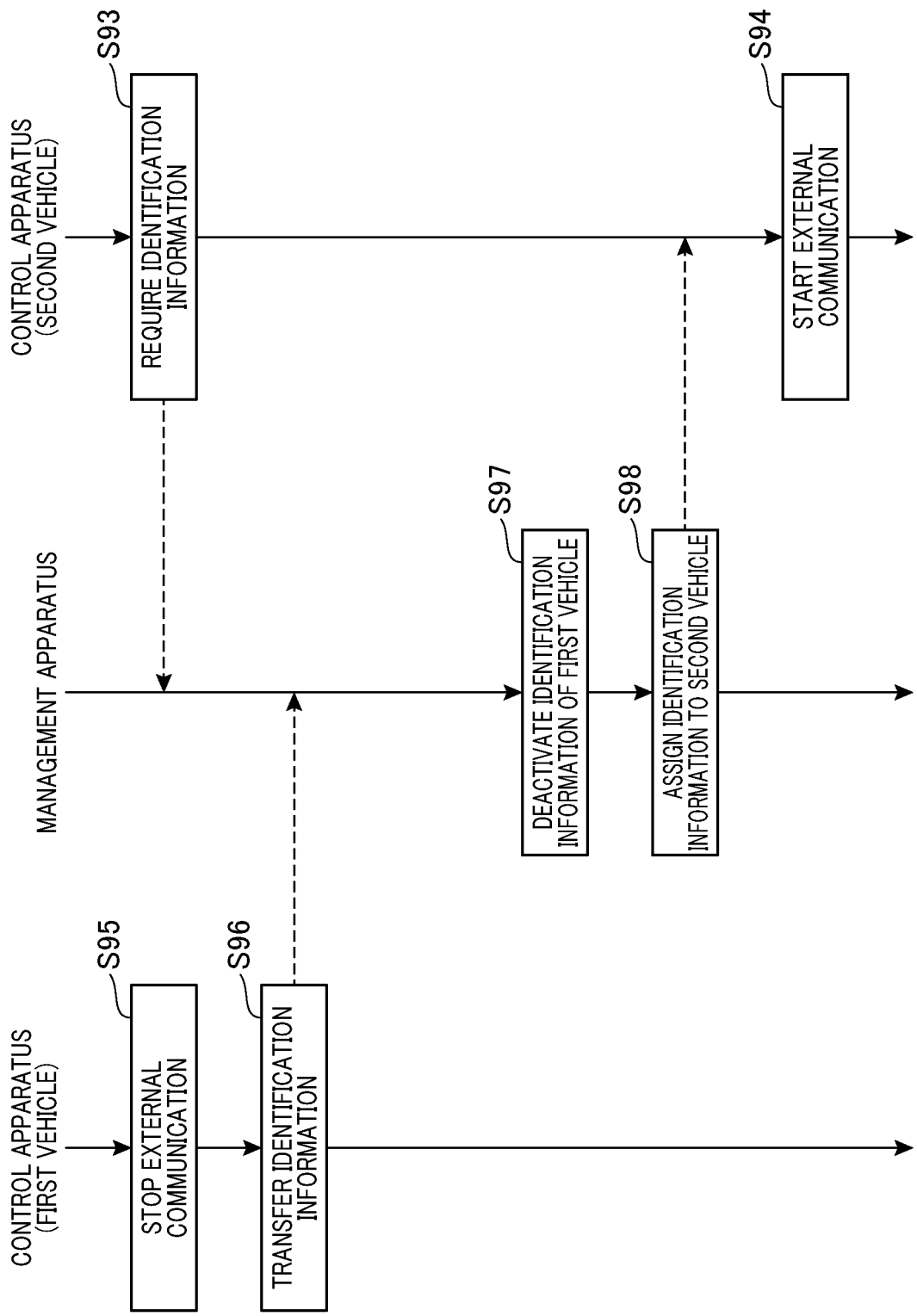
FIG. 23 is a diagram describing a communication sequence between the control apparatus and management apparatus according to the fourth embodiment.

FIG. 23 illustrates a process flow executed by the vehicle 100 and the management apparatus 30. In FIG. 23, left side flow shows a process executed by the vehicle 100 which has been performing the external communication, that is, a process executed by the control apparatus 10 mounted to the first vehicle. Moreover, one shown in the center of FIG. 23 is a process executed by the management apparatus 30, and one shown in the right side of FIG. 23 is a process executed by the vehicle 100 which has not performed the external communication, that is, a process executed by the control apparatus 10 mounted on the second vehicle.

When the first vehicle requires a transfer of the identification information at step S96 (to other vehicle 100), and the second vehicle requires an assignment of the identification information (to the own vehicle), the management apparatus 30 performs a process for deactivating the identification information of the first vehicle at step S97. Thus, none of the external communication apparatuses 170 can perform the external communication based on the identification information. As a result, the external communication by the first vehicle is stopped.

At step S98 subsequent to step S97, the process assigns the above-described identification information to the external communication apparatus 170 of the second vehicle, and activates the identification information again. Thereafter, the second vehicle executes the process of step S94 and starts the external communication based on the assigned identification information.

As described above, the control apparatus 10 according to the present embodiment is configured to control the own vehicle to perform the external communication when the vehicle 100 (i.e. own vehicle) on which the own control apparatus 10 is mounted travels at the specific position in the column. At this moment, the control apparatus 10 requires the assignment of the identification information to have the vehicle 100 on which the own control apparatus 10 is mounted to perform the external communication (step S93).

In the case where the travelling position of the own vehicle is not the specific position, the control apparatus 10 stops the external communication by the vehicle on which the own control apparatus 10 is mounted, and assigns (i.e. transfers) the identification information which has been assigned to the external communication apparatus 170 of the own vehicle to the external communication apparatus 170 of other vehicle. According to the above-described example, the control apparatus 10 transfers the identification information assigned to the external communication apparatus 170 of the own vehicle to the management apparatus 30, thereby assigning the identification information to the external communication apparatus 170 of another vehicle 100. Alternatively, the control apparatus 10 may assign the identification information which has been assigned to the external communication apparatus 170 of the own vehicle, to the external communication apparatus 170 of another vehicle 100 through the control apparatus 10 of the other vehicle 100, for example. In other words, the identification information may be directly transferred to the other vehicle 100 from the own vehicle.

In the above-described example, the frontmost side travelling position in the column is set as the specific position. However, another travelling position may be set as the specific position. In other words, the external communication may be performed at a position other than the frontmost side position in the column.

For example, any traveling positions except the frontmost side and the most rear side in the column may be set as the specific position. These travelling positions have low probability of causing rear end collision with other vehicles which are not in the column, or suffering rear end collision by other vehicles which are not in the column. Accordingly, the above-described travelling positions are set as the specific positions, thereby lowering the probability of missing external communication due to a traffic accident.

Note that when a plurality of identification information data items are assigned by the telecommunication company, the number of specific positions may be set as same as that of the identification information data.

Fifth Embodiment

Hereinafter, a fifth embodiment will be described. According to the fifth embodiment, similar to the fourth embodiment shown in FIG. 21, as many of the control apparatuses 10 as there are vehicles 100 included in the column are provided. These control apparatuses 10 are installed in the respective vehicles 100 included in the column. According to the present embodiment, only the content of the process executed by the control apparatus 10 is different from that of the fourth embodiment.

Figure 24:
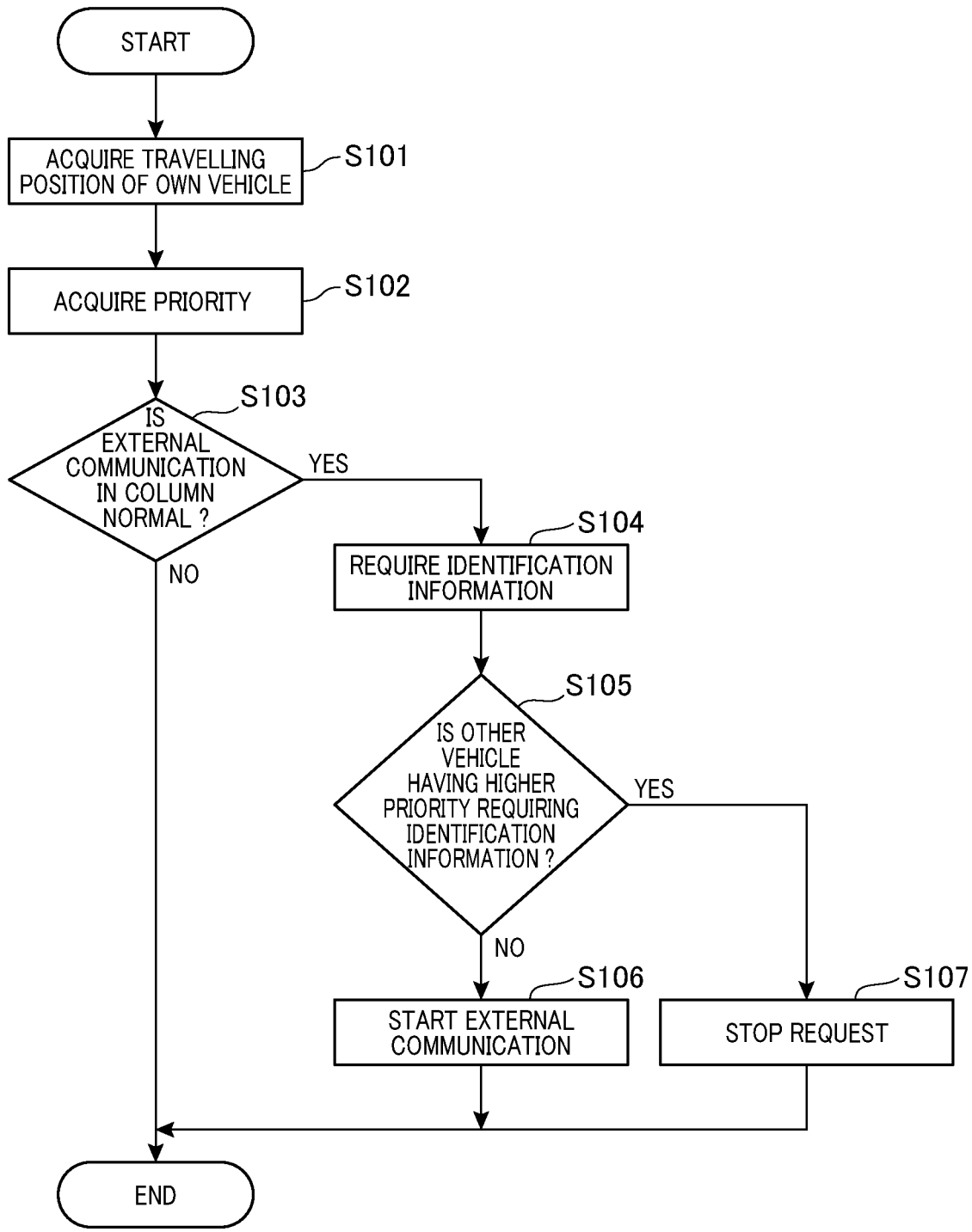
FIG. 24 is a flowchart showing a process executed by the control apparatus according to a fifth embodiment.

With reference to FIG. 24, processes executed by the control apparatus 10 will be described. The series of processes shown in FIG. 24 is repeatedly executed by respective control apparatuses 10 at predetermined control periods.

At the first step S101 of the processes, the process acquires the travelling position of the own vehicle. At step S102 subsequent to step S101, the process acquires the priority for each travelling position. In the present embodiment, similar to the example described with reference to FIG. 9B, the priorities are set for the respective travelling positions in the column for performing the external communication. The correlation between the respective travelling positions and the priorities are stored in the control apparatus 10. The process to be executed at step S102 acquires the above-described correlation which has been stored in the control apparatus 10. As a result of execution of the process at step S102, the control apparatus 10 is able to determines the degree of priority for respective travelling position at which the respective vehicles 100 including the own vehicle travel.

At step S103 subsequent to S102, the process determines whether external communication is being performed normally in the column. This determination is based on whether communication between the control apparatus 10 and the management apparatus 30 is possible. Note that the term communication refers to not only communication accomplished by the external communication performed by the own vehicle, but also communication performed by other vehicles 100 and communication accomplished by inter-vehicle communication between the vehicles 100. In any case, when it is possible to perform communication between the control apparatus 10 and the management apparatus 30, the process determines that the external communication is performed normally. On the other hand, in the case where communication between the control apparatus and the management apparatus 30 is unavailable, the process determines that external communication in the column is not being performed normally.

When the external communication in the column is performed normally, the series of processes shown in FIG. 24 is terminated. When the external communication in the column is not performed normally, the process proceeds to step S104. At step S104, the process requests the management apparatus 30 to assign the identification information. This process requires the identification information to be assigned to the external communication apparatus 170 of the own vehicle to enable the external communication. Once this process is executed, then the management apparatus 30 changes the correlation (FIGS. 3A and 3B) between the identification information and the ID, whereby the identification information is assigned to the external communication apparatus 170 of the own vehicle. Alternatively, without using the management apparatus 30, the identification information may be directly transferred to the own vehicle from another vehicle.

At step S105 subsequent to step S104, the process determines whether or not the control apparatus 10 mounted on another vehicle 100 travelling at a position having higher priority than that of the own vehicle is also requesting the assignment of the identification information. When the control apparatus 10 mounted on the vehicle 100 is not requesting the assignment of the identification information, the process continues to perform the request executed at step S104. Eventually, the identification information is assigned to the external communication apparatus 170 of the own vehicle.

Thereafter, the process proceeds to step S106. At step S106, at step S106, an activation process for starting the external communication based on the identification information assigned to the external communication apparatus 170 of the own vehicle. Thus, the external communication in the column can be normally performed again.

At step S105, when the process determines that the control apparatus 10 mounted on other vehicle 100 travelling at a position having higher priority than that of the own vehicle is also requesting the assignment of the identification information, the process proceeds to step S107. At step S107, the process stops the request initiated at step S104. The assignment of the identification information after step 107 is performed for the external communication apparatus 170 of the vehicle 100 travelling at the position having high priority, not for the external communication apparatus 10 of the own vehicle. Thus, external communication in the column can be performed normally again.

As described above, the control apparatus 10 according to the present embodiment is configured to stop the request for assigning the identification information in the case where other vehicle 100 travelling at a travelling position having higher priority than that of the vehicle 100 on which the own control apparatus 10 is mounted, is also requesting the assignment of the identification information. Thus, the vehicle 100 travelling at a position having higher priority is able to preferentially perform the external communication.

Sixth Embodiment

Hereinafter, a sixth embodiment will be described. According to the present embodiment, similar to the fourth embodiment shown in FIG. 21, as many of the control apparatuses 10 as there are vehicles 100 included in the column are provided. These control apparatuses 10 are installed in the respective vehicles 100 included in the column. According to the present embodiment, only the content of the process executed by the control apparatus 10 is different from that of the fourth and fifth embodiment.

Figure 25:
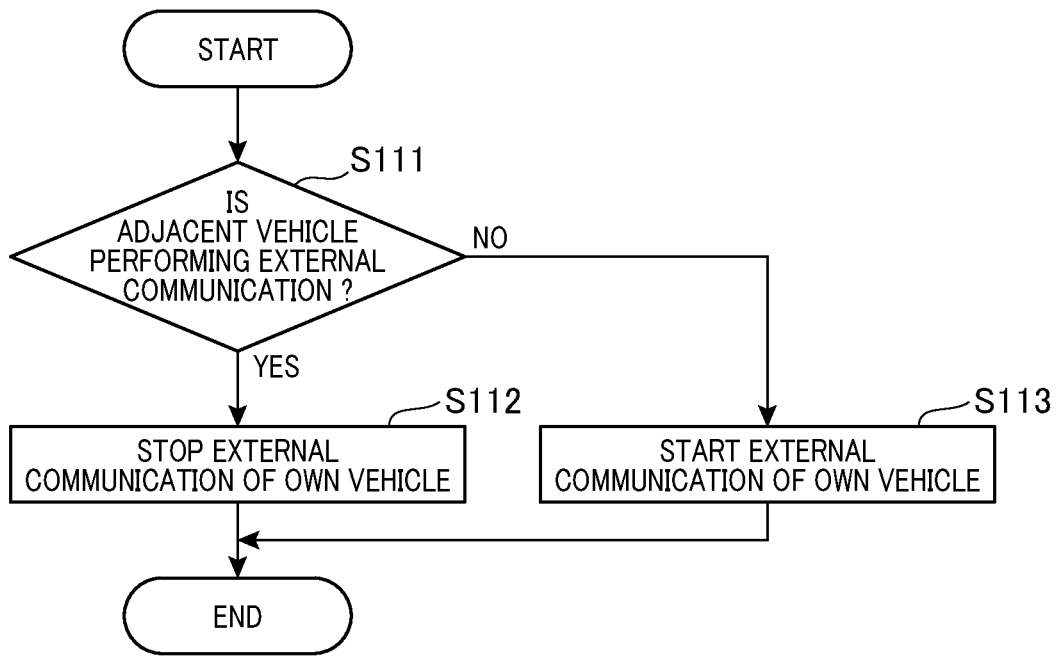
FIG. 25 is a flowchart showing a process executed by the control apparatus according to a sixth embodiment.

With reference to FIG. 25, processes executed by the control apparatus 10 will be described. The series of processes shown in FIG. 25 is repeatedly executed by respective control apparatuses 10 at predetermined control periods.

At the first step S111 of the process, the process determines whether another vehicle 100 travelling at a position adjacent to the own vehicle in the back and forth direction in the column performs external communication or not. In other words, the process determines whether the vehicle 100 travelling at a position one advanced from the own vehicle or one behind the own vehicle in the travelling direction performs external communication. When the vehicle 100 performs the external communication, the process proceeds to step S112. At step S112, the process terminates external communication, which was previously being performed by the own vehicle. The identification information used for the external communication is assigned to the external communication apparatus 170 of other vehicle through the management apparatus 30. At a time when the process proceeds to step S112 from step S111, when the identification information is not assigned to the external communication apparatus 170 of the own vehicle, the process at step S112 is not executed.

Thus, the control apparatus 10 according to the present embodiment is configured to stop external communication by the vehicle 100 on which the own control apparatus 10 is mounted, in the case where external communication is performed in the vehicle 100 travelling at a position being adjacent in either a front or rear position relative to the vehicle 100 on which the own control apparatus 10 is mounted.

The determination at step S111 may be applied to only a vehicle 100 among other vehicles 100, travelling at a position having higher priority than that of the own vehicle 100.

At step S111, when any other vehicles 100 travelling at adjacent positions in back and forth direction relative to the own vehicle are not performing the external communication, the process proceeds to step S113. At step S113, a process activating the external communication by the own vehicle is executed. Specifically, the process re-assigns the identification information which has been assigned to the external communication apparatus 170 of other vehicle 100 to the external communication apparatus 170 of the own vehicle, and then activates the external communication based on the identification information. At a time when the process proceeds to step S113 from step S111, when the own vehicle has already been performed the external communication the process at step S113 is not executed.

Thus, the control apparatus 10 according to the present embodiment is configured to activate the external communication in the case where the external communication is not performed in the vehicle 100 travelling at a position being adjacent to front or rear position relative to the vehicle 100 on which the own control apparatus 10 is mounted.

In other words, the control apparatus 10 according to the present embodiment is configured to change the travelling positions of the respective vehicles 100 included in the column to prevent a pair of vehicles 100 capable of simultaneously performing the external communication from travelling at adjacent positions in the back and forth direction in the column. Thus, when the column is divided into two columns, the probability of there being a vehicle 100 capable of performing external communication in the divided two columns can be high.

In the respective embodiments as described above, the control apparatus 10 is able to assign the identification information, or change the travelling positions of the vehicles 100. However, in the case where changing the travelling positions of the vehicles 100 performing the external communication is not necessary, the control apparatus 10 may not be provided. In this case, similar to the above-described embodiments, the number of vehicles 100 capable of simultaneously performing the external communication (i.e. the number of identification information data applied to the vehicles) is lower than the number of vehicles 100, however, the identification information is not assigned and the travelling positions of the vehicles 100 are not changed. Even in this case, compared to a case where dedicated identification information is assigned to all of the vehicles 100, an effect of reducing the communication cost for the external communication can be obtained.

In the foregoing embodiments, the processes to be executed by the control apparatus 10 (e.g. series of processes shown in FIG. 5) are repeatedly executed at predetermined control periods. However, the processes to be executed by the control apparatus 10 may be executed at a timing different from the above-described timing. For example, these processes may be executed when a predetermined condition is met such as temporary stop of the vehicle, power-on state, and power-off state. Moreover, these processes may be executed at predetermined control periods, and at a timing when the predetermined condition is met.

Seventh Embodiment

Figure 26:
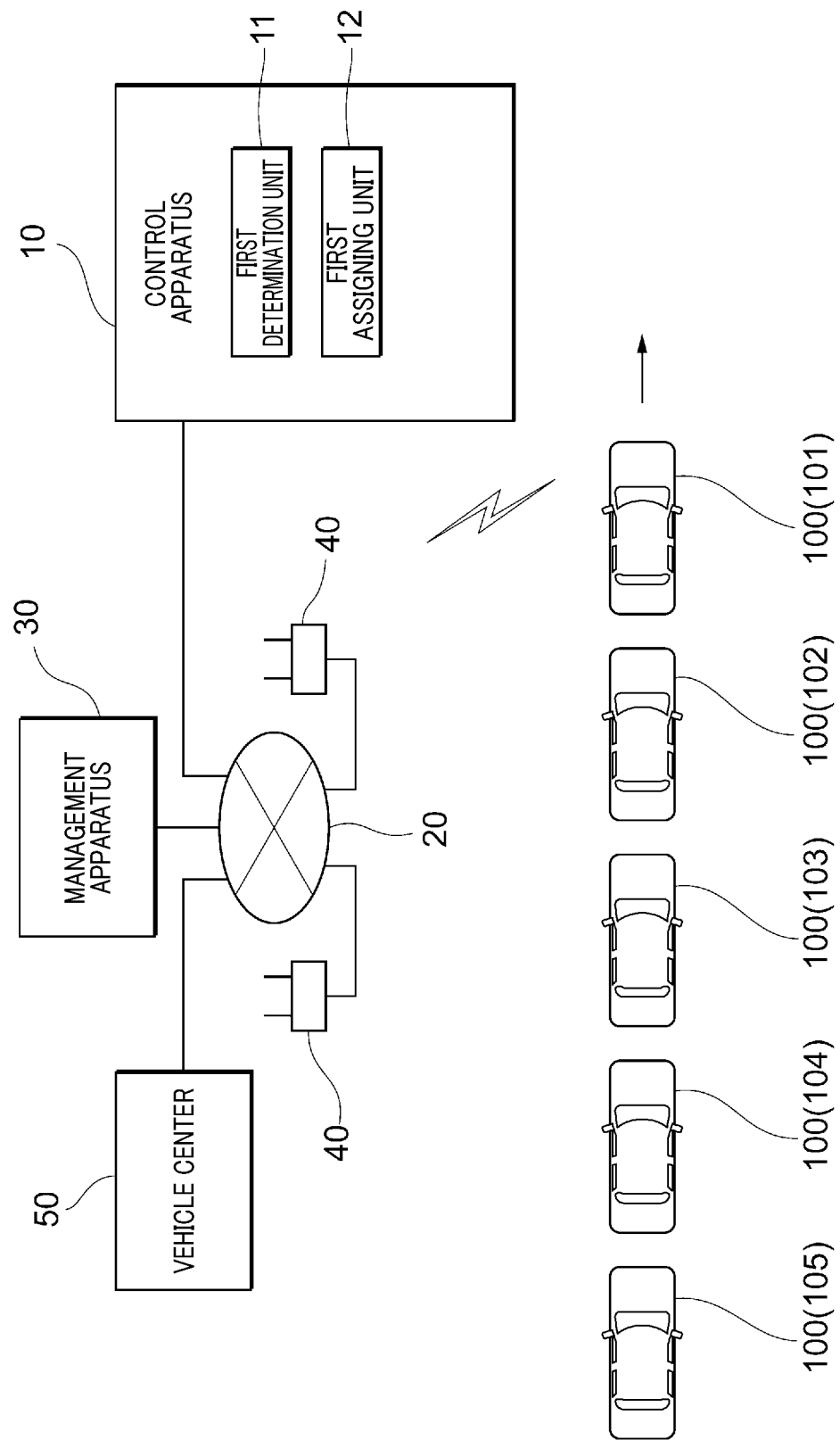
FIG. 26 is a diagram schematically showing vehicles and a control apparatus according to a seventh embodiment.

Hereinafter, a seventh embodiment will be described. A plurality of vehicles 100 shown in FIG. 26 are configured to perform platoon travelling. The platoon travelling refers to a travelling in which a plurality of vehicles are running in a column under a state where one or more vehicles are running with automatically tracking the head vehicle from the behind. According to the present embodiment, each vehicle 100 is configured as an electric vehicle, but may be configured as a vehicle provided with an internal combustion engine.

In FIG. 26, a state where five vehicles 100 is running forming a column is schematically illustrated as a top view. In FIG. 1, respective vehicles 100 are applied with reference numbers 100, 101, 102, 103, 104, and 105 in the order of vehicle positions from the head vehicle. In the following description, the head vehicle 100 to which a reference number 101 is applied may be referred to as a vehicle 101. Similarly, the second vehicle and subsequent vehicles 100 may be referred to as vehicle 102, vehicle 103 and the like. Note that the number of vehicles 100 which perform the platoon travelling may be five or less or more.

A control apparatus 10 shown in FIG. 26 is configured to control each of the plurality of vehicles 100 which perform platoon travelling. The control apparatus 10 according to the present embodiment is disposed inside a building which is not shown. That is, the control apparatus is disposed separately from respective vehicles 100 included in the column, to be located at a location different from that of the respective vehicles. The control apparatus 10 performs wide-area wireless communication with one vehicle included in the vehicles 100, thereby controlling platoon travelling by the vehicle 101 or the like. The control apparatus 10 performs the control including a determination (switching) of the vehicle 100 as an object of the wide-area wireless communication, and switching of the running position of the vehicle 101 or the like in the column. The configuration or the detailed contents of the control performed by the control apparatus 19 will be described later.

Wide-area wireless communication between the control apparatus 10 and the vehicle 100 is performed a communication network 20 and a base station 40. The communication network 20 is a wired communication network provided throughout the country, operated by a telecommunication company which also operates the base station 40 and a management apparatus 30 described later. The telecommunication company provides a wide-area wireless communication service with cellular phones and the like.

The base station 40 is a facility provided with an antenna used for performing the above-described wide-area wireless communication. The base station 40 is provided in a plural number. Each of the base stations 40 is connected to the above-described communication network 20. Each base station 40 is provided on a roof top of a building around the road so as to at least cover the road on which the vehicle 100 runs as a communicable range.

The management apparatus 30 is a server installed by the above-mentioned communication company. The management apparatus 30 is connected to the control apparatus 10 via the communication network 20. The management apparatus 30 is configured to be capable of performing wide-area wireless communication with the vehicle 100 via the communication network 20 and the base station 40. The management apparatus 30 is a server that manages the identification information data assigned to an external communication apparatus 170 (see FIG. 27) of the vehicle 100. The contents of the process executed by the management apparatus 30 will be described later.

A vehicle center 50 shown in FIG. 26 is, similar to the control apparatus 10, a server (i.e. external server) disposed inside a building which is not shown. The vehicle center 50 is connected to the base station 40 via the communication network 20. The vehicle center 50 performs a wide-area wireless communication with the vehicle 100 through these apparatuses, thereby transmitting/receiving information (junction information which will be described later) with the vehicle 100.

Note that the vehicle center 50 may include a part of or whole function included in the control apparatus 10. In other words, the control apparatus 10 or the vehicle center 50 may be configured as a part of the management center 30.

With reference to FIG. 27, a configuration of the vehicle 100 will be described. According to the present embodiment, configurations of all of the vehicles 100 included in the column are the same. The vehicle 100 is provided with a vehicle control apparatus 150, a navigation apparatus 151, a surroundings detection sensor 152, a travelling apparatus 153, a notifying apparatus 154, an inter-vehicle communication apparatus 160 and an external communication apparatus 170.

The vehicle control apparatus 150 is configured to control the entire operation of the vehicle 100. The vehicle control apparatus 150 is configured as a computer system including CPU, ROM and RAM. The vehicle 100 is configured as a vehicle capable of automatically performing driving operations such as braking and steering without a driver's intervention, that is, a vehicle capable of performing automatic driving. The vehicle control apparatus 150 controls the entire operation of the vehicle 100, thereby mainly performing necessary processes to achieve the automatic driving.

The navigation system 151 acquires the current location of the vehicle 100 using GPS (global positioning system) and acquires a travelling route to the destination based on the acquired current location. The vehicle control apparatus 150 allows the vehicle 100 to perform automatic driving such that the vehicle 100 travels along the travelling route acquired by the navigation system 151 to reach the destination.

In the case where all of the vehicles 100 included in the column perform platoon travelling to the same destination, the navigation system 151 may be installed on a vehicle (e.g. head vehicle 101) among the vehicles 100.

The surroundings detection sensor 152 detects a situation surrounding the vehicle 100. For example, the surroundings detection sensor 152 is configured as an on-vehicle camera or a radar. The surroundings detection sensor 152 detects the boundary of the traffic lane on which the vehicle 100 is travelling, or detects an obstacle (e.g. other vehicle) existing on the travelling road. The situation of the surroundings detected by the surroundings detection sensor 152 is transmitted to the vehicle control apparatus 150. Thus, the vehicle control apparatus 150 is able to prevent the vehicle 100 from protruding from the boundary of the traffic lane, or from colliding with an obstacle. Also, the surroundings detection sensor 152 is able to detect the inter-vehicle distance 100 ahead of the own vehicle.

The travelling apparatus 153 is configured to have the vehicle 100 travel. The travelling apparatus 153 is provided with a motor that produces a driving force of the vehicle 100, an electric brake for braking the vehicle 100, and an electric steering apparatus for performing steering of the vehicle 100. The vehicle control apparatus 150 controls the above described apparatuses included in the travelling apparatus 153, thereby performing automatic driving of the vehicle 100.

The notifying apparatus 154 notifies the passengers in the vehicle 100 about a traveling state of the vehicle 100 (e.g. current location during travelling). The notifying apparatus 154 is, for example, a touch panel screen. Note that the notifying apparatus 154 may not be provided in the case where no passengers are present in the vehicle 100 because the vehicle 100 is configured as a cargo carrying vehicle.

The inter-vehicle communication apparatus 160 performs wireless communication between the vehicle 100 and other vehicles 100 included in the column. Respective vehicles 100 in the column perform wireless communication with each other using the inter-vehicle communication apparatus, thereby sharing information about the situation around the vehicles or transmitting/receiving control signals for adjusting a brake timing and the like. Note that such a wireless communication is also referred to as inter-vehicle communication hereinafter. For example, inter-vehicle communication is performed in a relatively small range such as wireless LAN (local area network).

The external communication apparatus 170 utilizes a wide-area wireless communication service provided by the above-mentioned communication company to perform a wide-area wireless communication with equipment outside the vehicle such as the management apparatus 30, the control apparatus 10 and the management center 50. Hereinafter, this wide-area wireless communication is also referred to as external communication in order to differentiate it from the above-described inter-vehicle communication.

The external communication is performed based on own identification information data given by the telecommunication company. The identification information data is given in advance based on a line contract with the telecommunication company, in which the information is stored in a SIM (subscriber identity module) card or an eSIM card for cellular phones. In order to allow a plurality of vehicles 100 to simultaneously perform external communication, a plurality of identification information data sets corresponding to the number of vehicles have to be assigned, and dedicated identification information data has to be assigned to the external communication apparatus 170 of each vehicle 100.

According to the present embodiment, the external communication apparatus 170 is provided in the all of the vehicles 100 included in the column 100. Alternatively, the external communication apparatus 170 may not be provided in the all of the vehicles 100 but may be provided in some of the vehicles 100.

According to the present embodiment, the number of identification information data set being given in advance by the telecommunication company is lower than the number of vehicles 100 included in the column.

Thus, the number of vehicle 100 capable of simultaneously performing an external communication is always lower than the number of vehicles 100 included in the column.

In such a configuration, the number of line contracts of the telecommunication company (i.e. the number of given identification information data set) is lower than the number of vehicles 100 included in the column. Hence, compared to a case where the identification information data is provided for all of the vehicles 100, the communication cost due to the external communication can be reduced.

In an example shown in FIG. 26, the identification information data is assigned to only the external communication apparatus 170 of the vehicle 101 in the head position of the column, and the identification information data is not assigned to the external communication apparatus 170 of other vehicles 102 or the like. Therefore, only the vehicle 101 having the assigned identification information data is able to perform the external communication directly with the control apparatus 10 or the management apparatus 30.

The vehicles 102 or the like which have not been assigned the identification information data are not able to perform external communication with the control apparatus 10 or the management apparatus 30 directly. However, the vehicles 102 perform inter-vehicle communication with the vehicle 101 capable of performing an external communication, thereby communicating with the control apparatus 10 or the management apparatus 30 via the vehicle 101. In other words, the vehicle 101 performs so called tethering, whereby the vehicle 102 or the like is able to communicate with the control apparatus 10 or the management apparatus 30.

The control apparatus 10 performs a process for managing the assignment of the identification information data to the respective external communication apparatuses 170. As will be described later, the control apparatus 10 may perform a process in which identification information data being assigned to a specific vehicle 100 is reassigned to an external communication apparatus 170 of other vehicle 100.

With reference to FIGS. 28A, 28B, the assignment of the identification information data for the external communication apparatus 170 will be described. The table shown in FIG. 28A illustrates a correlation between ID in the left column and the identification information data in the right column. The ID refers to a unique number individually set in advance for the external communication apparatuses 170 mounted on the respective vehicles 100. According to the present embodiment, as an ID, 01 is assigned to the external communication apparatus 170 mounted on the vehicle 101, ID 02 is assigned to the external communication apparatus 170 mounted on the vehicle 102, and ID 03 is assigned to the external communication apparatus 170 mounted on the vehicle 103. The correlation shown in FIGS. 3A and 3B are stored in the management apparatus 30.

In the case where the correlation stored in the management apparatus 30 is like a correlation shown in FIG. 28A, AAAAA as the identification information data is assigned to the external communication apparatus 170 (ID=01) mounted on the vehicle 101. On the other hand, identification information data is not assigned to the external communication apparatus 170 mounted on another vehicle 102 or the like. Hence, similar to the example shown in FIG. 26, only the vehicle 101 is able to perform the external communication.

When the correlation stored in the management apparatus 30 changes from the example shown in FIG. 28A, the assignment of the identification information data to the respective external communication apparatus 170 varies. In other words, the management apparatus 30 changes the stored correlation, thereby changing the assignment of the identification information data to the respective external communication apparatuses 170.

FIG. 28B exemplifies a correlation which has been changed. In the case where the correlation is a correlation shown in FIG. 28B, AAAAA as the identification information data is assigned to the external communication apparatus 170 (ID=02) mounted on the vehicle 102. On the other hand, identification information data is not assigned to the external communication apparatus 170 mounted on another vehicle 101 or the vehicle 103 or the like. Hence, only the vehicle 102 is able to perform the external communication.

The management apparatus 30 changes the stored correlation from a correlation shown in FIG. 28A to a correlation shown in FIG. 28B, whereby the assignment of the identification information data to the vehicle 102 from the vehicle 101. As a result, the vehicle 100 performing the external communication is changed to vehicle 102 from the vehicle 101. The management apparatus 30 changes the assignment in such a way in response to a requirement transmitted from the control apparatus 10 (i.e. assignment unit 12).

According to the above-described example, the management apparatus 30 always manages the correlation between the identification information data and the ID, that is, the correlation between the identification information data and the external communication apparatus 170. The management apparatus 30 changes the correlation, thereby changing the assignment of the identification information data.

Alternatively, the above-described aspect may be changed to an aspect in which the correlation between the identification information data and the ID is not managed by the management apparatus 30. For example, the control apparatus 10 may directly assign, without via the management apparatus 30, the identification information data such as AAAAA to a specific external communication apparatus 170. Also, the identification information data of AAAAA may be directly transmitted to the vehicle 102 from the vehicle 101, thus changing an object to be assigned with the identification information data.

An overall process performed by the control apparatus 10 in order to change the object to be assigned with the identification information data will be described with reference to FIGS. 29A, 29B, 29C and 29D. As described in FIG. 26, the control apparatus 10 is provided with, as functional blocks, a determination unit 11 and an assignment unit 12. Each function of the determination unit 11 and the assignment unit 12 will be described in the following. The determination unit 11 and the assignment unit 12 according to the present embodiment correspond to first determination unit and first assignment unit, respectively.

Figure 29A:
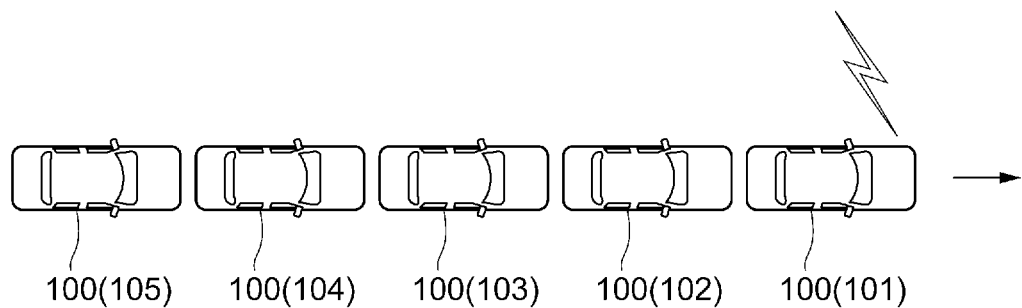
FIGS. 29A, 29B, 29C and 29D are diagrams for explaining an overall process executed by the control apparatus according to the seventh embodiment.

FIG. 29A illustrates a state where five vehicles 100 are travelling in a column similar to that shown in FIG. 26. At this moment, the external communication apparatus 170 has assigned the identification information data only to the frontmost side vehicle in the column (i.e. head vehicle 101). The vehicle 102 or the like travelling at the rear positions relative to the vehicle 101 are travelling with tracking the vehicle 101, and obtaining necessary information from the vehicle 101 via inter-vehicle communication.

Figure 29B:
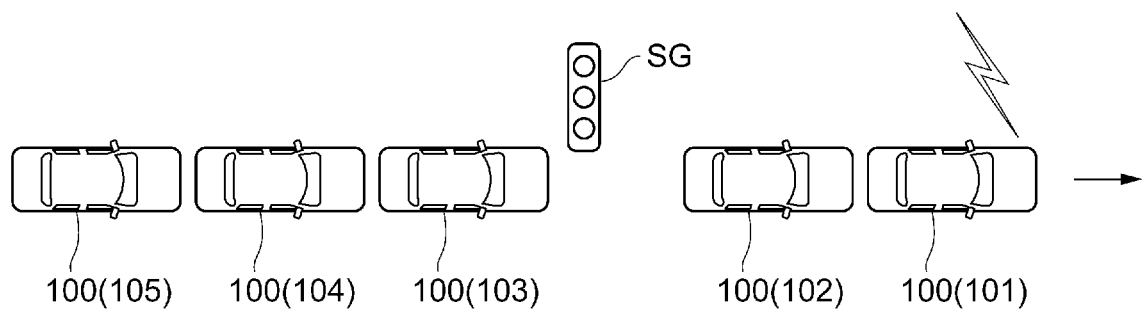

FIG. 29B illustrates a state where three vehicles 103, 104 and 105 are stopped because the signal SG turns red while travelling in the column. At this moment, since the two vehicles 101 and 102 travelling ahead of the three vehicle 103, 103 and 105 have passed the signal SG before it turned red, the two vehicles 101, 102 continues to travel even after the vehicle 103 or the like has stopped. Hence, as shown in FIG. 29B, the column is divided into two groups.

In the front side group (vehicle 101 and 102), the identification information is assigned to the external communication apparatus 170 of the vehicle 101. Hence, the vehicle 101 is able to perform the external communication in this group. On the other hand, in the rear side group (i.e. vehicles 103, 104 and 105), the identification information is not assigned to the external communication apparatus 170 in any of the vehicles 100. Therefore, in this group, external communication cannot be performed. Hereinafter, the group which cannot perform external communication because of separation of the column is also referred to as a first group. Further, the other group in the group also is referred to as a second group. The first group may be a group composed of a plurality of vehicles 100 shown in FIG. 29B, but may be a group including only one vehicle 100. The same applies to the second group.

After the state shown in FIG. 29B, when the distance between the first group and the second group becomes larger than the distance within which the inter-vehicle communication can be performed, communication cannot be accomplished between both groups. As a result, both the first and second groups are difficult to rejoin together and return to the previous column.

In this respect, the control apparatus 100 of the present embodiment, when determined that the first and second groups cannot perform the inter-vehicle communication, assigns the identification information to the external communication apparatus 170 of the vehicle 100 that belongs to the first group, to allow the vehicle 100 to perform external communication.

The determination unit 11 included in the control apparatus 10 is configured to determine whether the first group composed of one or more vehicles 100 will not be able to perform inter-vehicle communication with the second vehicle composed of the other vehicles. Specifically, as shown in FIG. 29B, the situation where the first group will not be able to perform inter-vehicle communication is determined by the determination unit 11.

The assignment unit 12 of the control apparatus 10, when it is determined that inter-vehicle communication cannot be performed between the first group and the second group by the determination unit 11, assigns the identification information to the external communication apparatus 170 of the vehicle 100 belonging to the first group and allows the vehicle 100 to perform external communication.

Figure 29C:
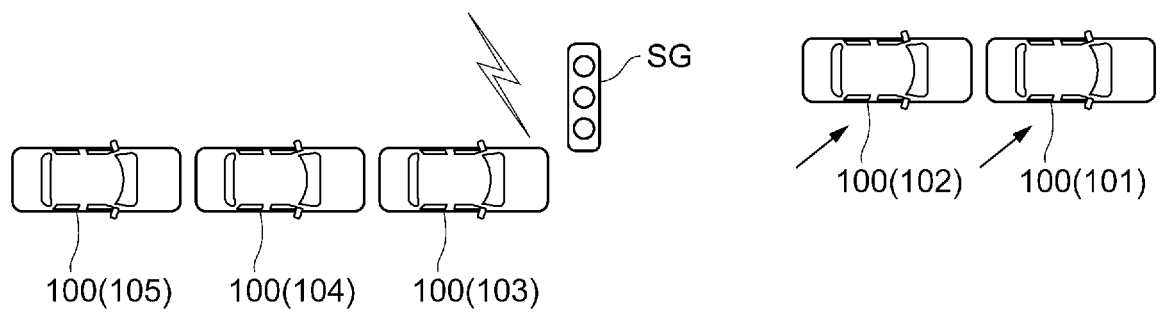

In a state shown in FIG. 29B, the assignment unit 12 assigns the identification information which has been assigned to the external communication apparatus 170 of the vehicle 101 to the external communication apparatus 170 of the vehicle 103. Once this process is executed, the vehicle 101 cannot perform external communication. Prior to executing this process, the vehicle control apparatus 150 stops the respective vehicles 100 including the vehicle 101 in the second group at a road shoulder, and transmits the stop positions thereof to the vehicle center 50. FIG. 29C illustrates a state where the vehicles 101 and 102 are stopped at the road shoulder.

Since the information to be transmitted to the vehicle center 50 indicates the stop positions of the second group as described above, the information is regarded as necessary information for rejoining the first group and the second group. Hereinafter, such information is also referred to as joining information. The joining information is transmitted by the vehicle 101 prior to the assignment of the above-described identification information, that is, prior to a time when the vehicle 101 is unable to perform the external communication. The joining information transmitted to the vehicle center 50 is temporarily stored in the vehicle center 50.

When the assignment unit 12 performs the above-described assignment of the identification information, the vehicle 103 in the first group performs external communication. The vehicle 103 acquires, from the vehicle center 50, the joining information transmitted by the vehicle 101. The vehicle control apparatus 150 of the vehicle 103 controls the respective vehicles 100 in the first group to travel to positions indicated by the joining information, that is, the positions where the vehicles of the second group are stopped.

Figure 29D:
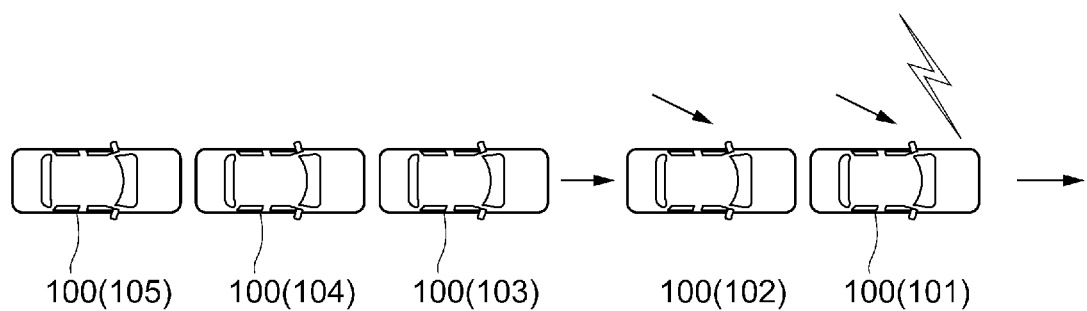

When the respective vehicles 100 in the first group reach a position close to the stop positions of the second group, a process for rejoining the first group and the second group is executed. As shown in FIG. 29D, the vehicles 101 and 102 of the second group start to run from the road shoulder and start to travel on the travelling road again. The vehicles 103, 104 and 105 in the first group approach the first group from behind and start to track the first group from behind.

After completing the join, the assignment unit 12 assigns the identification information which has been assigned to the external communication apparatus 170 of the vehicle 103.

Thus, the head vehicle 101 starts to perform external communication again so that the column returns to a state shown in FIG. 29A. After completing the above-described joining, when a vehicle 100 different from the vehicle 101 becomes the head vehicle, the identification information is assigned to the external communication apparatus 170 of the new vehicle 100. After the joining, when the vehicle 103 travels at the head position in the column, re-assignment of the identification information is unnecessary.

According to the present embodiment, in the state shown in FIG. 29A and FIG. 29D, the identification information is assigned to the external communication apparatus 170 of the head vehicle 101 in the column. Alternatively, the identification information may be assigned to the external communication apparatus 170 of the vehicle 100 other than head vehicle in the column (e.g. second vehicle 102 with respect to the head vehicle).

Also, in a state shown in FIG. 29C, the identification information assigned to the external communication apparatus 170 in the first group is set to be the head vehicle 103 in the first group. Alternatively, the identification information may be assigned to the external communication apparatus 170 of the vehicle 100 other than head vehicle in the first group (e.g. second vehicle 104 with respect to the head vehicle).

Figure 30:
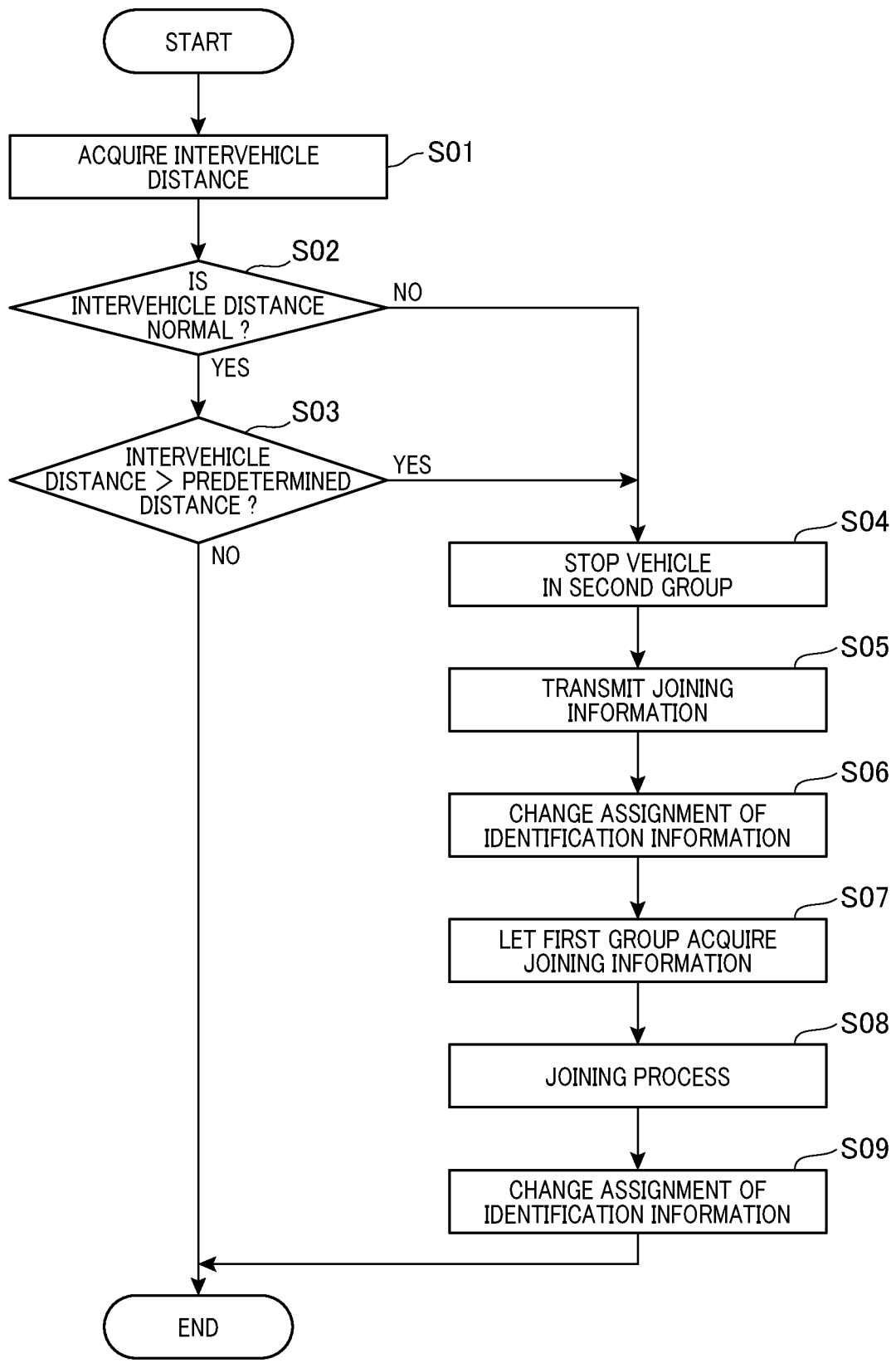
FIG. 30 is a flowchart executed by the control apparatus according to the seventh embodiment.

A process flow to achieve the above-described control executed by the control apparatus 10 will be described with reference to FIG. 30. The series of processes shown in FIG. 30 is repeatedly executed by the control apparatus 10 at a predetermined period.

At the first step S01, a process for acquiring the intervehicle distance between respective vehicles included in the column is executed. In the respective vehicles 100, the surroundings detection sensor 152 is able to detect the inter-vehicle distance between the own vehicle 100 and the preceding vehicle 100 positioned ahead of the own vehicle 100. At step S01, the above-described inter-vehicle distance is acquired individually from the respective vehicles 100. Note that the inter-vehicle distance is not acquired from the vehicle 100 travelling at the head position in the column.

At step S02 subsequent to step S01, the process determines whether the inter-vehicle communication is being performed normally in the column. The determination is performed by the determination unit 11. According to the present embodiment, when a fault occurs in the inter-vehicle communication in some of the vehicles 100, the information indicating the fault is transmitted to the control apparatus 10 from the vehicle control apparatus 150. In the case where the inter-vehicle communication is performed normally in the column, the process proceeds to step S03.

At step S03, the process determines whether the respective inter-vehicle distances acquired at step S01 is larger than a predetermined distance. The determination is performed by the determination unit 11. The above-described predetermined distance is a threshold value set in advance, as an upper limit of the inter-vehicle distance that allows stable inter-vehicle communication. In the case where all of the inter-vehicle distances are less than or equal to the predetermined distance, the series of processes shown in FIG. 30 is terminated.

At step S02, when a fault has occurred in the inter-vehicle communication, the process proceeds to step S04. At step S03, any of the intervehicle distances is larger than the predetermined distance, the process proceeds to step S04.

The transition of the process from step S02 to step S04 occurs in the case where the inter-vehicle distance is unable to be performed because of a case where the inter-vehicle distance in a part of the column becomes significantly large making the measurement of the inter-vehicle distance impossible. Also, the transition of the process from step S03 to step S04 occurs in the case where it will be difficult to perform the inter-vehicle communication because the inter-vehicle distance in a part of the column becomes large.

As described above, the determination unit 11 determines whether there is a case where the first group composed of one or more vehicles 100 is unable to perform inter-vehicle communication with the second group composed of other vehicles 100. The case where the inter-vehicle communication is unable to be performed refers to a case where inter-vehicle communication is already unable to be performed (transition of process from S02 to S04) or a case where the inter-vehicle communication will be difficult to perform in the future (transition of process from step S03 to step S04). According to the present embodiment, the above-described both cases are determined as cases where inter-vehicle communication is unable to be performed.

Instead of the above-described configuration, the determination unit 11 may determine that the first group cannot perform inter-vehicle communication with the second group when some obstacles are present between the vehicles 100 in the column. As the above-described obstacles, for example, other vehicles which are not included in the column, and a load on the road fallen from other vehicles are examples. When these obstacles are present between the vehicles 100, the transmittance of radio waves is lowered so that the inter-vehicle communication may be disturbed.

Alternatively, only a process of step S02 may be executed and the process of step S03 may not be performed. In this case, the process proceeds to step S04 only when inter-vehicle communication is unlikely to be performed successfully.

Instead of using the above-described configuration, only the process of step S02 may be executed and the process of step S03 may not be performed. In this case, the process proceeds to step S04 only when inter-vehicle communication is unlikely to perform.

Further, only a process of step S03 may be executed and the process of step S02 may not be performed. In this case, the process proceeds to step S04 only when the inter-vehicle communication is unlikely to perform.

In the case where the process proceeds to step S04, the plurality of vehicles 100 in the column are divided into two groups, that is, the first group and the second group. The first group is vehicles 100 that are unable to perform external communication (vehicles 103, 104 and 105 according to an example shown in FIG. 29B), and the second group is vehicles 100 that are still able to perform external communication (vehicles 101 and 102 according to an example shown in FIG. 29B). At step S04, the respective vehicles 100 in the second group are moved to a safe location such as a road shoulder and stopped.

At step S05 subsequent to step S04, the process transmits the joining information to a vehicle 100 which is able to perform the external communication in the vehicles 100 belonging to the second group. The joining information is transmitted to the vehicle center 50 by the external communication from the vehicle control apparatus 150 of the vehicle 100. The joining information is temporarily stored in the vehicle center 50.

The process at step S05 is executed after completing the process at step S04, that is, after the respective vehicles 100 in the second group stop at the road shoulder or the like. However, when that the stopping positions can be expected before completing the process at step S04, at this point, the process proceeds to step S05 and may transmit the joining information before stopping vehicles.

At step S06 subsequent to step S05, the process assigns the identification information which has been assigned to the external communication apparatus 170 of the vehicle 100 (vehicle 101 according to an example shown in FIGS. 29A to 29D) belonging to the second group, to the external communication apparatus 170 of the vehicle 100 belonging to the first group (vehicle 103 according to an example shown in FIGS. 29A to 29D). This process is executed by the assignment unit 12 of the control apparatus 10. After performing the process, the vehicles 100 belonging to the second group cannot perform external communication. However, since these vehicles are stopped at the road shoulder or a process for stopping these vehicles is ongoing, the lack of available external communication does not influence these vehicles. On the other hand, the vehicles 100 belonging to the first group are able to perform external communication after executing the process at step S06.

At step S07 subsequent to step S06, the process controls the vehicle 100 belonging to the first group to acquire the joining information from the vehicle center 50 by external communication. The joining information to be acquired by the vehicle 100 is information transmitted to the vehicle center 50 by the vehicle 100 belonging to the second group and being stored therein.

At step S08 subsequent to step S07, the process merges the first group and the second group. At this moment, firstly, the process controls the respective vehicles 100 belonging to the first group to travel towards the stop positions indicated in the joining information. Specifically, the process sets the travelling route of the column such that the stop position in the joining information is the destination, and controls the respective vehicles in the first group to travel along the travelling route. Thereafter, when the respective vehicles 100 in the first group reach a location close to the stop positions of the second group, the process controls the vehicles in the second group which have been stopped, to start to run so as to merge the both groups again.

At step S09 subsequent to step S08, the process assigns the identification information which has been assigned to the external communication apparatus 170 of the vehicle 100 belonging to the first group (vehicle 103 according to an example shown in FIGS. 29A to 29D), to the external communication apparatus 170 of the vehicle 100 belonging to the second group (vehicle 101 according to an example shown in FIGS. 29A to 29D). Thus, the head vehicle 101 performs the external communication again, and the column returns to the initial state.

As described, according to the control apparatus 10, in the case where the first group and the second group cannot perform the inter-vehicle communication, the assignment unit 12 assigns the identification information to the external communication apparatus of the vehicle 100 belonging to the first group, so as to have the vehicle 100 perform the external communication. Thus, even when the column is divided, necessary external communication can be performed and respective groups can be rejoined.

The determination unit 11 according to the present embodiment determines that the first group is unable to perform the inter-vehicle communication with the second group, when a part of the inter-vehicle distances between the vehicles 100 in the column is larger than the predetermined distance (step S03 shown in FIG. 30). Thus, the process accurately determines whether the inter-vehicle communication is unable to be performed. Note that the above-described predetermined distance may be set as an upper limit of intervehicle distance for performing stable intervehicle communication, but another distance may be set. For example, a distance larger than the maximum intervehicle distance that enables the inter-vehicle communication may be set as the predetermined distance.

The assignment unit 12 according to the present embodiment assigns the identification information which has been assigned to the external communication apparatus 170 of the vehicle 100 belonging to the second group to the external communication apparatus of the vehicle 100 belonging to the first group (step S06 shown in FIG. 30). Thus, the identification information data is appropriately re-used even when only one identification information data is applied by the telecommunication company, whereby the re-joining operation can be performed for the divided groups.

When the assignment unit 12 assigns the identification information, the process transmits, in advance, re-joining information necessary for rejoining the first group and the second group to the vehicle center 50 as the external server from the vehicle 100 belonging to the second group by the external communication. Also, after assigning the identification information by the assignment unit 12, the process controls the vehicle 100 belonging to the first group to acquire the joining information, by using the external communication, from the vehicle center as the external server. As a result of the execution of such processes by the control apparatus 10, the joining information can be transferred to the first group via the vehicle center, even when the first group and the second group are unable to perform direct communication therebetween. Hence, the respective vehicles 100 in the first group can be controlled to travel to appropriate junction points.

Instead of the above-described such configurations, a configuration may be employed in which the joining information as necessary information for re-joining the first group and the second group may be directly transmitted, by the inter-vehicle communication, to the vehicle 100 belonging to the first group, when assigning the identification information by the assigning unit 12. For example, at a time when the process proceeds to step S04 from step S03 shown in FIG. 30, if inter-vehicle communication is still able to be performed, the transmission of the joining information at step S05 can be performed such that the vehicle 100 belonging to the second group directly transmits the joining information to the vehicle 100 belonging to the first group by the inter-vehicle communication. In this case, the transmission of the joining information at step S05 and the acquisition of the joining information at step S07 are simultaneously performed. In this case, the assignment of the identification information at step S06 may be performed before or after transmitting/receiving the joining information.

The transmission/reception of the joining information performed by the inter-vehicle communication described above may be repeatedly performed at a predetermined period.

In the case where the inter-vehicle communication is unable to be performed before transmitting/receiving the joining information using the inter-vehicle communication, the joining information can be transmitted via the vehicle center 50 as described above. Thus, the processing load or necessary amount of memory for the information can be reduced.

With reference to FIG. 31A to 31C, a case will be described in which the correlation between the identification information and the ID is not managed by the management unit 30. In this example, regardless of whether the external communication is actually performed or not, the identification information is stored in advance in each external communication apparatus 170. When the external communication apparatus 170 performs the external communication, the identification information stored in the external communication apparatus 170 is activated to start the external communication based on the identification information. Accordingly, in this example, activation of the identification information stored in the above-described manner corresponds to assigning the identification information to execute the external communication. The process of activating the identification information is executed based on the signal to be transmitted to each vehicle control apparatus 150 from the control apparatus. Note that activating the identification information refers to a state where external communication based on the identification information is prohibited changing to a state where external communication based on the identification information is enabled.

According to an example shown in FIG. 31A, the identification information S1 is stored in the external communication apparatus 170 of the vehicle 101 travelling at the head position. Also, common identification information S2 is stored in each of the external communication apparatuses 170 of four vehicles (102, 103, 104, and 105) travelling at the second head position and following positions. Thus, the process for storing the identification information into the external communication apparatus 170 is performed in advance by the control apparatus 10. Note that the travelling position in the above-description indicates which position the vehicle 100 is travelling at in the case where a plurality of vehicles 100 are travelling, forming a column. In the following description, the term travelling position is used with the same meaning as that described above.

According to the example shown in FIG. 31A, only the identification information S1 stored in the external communication apparatus 170 of the vehicle 101 is active, so that only the vehicle 101 performs the external communication based on this identification information S1. None of the identification information S2 stored in the external communication apparatuses 170 of other vehicles 102 is active. Note that S2 written in parentheses shown in FIG. 31A refers to that S2 is not active. The same applies to the following FIG. 31B and FIG. 31C.

When reassigning the vehicle 100 performing the external communication in the state shown in FIG. 31A, the control apparatus 10 stops the external communication by the vehicle 101 (that is, changes S1 to be inactive), and makes the identification information (S2) stored in any of the external communication apparatuses 170 in other vehicles 102 to be active.

Thus, the control apparatus 10 in the above-described example stores the common identification information in advance to the external communication apparatus 170 of each vehicle (102, 103, 104, and 105) performing no external communication, among vehicles 100 provided with the external communication apparatus 170. According to this configuration, even when the correlation between the identification information and the ID is not managed by the management apparatus 30, the control apparatus 10 is able to re-assign the identification information.

In an example shown in FIG. 31B, the identification information S1 is stored in the external communication apparatus 170 of the vehicle 101 travelling at the head position. Also, the identification information S2 is stored in the external communication apparatus 170 of the vehicle 104 travelling at the fourth position with respect to the head position.

The common identification information S3 is stored in the external communication apparatus 170 of the vehicle 102 travelling at the second head position and the external communication apparatus 170 of the vehicle 103 travelling at the third head position. The common identification information S4 is stored in the external communication apparatus 170 of the vehicle 105 travelling at the most rear side travelling position.

According to an example shown in FIG. 31B, the identification information S1 stored in the external communication apparatus 170 of the vehicle 101, and the identification information S2 stored in the external communication apparatus 170 of the vehicle 104 are in an active state. Hence, each of the vehicle 101 and vehicle 104 individually performs external communication. Other identification information S3 and S4 are not in an active state.

When reassigning the vehicle 100 performing the external communication in the state shown in FIG. 31B, the control apparatus 10 stops the external communication by the vehicle 101 or the vehicle 102 (that is, changes S1 or S2 to be inactive), and makes the identification information (S3) stored in any of the external communication apparatuses 170 in the vehicle 102 or the vehicle 103 active. Note that the identification information S4 stored in the external communication apparatus 170 of the vehicle 105 is set to be active when reassignment of the identification information is further required after the above-described process, and stored as a spare.

FIG. 31C illustrates two columns (column 1 and column 2) each travels individually. The column 1 includes, as similar to the previous examples, 5 vehicles 100 (101, 102, 103, 104 and 105). In the external communication apparatuses 170 in the respective external communication apparatuses 170, S1, S2, S3, S4, S5 and S6 are stored in the order of vehicle positions from the head vehicle. In these identification information data, only S1 is set to be active, and S3, S4, S5 and S6 are not active (i.e. inactive). Hence, only the vehicle 101 among the vehicles 100 included in the column 1 performs external communication based on S1, and other vehicles 100 do not perform the external communication.

The column 2 includes 5 vehicles (111, 112, 113, 114, 115). The external communication apparatuses 170 in the respective vehicles 100 each stores identification information data S2, S3, S4, S5 and S6 in the order of vehicle positions from the head vehicle. In these identification information data, only S2 is set to be active, and S3, S4, S5, and S6 are inactive. Accordingly, among these vehicles 100 included in the column 2, only the vehicle 121 performs the external communication based on S2, and other vehicles 100 do not perform external communication.

In the column 1, when re-assigning the vehicle 100 that performs the external communication, the control apparatus 10 stops the external communication (that is, changes the state S1 to be inactive), and controls the identification information data (S3 or the like) stored in the external communication apparatus 170 of any of other vehicles 102 to be active.

Similarly, in the column 2, when re-assigning the vehicle 100 that performs the external communication, the control apparatus 10 stops the external communication of the vehicle 111 (that is, controls S2 to be inactive), and controls the identification information data (S3 or the like) stored in the external communication apparatus 170 in any of other vehicles 112 to be active.

In the example shown in FIG. 31C, the identification information data (e.g. S3) which is not active is shared between the column 1 and column 2. Hence, in the case where the identification information data is reassigned in each column as described above, it is required to avoid simultaneous activation of the same identification information data between the column 1 and the column 2. In order to avoid simultaneous activation of the identification information data, each control apparatus 10 of respective columns may acquire, from the management apparatus 20 in advance, information whether the identification information data (S3 or the like) is active in other column. Alternatively, the above-mentioned acquisition of the information may be applied to other vehicle 100 via the inter-vehicle communication.

The separation of the column usually occurs when some of the vehicles 100 included in the column stop at the signal SG, but the separation may occur because of other reason. For example, in the case where the destination of some of the vehicles 100 in the column are different from those of other vehicle 100, the column may be intentionally divided into two groups while travelling. In this case, the determination unit 11 may perform the determination not based on the inter-vehicle distance, but based on whether or not the column approaches the junction where the column should be divided into two groups.

Thus, when the rejoining after the separation is not expected, the assignment unit 12 may assign the identification information such that the respective groups after the separation are able to perform the external communication.

For example, in the case where the column is divided into the first group composed of the vehicles 103, 104 and 105, and the second group composed of the vehicles 101 and 102, from a state shown in FIG. 31B, the assignment unit 12 may set the identification information S2 assigned to the external communication apparatus 170 of the vehicle 103 to be active, while maintaining the active state of the identification information S1 assigned to the external communication apparatus 170 of the vehicle 101. Thus, the vehicle 100 belonging to the first group is still able to perform the external communication even after the separation of the column.

In the case where the column is divided into a group composed of the vehicles 103, 104 and 105, and a group composed of the vehicles 101 and 102, from a state shown in FIG. 31B, the process may set the identification information S2 assigned to the vehicle 104 to be inactive, and set the identification information assigned to the vehicle 103 to be active. Thus, each of the vehicles 101 and 103 which will be the head vehicle after the separation is able to perform the external communication.

As a method for activating the identification information, for example, the identification information may be acquired from other vehicle 100 via the inter-vehicle communication, and may be stored into the external communication apparatus 170. The identification information may be stored into the external communication apparatus 170 in advance, and the communication function of the external communication apparatus 170 may be changed to ON from OFF, thereby activating the identification information. The identification information may be stored in advance in the management apparatus 30 and the control apparatus 10, and the apparatus may acquire the stored identification information. Further, the identification information may be purchased when acquiring the identification information.

Eighth Embodiment

With reference to FIG. 32, the eighth embodiment will be described. According to the present embodiment, the control apparatus 10 is not installed in a building, but installed in one vehicle among the plurality of vehicles 100 included in the column. In the example shown in FIG. 32, the control apparatus 10 is mounted on the vehicle 101 traveling at the head position of the column. Instead of using this configuration, the control apparatus 10 may be mounted on any one of the vehicles 102 travelling at positions other than the head position.

The control apparatus 10 communicate with the vehicle control apparatus 150 of each vehicle 100 by the inter-vehicle communication, and also communicates with the management apparatus 30 by the external communication. The specific processes performed by the control apparatus 10 is similar to those described in the seventh embodiment. Also with this configuration, the same effects and advantages can be obtained.

Ninth Embodiment

The ninth embodiment will be described. As shown in FIG. 33, according to the present embodiment, a plurality of the control apparatuses 210 are prepared as much as the number of vehicles 100 included in the column. These apparatuses are installed in the respective vehicles 100. In FIG. 33, the control apparatus 10 installed in the vehicle 101 is shown as a control apparatus 10A. Similarly, the control apparatus 10 installed in the vehicle 102 is shown as a control apparatus 10B, the control apparatus 10 installed in the vehicle 103 is shown as a control apparatus 10C, the control apparatus 10 installed in the vehicle 104 is shown as a control apparatus 10D, and the control apparatus 10 installed in the vehicle 105 is shown as a control apparatus 10E.

According to the present embodiment, the above-described five control apparatuses 10 are configured to execute individual processes at the respective vehicles 100, while sharing necessary information as needed with the inter-vehicle communication. The control apparatus 10 is able to execute similar processes described in the seventh embodiment.

Figure 34:
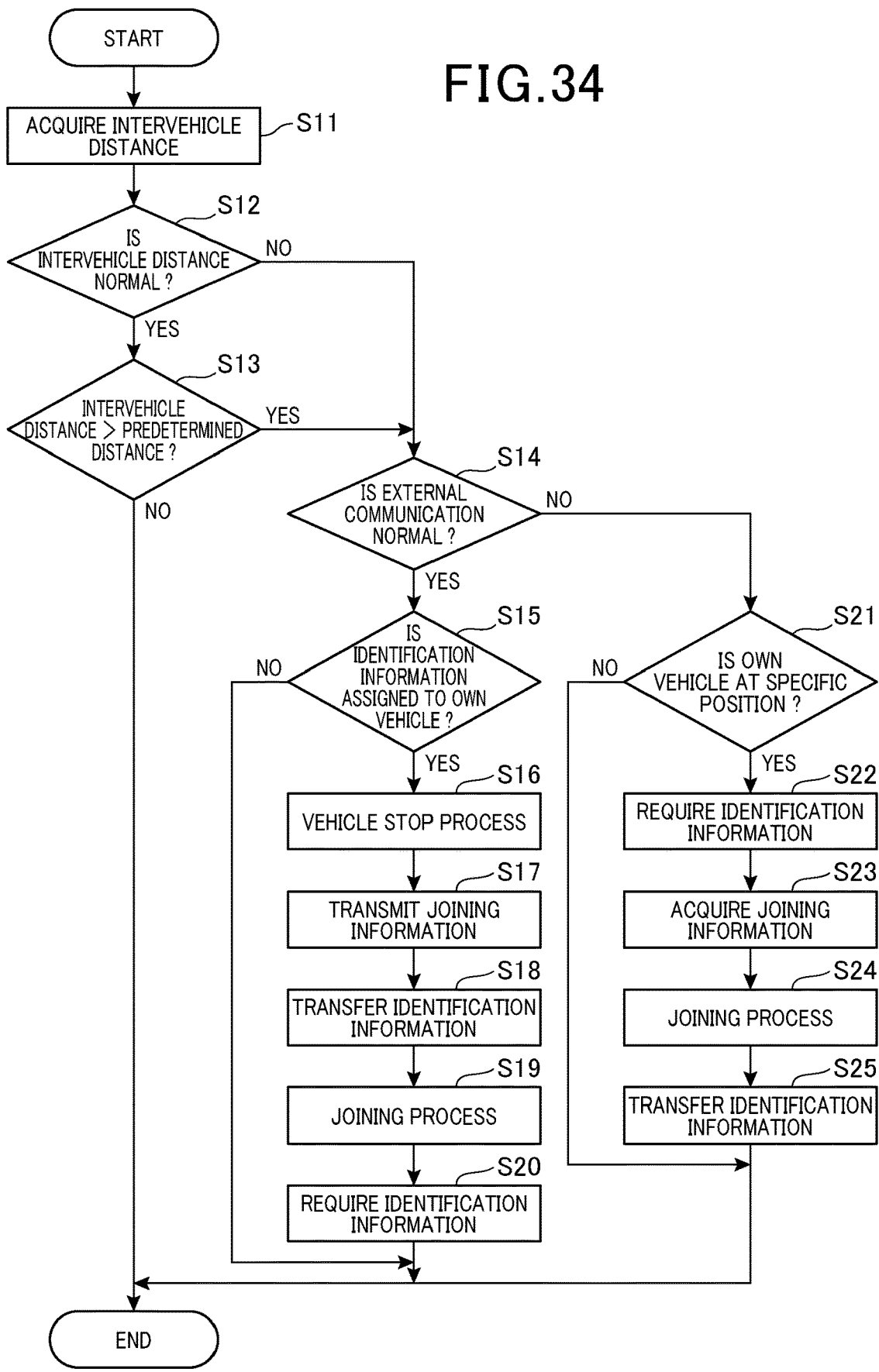
FIG. 34 is a flowchart executed by the control apparatus according to the ninth embodiment.

For a specific example of the processes executed by the control apparatus according to the present embodiment will be described with reference to FIG. 34. The series of processes shown in FIG. 34 is repeatedly executed by the respective control apparatuses 10 at a predetermined period.

At the first step S11 of the process, a process acquiring the inter-vehicle distance in the back-forth direction of the own vehicle. Note that own vehicle refers to a vehicle 100 on which the control apparatus 10 is executing the processes of FIG. 34. In other words, the own vehicle refers to, for the control apparatus 10, the vehicle 100 to which the control apparatus 10 itself is mounted. Hereinafter, the term own vehicle will be used with the above-mentioned meaning. Note that the above-described inter-vehicle distance in the back-forth direction of the own vehicle does not include an inter-vehicle distance between vehicles in the surroundings other than the column.

At step S12 subsequent to step S11, the process determines whether the own vehicle performs the inter-vehicle communication normally. This determination is performed by the determination unit 11. When the inter-vehicle communication is performed normally the process proceeds to step S13.

At step S13, the process determines whether the inter-vehicle distance acquired at step S11 is larger than the predetermined distance. This determination is performed by the determination unit 11. The above-described predetermined distance is a predetermined threshold as an upper limit of the inter-vehicle distance for ensuring stable inter-vehicle communication. In the case where the inter-vehicle distance in the back-forth direction of the own vehicle is smaller than or equal to the predetermined distance, the series of processes shown in FIG. 34 is terminated.

At step S12, when the process determines that a fault has occurred in inter-vehicle communication, the process proceeds to step S14. Also, at step S13, when the inter-vehicle distance in either longitudinal direction is larger than the predetermined distance, the process proceeds to step S14.

The process proceeds to step S14 from step S12 when inter-vehicle communication is unable to be performed because the inter-vehicle distance in the back-forth direction of the own vehicle becomes significantly large such that the inter-vehicle distance in the longitudinal direction cannot be measured. Further, the process proceeds to step S14 from step S13 in the case where it is difficult to perform inter-vehicle communication after the inter-vehicle distance in the longitudinal direction becomes significantly large as described above.

Alternatively, only the process at step S12 may be executed and the process at step S13 may not be performed. In this case, the process proceeds to step S14 only when the inter-vehicle communication is unable to be performed already.

Moreover, only the process at step S13 may be executed and the process at step S13 may not be performed. In this case, the process proceeds to step S14 only when it is unlikely that inter-vehicle communication will be able to be performed.

In the case where the process proceeds to step S14, the plurality of vehicles 100 included in the column are divided into the first group where no external communication is performed, and the second group where the external communication continues to perform external communication. However, at this moment, it is not determined which group the own vehicle belongs to.

At step S14, the process determines whether the own vehicle is performing external communication normally. It is not limited to the external communication apparatus 170 mounted on the own vehicle to perform the external communication, but the external communication apparatus 170 mounted on another vehicle belonging to the same group may be used to perform the external communication (i.e. tethering). When external communication is performed normally by the own vehicle, the process proceeds to step S15. The own vehicle belongs to the second group in the case where the process proceeds to step S15.

At step S15, the process determines whether the identification information has been assigned to the external communication apparatus 170 of the own vehicle. In other words, the process determines whether the external communication apparatus 170 of the own vehicle performs the external communication of the second group. When the identification information has not been assigned to the external communication apparatus 170 of the own vehicle, and the external communication of the second group is performed via other vehicle 100, the process terminates the series of processes shown in FIG. 34. When the identification information has been assigned to the external communication apparatus 170 of the own vehicle, the process proceeds to step S16.

At step S16, the process stops the all of other vehicles 100 belonging to the second group together with the own vehicle at a road shoulder or the like. This process is performed by the vehicle control apparatus 150 of the own vehicle. At this moment, when the own vehicle is travelling at a position other than the head position. a vehicle control apparatus 150 of the vehicle 100 travelling at the head position may perform the process.

At step S17 subsequent to step S16, the process transmits the joining information indicating an estimated stop position of the second group to the vehicle center 50 from the own vehicle. Similar to the first embodiment, the process is performed after stopping the respective vehicles 100 of the second group at the road shoulder or the like, but may be performed before completing the stop of the vehicles.

At step S18 subsequent to step S17, the process transfers the identification information assigned to the external communication apparatus 170 of the own vehicle to the external communication apparatus 170 of another vehicle 100. Specifically, the process transmits a request to the management apparatus 30 so as to reassign the identification information assigned to the external communication apparatus 170 of the own vehicle to a specific vehicle 100 travelling in the first group (e.g. vehicles travelling at the head position). The management apparatus 30 responds to the request to change the correlations which are described with reference to FIG. 26. Thereafter, external communication by the own vehicle, that is, external communication by the second group cannot be performed.

Thereafter, when the first group approaches the second group which is stopped so that the inter-vehicle communication is ready to be performed between both groups, the process proceeds to step S19. At step S19, the process controls all of the other vehicles belonging to the second group to start from the road shoulder or the like, and rejoin both groups again. Similar to step S16, this process is performed by the vehicle control apparatus 150. At this time, when the own vehicle is traveling at a position other than the head position of the second group, the vehicle control apparatus 150 of the vehicle 100 may perform the process.

At step S20 subsequent to step S19, the process transmits a request to the management apparatus 30 so as to reassign the identification information to the external communication apparatus 170 of the own vehicle. The management apparatus 30 responds to the request to change the correlation described with reference to FIG. 26, whereby external communication by the external communication apparatus 170 can be performed similar to a case before the column is separated. When the own vehicle is travelling at a position other than the head position after the joining, the process may not perform the process at step S20.

In this example, the vehicle 100 travelling at the head position performs external communication. However, the position of the vehicle 100 performing external communication may be a position other than the head position. In this case, the process at step S20 is performed only when the own vehicle is travelling at the above-described predetermined position after the joining.

At step S14, when the own vehicle is not able to perform external communication, the process proceeds to step S21. In the case where the process proceeds to step S21, the own vehicle belongs to the first group.

At step S21, the process determines whether the own vehicle is traveling at the specific position of the first group. Note that the specific position refers to, similar to the above-described specific position, a predetermined travelling position as a travelling position of the vehicle 100 which is responsible for performing the external communication. According to the present embodiment, the head position of the group is determined as the specific position. However, another position may be set as the specific position. In the case where the own vehicle is travelling at a position other than the specific position, the process terminates the series of processes shown in FIG. 34. When the own vehicle is travelling at the specific position, the process proceeds to step S22.

At step S22, the process assigns the identification information to the external communication apparatus 170 of the own vehicle. For this process, the control apparatus 10 does not positively perform this process, but is performed as a result of changing the correlation shown in FIG. 26 by the management apparatus 30 responding to the request at step S18. After executing the process at step S18, the external communication by the own vehicle, that is, the external communication by the first group can be performed.

At step S22 subsequent to step S23, the process controls the own vehicle (i.e. vehicle 100 belonging to the first group) to acquire, using the external communication, the joining information from the vehicle center 50 as the external server. Thus, the vehicle control apparatus 150 of the own vehicle is able to recognize the stopping position at which the second group is stopped.

Hereinafter, the process controls the respective vehicles 100 in the first group to travel towards the stop positions of the second group. When the first group approaches the second group being stopped, the process controls both groups to be re-joined. Similar to step S16, these processes are performed via the vehicle control apparatus 150 of the own vehicle. At this moment, when the own vehicle is travelling at a position other than the head position in the first group, these processes may be executed by the vehicle control apparatus 150 of the vehicle 100 travelling at the head position.

At step S25 subsequent to step S24, the process transfers the identification information assigned to the external communication apparatus 170 of the own vehicle to the external communication apparatus 170 of another vehicle 100. Specifically, the process transmits a request to the management apparatus 30 so as to reassign the identification information assigned to the external communication apparatus 170 of the own vehicle to a vehicle 100 at a specific position in the column (e.g. vehicles travelling at the head position). The management apparatus 30 responds to the request to change the correlation which are described with reference to FIG. 26. Thereafter, external communication by the external communication apparatus 170 of the own vehicle can be performed similar to the case before the column is separated. After the joining, when the own vehicle is travelling at the specific position in the column, the process at step S25 may not be executed.

In the above-described examples, the vehicle 100 travelling at the heat position in the column performs external communication. Hence, in the case where the own vehicle is at the head position in the second group, the request of the identification information is transmitted, assuming that the own vehicle will be at the head position after the joining at step S20. Alternatively, the first and second groups may be joined such that a vehicle in the first group is at the head position after the joining. In this case, the process at step S20 requiring the identification information may not be performed. Similarly, in the case where the own vehicle is travelling at the head position in the first group, and the first group will be the head position, the process at step 25 for transferring the identification information may not be performed.

Figure 35:
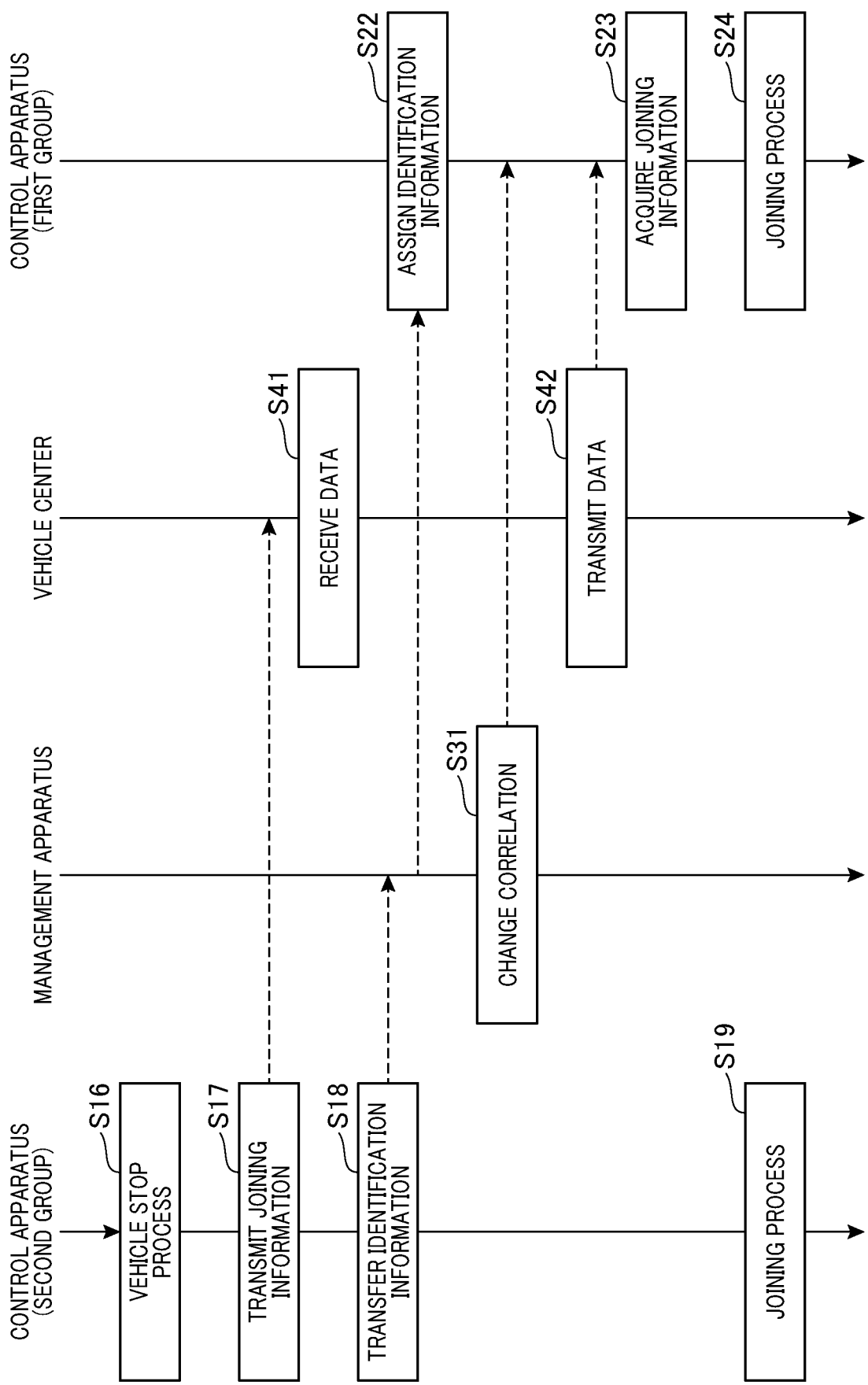
FIG. 35 is a diagram describing a communication sequence between the control apparatus and management apparatus according to the ninth embodiment.

FIG. 35 illustrates a process flow executed by the vehicle 100, the management apparatus 30 and the vehicle 30. The one illustrated in the most left side in FIG. 35 is a process flow executed by the vehicle 100 which has been performing the external communication, that is, executed by the control apparatus 10 mounted on the vehicle 100 in the second group. The one illustrated in the second left side in FIG. 35 is a process flow executed by the management apparatus 30. The one illustrated in the third left side in FIG. 35 is a process flow executed by the vehicle center 50. The one illustrated in the most right side in FIG. 35 is a process flow executed by the vehicle 100 which has not been performing the external communication, that is, executed by the control apparatus 10 mounted on the vehicle 100 in the first group. FIG. 35 illustrates a part of processes executed after step 14 shown in FIG. 34. The same reference numbers (e.g. S16) are applied to processes that are the same as those shown in FIG. 34.

At step S17, when the joining information is transmitted from the vehicle 100 in the second group, the vehicle center 50 receives the joining information at step S41. The vehicle center 50 temporarily stores the joining information into a memory unit (not shown) included in the own vehicle center 50.

At step S18, when a process is executed for requiring a transfer of the identification information from the vehicle 100 in the second group, the management apparatus 30 changes the correlation shown in FIG. 26 (step S31). Specifically, the management apparatus 30 changes the correlation such that the identification information assigned to the external communication apparatus 170 of the vehicle 100 in the second group is assigned to the external communication apparatus 100 in the first group.

In the case where the vehicle 100 to be assigned with the identification information is unknown, the process assigns the identification information to the external communication apparatus 170 in any of vehicle 100 in the second group. Thereafter, the process re-assigns the identification information to the external communication apparatus 170 of other vehicle 100 (e.g. head vehicle determined by the external communication) in the second group as needed.

When the second group is ready to perform the external communication as a result of the execution of the process at step S31, the vehicle center 50 transmits the stored joining information to the vehicle 100 based on the requirement of the vehicle 100 in the second group (step S42).

Thereafter, the control apparatus 10 mounted on the vehicle 100 in the second group executes a process in which the joining information is received at step S23 so as to join the first group based on the joining information.

Thus, even in the case where the control apparatus 10 is mounted to each vehicle 100, similar processes to the first embodiment is performed and the same effects and advantages as those of first embodiment can be obtained.

Also, according to the present embodiment, when the assignment unit 12 assigns the identification information, the joining information as necessary information for re-joining the first group and the second group may be directly transmitted, via inter-vehicle communication, to the vehicle belonging to the first group from the vehicle 100 belonging to the second group. For example, in the case where inter-vehicle communication is still able to be performed at a time when the process proceeds from step S13 to step S14 shown in FIG. 34, as a process to be executed at step S17, the joining information can be directly transmitted via the inter-vehicle communication to a vehicle belonging to the first group from the vehicle 100 belonging to the second group. In this case, the process at step S15 in which the joining information is transmitted, and a process at step S23 in which the joining information is acquired are simultaneously performed. In this case, the assignment of the identification information at step S18 or step S22 may be performed before/after the transmission/reception of the joining information.

The above-described transmission/reception with the inter-vehicle communication may be repeatedly performed at a predetermined period while the inter-vehicle communication is available.

In the case where the inter-vehicle communication is unable to be performed before transmitting/receiving the joining information by the inter-vehicle communication, the joining information may be transmitted/received via the vehicle center 50 as described above. Thus, the processing load of the vehicle center 50 and a required memory size of the information can be reduced.

Tenth Embodiment

Hereinafter, a tenth embodiment will be described. A plurality of vehicles 100 shown in FIG. 36 are configured to perform platoon travelling. The platoon travelling refers to travelling in which a plurality of vehicles are running in a column in a state where one or more vehicles are running automatically tracking the head vehicle from behind. According to the present embodiment, each vehicle 100 is configured as an electric vehicle, but may be configured as a vehicle provided with an internal combustion engine.

In FIG. 36, a state where five vehicles 100 are running forming a column is schematically illustrated as a top view. In FIG. 1, respective vehicles 100 are applied with reference numbers 100, 101, 102, 103, 104, and 105 in the order of vehicle positions from the head vehicle. In the following description, the head vehicle 100 to which a reference number 101 is applied may be referred to as a vehicle 101. Similarly, the second vehicle and subsequent vehicles 100 may be referred to as vehicle 102, vehicle 103 and the like. Note that the number of vehicles 100 which perform the platoon travelling may be five or less or more.

A control apparatus 10 shown in FIG. 36 is configured to control each of the plurality of vehicles 100 which perform platoon travelling. The control apparatus 10 according to the present embodiment is disposed inside a building which is not shown. That is, the control apparatus is disposed separately from respective vehicles 100 included in the column, to be located at a location different from that of the respective vehicles. The control apparatus 10 performs wide-area wireless communication with one vehicle included in the vehicles 100, thereby controlling the platoon travelling by the vehicle 101 or the like. The control apparatus 10 performs control including a determination (switching) of the vehicle 100 as an object of the wide-area wireless communication, and switching of the running position of the vehicle 101 or the like in the column. The configuration or the detailed contents of the control performed by the control apparatus 19 will be described later.

Wide-area wireless communication between the control apparatus 10 and the vehicle 100 is performed via a telecommunication network 20 and a base station 40. The telecommunication network 20 is a wired communication network provided throughout the country, operated by a telecommunication company which also operates the base station 40 and a management apparatus 30 described later. The telecommunication company provides a wide-area wireless telecommunication service with cellular phones and the like.

The base station 40 is a facility provided with an antenna used for performing the above-described wide-area wireless communication. A plurality of base stations 40 are provided. Each of the base stations 40 is connected to the above-described communication network 20. Each base station 40 is provided on a roof top of a building around the road so as to at least cover the road on which the vehicle 100 runs as a communicable range.

The management apparatus 30 is a server installed by the above-mentioned communication company. The management apparatus 30 is connected to the control apparatus 10 via the communication network 20. The management apparatus 30 is configured to be capable of performing wide-area wireless communication with the vehicle 100 via the communication network 20 and the base station 40. The management apparatus 30 is a server that manages the identification information data assigned to an external communication apparatus 170 (see FIG. 37) of the vehicle 100. The contents of the process executed by the management apparatus 30 will be described later.

Note that the management apparatus 30 may include a part of or whole function included in the control apparatus 10. In other words, the control apparatus 10 may be configured as a part of the management center 30.

Also, a part of the functions included in the control apparatus 10 (e.g. function in which the column is lead to the destination) may be accomplished by another apparatus connected to the network 20.

With reference to FIG. 37, a configuration of the vehicle 100 will be described. According to the present embodiment, configurations of all of the vehicles 100 included in the column are the same. The vehicle 100 is provided with a vehicle control apparatus 150, a navigation apparatus 151, a surroundings detection sensor 152, a travelling apparatus 153, a notification apparatus 154, an inter-vehicle communication apparatus 160 and an external communication apparatus 170.

The vehicle control apparatus 150 is configured to control all operations of the vehicle 100. The vehicle control apparatus 150 is configured as a computer system including CPU, ROM and RAM. The vehicle 100 is configured as a vehicle capable of automatically performing driving such as braking and steering without a driver's intervention, that is, a vehicle capable of performing autonomous driving. The vehicle control apparatus 150 controls the entire operation of the vehicle 100, thereby mainly performing necessary processes to achieve autonomous driving.

The navigation system 151 acquires the current location of the vehicle 100 by using the GPS (global positioning system) and acquires a travelling route to the destination based on the acquired current location. The vehicle control apparatus 150 allows the vehicle 100 to perform the automatic driving such that the vehicle 100 travels along the travelling route acquired by the navigation system 151 to reach the destination.

In the case where all of the vehicles 100 included in the column perform platoon travelling to the same destination, the navigation system 151 may be installed in a vehicle (e.g. head vehicle 101) among the vehicles 100.

The surroundings detection sensor 152 detects a situation surrounding the vehicle 100. For example, the surroundings detection sensor 152 is configured as an on-vehicle camera or a radar. The surroundings detection sensor 152 detects the boundary of the traffic lane on which the vehicle 100 is travelling, or detects an obstacle (e.g. other vehicle) existing on the travelling road. The situation of the surroundings detected by the surroundings detection sensor 152 is transmitted to the vehicle control apparatus 150. Thus, the vehicle control apparatus 150 is able to prevent the vehicle 100 from protruding from the boundary of the traffic lane, or from colliding with an obstacle. Also, the surroundings detection sensor 152 is able to detect the inter-vehicle distance 100 travelling ahead of the own vehicle.

The travelling apparatus 153 is configured to have the vehicle 100 travel. The travelling apparatus 153 is provided with a motor that produces a driving force of the vehicle 100, an electric brake for braking the vehicle 100, and an electric steering apparatus for performing a steering operation of the vehicle 100. The vehicle control apparatus 150 controls the above described apparatuses included in the travelling apparatus 153, thereby performing an automatic driving of the vehicle 100.

The notifying apparatus 154 notifies the passengers in the vehicle 100 about a traveling state of the vehicle 100 (e.g. current location during travelling). The notifying apparatus 154 is, for example, a touch panel screen. Note that the notifying apparatus 154 may not be provided in the case where no passengers are present in the vehicle 100 because the vehicle 100 is configured as a cargo carrying vehicle.

The inter-vehicle communication apparatus 160 performs a wireless communication between the vehicle 100 and other vehicles 100 included in the column. Respective vehicles 100 in the column perform the wireless communication from each other by the inter-vehicle communication apparatus, thereby sharing information about the situation around the vehicles or transmitting/receiving control signals for adjusting a brake timing and the like. Note that such a wireless communication is also referred to as inter-vehicle communication hereinafter. For example, the inter-vehicle communication is performed in a relatively small area such as wireless LAN (local area network).

The external communication apparatus 170 utilizes a wide-area wireless communication service provided by the above-mentioned communication company to perform a wide-area wireless communication with equipment outside the vehicle such as the management apparatus 30, the control apparatus 10 and the management center 50. Hereinafter, this wide-area wireless communication is also referred to as external communication in order to differentiate with the above-described inter-vehicle communication.

The external communication is performed based on own identification information data given by the telecommunication company. The identification information data is given in advance based on a line contract with the telecommunication company, in which the information is stored in a SIM (subscriber identity module) card or an eSIM card. In order to allow a plurality of vehicles 100 to simultaneously perform the external communication, a plurality of identification information data set corresponding to the number of vehicles have to be given, and dedicated identification information data has to be assigned to the external communication apparatus 170 of each vehicle 100.

According to the present embodiment, the external communication apparatus 170 is provided in the all of the vehicles 100 included in the column 100. Alternatively, the external communication apparatus 170 may not be provided in the all of the vehicles 100 but may be provided in some of the vehicles 100.

According to the present embodiment, the number of identification information data set being given in advance by the telecommunication company is lower than the number of vehicles 100 included in the column. Thus, the number of vehicle 100 capable of simultaneously performing an external communication is always lower than the number of vehicles 100 included in the column.

In such a configuration, the number of line contracts of the telecommunication company (i.e. the number of given identification information data set) is lower than the number of vehicles 100 included in the column. Hence, compared to a case where the identification information data is assigned to the all of vehicles 100, the communication cost accompanied by the external communication can be reduced.

In an example shown in FIG. 36, the identification information data is assigned to only the external communication apparatus 170 of the vehicle 101 in the head position of the column, the identification information data is not assigned to the external communication apparatus 170 of other vehicles 102 or the like. Therefore, only the vehicle 101 having the assigned identification information data is able to perform the external communication directly with the control apparatus 10 or the management apparatus 30.

The vehicles 102 or the like which have not been assigned with the identification information data are not able to perform the external communication with the control apparatus 10 or the management apparatus 30 directly. However, the vehicles 102 perform the inter-vehicle communication with the vehicle 101 capable of performing an external communication, thereby communicating with the control apparatus 10 or the management apparatus 30 via the vehicle 101. In other words, the vehicle 101 performs so called tethering, whereby the vehicle 102 or the like is able to communicate with the control apparatus 10 or the management apparatus 30.

The control apparatus 10 performs a process for managing the assignment of the identification information data to the respective external communication apparatuses 170. As will be described later, the control apparatus 10 may perform a process in which identification information data being assigned to a specific vehicle 100 is reassigned to an external communication apparatus 170 of other vehicle 100.

With reference to FIGS. 38A, 38B, the assignment of the identification information data for the external communication apparatus 170 will be described. The table shown in FIG. 38A illustrates a correlation between ID in the left column and the identification information data in the right column. The ID refers to a unique number individually set in advance for the external communication apparatuses 170 mounted on the respective vehicles 100. According to the present embodiment, as an ID, 01 is assigned to the external communication apparatus 170 mounted on the vehicle 101, ID 02 is assigned to the external communication apparatus 170 mounted on the vehicle 102, and ID 03 is assigned to the external communication apparatus 170 mounted on the vehicle 103. The correlation shown in FIGS. 3A and 3B are stored in the management apparatus 30.

In the case where the correlation stored in the management apparatus 30 is like a correlation shown in FIG. 38A, AAAAA as the identification information data is assigned to the external communication apparatus 170 (ID=01) mounted on the vehicle 101. On the other hand, identification information data is not assigned to the external communication apparatus 170 mounted on another vehicle 102 or the like. Hence, similar to the example shown in FIG. 36, only the vehicle 101 is able to perform the external communication.

When the correlation stored in the management apparatus 30 changes from the example shown in FIG. 38A, the assignment of the identification information data to the respective external communication apparatus 170 varies. In other words, the management apparatus 30 changes the stored correlation, thereby changing the assignment of the identification information data to the respective external communication apparatuses 170.

FIG. 38B exemplifies a correlation which has been changed. In the case where the correlation is a correlation shown in FIG. 38B, AAAAA as the identification information data is assigned to the external communication apparatus 170 (ID=02) mounted on the vehicle 102. On the other hand, identification information data is not assigned to the external communication apparatus 170 mounted on another vehicle 101 or the vehicle 103 or the like. Hence, only the vehicle 102 is able to perform the external communication.

The management apparatus 30 changes the stored correlation from a correlation shown in FIG. 38A to a correlation shown in FIG. 38B, whereby the assignment of the identification information data to the vehicle 102 from the vehicle 101. As a result, the vehicle 100 performing the external communication is changed to vehicle 102 from the vehicle 101. The management apparatus 30 changes the assignment in such a way in response to a requirement transmitted from the control apparatus 10 (i.e. assignment unit 12).

According to the above-described example, the management apparatus 30 always manages the correlation between the identification information data and the ID, that is, the correlation between the identification information data and the external communication apparatus 170. Since the management apparatus 30 changes the correlation, thereby changing the assignment of the identification information data.

Alternatively, the above-described aspect may be changed to an aspect in which the correlation between the identification information data and the ID is not managed by the management apparatus 30. For example, the control apparatus 10 may directly assign, without via the management apparatus 30, the identification information data such as AAAAA to a specific external communication apparatus 170. Also, the identification information data of AAAAA may be directly transmitted to the vehicle 102 from the vehicle 101, thus changing an object to be assigned with the identification information data.

An overall process performed by the control apparatus 10 in order to change the object to be assigned with the identification information data will be described with reference to FIGS. 39A, 39B, 39C and 39D. As described in FIG. 36, the control apparatus 10 is provided with, as functional blocks, a determination unit 11 and an assignment unit 12. Each function of the determination unit 11 and the assignment unit 12 will be described in the followings.

Figure 39A:
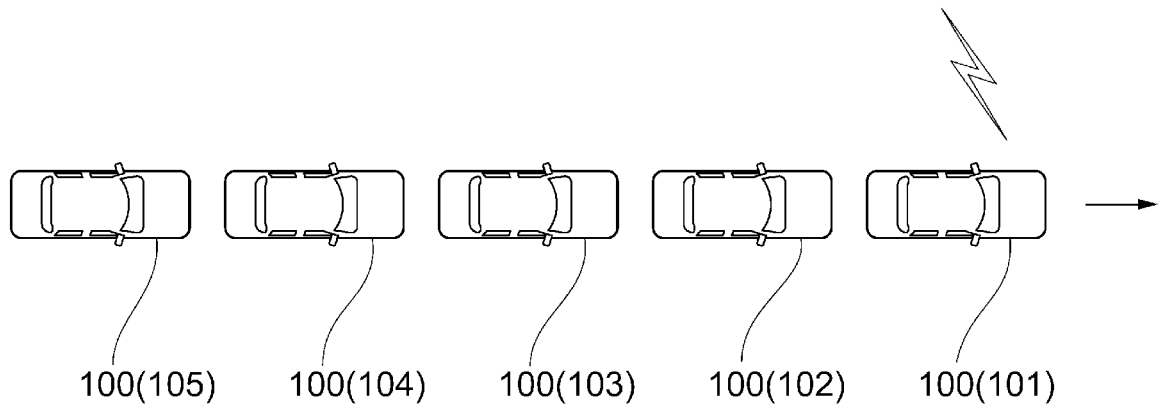
FIGS. 39A, 39B and 39C are diagrams for explaining an overall process executed by the control apparatus according to the tenth embodiment.

FIG. 39A illustrates a state where five vehicles 100 are travelling in a column similar to that shown in FIG. 36. At this moment, the external communication apparatus 170 has assigned the identification information data only to the frontmost side vehicle in the column (i.e. head vehicle 101). The vehicle 102 or the like travelling at the rear positions relative to the vehicle 101 are travelling with tracking the vehicle 101, and obtaining necessary information from the vehicle 101 via the inter-vehicle communication.

In the state shown in FIG. 39A, if a fault occurs in the external communication apparatus 170 included in the vehicle 101, thereafter, the vehicle 101 in unable to perform the external communication. The assignment unit 12 if the control apparatus 10 assigns, when the determination unit 11 determines that the fault has occurred in the external communication apparatus 170 as described above, the identification information assigned to the external communication apparatus 170 of the vehicle 101, to the external communication apparatus 170 of other vehicle 100 (e.g. vehicle 102). The determination unit 11 and the assignment unit 12 according to the present embodiment correspond to second determination unit and second assignment unit, respectively.

The determination unit 11 included in the control apparatus 10 determines whether a fault has occurred in any of vehicles 100 included in the column. In other words, the determination unit 11 determines whether a fault has occurred in the external communication apparatus 170 of any of the vehicles 100.

Figure 39B:
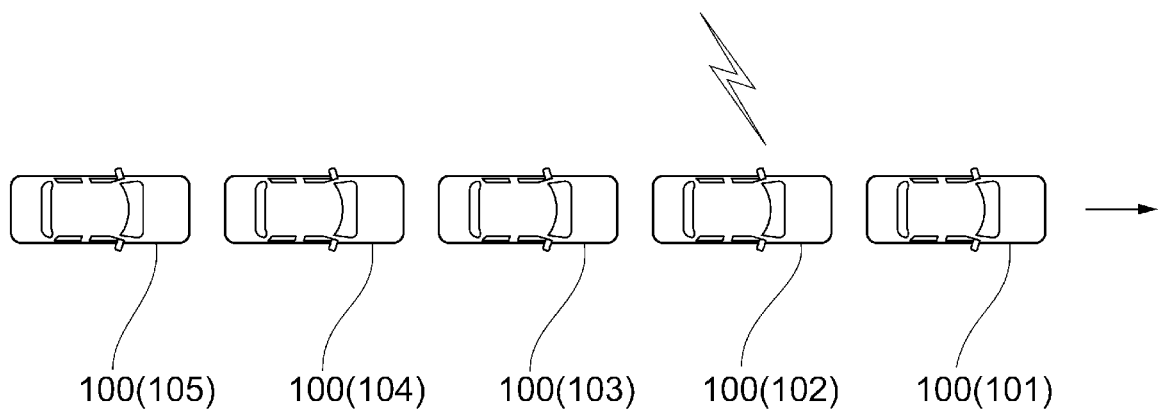

The assignment unit 12 included in the control apparatus 10, when the determination unit 11 determines that a fault occurred in any of the vehicles 100, assigns the identification information to the external communication apparatus 170 of the specific vehicle 100, thereby performing the external communication by the vehicle 100. FIG. 39B illustrates a state of the column immediately after the above-described identification information is assigned. According to a state shown in FIG. 39B, the identification information is assigned to the external communication apparatus 170 of the vehicle 102 travelling at the second head position. Hence, the external communication is performed by the vehicle 102. Thus, according to the present embodiment, as the above-described specific vehicle 100, a vehicle 102 travelling at the second head position may be set.

Note that the above-described travelling position refers to which position the vehicle is travelling at when the plurality of vehicles 100 are in the column. Also in the following description, the term travelling position is used as the same meaning.

According to the state of FIG. 39B, the external communication is performed by the vehicle 102 as described above. On the other hand, a guidance of the column is performed by the had vehicle 101. At this time, after the vehicle 102 acquires necessary information for the platoon travelling (e.g. traffic jam information of the travelling route) from the control apparatus 10 by the external communication, the necessary information is transmitted to the vehicle 101 from the vehicle 102 by the inter-vehicle communication. The vehicle 101 performs, with the necessary information, a process for changing the traffic lane and guides the respective vehicles 100.

In this state, since the necessary information for the platoon travelling is acquired via both of the external communication and the inter-vehicle communication, acquisition of the information is delayed due to communication time lag. Further, in the case where the number of apparatuses for the communication increases, the communication is possibly affected by a fault or the like in an apparatus that interposes the communication. In this respect, the acquisition of the information via the external communication may preferably be performed by the vehicle 100 travelling at the head position in the column.

Here, the control apparatus 10 according the present embodiment is configured to re-assign the identification information as described above, and thereafter change the travelling position of the vehicle 100 to which the identification information is assigned to be the specific position. The above-described specific position is set in advance, to be a travelling position at which the vehicle 100 directly performing the external communication should travel. According to the present embodiment, the head position in the column is set as the specific position.

Figure 39C:
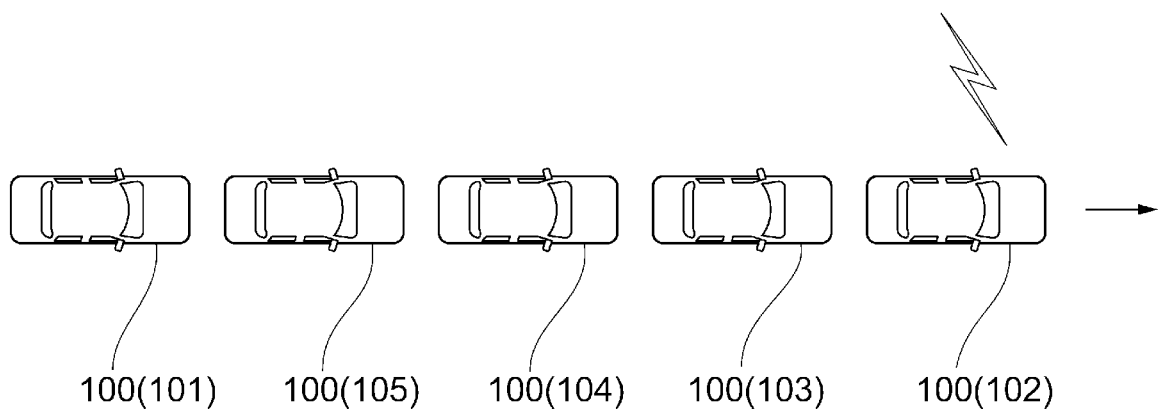

FIG. 39C illustrates a state of the column after the travelling position is changed from the state shown in FIG. 39B as described above. In this example, the vehicle 101 is moved to the most rear side travelling position in the column. As a result, the vehicle 102 in which the identification information is assigned to the external communication apparatus 170, is travelling at the frontmost side travelling position in the column, that is, the above-described specific position. Thus, the vehicle 102 is able to guide the respective vehicles 100 in the column based on the information directly acquired by the vehicle 102 itself with the external communication.

According to an example shown in FIGS. 39A, 39B and 39C, the head travelling position in the column is set as the specific position. However, travelling position other than the head travelling position may be set for the specific position.

The processes executed by the control apparatus 10 in order to achieve the above-described control will be described with reference to FIG. 40. The series of processes shown in FIG. 40 are repeatedly executed at predetermined control periods.

At the first step S01 of the process, the process determines whether a fault has occurred in the external communication, in the vehicle 100 included in the column. As described above, the determination is performed by the determination unit 11. For example, in the case where the external communication has been cutoff for a predetermined period between the control apparatus 10 and the vehicle 100, the determination unit 11 determines that a fault has occurred in the external communication. Moreover, in the case where any fault has occurred in the external communication apparatus 170 even it is possible to perform the external communication, the vehicle 100 transmits the information indicating the fault information to the control apparatus 10, and the determination unit 11 may perform the determination based on the information.

Figure 40:
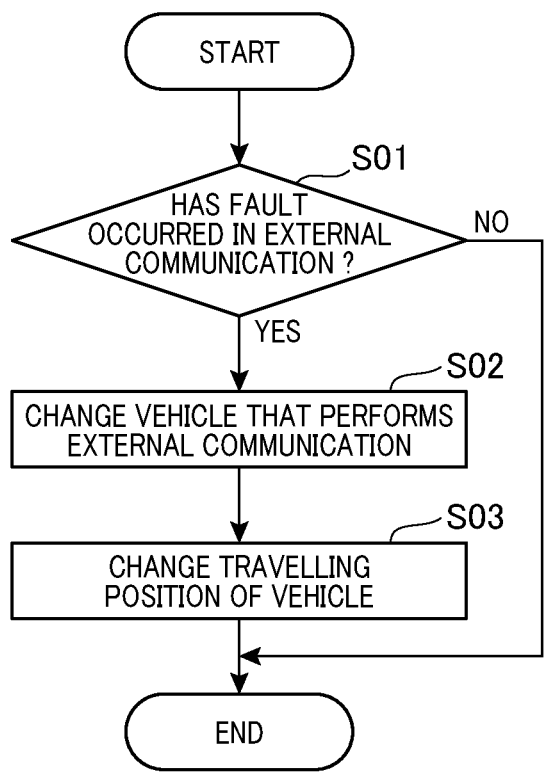
FIG. 40 is a flowchart executed by the control apparatus according to the tenth embodiment.

In the case where no fault has occurred in the external communication, the process terminates the series of processes in the FIG. 40. The process proceeds to step S02 when determined that a fault has occurred in the external communication. At step S02, the process reassigns the vehicle 100 that performs the external communication. Specifically, the process reassigns the identification information assigned to the external communication apparatus 170 of the vehicle 100 (i.e. vehicle 101 in the example shown in FIGS. 39A, 39B, 39C) in which a fault has occurred, to the external communication apparatus 170 of the specific vehicle 100 (vehicle 102 in the example shown in FIGS. 39A, 39B and 39C), thereby changing the vehicle 100 that performs the external communication. As described, the process is executed by the assignment unit 12.

At step S03 subsequent to step S02, the process changes the travelling position of the vehicle 100. Specifically, the process changes the travelling position of the respective vehicles 100 (vehicle 102 shown in FIGS. 39A, 39A, 39C) in which the identification information is assigned to the external communication apparatus 170, such that the vehicle 100 travels at the specific position of the column, that is, the head position of the column.

As described, the control apparatus 10 according to the present embodiment includes the determination unit 11 that determines whether a fault has occurred in any of the vehicles 100, and the assignment unit 12 that assigns the identification information to the external communication apparatus of the specific vehicle 100 included in the column in response to the determination of the determination unit 11 that a fault has occurred in the vehicle 100, and controls the specific vehicle to perform the external communication.

The determination unit 11 in the above-described example determines whether a fault has occurred in the external communication performed by any of the vehicles 100 included in the column. When determined that the fault has occurred, the assignment unit 12 assigns the identification information assigned to the external communication apparatus 170 of the vehicle where the fault has occurred, to the external communication apparatus of another vehicle 100. Thus, even in the case where the number of identification information data given by the telecommunication company is only one, the identification information data is appropriately used for multiple times, whereby the external communication is able to be continuously performed.

The control apparatus 10 in the above-described example performs a process to control the vehicle 100 having the identification information data assigned to the external communication apparatus 170, to travel at the specific position in the column. Thus, the external communication can be performed by the vehicle 100 travelling at the optimized travelling position. For example, the travelling position at the head position in the column is set as the above-described specific position, whereby the acquisition of the information can be prevented from being delayed due to the communication time lag.

With reference to FIGS. 41A, 41B, 41C and 41D, a case will be described in which the correlation between the identification information and the ID Is not managed by the control apparatus 30. In this example, the identification information is stored in the respective external communication apparatuses 170, regardless of whether the external communication is actually performed. In the case where the external communication is performed by the external communication apparatus 170, the process sets the identification information stored in the external communication apparatus 170 to be active to start the external communication based on the identification information. Accordingly, in this example, the process of activating the stored identification information as described above corresponds to the process of assigning the identification information to perform the external communication. The process of activating the identification information is executed by the vehicle control apparatus 150 based on the signal transmitted to the respective vehicle control apparatuses 150 from the control apparatus 10. Note that 'activating' refers to changing a state where the external communication based on the identification information is prohibited to a state where the external communication based on the identification information is enabled.

Figure 41A:
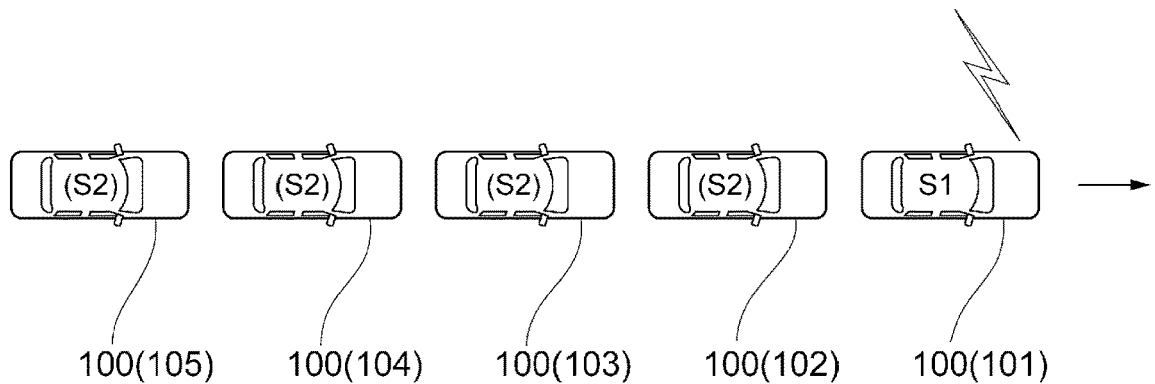
FIGS. 41A, 41B, and 41C are diagrams showing a modification of an assignment of identification information data.

According to an example shown in FIG. 41A, the identification information S1 is stored in the external communication apparatus 170 of the vehicle 101 travelling at the head travelling position. Further, common identification information S2 is stored in the respective communication apparatus 170 of the four vehicles (102, 103, 104 and 105) travelling at the second head position and the following positions. Thus, the process storing the identification information in the respective external communication apparatuses 170, is executed in advance by the control apparatus 10.

According to an example shown in FIG. 41A, only the identification information S1 stored in the external communication apparatus 170 of the vehicle 101 is active, and only the vehicle 101 performs the external communication based on the identification information S1. Any of the identification information S2 stored in the external communication apparatuses 170 of other vehicles 102 or the like are not active. Note that the identification information data S2 written in parenthesis shown in FIG. 41A indicate non-active state. The same applies to those shown in FIG. 41B and FIG. 41C.

When re-assigning the vehicle 100 performing the external communication from the state shown in FIG. 41A, the control apparatus 10 stops the external communication by the vehicle 101 (that is, changes S1 to be inactive), and controls the identification information data (S2) stored in any of the external communication apparatuses 170 of other vehicles 102, to be active.

Thus, the control apparatus 10 in the above-described example stores the common identification information in advance to the external communication apparatus 170 of each vehicle (102, 103, 104, and 105) performing no external communication, among vehicles 100 provided with the external communication apparatus 170. According to this configuration, even when the correlation between the identification information and the ID is not managed by the management apparatus 30, the control apparatus 10 is able to re-assign the identification information.

Figure 41B:
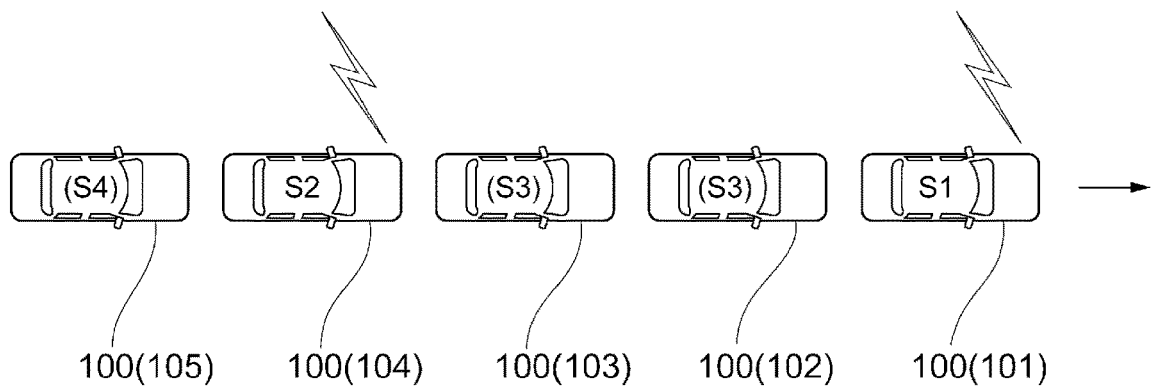

In an example shown in FIG. 41B, the identification information S1 is stored in the external communication apparatus 170 of the vehicle 101 travelling at the head position. Also, the identification information S2 is stored in the external communication apparatus 170 of the vehicle 104 travelling at the fourth position with respect to the head position.

The common identification information S3 is stored in the external communication apparatus 170 of the vehicle 102 travelling at the second head position (i.e. following position of the head position) and the external communication apparatus 170 of the vehicle 103 travelling at the third head position. The identification information S4 is stored in the external communication apparatus 170 of the vehicle 105 travelling at the most rear side position.

According to an example shown in FIG. 41B, the identification information S1 stored in the external communication apparatus 170 of the vehicle 101 and the identification information S2 stored in the external communication apparatus 170 of the vehicle 104 are in an active state. Hence, each of the vehicle 101 and vehicle 104 individually performs the external communication. Other identification information items S3 and S4 are not in an active state.

When reassigning the vehicle 100 performing the external communication in the state shown in FIG. 41B, the control apparatus 10 stops the external communication by the vehicle 101 or the vehicle 102 (that is, changes S1 or S2 to be inactive), and makes the identification information (S3) stored in any of the external communication apparatuses 170 in the vehicle 102 or the vehicle 103 to be active. Note that the identification information S4 stored in the external communication apparatus 170 of the vehicle 105 is set to be active when reassignment of the identification information is further required after the above-described process, and stored as a spare.

Figure 41C:
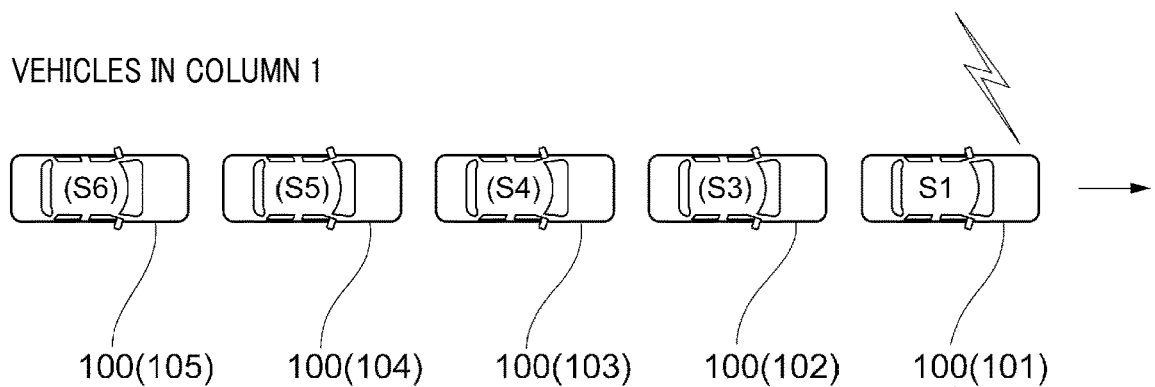

FIG. 41C illustrates two columns (column 1 and column 2) each travelling individually. The column 1 includes, similar to the previous examples, 5 vehicles 100 (101, 102, 103, 104 and 105). In the external communication apparatuses 170 in the respective external communication apparatuses 170, S1, S3, S4, S5 and S6 are stored in the order of vehicle positions from the head vehicle. In these identification information data, only S1 is set to be active, and S3, S4, S5 and S6 are not active (i.e. inactive). Hence, only the vehicle 101 among the vehicles 100 included in the column 1 performs external communication based on S1, and other vehicles 100 do not perform the external communication.

The column 2 includes 5 vehicles (111, 112, 113, 114, 115). The external communication apparatuses 170 in the respective vehicles 100 each stores identification information data S2, S3, S4, S5 and S6 in the order of vehicle positions from the head vehicle. In these identification information data, only S2 is set to be active, and S3, S4, S5, and S6 are inactive. Accordingly, among these vehicles 100 included in the column 2, only the vehicle 121 performs the external communication based on S2, and other vehicles 100 do not perform external communication.

In the column 1, when re-assigning the vehicle 100 that performs the external communication, the control apparatus 10 stops the external communication (that is, changes the state S1 to be inactive), and controls the identification information data (S3 or the like) stored in the external communication apparatus 170 of any of other vehicles 102 to be active.

Similarly, in the column 2, when re-assigning the vehicle 100 that performs the external communication, the control apparatus 10 stops the external communication of the vehicle 111 (that is, controls S2 to be inactive), and controls the identification information data (S3 or the like) stored in the external communication apparatus 170 in any of other vehicles 112 to be active.

In the example shown in FIG. 41C, the identification information data (e.g. S3) which is not active is shared between the column 1 and column 2. Hence, in the case where the identification information data is reassigned in each column as described above, it is required to avoid simultaneous activation of the same identification information data between the column 1 and the column 2. In order to avoid simultaneous activation of the identification information data, each control apparatus 10 of respective columns may acquire, from the management apparatus 20 in advance, information whether the identification information data (S3 or the like) is active in other column.

According to the examples shown in FIGS. 41B and 41C, it is not necessary to store the identification information in the external communication apparatus 170 in advance. However, the identification information may be transmitted through the communication, and may be stored into the external communication apparatus 170 of the specific vehicle 100 activated. That is, the identification information may be assigned by using a so called 'eSim' method.

Figure 42A:
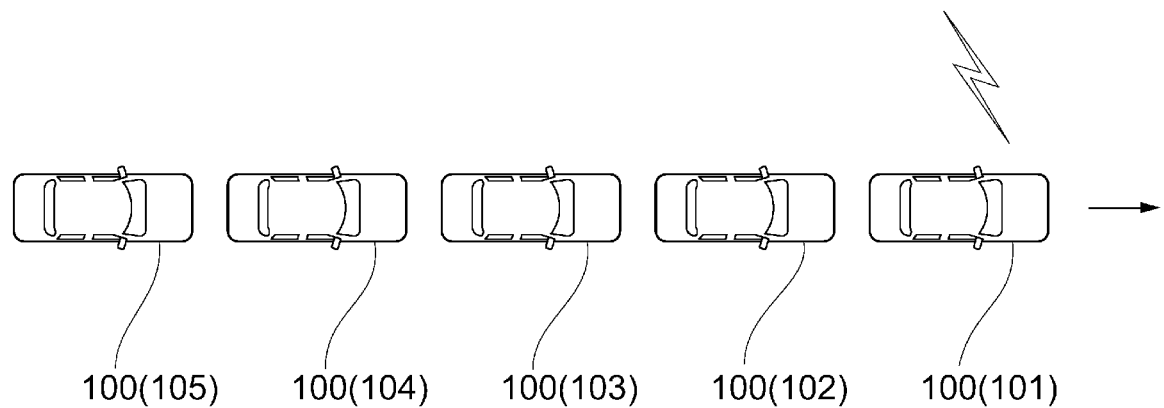
FIGS. 42A and 42B are diagrams for explaining an overall process executed by the control apparatus according to the tenth embodiment.
Figure 42B:
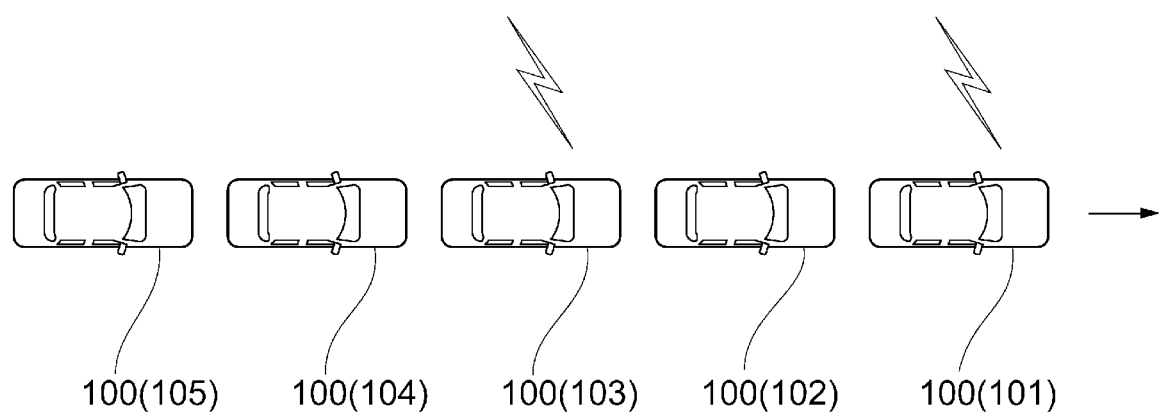

With reference to FIGS. 42A and 42B, other processes executed by the control apparatus 10 according to the present embodiment will be described.

FIG. 42A illustrates a state where five vehicles 100 are travelling in a column similar to that shown in FIG. 26. At this moment, the external communication apparatus 170 has assigned the identification information data only to the frontmost side vehicle in the column (i.e. head vehicle 101). The vehicle 102 or the like travelling at the rear positions relative to the vehicle 101 are travelling by tracking the vehicle 101, and obtaining necessary information from the vehicle 101 via inter-vehicle communication.

In a state shown in FIG. 42A, when a fault occurs in the inter-vehicle communication apparatus 160 included in some of the vehicles 100, thereafter, the inter-vehicle communication cannot be performed by the vehicles 100. The assignment unit 12 of the control apparatus 10 assigns the identification information to the external communication apparatus 170 of the vehicle 100, when the determination unit 11 determines that the above-mentioned fault occurs. FIG. 42B illustrates an example where the identification information is assigned to the external communication apparatus 170 of the vehicle 103 when a fault occurs on the inter-vehicle communication apparatus 160 of the vehicle 103. This assignment of the identification information is accomplished by activating the identification information (S2) stored in the external communication apparatus 170 of the vehicle 103 in the state shown in FIG. 41A. Even in the case shown in FIG. 42B, the identification information in the external communication apparatus 170 of the vehicle 101 is maintained.

According to a state shown in FIG. 42B, the vehicle 103 is able to perform the communication with another vehicle 100 using the external communication apparatus 170 via the external communication (i.e. inter-vehicle communication) instead of using the inter-vehicle communication of the inter-vehicle communication apparatus 160. Specifically, the vehicle 103 communicates with the vehicle 102 or the like other than the vehicle 101, by using the external communication of the vehicle 101. This communication can be an alternative of the inter-vehicle communication of the inter-vehicle communication apparatus 160. Thus, even after a fault has occurred on the inter-vehicle communication apparatus 160 of the vehicle 103, the inter-vehicle communication necessary for maintaining the column can be performed continuously.

Figure 43:
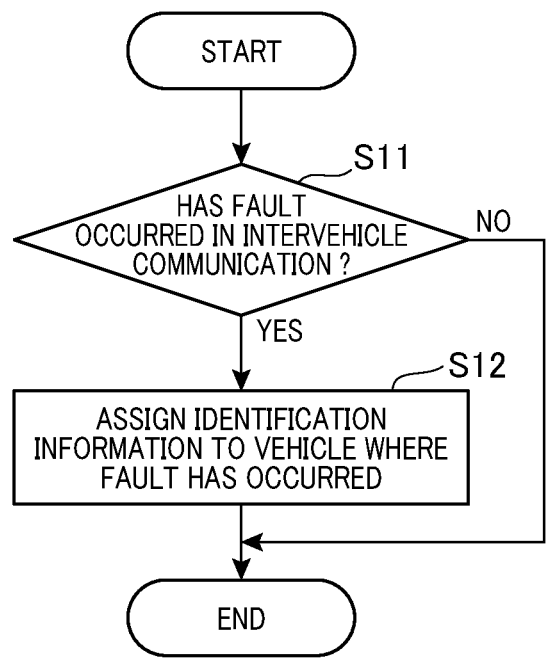
FIG. 43 is a flowchart executed by the control apparatus according to the tenth embodiment.

With reference to FIG. 43, a process executed by the control apparatus 10 in order to achieve such a control as described above will be described. The series of processes shown in FIG. 43 is repeatedly executed at predetermined control periods by the control apparatus 10. The series of processes is executed in parallel to the series of processes shown in FIG. 40.

At the first step S11, the process determines whether a fault has occurred in the inter-vehicle communication at the vehicle 100 included in the column. As described, the determination is performed by the determination unit 11. For example, in the case where the information indicating a fault that has been occurred in the inter-vehicle communication between some of the vehicles 100, is transmitted to the control apparatus 10 from the vehicle 100 in which the identification information is assigned to the external communication apparatus, the determination unit 11 is able to perform the above-described determination based on the information.

In the case where no fault has occurred in the inter-vehicle communication, the series of processes shown in FIG. 43 is terminated. When a fault has occurred in the inter-vehicle communication, the process proceeds to step S12. At step S12, the process assigns the identification information to the external communication apparatus 170 of the vehicle 100 (vehicle 103 in the example shown in FIGS. 42A and 42B) in which the fault has occurred, whereby the external communication can be performed in the vehicle 100. As described, this process is executed by the assignment unit 12.

As described, the determination unit 11 in this case determines whether a fault has occurred in the inter-vehicle communication in any of vehicles included in the column. When determined that the fault has occurred, the assignment unit 12 assigns the identification information to the external communication apparatus 170 of the vehicle 100 in which the fault has occurred. Thus, even after a fault occurred in the inter-vehicle communication apparatus 160 of the vehicle 103, the inter-vehicle communication necessary for maintaining the column can be performed continuously.

In the case where a fault of the inter-vehicle communication occurs in the unique vehicle 100 in which the identification information is assigned to the external communication apparatus 170, the process may re-assign another item of identification information to the external communication apparatus 170 of another vehicle 100, while maintaining a state where the identification information is assigned to the external communication apparatus 170 of the unique vehicle 100.

With reference to FIGS. 44A, 44B, 44C, and 44D, yet other processes executed by the control apparatus 10 according to the present embodiment will be described.

Figure 44A:
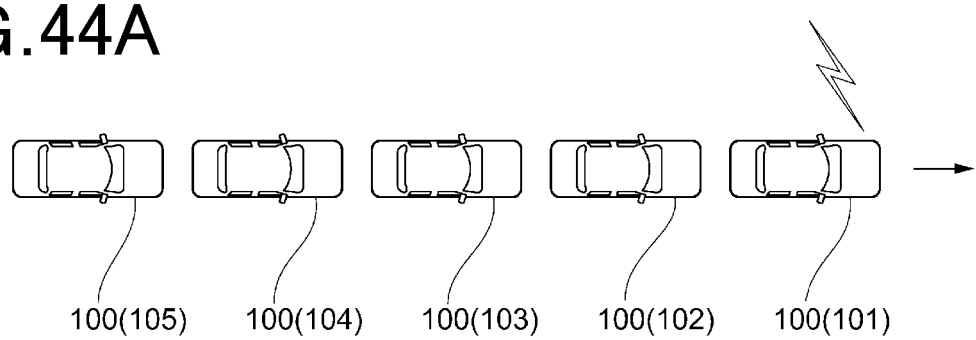
FIGS. 44A, 44B, 44C, and 44D are diagrams for explaining an overall process executed by the control apparatus according to the tenth embodiment.

FIG. 44A illustrate a state where five vehicles 100 are travelling in a column similar to that shown in FIG. 36. At this moment, the external communication apparatus 170 has assigned the identification information data only to the frontmost side vehicle in the column (i.e. head vehicle 101). The vehicle 102 or the like travelling at the rear positions relative to the vehicle 101 are travelling tracking the vehicle 101, and obtaining necessary information from the vehicle 101 via the inter-vehicle communication.

In a state shown in FIG. 44A, when a fault occurs in a travel function in some of the vehicles 100, thereafter, platoon travelling including some of the vehicles 100 is difficult to perform. The travelling function as described above refers to the function of the vehicle 100 required to perform the platoon travelling, that is, a function other than the function of performing external communication and inter-vehicle communication. Specifically, the function refers to a function accomplished by the surroundings detection sensor 152 or the travelling apparatus 153.

In the case where the determination unit 11 determines that a fault has occurred in the travelling function of some of the vehicles 100, the assignment unit 12 of the control apparatus assigns the identification information to the external communication apparatus 170 of the vehicles 100. The assignment unit 12 further assigns the identification information to the external communication apparatuses of the vehicles 100 travelling at rear side of the vehicles 100 where the fault has occurred.

Figure 44B:
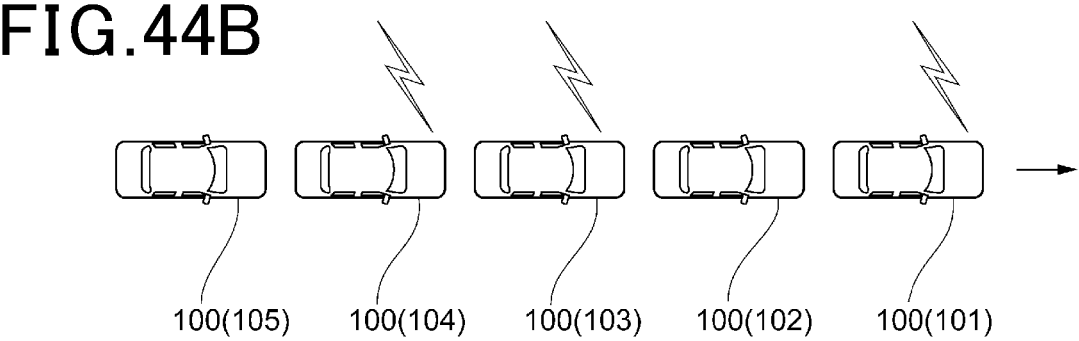

FIG. 44B illustrates an example where the identification information is assigned to the external communication apparatus 170 of the vehicle 103 when a fault has occurred in the travelling function of the vehicle 103. Also, another identification information is assigned to the external communication apparatus 170 of the vehicle 104 travelling at the rear side of the vehicle 103. Such an assignment of the identification information is achieved, for example, by activating both of the identification information (S3) stored in the external communication apparatus 170 of the vehicle 103 and the identification information (S2) stored in the external communication apparatus 170 of the vehicle 104 in the configuration shown in FIG. 41B. Note that the identification information is kept assigned to the external communication apparatus 170 of the vehicle 101 even in the state shown in FIG. 44B.

According to a state shown in FIG. 44B, as a result of the assignment of the identification information described above, each of the vehicles 101, 103 and 104 is able to perform the external communication. Thereafter, the vehicle 103 in which a fault has occurred in the travelling function leaves the column shown in FIG. 44C and performs evacuation travelling. Since the external communication apparatus 170 of the vehicle 103 has the identification information assigned thereto, the vehicle 103 is able to leave the column while acquiring the necessary information for evacuation travel, and stop in a safe place. The control apparatus 10 may directly control the travelling of the vehicle 103 by the external communication, so as to evacuate the vehicle 103 (i.e. evacuate travelling) to a safe place.

Figure 44C:
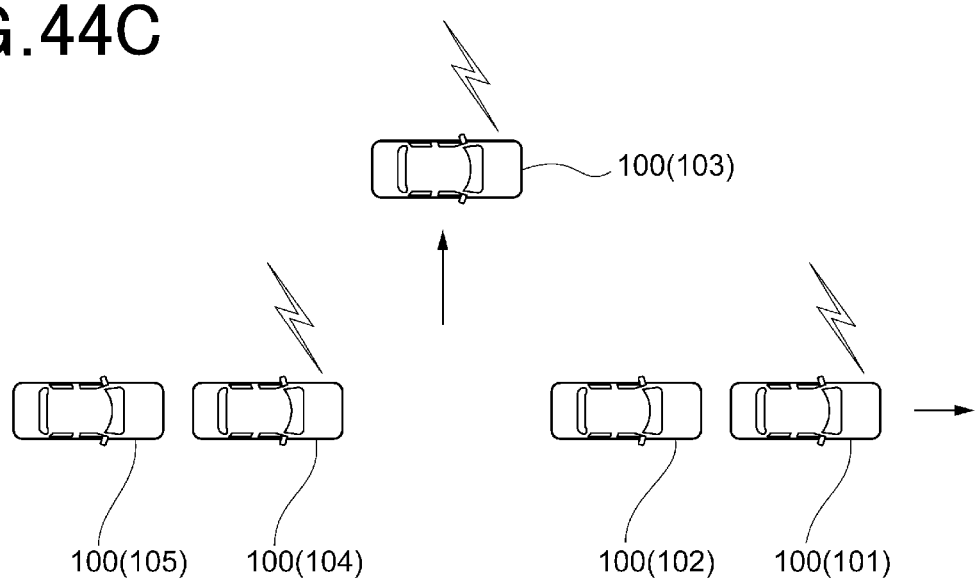

As shown in FIG. 44C, the inter-vehicle distance between the vehicle 102 and the vehicle 103 is relatively large immediately after the vehicle 103 left the column. Hence, the inter-vehicle communication between a group composed of front side vehicles 102 and 103 and a group composed of rear side vehicles 104 and 105 may be temporarily unavailable. For example, in the case where other vehicle intercepts a position where the vehicle 103 is travelling or the group in the rear side stops for a traffic signal or the like, the inter-vehicle communication between the groups is likely to be cutoff. Accordingly, both groups may be difficult to rejoin in the same column.

Figure 44D:
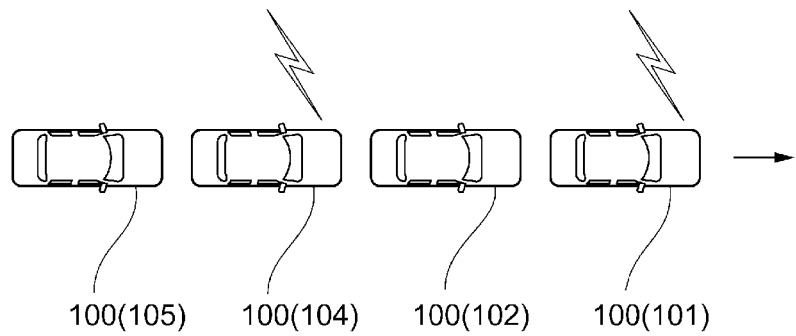

However, according to the example shown in FIGS. 44A, 44B, 44C and 44D, the identification information is assigned in advance to the external communication apparatus 170 of the vehicle 104 included in the rear side group. Thus, even after the column is divided into two groups shown in FIG. 44C, the external communication can be performed between the vehicle 101 and the vehicle 104. Accordingly, both groups travel sharing necessary information for rejoining (e.g. respective current locations or the like) and can be rejoined into the same column. FIG. 44D illustrates a state of the column where the rejoining is completed. After the state shown in FIG. 44D, the assignment of the identification information to the external communication apparatus 170 of the vehicle 104 may be cancelled.

Note that depending on the types of fault which has occurred in the travelling function, the platoon travelling including the vehicle 100 where the fault has occurred may be maintained, without having the vehicle 100 leave the column. Even in this case, the identification information may be assigned to the external communication apparatus of the vehicle 100, it may preferably be prepared for possible future leaving or the like.

Alternatively, the identification may be assigned to the external communication apparatus 170 of other vehicle 100 in the rear side of the vehicle 100 where the fault has occurred, without assigning the identification information to the external communication apparatus 170 of the vehicle 100 where the fault has occurred.

Figure 45:
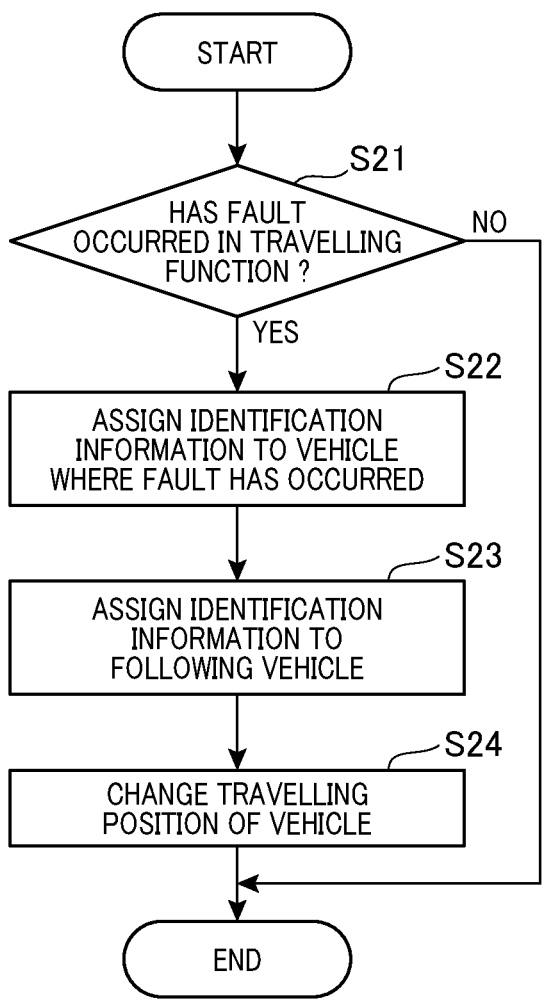
FIG. 45 is a flowchart executed by the control apparatus according to the tenth embodiment.

With reference to FIG. 45, a process executed by the control apparatus 10 in order to achieve such a control as described above will be described. The series of processes shown in FIG. 45 is repeatedly executed at predetermined control periods by the control apparatus 10. The series of processes is executed in parallel to the series of processes shown in FIG. 40 and FIG. 43.

At the first step S21, the process determines whether a fault has occurred in the travelling function in the vehicle 100 included in the column. As described, the determination is performed by the determination unit 11. For example, in the case where the information indicating occurrence of fault on the travelling function in some of the vehicles 100 is transmitted to the control apparatus 100 from the vehicle 100 in which the identification information is assigned to the external communication apparatus 170, the determination unit 11 is able to perform the determination based on the information.

When the travelling function is determined as normal, the process terminates the series of processes shown in FIG. 45. On the other hand, when determined that a fault has occurred in the travelling function, the process proceeds to step S22. At step S22, the process assigns the identification information to the external communication apparatus 170 of the vehicle 100 in which the fault has occurred (vehicle 103 in an example shown in FIGS. 44A, 44B, 44c, and 44D), thereby enabling the vehicle 100 to perform the external communication.

At step S23 subsequent to step S22, the process assigns the identification information to the external communication apparatus 170 of the vehicle 100 (vehicle 104 in the example shown in FIGS. 44A, 44B, 44c, and 44D) travelling in rear side of the vehicle 100 in which the fault has occurred, whereby the external communication can be performed by the vehicle 100. As described, the processes at steps S22 and S23 are executed by the assignment unit 12. Note that a vehicle in which the identification information is assigned to the external communication apparatus 170 at step S23 may be a vehicle 100 travelling at the position following the vehicle 100 in which a fault has occurred, or may be a vehicle 100 travelling further behind the vehicle 100 travelling at the immediately following position.

At step S24 subsequent to step S23, the process changes the travelling positions of the vehicles 100. Specifically, the process controls the vehicle 100 in which the fault has occurred to leave the column, and controls the respective vehicles 100 which have been divided into two groups because of the leaving vehicle 100 to be rejoined to form a single column.

As described, the determination unit 11 in this case determines whether a fault has occurred in a function (i.e. travelling function) other than the external communication and the inter-vehicle communication, in any of vehicles 100 in the column. The assignment unit 12 assigns the identification information to the external communication apparatus 170 of the vehicle 100 where the fault has occurred. Thus, the external communication is performed by the vehicle 100 where the fault has occurred and the vehicle 100 can be stopped at a safe place by evacuation travelling.

The assignment unit 12 further assigns, in the column, the identification information to the external communication apparatus 170 of the vehicle 100 travelling at rear side with respect to the vehicle 100 where the fault has occurred. Thus, even in a case where the column is divided into two groups since the vehicle 100 where the fault has occurred left the column, the vehicles 100 in the both groups can be reliably rejoined.

Eleventh Embodiment

Figure 46:
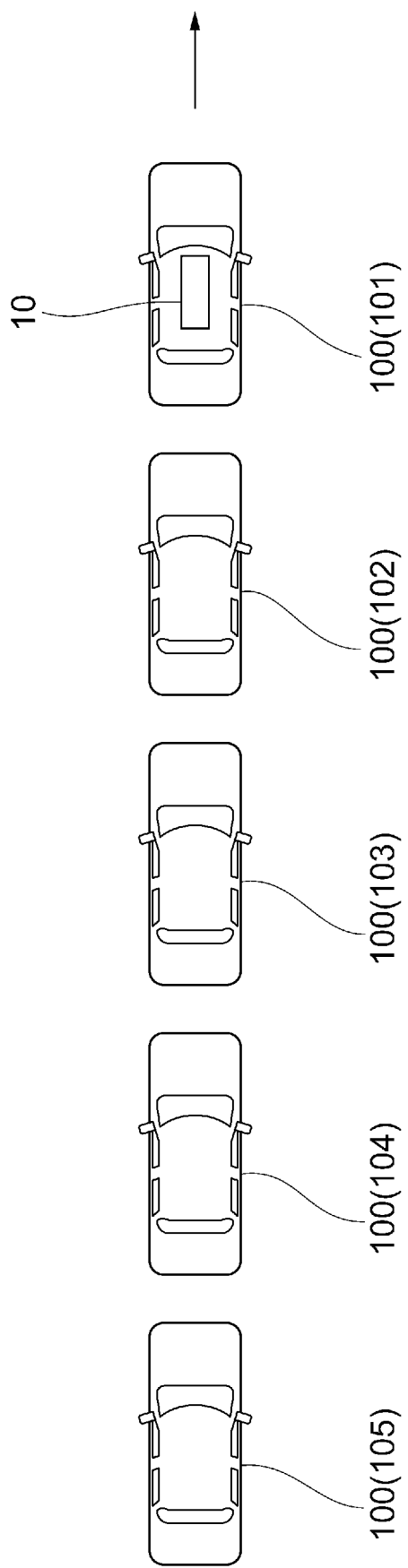
FIG. 46 is a block diagram schematically showing vehicles and a control apparatus according to an eleventh embodiment.

Hereinafter, the eleventh embodiment will be described with reference to FIG. 46. According to the present embodiment, the control apparatus 10 is not installed inside a building but installed in one vehicle among the plurality of vehicles 100 included in the column. In an example shown in FIG. 46, the control apparatus 10 is mounted on the vehicle 101 travelling at the head position in the column. Alternatively, the control apparatus 10 may be mounted on any of the vehicle 102 or the like travelling at a position other than the head position in the column.

The control apparatus 10 communicates with the vehicle control apparatuses 150 of the respective vehicles 100 via the inter-vehicle communication and also communicates with the management apparatus 30 via the external communication. The specific processes performed by the control apparatus 10 are the same as those described in the tenth embodiment. In such a configuration, the same effects and advantages as those in the tenth and eleventh embodiments can be obtained.

In the case where a fault occurs in the external communication apparatus 170 where the identification information is assigned, the control apparatus 10 according to the present embodiment may be unable to perform the communication with the management apparatus 30. Hence, the assignment unit 12 may preferably directly assign the identification information without interposing the management apparatus 30 (e.g. the assignment described with reference to FIGS. 41A, 41B, 41C and 41D). Also, the number of identification information data items provided by the telecommunication company (i.e. the number of vehicles 100 capable of performing the external communication) may be two or more. The same applies for the following twelfth embodiment.

Twelfth Embodiment

Figure 47:
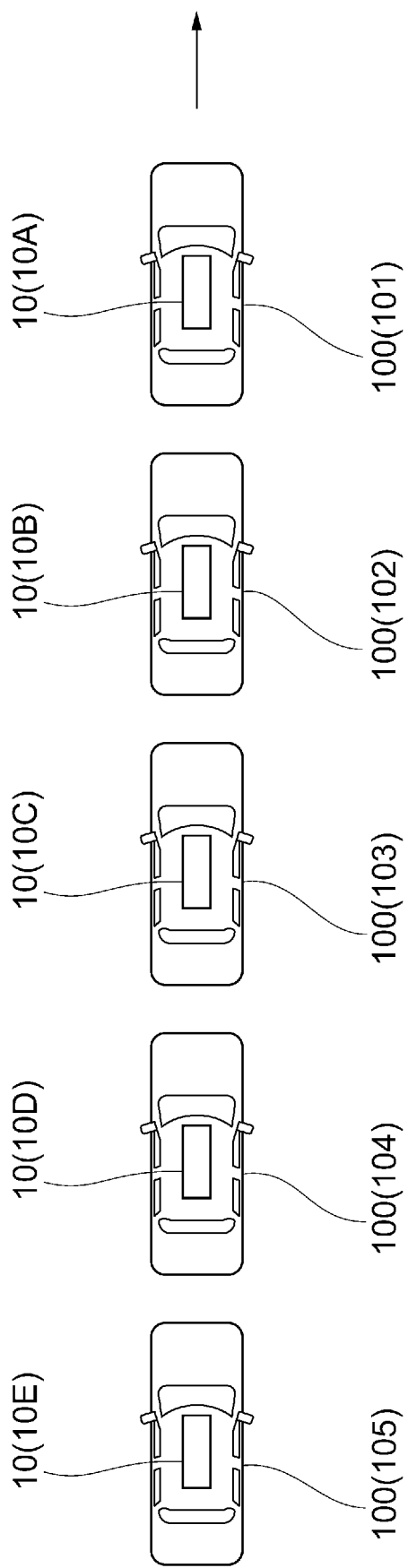
FIG. 47 is a diagram schematically showing vehicles and a control apparatus according to a twelfth embodiment.

Next, the twelfth embodiment will be described. As shown in FIG. 47, according to the present embodiment, a plurality of control apparatuses 10 are provided corresponding to the number of vehicles 100 included in the column. In FIG. 47, the control apparatus 10 mounted on the vehicle 101 is shown as a control apparatus 10A. Similarly, the control apparatus 10 mounted on the vehicle 102 is shown as a control apparatus 10B, the control apparatus 10 mounted on the vehicle 103 is shown as a control apparatus 10C, the control apparatus 10 mounted on the vehicle 104 is shown as a control apparatus 10D, and a control apparatus 10 mounted on the vehicle 105 is shown as a control apparatus 10E.

According to the present embodiment, the above-mentioned five control apparatuses 10 are configured to perform individual processes for the respective vehicles 100, while sharing necessary information via the inter-vehicle communication as needed. The control apparatus 10 is able to perform the same processes as those described in the tenth embodiment.

Figure 48:
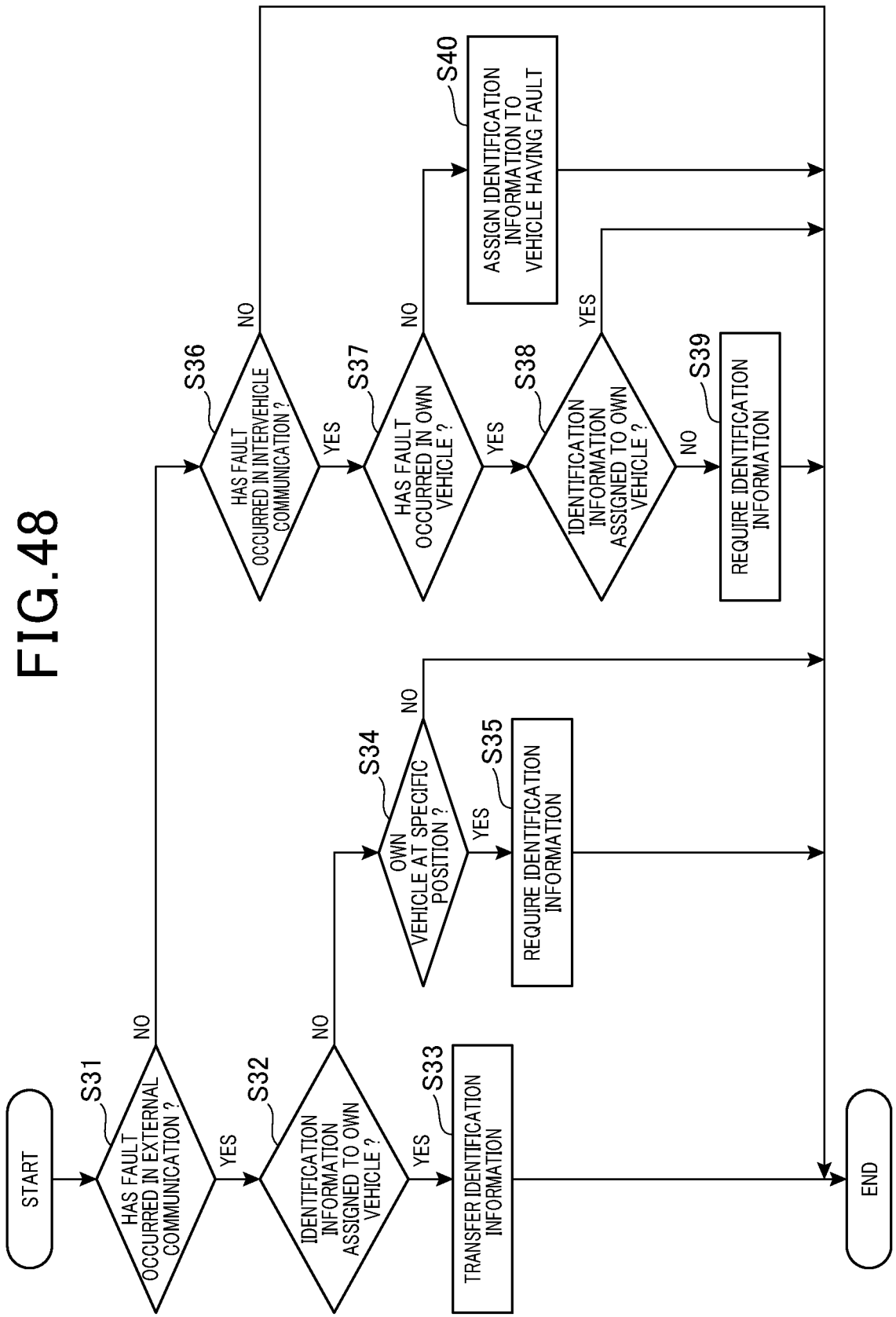
FIG. 48 is a flowchart executed by the control apparatus according to the twelfth embodiment.

The specific example executed by the control apparatus 10 of the present embodiment will be described with reference to FIG. 48. The series of processes shown in FIG. 48 is repeatedly executed by the respective control apparatuses 10 at a predetermined period.

At the first step S31 of the process, the process determines whether a fault has occurred in the external communication in the column. The determination is performed based on whether it is possible to perform communication between the control apparatus executing processes shown in FIG. 48 and the management apparatus 30. The term 'communication' is not limited to the external communication performed by the external communication apparatus 170 of the vehicle 100 on which the control apparatus 10 executing the processes shown in FIG. 48, but includes external communication (i.e. tethering) performed through an external communication apparatus 170 of other vehicle 100.

When a fault has occurred in the external communication in the column, the process proceeds to step S32. The process determines, at step S32, whether the identification information is assigned to the external communication apparatus 170 of the own vehicle. Note that the term 'own vehicle' here refers to a vehicle 100 on which the control apparatus 10 executing processes shown in FIG. 48. In other words, a vehicle on which the control apparatus itself is mounted with respect to the control apparatus 10. In the following description, the term 'own vehicle' will be used with the same meaning as the above-described meaning.

When the identification information is assigned to the external communication apparatus 170 of the own vehicle, the process proceeds to step S33. The reason why the process proceeds to step S33 is that a fault has occurred in the external communication which has been performed by the external communication apparatus 170 of the own vehicle. Then, the process transfers, at step S33, the identification information assigned to the external communication apparatus 170 of the own vehicle to the external communication apparatus 170 of other vehicle. This process re-assigns the identification information assigned to the external communication apparatus 170 of the own vehicle to the vehicle 100 in the column at the specific position. This process is performed by the assignment unit 12. This process is performed by the assignment unit 12.

According to the present embodiment, the priority of the external communication is set for the respective travelling positions in the column. For example, the highest priority 1 is set for the head position at which the vehicle 101 shown in FIG. 47 is travelling. For the following positions, the priority is set as 2, 3, 4 and 5 as the position moves towards rear side from the front side. Note that the term 'specific position' refers to a travelling position having the highest priority among the vehicles 100 in which no identification information is assigned to the external communication apparatuses 170 at the moment. For example, when the own vehicle is the vehicle 101 (priority set as 1) shown in FIG. 47, the identification information is transferred to the external communication apparatus 170 of the vehicle 102 (priority set as 2).

At step S32, when no identification information is assigned to the external communication apparatus 170 of the own vehicle, the process proceeds to step S34. At step S34, the process determines whether the travelling position of the own vehicle is the above-described specific position. When the travelling position of the own vehicle is not the specific position, the process terminates the series of processes shown in FIG. 48. When the travelling position of the own vehicle is the specific position, the process proceeds to step S35.

At step S35, the process requests the identification information. This process requires the vehicle 100 which has been performing the external communication in the column to re-assign the identification information assigned to the external communication apparatus 170 of the vehicle 100. This process is performed by the assignment unit 12. Once the vehicle 100 which has been performing the external communication accepts the requirement, thereafter, the own vehicle performs the external communication.

Thus, even in the case where the control apparatus 10 is mounted on respective vehicles 100 in the column, the same processes as those in the tenth embodiment can be performed. In other words, the identification information assigned to the external communication apparatus 170 of the vehicle 100 in which a fault has occurred, can be re-assigned to the external communication apparatus 170 of another vehicle 100.

At step S31, when determined that the external communication is performed normally in the column, the process proceeds to step S36. At step S36, the process determines whether a fault has occurred in the inter-vehicle communication. This determination is performed by the determination unit 11. The determination can be performed based on whether a response in the inter-vehicle communication is returned from another vehicle 100 included in the column. When a fault has not occurred in the inter-vehicle communication, the process terminates the series of processes shown in FIG. 48. When a fault has occurred in the inter-vehicle communication, the process proceeds to step S37.

At step S37, the process determines whether a fault has occurred in the inter-vehicle communication of the own vehicle. For example, when determined based on the inter-vehicle communication with another vehicle that only the own vehicle is unable to perform the inter-vehicle communication with the specific vehicle, the process determines that a fault has occurred in the own vehicle. Further, if the inter-vehicle communication is unable to be performed with all of the other vehicles, the process also determines that a fault has occurred in the own vehicle.

When a fault of the inter-vehicle communication has occurred in the own vehicle, the process proceeds to step S38. At step S38, the process determines whether the identification information is assigned to the external communication apparatus of the own vehicle. When determined that the identification information is assigned to the external communication apparatus of the own vehicle, the process terminates the series of processes shown in FIG. 48. In this case, the own vehicle is able to communicate with another vehicle 100 by external communication. In the case where only the own vehicle is able to perform the external communication, the process may send a request to the management apparatus 30 to apply the identification information to another vehicle.

At step S38, when determined that the identification information is not assigned to the external communication apparatus of the own vehicle, the process proceeds to step S39. At step S39, the process requires the identification information. This process requires the management apparatus 30 or the control apparatus 10 of other vehicle 100 to re-assign the identification information to the external communication apparatus 170 of the own vehicle. In the case where the inter-vehicle communication is unable to be performed with all of other vehicles, the identification information stored in the external communication apparatus 170 of the own vehicle may be set to be active at step S39.

At step S37, when determined that a fault in inter-vehicle communication has occurred in another vehicle, not in the own vehicle, the process proceeds to step S40. At step S40, the process assigns the identification information to the external communication apparatus 170 of the vehicle 100 where a fault has occurred in the inter-vehicle communication. This process is achieved by, for example, transmitting a request to the management apparatus 30 for assigning the identification information to the vehicle 100.

Thus, even in a case where the control apparatus 10 is mounted on the respective vehicles in the column, similar processes to the tenth embodiment can be performed. That is, the identification information can be assigned to the external communication apparatus 170 of the vehicle 100 in which a fault occurred in inter-vehicle communication.

Figure 49:
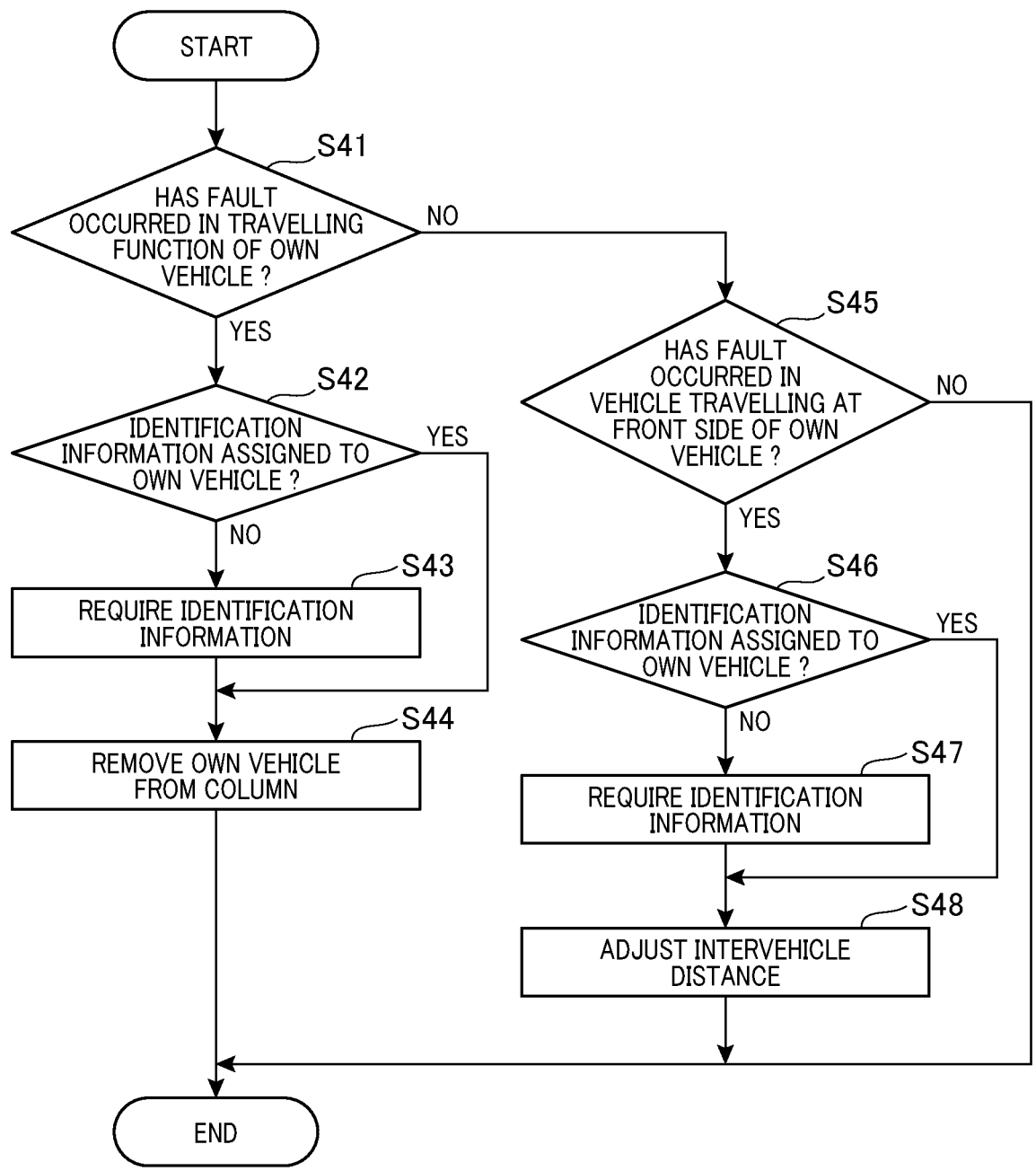
FIG. 49 is a flowchart executed by the control apparatus according to the twelfth embodiment.

The specific example executed by the control apparatus 10 of the present embodiment will be described with reference to FIG. 49. The series of processes shown in FIG. 49 is repeatedly executed by the respective control apparatuses 10 at a predetermined period. The series of processes is executed in parallel to the series of processes shown in FIG. 48.

At the first step S41, the process determines whether a fault has occurred in the travelling function of the own vehicle. When determined that a fault has occurred in the travelling function, the process proceeds to step S42. At step S42, the process determines whether the identification information has been assigned to the external communication apparatus 170 of the own vehicle. When determined that the identification information is assigned to the external communication apparatus 170 of the own vehicle, the process proceeds to step S44 which will be described later. When determined that no identification information has been assigned to the external communication apparatus 170 of the own vehicle, the process proceeds to step S43.

At step S43, the process requires the identification information. The process executed at step S43 is the same as the process executed at step S39 shown in FIG. 48. This process enables the own vehicle to perform the external communication.

At step S44 subsequent to step S43, a process of having the own vehicle leave the column is executed. The control apparatus 10 controls the own vehicle to perform evacuation travelling to reach a safe place. This process is performed while acquiring necessary information for the evacuation and travelling via the external communication.

At step S41, when no fault has been detected in the travelling function of the own vehicle, the process proceeds to step S45. At step S45, the process determines whether a fault has occurred in the traveling function of other vehicle 100 travelling immediately in front of the own vehicle in the column. When determined that no fault has occurred in the travelling function of the vehicle 100, the process terminates the series of processes shown in FIG. 49. When determined that a fault has occurred in the travelling function of the vehicle 100, the process proceeds to step S46.

The reason why the process proceeds to step S46 is that the vehicle 100 in the front side will leave the column (step S44).

At step S46, the process determines whether the identification information is assigned to the external communication apparatus 170 of the own vehicle. When the identification information is assigned to the external communication apparatus 170, the process proceeds to step S48 which will be described later. When the identification information is not assigned to the external communication apparatus, the process proceeds to step S47. At step S47, the process requires the identification information. The process executed at step S47 is the same as that executed at step S39. After executing the process at step S47, the external communication by the own vehicle is available.

At step S48 subsequent to step S47, the process adjusts the inter-vehicle distance in the front side with respect to the own vehicle. This process is performed when the vehicle 100, where a fault has occurred in the traveling function, has left the column. At step S48, the process controls the own vehicle to accelerate for example, such that the inter-vehicle distance extended due to the vehicle 100 which left the column, becomes smaller. This process is performed acquiring necessary information through the external communication. Thus, the groups separated between the front side and the rear side are rejoined and travel as the original single column. After completing the process at step S48, the process may release the assignment of the identification information to the external communication apparatus 170 of the own vehicle.

Thus, even in the case where the control apparatuses 10 are mounted on the respective vehicles 100 in the column, similar processes to those in the tenth embodiment can be performed. In other words, the identification information can be assigned to the external communication apparatus 170 of a vehicle 100 where a fault has occurred in a function other than the external communication and the inter-vehicle communication (i.e. travelling function), or a vehicle 100 travelling at the rear side of the vehicle 100 where the fault has occurred.

The assignment of the identification information to the external communication apparatus 170 may not be accomplished by initially storing the identification information to the external communication apparatus 170, but may be accomplished by activating identification information which has been transmitted by a communication and stored in an external communication apparatus 170 of a specific vehicle 100. In other words, a so called 'eSIM' method can be used for assigning the identification information.

Alternatively, the identification information may be initially stored in the external communication apparatus 170, and the communication function of the external communication function may be turned ON, thereby activating the identification information. The identification information may be stored in advance in an external communication apparatus 170 in any of the vehicles 100 in the column and may be transmitted/received. The external communication apparatus 170 may store a plurality of identification information data. The identification information may be acquired from the communication network 20, or the management apparatus 30. The identification information may be purchased when it is required to acquire the identification information.

Thirteenth Embodiment

Figure 50:
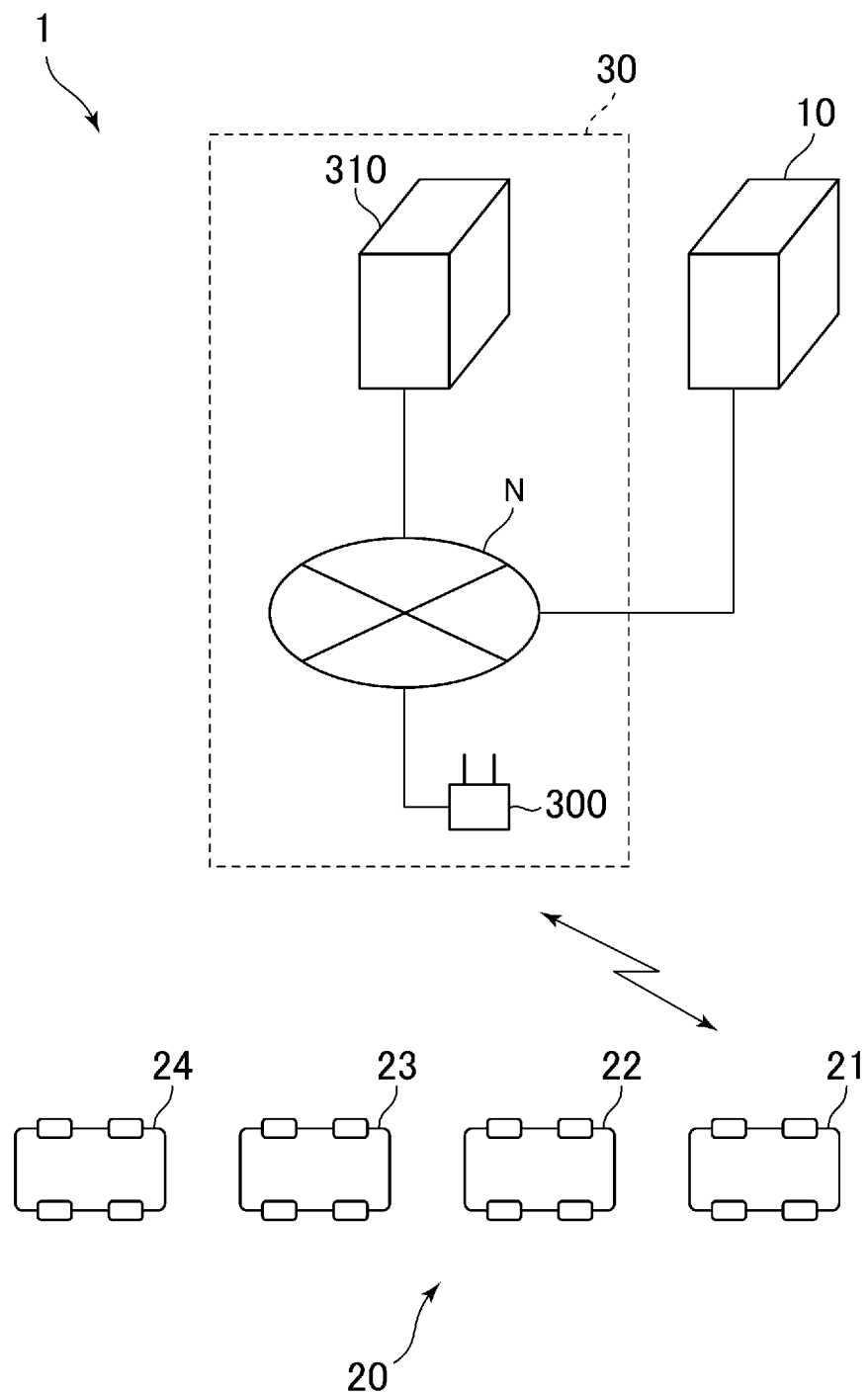
FIG. 50 is a block diagram showing an overall configuration of a control apparatus of a vehicle according to a thirteenth embodiment.

Firstly, a control apparatus of a vehicle according to a thirteenth embodiment will be described. As shown in FIG. 50, a control apparatus according to the thirteenth embodiment is provided with a management apparatus 10 that manages the travelling state of a plurality of vehicles 30 that automatically travels forming a column. Among the plurality of vehicles 20, a vehicle 21 travelling at the head position automatically travels to the destination from the starting place, performing a wide-area wireless communication with the management apparatus 10 via the telecommunication company 30. At this moment, the vehicle 21 performs short-distance wireless communication with other vehicles 22 to 24 (i.e. inter-vehicle communication), thereby leading other vehicles 22 to 24 to the destination from the starting place, while acquiring various information for other vehicles 22 to 24. Hereinafter, for the sake of convenience, the vehicle 21 is also referred to as "leading vehicle 21" and the vehicles 22 to 24 are referred to as "slave vehicles 22 to 24". The leading vehicle 21 performs automatic travelling by executing the automatic travel control, with manned or unmanned operation. The slave vehicles 22 to 24 travel with unmanned operation by executing the automatic travelling control. Note that a case will be exemplified according to the present embodiment, in which three slave vehicles are included in the platoon travelling. However, the number of slave vehicles included in the platoon travelling is one or more.

The leading vehicle 21 successively transmits not only the travelling state of the leading vehicle 21 but also the travelling states of the respective slave vehicles 22 to 24 to the management apparatus 10 by using communication with the management apparatus 10 via the telecommunication company. The management apparatus 10 manages the travelling states of the vehicles 21 to 24 based on the information transmitted from the leading vehicle 21. Also, the management apparatus 10 remotely controls the leading vehicle 21 via the telecommunication company 30, thereby assisting the automatic travelling of the leading vehicle 21. Further, the management apparatus 10 remotely and indirectly controls the slave vehicles 22 to 24 via the leading vehicle 21, thereby assisting the slave vehicles 22 to 24.

Figure 51:
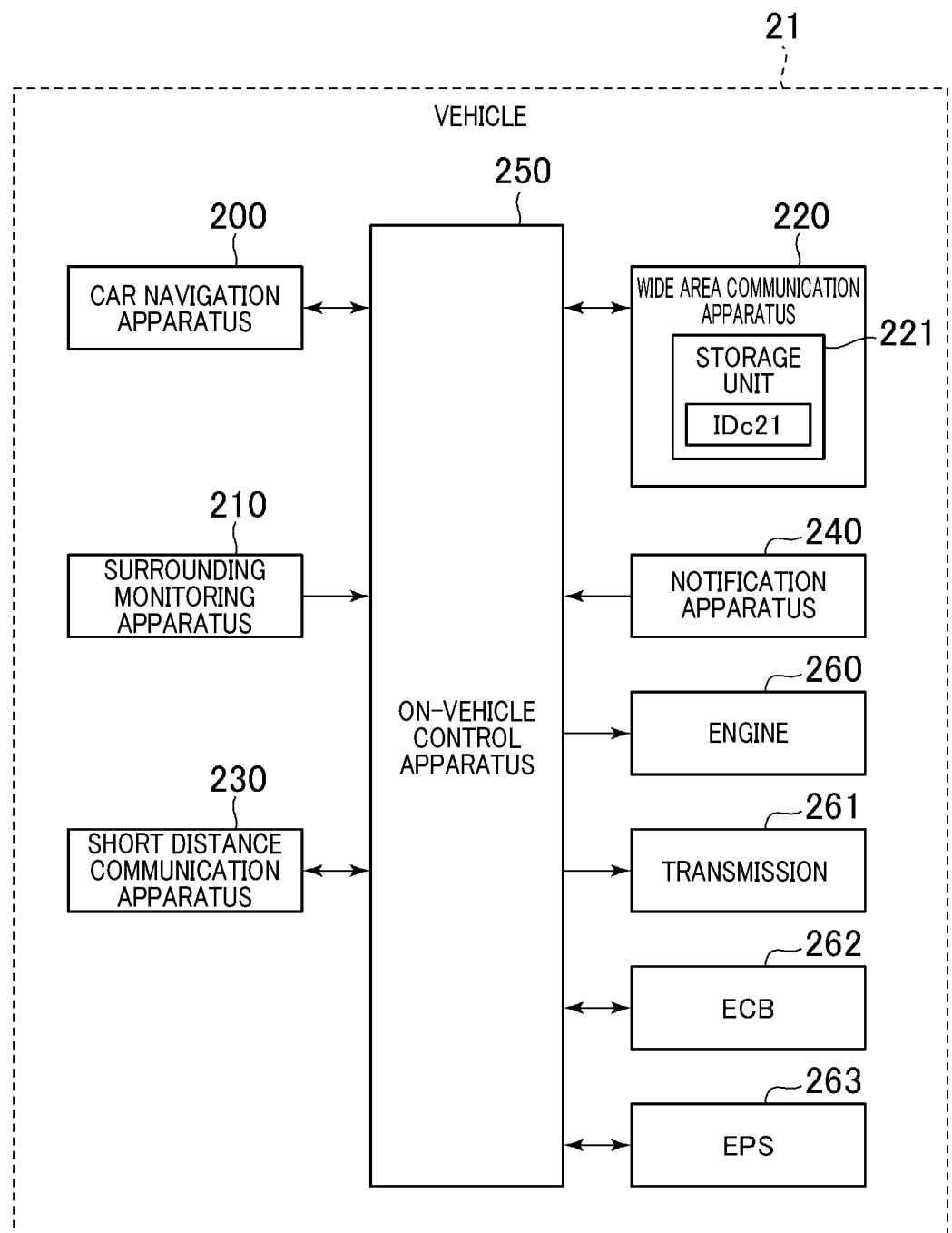
FIG. 51 is a block diagram showing an overall configuration of the vehicle according to the thirteenth embodiment.
Figure 53:
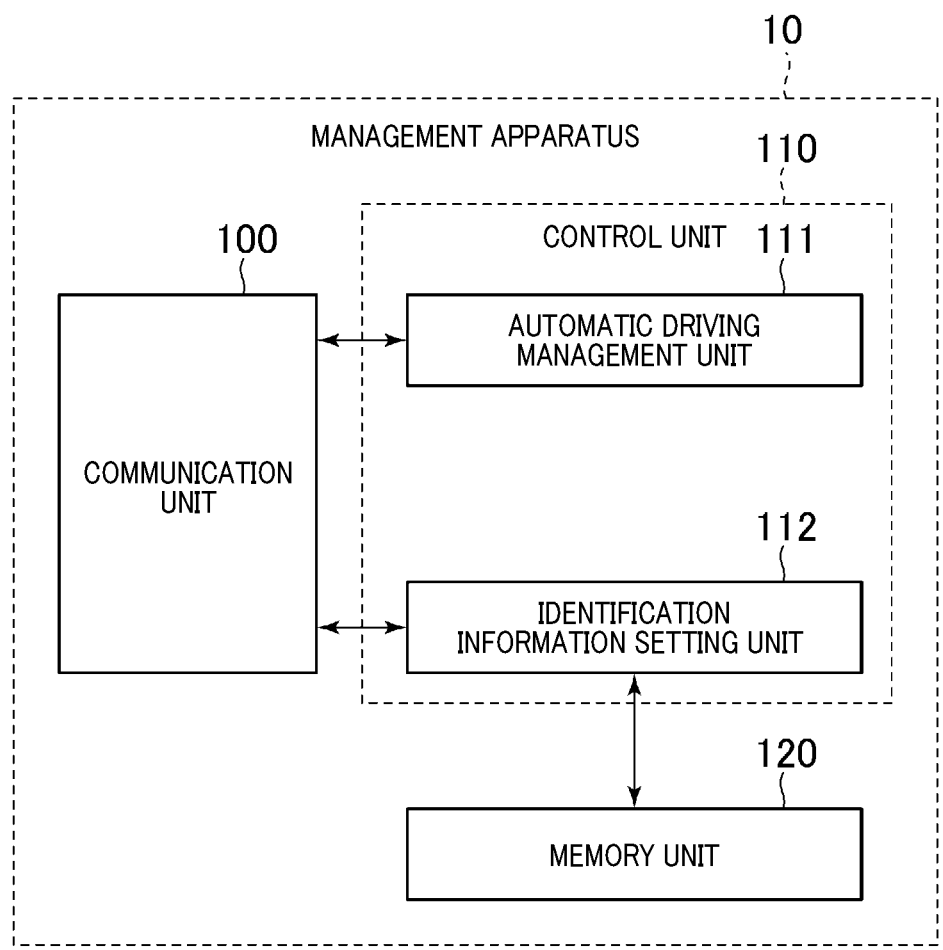
FIG. 53 is a block diagram showing an overall configuration of a management apparatus according to the thirteenth embodiment.

Next, the configurations of the vehicles 21 to 24 will be described. Since the respective vehicles 21 to 24 have the same configuration, the configuration of the leading vehicle 21 is used as a typical example. As shown in FIG. 51, the leading vehicle 21 is provided with a car navigation apparatus 200, a surrounding monitoring apparatus 210, a wide-area communication apparatus 220, a short-distance communication apparatus 230, a notification apparatus 240 and an on-vehicle control apparatus 250.

The navigation apparatus 200 is able to set a travelling route where the leading vehicle 21 automatically travels.

The route set by the leading vehicle 21 is a travelling route for the vehicles 21 to 24 that form the column. The car navigation apparatus 200 includes a sensor such as GPS (global positioning system) that acquires the positional information of the leading vehicle 21 and map information or the like. The car navigation apparatus 200 transmits, in response to a request from the on-vehicle control apparatus 250, the current positional information, information about the road where the leading vehicle will be travelling and the like, to the on-vehicle control apparatus 250.

The surrounding monitoring apparatus 210 is configured of a camera, a LIDAR (light detection and ranging) and the like. The surrounding monitoring apparatus 210 acquires the information about the surrounding environment of the leading vehicle 21 necessary for executing the automatic control. The information acquired by the surrounding monitoring apparatus 210 includes information on the traffic lane where the leading vehicle 21 travels, information about the traffic signs, travelling states of other vehicles travelling on the adjacent lane.

The wide-area communication apparatus 220 is configured to enable the wide-area wireless communication with other external apparatus such as the management apparatus 10 other than apparatuses mounted on the vehicles 21 to 24 through the telecommunication company 30. The wide-area communication apparatus 220 includes a storage unit 221 in which communication identification IDc21 dedicated to the leading vehicle 21 is stored in advance. For the wide-area wireless communication apparatuses 220 of the slave vehicles 22 to 24, unique communication identification IDc22 to IDc24 are stored in advance in the respective sub vehicles 22 to 24. The identification information IDc21 to IDc24 are assigned in advance to a plurality of vehicles which are managed by the management apparatus 10. The communication identification IDc21 to IDc24 are used to identify the wide-area wireless communication apparatuses 220 corresponding to respective vehicles 21 to 24 among the communication apparatuses mounted on vehicles managed by the management apparatus 10.

The short-distance communication apparatus 230 is configured to enable short-distance wireless communication, that is, inter-vehicle communication between vehicles 21 to 24 travelling in the column. As a communication method of the inter-vehicle communication, a technology of wireless local area networking is used (e.g. WiFi). The notification apparatus 240 is used to send various notifications to passengers in the leading vehicle 21 visually or audibly.

The on-vehicle control apparatus 250 is configured mainly of a microcomputer including a memory and a CPU. The on-vehicle control apparatus 250 acquires a travelling route information where the leading vehicle 21 travels with an automatic driving, from the car navigation apparatus 200, thereby executing an automatic driving control. During the automatic driving control, the on-vehicle control apparatus 250 acquires the surrounding information of the leading vehicle 21 through the surrounding monitoring apparatus 210 and automatically controls, based on the acquired information, a power train system of the leading vehicle 21 including the engine 260 and the transmission 261, a braking system of the leading vehicle including ECB (i.e. electronically controlled brake system) 262, and a steering system of the leading vehicle 21 including EPS (i.e. electric power steering system) 263. The on-vehicle control apparatus 250 automatically controls the engine 260 and the transmission 261 or the like until the destination of the route information acquired from the car navigation apparatus 200, thereby automatically driving the leading vehicle 21. Further, the on-vehicle control apparatus 250 further controls the automatic driving of the leading vehicle 21 based on a driving support command successively transmitted from the management apparatus 10. The automatic driving support command successively transmitted to the on-vehicle control apparatus 250 from the management apparatus 250 includes, for example, an acceleration control, a lane change control and a curved road travelling control.

The on-vehicle control apparatus 250 acquires, during the automatic driving control being executed, the current location of the leading vehicle 21 and the travelling route information of the leading vehicle 21. The on-vehicle control apparatus 250 transmits the acquired information to the management apparatus 10 using the wide-area wireless communication apparatus 220. The on-vehicle control apparatus 250 transmits various information about state quantity such as travelling speed to the management apparatus 10 via the wide-area wireless communication apparatus 220. The on-vehicle control apparatus 250 successively transmits the surroundings information of the leading vehicle 21 acquired by the surrounding monitoring apparatus 210 to the management apparatus 10. Further, the on-vehicle control apparatus 250 acquires various information from the slave vehicles 22 to 24 via the short-distance communication apparatus 230 and successively transmits the acquired information to the management apparatus 10.

The on-vehicle control apparatus 250 mounted on the respective slave vehicles 22 to 24 performs, as an automatic driving control of the slave vehicles 22 to 24, an automatic driving control for tracking the preceding vehicle travelling ahead of the own vehicle. Specifically, as shown in FIG. 50, the platoon travelling of the vehicles 21 to 24 is set in advance such that the leading vehicle 21, the slave vehicle 22, the slave vehicles 23 and the slave vehicle 24 travel in this order. The setting of the travelling order can be set by the car navigation apparatus 200 of the leading vehicle 21, for example. In the case where the traveling order is set in this manner, for example, the on-vehicle control apparatus 250 of the slave vehicle 22 performs the automatic travelling control so as to track the leading vehicle 21 travelling ahead of the own vehicle. Also, the on-vehicle control apparatus 250 of the slave vehicle 23 performs an automatic travelling control so as to track the leading vehicle 22 travelling ahead of the slave vehicle 22.

As shown in FIG. 50, the telecommunication company 30 allows a plurality of subscribers in the service provided by the telecommunication company 30 to use the mobile communication network N via the base stations installed in every location. For each subscriber, individual subscriber identification information is applied in advance by the telecommunication company 30. In the case where one subscriber has a contract of using a plurality of lines with the telecommunication company, the one subscriber may have a plurality of subscriber identification information data. Hereinafter, the subscriber identification information is also referred to as subscriber identity module (i.e. SIM) information. The telecommunication company 30 identifies the users on the mobile communication network N based on the SIM information, and charges the communication fee to the identified users. The user of the mobile communication network N may purchase the SIM information by contracting with the telecommunication company 30.

As shown in FIG. 50, the telecommunication company 30 is provided with a server 310 that manages the communication on the mobile communication network N. As shown in FIG. 52A, the server 310 manages the identification information (SIM information) of each user on the mobile communication network N. In the vehicles 21 to 24, a plurality of identification information S (1) and S (2) indicated by FIG. 52A can be utilized. In other words, the number of identification information data available for the vehicles 21 to 24 is less than the number of vehicles that performs the platoon travelling.

As shown in FIG. 52A, the identification information S (1) between the plurality of identification information data S (1) and S (2) is correlated to the communication identification IDc21 of the leading vehicle 21. In this case, the leading vehicle is allowed to perform the communication via the mobile communication network N, but the slave vehicles 22 to 24 are not allowed to perform the communication via the mobile communication network. On the other hand, as shown in FIG. 52B, when the identification information S (2) is correlated to the communication identification IDc23 of the slave vehicle 23, the communication is allowed to perform not only for the leading vehicle 21 but also for the slave vehicle 23 through the mobile communication network. The server 310 changes the identification information S (1) and S (2) correlated to the communication identification IDc21 to IDc 24 of the vehicles 21 to 24 based on the command from the management apparatus 10.

Figure 54:
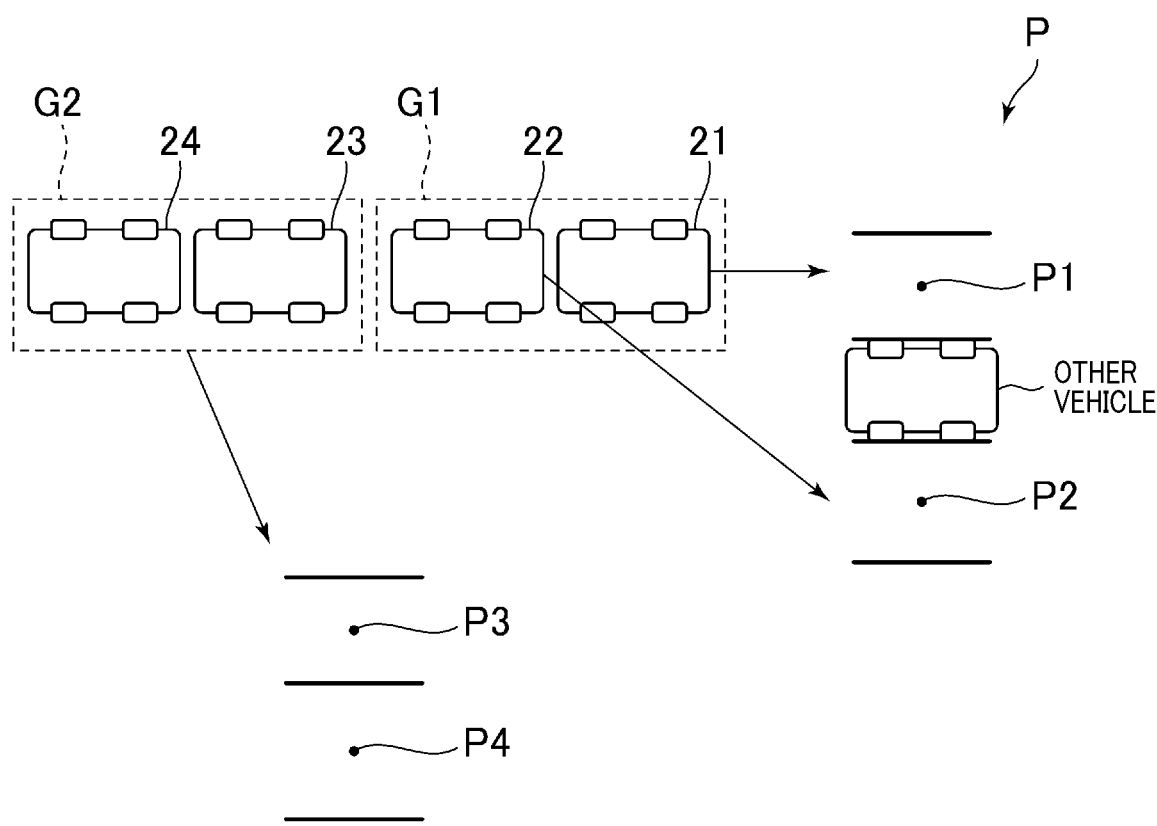
FIG. 54 is a diagram schematically showing an example of a parking state of the vehicle according to the thirteenth embodiment.

As shown in FIG. 54, the management apparatus 10 is provided with a communication unit 100, a control unit 110 and a memory unit 120. The communication unit 100 performs communication with the vehicles 21 to 24 or the telecommunication company 30 via the mobile communication network N of the telecommunication company 30. The communication unit 100 acquires the travelling route information or the current location information of the vehicles 21 to 24. Also, the communication unit 100 is utilized when communicating with the server 310 in the case where the identification information S (1) and S (2) correlated to the communication identification IDc21 to IDc24 of the vehicles 21 to 24 are changed by the telecommunication company.

In the memory unit 120, a plurality of identification information data S (1) and S (2) which are available for the vehicles 21 to 24 are stored. Note that the management apparatus 10 may own the plurality of identification information data S (1) and S (2) stored in the memory unit 120 by purchasing them from the telecommunication company 30, or the users of the vehicles 21 to 24 may purchase the plurality of identification information data S (1) and S (2) stored in the memory unit 120 in advance from the telecommunication company 30, and may register them into the management apparatus 10.

The control unit 110 is configured mainly of a microcomputer including a memory and a CPU. The control unit 110 integrally executes various processes of the management apparatus 10. The control unit 110 is provided with an automatic driving management unit 111 and an identification information setting unit 112. The automatic driving unit 111 communicates with the leading vehicle 21 via the communication unit 100, thereby managing information about the current location and the travelling route of the leading vehicle 21 in the automatic driving mode and various information of the slave vehicles 22 to 24. Also, the automatic driving management unit 111 transmits, based on requirement of the user as the owner of the vehicles 21 to 24, information about the current location and the travelling route of the vehicles 21 to 24 in the column to the portable terminals of the users, thereby providing various information of the vehicles 21 to 24 in the platoon travelling. Moreover, the automatic driving management unit 111 remotely controls the vehicles 21 to 24 depending on the travelling states of the vehicles 21 to 24, thereby assisting the automatic driving control of the vehicles 21 to 24.

The identification information setting unit 112 is configured to change the communication identification IDc21 to IDc24 of the vehicles 21 to 24 correlated to the identification information S (1) and S (2), based on the current location and the travelling route information of the vehicles 21 to 24 forming the column, or the requirement by the leading vehicle 21. Specifically, the identification information setting unit 112 sends a switch request of the identification information to the telecommunication company 30, thereby switching the communication identification between IDc21 to IDc24 of the vehicles 21 to 24 correlated to the identification information S (1) and S (2). According to the identification information setting unit 112 corresponds to a subscriber identification information setting unit.

In the case where the vehicles 21 to 24 in the platoon travelling park in a parking lot, if space for four vehicles is present in the parking lot, and the space is in an area enabling the four vehicles to perform short-distance wireless communication, the vehicles can be parked in the parking lot. However, as shown in FIG. 54, in the case where space P1 and P2 for only two vehicles is present in an area in which short-distance communication is available at the parking lot P where the vehicles 21 to 24 arrived, the remaining two vehicles are required to be parked in other spaces P3 and P4 where short-distance communication is unavailable at the parking lot P. In this situation, for example, after having the leading vehicle 21 and the slave vehicle 22 parked in the available space P1 and P2, when the remaining slave vehicles 23 and 24 are going to be parked in another space P3 and P4, the slave vehicles 23 and 24 are outside the available short-distance communication range, thus communication between the slave vehicles 23 and 24 and the leading vehicle cannot be performed. As a result, the slave vehicles 23 and 24 may not be parked in the available space P3 and P4.

In this respect, according to the control apparatus 1 of the present embodiment, after having the leading vehicle 21 and the slave vehicle 22 parked in the space P1 and P2, the management apparatus 10 authorizes the slave vehicle 23 to obtain the identification information, thereby enabling the slave vehicle 23 to perform wide-area wireless communication with the management apparatus 10. Thus, the slave vehicle 23 is able to function as the leading vehicle. Then, the slave vehicle 23 in which the identification information is activated leads the slave vehicle 24 while communicating with the management apparatus 10, whereby the slave vehicles 23 and 24 move to the spaces P3 and P4 by automatic driving, and park in the spaces P3 and P4. Thus, with the control apparatus 1 of the present embodiment, as shown in FIG. 54, a first column group G1 composed of the leading vehicle 21 and the slave vehicle 22, and a second column group G2 composed of the slave vehicle 23 and the slave vehicle 24 are formed. Note that the number of vehicles belonging to the second column group is not limited to two but may be at least one or more.

According to the present embodiment, the first column group G1 corresponds to a major column group and the second column group G2 corresponds to a sub column group. Also, the slave vehicle 23 and the slave vehicle 24 correspond to a separated vehicle. In particular, the slave vehicle 23 corresponds to a separated vehicle in which the identification information is activated.

Next, a process executed by the leading vehicle 21 and the management apparatus 10 when the vehicles 21 to 24 are thus parked will be described in more detail. Firstly, with reference to FIG. 55, a process executed by the on-vehicle control apparatus 250 of the leading vehicle 21 will be described. In the following, an example will be described in which the leading vehicle 21 forming the column with the slave vehicles 22 to 24 travels and arrives the parking lot P.

Figure 55:
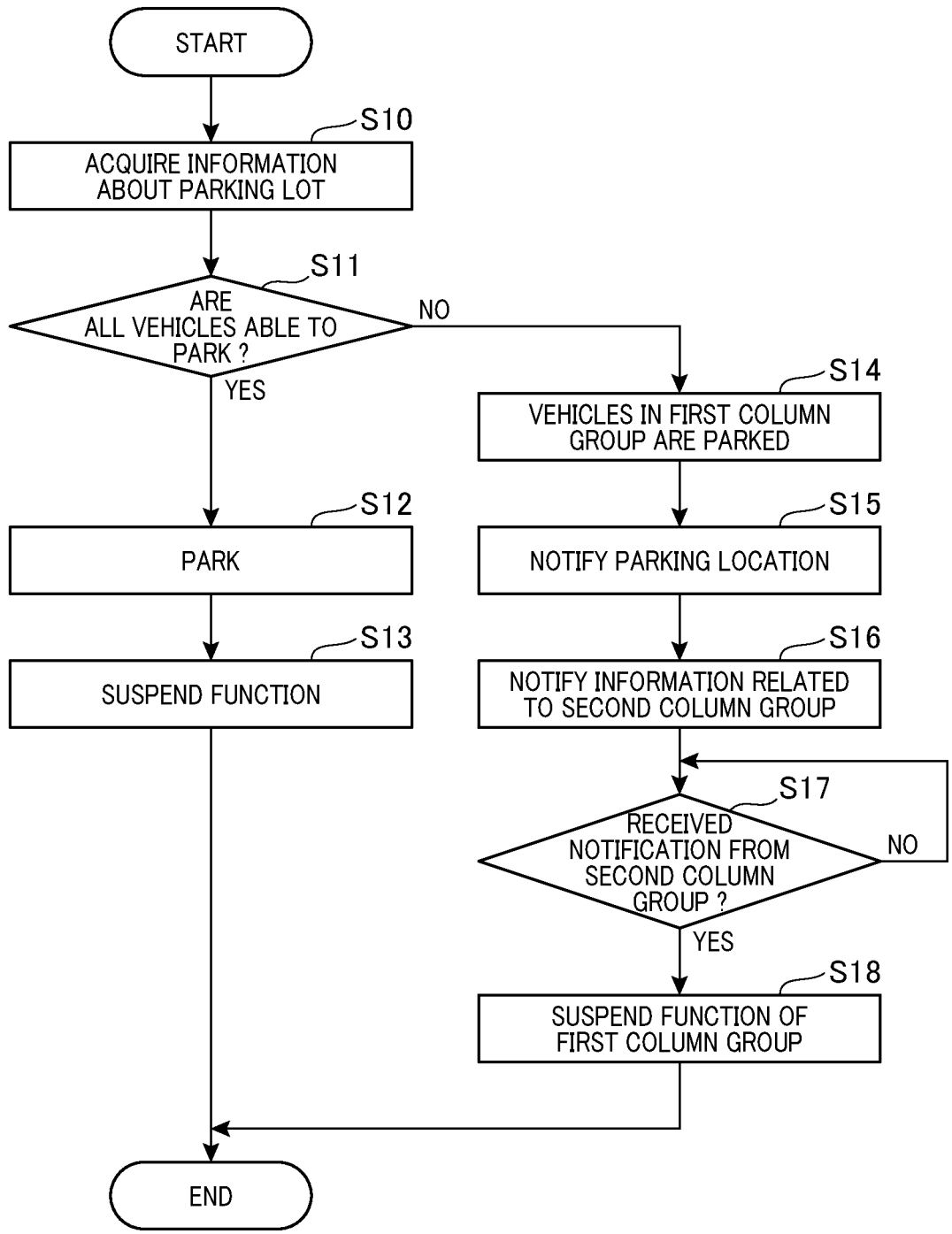
FIG. 55 is a flowchart showing processes executed by an on-vehicle control apparatus according to the thirteenth embodiment.

As shown in FIG. 55, the on-vehicle control apparatus 250 of the leading vehicle 21 acquires the information about the space in the parking lot P at step S10. Specifically, the management apparatus 10 acquires, from the management company who manages the parking lot, the information of the locations indicating the available space in the parking lot where the vehicles 21 to 24 in the platoon travelling may be parked. The on-vehicle control apparatus 250 of the leading vehicle 21 acquires the information about the locations indicating the available space of the parking lot P by communication with the management apparatus 10.

Subsequently, in a process at step S11, the on-vehicle control apparatus 250 of the leading vehicle 21 determines whether enough available space of parking all of the vehicles 21 to 24 is present in the parking lot P within an area enabling the short-distance wireless communication, that is, the inter-vehicle communication. When the determination at step S11 is affirmative, that is, available space of parking all of the vehicles 21 to 24 is present in the parking lot P within an area enabling inter-vehicle communication, the on-vehicle control apparatus 250 of the leading vehicle 21 controls the vehicles 21 to 24 to park as a process at step S12. Specifically, the on-vehicle control apparatus 250 of the leading vehicle 21 controls the leading vehicle 21 to park in the available space in the parking lot P, and performs inter-vehicle communication with the slave vehicles 22 to 24, thereby parking the slave vehicles 22 to 24 in the available spaces in the parking lot P.

The on-vehicle apparatus 250 of the leading vehicle 21 suspends the functions of the vehicles 21 to 24 as a process at step S13 subsequent to step S12. In the case where no passengers is on board the leading vehicle, the wake-up function based on by the wide-area wireless communication may be enabled in the leading vehicle 21 such that the function of the leading vehicle 21 during the function being suspended can be activated in response to an activation request. For the slave vehicles 22 to 24, the wake-up function may be enabled by the inter-vehicle communication such that the function of the slave vehicles during the function being suspended can be activated in response to an activation request from the leading vehicle. For the wake-up function, in the standby mode, a control apparatus is operating for activating functions of the communication apparatus and the vehicle, and activates the vehicle function in response to the reception of a signal commanding the wake-up via the communication apparatus, thereby changing the state to be ready for the automatic driving based on the command transmitted from external equipment.

On the other hand, as a process at step S14, the on-vehicle control apparatus 250 of the leading vehicle 21 controls only the vehicles in the first column group G1 to park, when determination at step S11 is negative, that is, not enough available space for parking all of the vehicles 21 to 24 is present in the parking lot P within an area enabling inter-vehicle communication. For example, as shown in FIG. 54, only two locations P1 and P2 are present as available spaces for the parking enabling the inter-vehicle communication, the on-vehicle control apparatus 250 of the leading vehicle 21 assigns the leading vehicle 21 and the slave vehicle 22 subsequent to the leading vehicle 21 to form the first column group G1. Then, the on-vehicle control apparatus 250 of the leading vehicle 21 controls the leading vehicle 21 belonging to the first column group G1 to park in the available space P1 in the parking lot P, and controls the slave vehicle 22 to park in the available space P2 in the parking lot P via the communication with the slave vehicle 22.

Subsequently, the on-vehicle control apparatus 250 of the leading vehicle 21 notifies the parking location of the first column group G1 to the management apparatus 10 as a process at step S15, and notifies the information of the vehicles 23 and 24 belonging to the second column group G2 to the management apparatus 10 as a process at step S16. Further, the on-vehicle control apparatus 250 of the leading vehicle 21 determines whether the notification from the second column group G2 is received as a process at step S17. According to the control apparatus 1 of the present embodiment, the second column group G2 is parked after the first column group G1 is parked. When the second column group G2 completes parking, the information of the location of the parking space of the second column group G2 is notified to the leading vehicle 21. The process at step S17 determines whether the notification transmitted from the second column group G2 is received.

In response to an affirmative determination at step S17, that is, when receiving the notification transmitted from the second column group G2, the on-vehicle control apparatus 250 of the leading vehicle 21 suspends the function of the vehicles 21 and 22 belonging to the first column group G1 as a process at step S18. Note that similar to that of step S13, the wake-up function of the vehicles 21 and 22 may be enabled.

Next, with reference to FIG. 56, a process executed by the identification information setting unit 112 will be described. The identification information setting unit 112 executes a process shown in FIG. 56 after receiving the notification of the parking location of the first column group G1 from the leading vehicle 21 of the first column group G1, and acquiring the information of the vehicles 23 and 24 belonging to the second column group. The identification information setting unit 112 activates the identification information of the mobile communication network N in either one of the vehicle 23 or 24 belonging to the second column group G2 as a process at step S20. For example, when enabling the identification information in the vehicle 23, the identification information setting unit 112 requires the telecommunication company 30 to apply the identification information S (2) to the communication identification IDc23 of the vehicle 23. Thus, the server 310 correlates the identification information S (2) with the communication identification IDc23, thereby enabling wide-area wireless communication via the mobile communication network in the vehicle 23. That is, the vehicle 23 can be switched to the leading vehicle from the slave vehicle.

Thereafter, the on-vehicle control apparatus 250 of the vehicle 23 serving as a new leading vehicle executes the process show in FIG. 55, whereby the slave vehicles 23 and 24 belonging to the second column group G2 park in the available space P3 and P4. The on-vehicle control apparatus 250 of the vehicle 23 controls the vehicles 23 and 24 to park in the available space P3 and P3 at step S12 shown in FIG. 55. Then, the parking location information is transmitted to the leading vehicle 21 of the first column group G1 via the mobile communication network N.

Next, with reference to FIG. 57, a process executed by the on-vehicle control apparatus 250 to re-organize the column of the vehicles 21 to 24 when the vehicles 21 to 24 starts to travel will be described. Note that the processes shown in FIG. 57 are executed by the on-vehicle control apparatus 250 of the leading vehicle 21 when the user operates the car navigation apparatus 200 of the leading vehicle 21 to start platoon travelling, or when the management apparatus 10 commands the leading vehicle 21 to start the platoon travelling.

Figure 57:
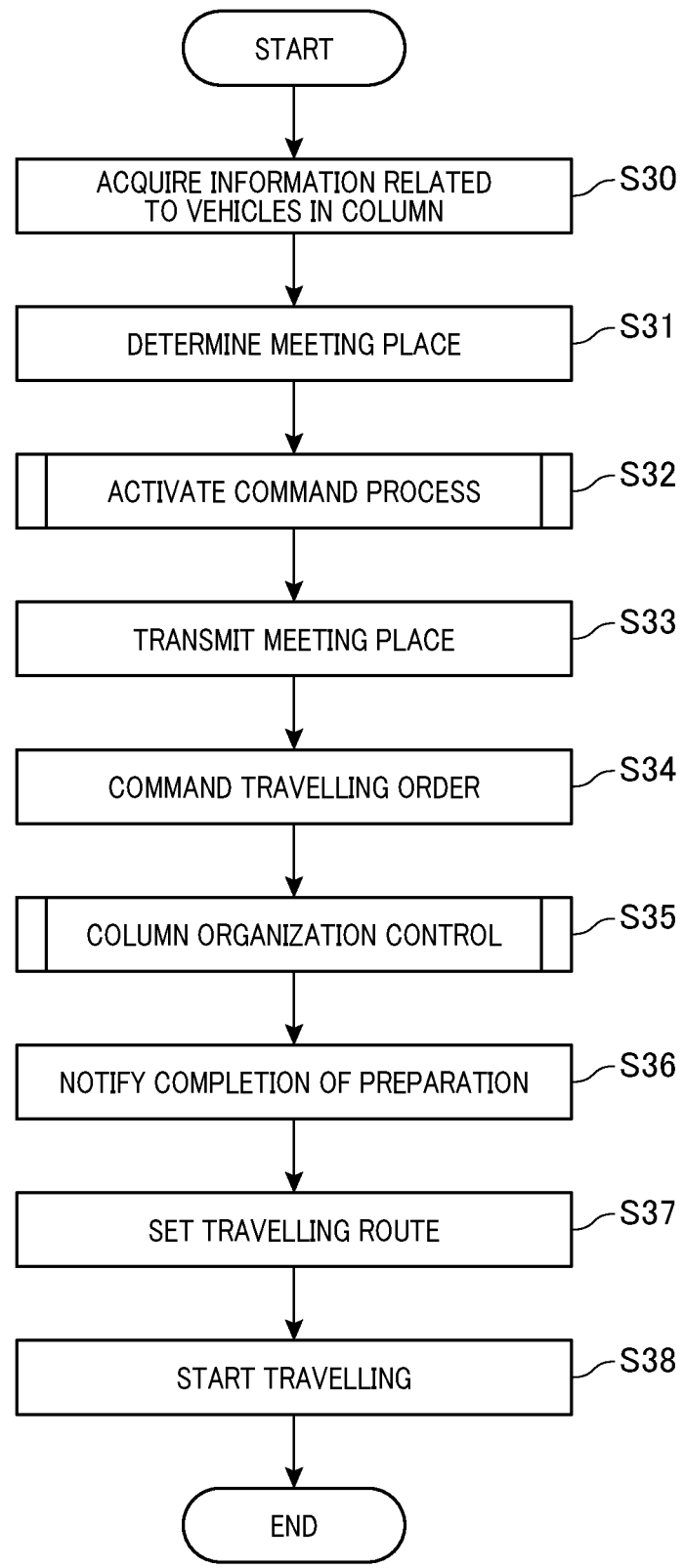
FIG. 57 is a flowchart showing processes executed by the on-vehicle control apparatus according to the thirteenth embodiment.

As shown in FIG. 57, the on-vehicle control apparatus 250 of the leading vehicle 21 acquires the information of a vehicle forming the column as a process at step S30. Specifically, according to the car navigation apparatus 200 of the leading vehicle 21, it is possible to select a vehicle forming the column among the plurality of vehicles registered in advance. The on-vehicle control apparatus 250 of the leading vehicle 21 acquires information about the vehicle forming the column based on the information inputted to the car navigation apparatus 200. Note that an example will be described in which a column formed by the vehicles 21 to 24 starts to travel.

Subsequently, at step S31, the on-vehicle control apparatus 250 of the leading vehicle 21 determines a meeting place for the vehicles 21 and 22 belonging to the first group G1 and the vehicles 23 and 24 belonging to the second group G2. The meeting place is set as a predetermined place in the parking lot P, a predetermined place outside the parking lot P, or an intermediate place between the origin and the destination. The on-vehicle control apparatus 250 of the leading vehicle 21 may further set the meeting time at step S31.

Figure 58:
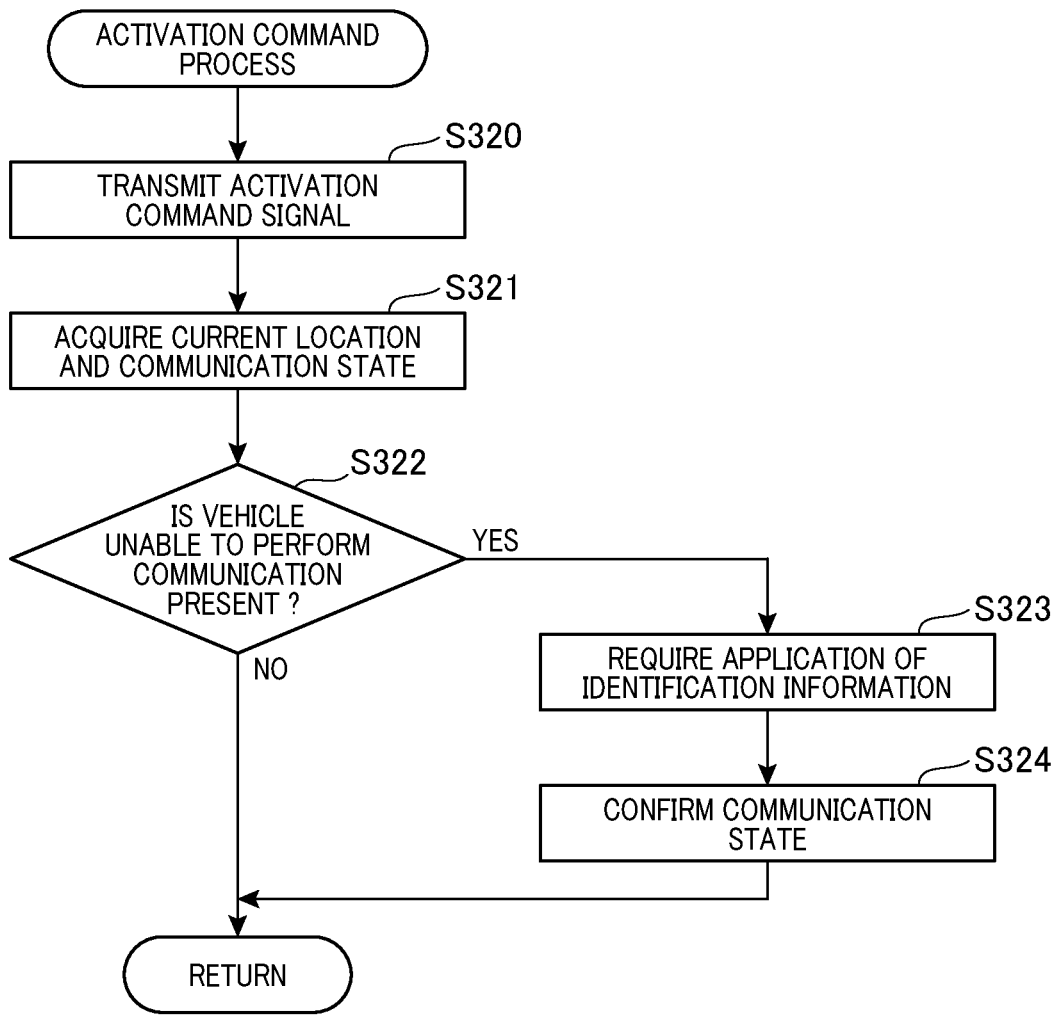
FIG. 58 is a flowchart showing an activation command process executed by the on-vehicle control apparatus according to the thirteenth embodiment.

The on-vehicle control apparatus 250 of the leading vehicle 21 executes an activation command process to the vehicles in the column at step S32 subsequent to step S31. The specific process of the activation command process will be shown in FIG. 58. As shown in FIG. 58, at step S320, the on-vehicle control apparatus 250 of the leading vehicle 21 transmits an activation command signal to the vehicle forming the column in the activation command process. The activation command signal is to activate the vehicle of which the function is suspended. Specifically, the on-vehicle control apparatus 250 of the leading vehicle 21 transmits the activation command signal to the slave vehicle 22 of the first column group G1 via the inter-vehicle communication. Moreover, the on-vehicle control apparatus 250 of the leading vehicle 21 transmits the activation command signal to the slave vehicle 23 of the second column group G2. Furthermore, in the slave vehicle 23 of the second column group G2 activated by the activation command signal, the on-vehicle control apparatus 250 transmits the activation command signal to the slave vehicle 24 of the second group G2, thereby activating the slave vehicle 24 of the second column group G2.

Subsequently, at step S321, the on-vehicle control apparatus 250 of the leading vehicle 21 acquires the information about the current location and the communication state from the slave vehicles 22 to 24. At step S322, the on-vehicle control apparatus 250 of the leading vehicle 21 determines whether communication with the slave vehicles 22 to 24 is unavailable. The on-vehicle control apparatus 250 of the leading vehicle 21 terminates the activation command process shown in FIG. 58 when the determination at step S322 is negative, that is, the communication with the slave vehicles 22 to 24 is determined as unavailable.

On the other hand, at step S323, in response to affirmative determination at step S322, that is, when vehicles being unable to communicate are present, the on-vehicle control apparatus 250 of the leading vehicle 21 requires the management apparatus 10 to apply the identification information to the slave vehicles being unable to communicate. For example, as a slave vehicle forming the column, when only the slave vehicle 24 is selected without selecting the slave vehicle 23 of the second column group G2, the slave vehicle 24 where the identification information is deactivated is unable to perform wide-area wireless communication. In other words, the slave vehicle 24 is unable to communicate with the management apparatus 10 or the leading vehicle 21 of the first column group G1. In this case, the process applies the identification information to the slave vehicle 24 at step S323.

The identification information setting unit 112 of the management apparatus 10, when the on-vehicle control apparatus 250 of the leading vehicles 21 requires an application of the identification information to a slave vehicle, correlates the identification information with the communication identification of the slave vehicle, thereby enabling the slave vehicle which is unable to communicate to perform the wide-area wireless communication via the mobile communication network N. In this case, when two identification information data items S (1) and S (2) are not sufficient, the identification information setting unit 11 may purchase or rent new identification information data from the telecommunication company 30.

At a step S324 subsequent to step S323, the on-vehicle control apparatus 250 of the leading vehicle 21 confirms that the slave vehicle being unable to communicate is now ready to perform communication, and terminates the activation command process shown in FIG. 58. At step S33 subsequent to step S32 shown in FIG. 57, the on-vehicle control apparatus 250 of the leading vehicle 21 transmits the meeting place to the slave vehicles 22 to 24 and the management apparatus 10 after terminating the activation command process shown in FIG. 58. In the case where the meeting time is set, the on-vehicle control apparatus 250 of the leading vehicle 21 may transmit the meeting time to the slave vehicles 22 to 24 and the management apparatus at step S33. Subsequently, at step S34, the on-vehicle control apparatus 250 of the leading vehicle 21 commands the respective slave vehicles 22 to 24 to travel with a travelling order in the column. The travelling order may be arbitrarily set by the on-vehicle control apparatus 250 of the leading vehicle 21 or may be set by the user in the car navigation apparatus 200 of the leading vehicle 21.

Figure 59:
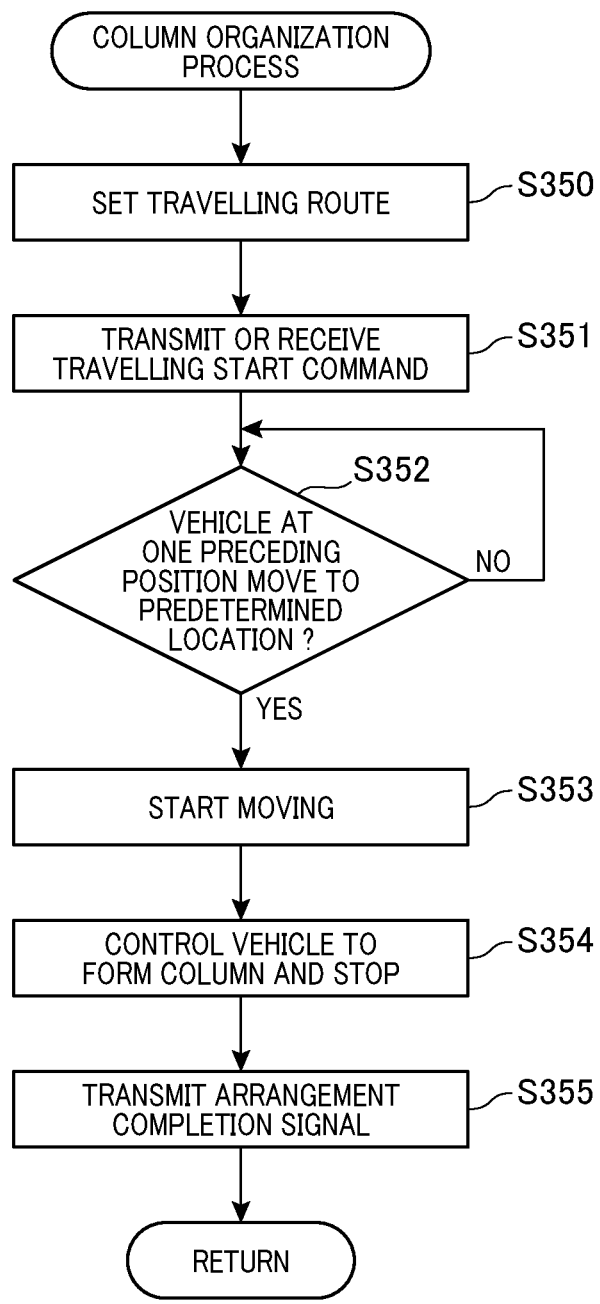
FIG. 59 is a flowchart showing a column organization control process executed by the on-vehicle control apparatus according to the thirteenth embodiment.

At step S35, the on-vehicle control apparatus 250 of the leading vehicle 21 executes a column organization control process. The specific process of the column organization control process is shown in FIG. 59. The column organization control process is also executed at the column organization control process of the slave vehicles 22 to 24 which receives the travelling order information.

As shown in FIG. 59, at step S350, the on-vehicle control apparatus 250 of each of the vehicles 21 to 24 sets the travelling route to the meeting place in the column organization control process. Subsequently, at step S351, the column organization control apparatus 250 of the vehicles 21 to 24 transmits or receives a travelling start command. Specifically, the column organization control apparatus 250 of the leading vehicle 21 transmits the travelling start command to the respective vehicles 22 to 24. On the other hand, the column organization control apparatus 250 in each of the slave vehicles 22 to 24 receives the travelling start command transmitted from the leading vehicle 21.

At step S352, the on-vehicle control apparatus 250 of each of the vehicles 21 to 24 determines whether a vehicle at a travelling position preceding the own vehicle for one vehicle (i.e. one preceding travelling position) has moved to a predetermined location. The predetermined location refers to the meeting place or a location where the own vehicle is able to track a vehicle at the one preceding position. At step S353, the on-vehicle control apparatus 250 of each of the vehicles 21 to 24 controls the own vehicle to start travelling to the meeting place, when the determination at step S35 is affirmative, that is, the vehicle at the one preceding travelling position has moved to the predetermined location. For example, since the leading vehicle 21 travels at a head position in the column, no preceding vehicle is present in the column. Therefore, the on-vehicle control apparatus 250 of the leading vehicle 21 transmits the travelling start command, and then immediately controls the leading vehicle 21 to automatically travel to the meeting place. On the other hand, the slave vehicle 22 is a vehicle that travels subsequently to the leading vehicle 21. Hence, the on-vehicle control apparatus 250 of the slave vehicle 22 controls the slave vehicle 22 to travel to the meeting place after the leading vehicle travels to reach the predetermined location.

Note that, at step S352, the process may determine whether a first distance between the vehicle at one preceding travelling position and the predetermined location, is shorter than a second distance between the own vehicle and the predetermined location. Further, at step S352, the process may determine whether a second estimated time at which the own vehicle is estimated to arrive at the predetermined location is later than a first estimated time at which the vehicle at the one preceding travelling position is estimated to reach the predetermined location.

The on-vehicle control apparatus 250 of each of the vehicles 21 to 24 controls the vehicles to form the column and stop. For example, the on-vehicle control apparatus 250 of the leading vehicle 21 controls the leading vehicle 21 to stop at the head position (also referred to as leading position) in the meeting place. Moreover, the on-vehicle control apparatus 250 of the slave vehicle 22 controls the slave vehicle 22 at the following position of the leading vehicle 21 in the meeting place.

Subsequently, at step S355, the on-vehicle control apparatus 250 of each of the vehicles 22 to 24 transmits an arrangement completion signal to the leading vehicle 21. Note that the on-vehicle control apparatus 21 of the leading vehicle 21 omits the process at step S355. The arrangement completion signal is transmitted to the leading vehicle 21 from the slave vehicles 22 to 24, whereby the on-vehicle control apparatus 250 of the leading vehicle 21 is able to confirm completion of the arrangement for all of the vehicles 21 to 24.

The on-vehicle control apparatus 250 of the leading vehicle 21 completes the column organization control process shown in FIG. 59. Thereafter, at step S36 subsequent to step S35, the process notifies the management apparatus 10 that preparation of the platoon travelling is completed. The management apparatus 10 sets the identification information applied to the slave vehicles 22 to 24 to be deactivated, when receiving the notification indicating the completion of the preparation of the platoon travelling. Specifically, in the case where the identification information S (2) is applied to the slave vehicle 23 to form the second column group G2, the management apparatus 10 requires the server 310 of the telecommunication company 30 to disable the identification information S(2) correlated to the communication identification IDc23 of the slave vehicle 23. Thus, the identification information S (2) applied to the slave vehicle 23 is deactivated.

At step S37 subsequent to step S36, the on-vehicle control apparatus 250 of the leading vehicle 21 sets the travelling route to the destination, and starts to perform the platoon travelling. According to the control apparatus 1 of a vehicle of the present embodiment described above, the following effects and advantages can be obtained.

(1) The plurality of vehicles 21 to 24 performing the platoon travelling is divided into groups of the leading vehicle 21 and the slave vehicles 22 to 24. For the leading vehicle 21, the identification information is set to be active, thereby enabling the wide-area wireless communication via the management apparatus 10 and the mobile communication network N. For each of the slave vehicles 22 to 24, the identification information is set to be deactivated. The slave vehicles 22 to 24 share information necessary for performing the platoon travelling, based on the information directly transmitted by the leading vehicle 21 with the inter-vehicle communication, or the information indirectly transmitted by the leading vehicle through other vehicles via the inter-vehicle communication. Assuming that a group composed of the leading vehicle 21 and the slave vehicles 22 to 24 is determined as a first column group, and a group composed of the slave vehicles 23 and 24 in the slave vehicles 22 to 24 of the first column group G1 is determined as a second group G2, and the second column group G2 is separated from the first column group G1, the identification information setting unit 112 sets the identification information in the slave vehicles 23 and 24 belonging to the second column group G2 to be active. According to such a configuration, since the vehicles 23 and 24 belonging to the second column group G2 become able to move across the area of the inter-vehicle communication, the platoon travelling can be achieved with high flexibility. Furthermore, since the identification information is not necessarily applied to all of the vehicles 21 to 24, communication cost can be reduced when utilizing the identification information.

(2) The identification information setting unit 112 is provided in the management apparatus 10. According to such a configuration, since the configuration for managing the identification information is not required to be provided in each of the vehicles 21 to 24, limited space used for mounting equipment in the vehicles 21 to 24 can be saved.

(3) The identification information setting unit 112 sets the identification information, which has been active for each of the slave vehicles 22 to 24, to be deactivated when the slave vehicles 22 to 24 complete to move to the meeting place. The identification information setting unit 112, when having determined the meeting place for the slave vehicles 22 to 24, may set the identification information which has been active for the slave vehicles 22 to 24 to be deactivated. According to such a configuration, the identification information which has been deactivated can be utilized in other vehicles.

(4) In the case where at least one vehicle in the plurality of vehicles 21 to 24 during a parking operation leave a communicable range of the inter-vehicle communication, the identification information setting unit 112 organizes the second column group G2. According to such a configuration, since the identification information can be applied for each column group, the vehicles can be parked as being distributed with fewer identification information data.

(5) The on-vehicle control apparatus 250 of the leading vehicle 21 in which the identification information S (1) has been set to be active, sets the wide-area wireless communication to be active during the function of the vehicle 21 being suspended. Similarly, the on-vehicle control apparatus 250 of the slave vehicle 23 in which the identification information S (2) has been set to be active, sets the wide-area wireless communication to be active during the function of the vehicle 23 being suspended. According to such a configuration, various signals can be received when the vehicles 21 and 23 are re-started.

(First Modification)

Next, a first modification of the control apparatus 1 of the vehicle according to the thirteenth embodiment will be described. The column organization control process shown in FIG. 59. The column organization control shown in FIG. 59 is not limited to be executed by respective vehicles 21 to 24. However, the column organization control may be executed by an on-vehicle control apparatus 250 of a vehicle serving as a leading vehicle in each column group. Thus, instead of using a method in which respective vehicles congregate at the meeting place when a plurality of vehicles forming the column are required to be congregated at the meeting place, a method may be used in which each column group congregates at the meeting place.

At this moment, the vehicles 21 and 22 belonging to the first column group are joined at a first organization point to form the column, and the vehicles 23 and 24 belonging to the second column group G2 are joined at a second organization point. Thereafter, the first column group G1 and the second column group G2 may be joined at the meeting place.

In this case, at step S352 shown in FIG. 59, the process may determine whether a column at a travelling position preceding the own column group for one column (i.e. one preceding column group) travels to the meeting place. Also, at step S352, when assuming a first distance between the one preceding column and a preceding location, and a second distance between the own column group and the predetermined location, the process may determine whether the first distance is shorter than the second distance. Further, at step S352, when assuming a first estimated time where the one preceding column group arrives at the predetermined location, and a second estimated time where the own column group arrives at the predetermined location, the process may determine whether the second estimated time is later than the first estimated time. In other words, the second column group G2 may start to travel at the second organization point such that the second column group will arrive at the meeting place later than the first column group.

According to such a configuration, since respective column groups can be joined at the meeting place, the plurality of vehicles 21 to 24 are able to form the columns smoothly.

(Second Modification)

The second modification of the control apparatus 1 of the vehicle according to the thirteenth embodiment will be described.

Figure 60:
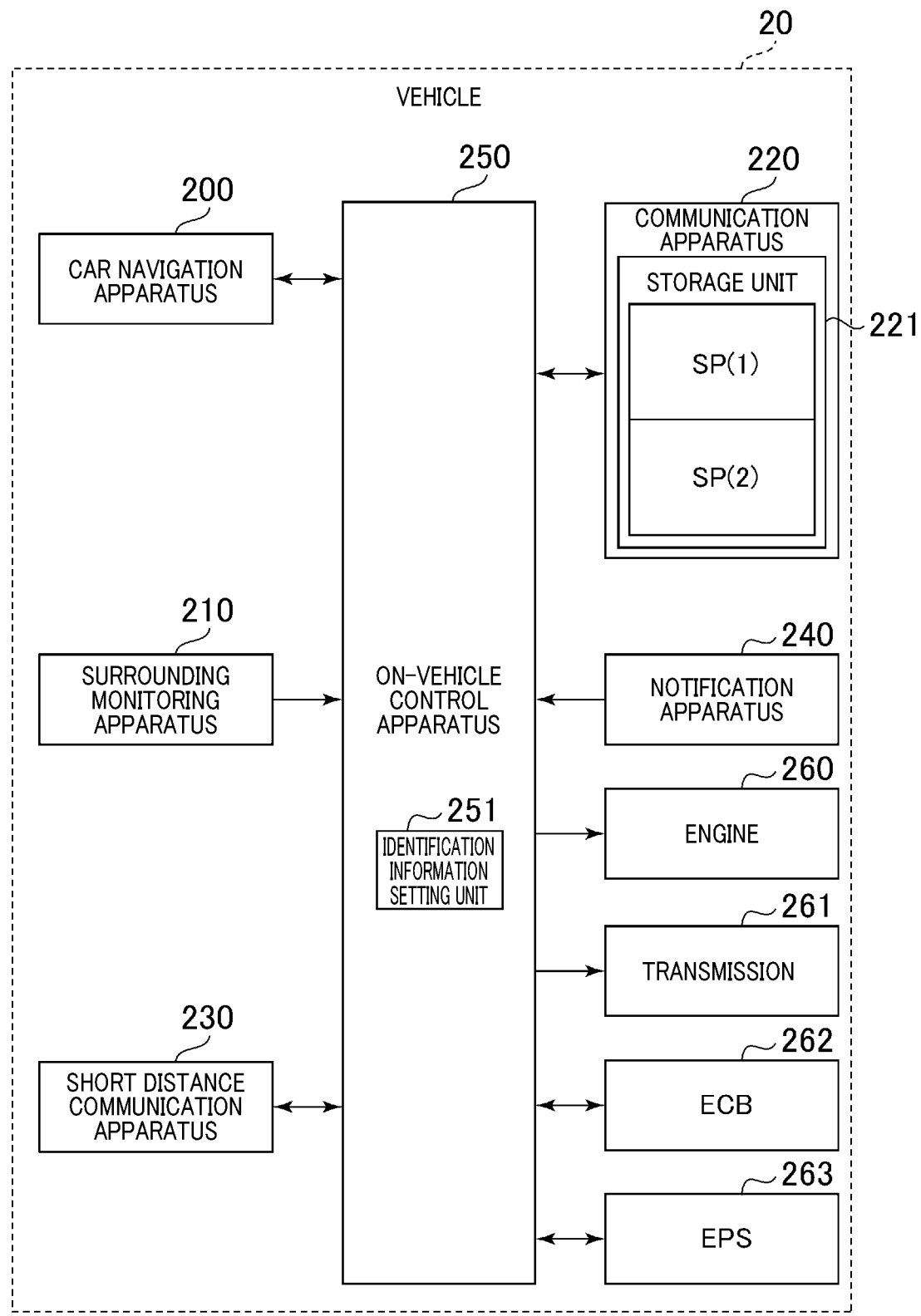
FIG. 60 is a block diagram showing an overall configuration of a vehicle according to a second modification of the thirteenth embodiment.

According to the second modification, the identification information is changed for the respective vehicles 21 to 24. Specifically, as shown in FIG. 60, a plurality of SIM profiles SP (1) and SP (2) are stored in advance in the storage unit of the wide-area communication apparatus 220 in the leading vehicle 21. The SIM profile SP (1) and SP (2) are used when utilizing the mobile communication network N. The SIM profile SP (1) and SP (2) are stored in the storage unit 221 in a form of an eSIM (embedded Subscriber Identity Module). According to the present embodiment, the SIM profiles SP (1) and SP (2) corresponds to subscriber identification information. Similarly, a plurality of SP profiles SP (1) and SP (2) are stored in advance in the storage unit 21 of the wide-area communication apparatus 220 of the slave vehicles 22 to 24.

In the wide-area communication apparatus 220 of the leading vehicle 21 of the present modification, the SIM profile SP (1) is stored in advance to be active. On the other hand, in the wide-area communication apparatus 220 of the respective vehicles 22 to 24, both of the SIM profiles SP (1) and SP (2) are set to be deactivated. At step S16 shown in FIG. 55, the on-vehicle control apparatus 250 of the leading vehicle 21 commands the vehicle 23 belonging to the second column group G2 to activate the SIM profile SP (2). Thus, the vehicle 23 serves as the leading vehicle of the second column group G2.

Further, when the on-vehicle control apparatus 250 of the leading vehicle 21 determines that the preparation of the platoon travelling is completed at step S37 shown in FIG. 57, the process commands the slave vehicle 34 to deactivate the SIM profile SP (3). According to the present modification, as shown in FIG. 60, the on-vehicle control apparatus 250 of each of the vehicles 21 to 24 includes an identification information setting unit 251 that switches the state of the SIM profiles SP (1) and SP (2) between active and inactive. The identification information setting unit 251 corresponds to a subscriber information setting unit.

The identification profile stored in the storage unit 221 may be acquired via the communication. The identification profile is transmitted via the inter-vehicle communication, thereby obtaining similar effects and advantages to configuration without communication. The identification profile may be stored in advance in the vehicle, or may be acquired from the telecommunication company 30 or the management apparatus 10. Note that the identification profile may be purchased when acquiring it via the telecommunication company.

The storage unit 221 may store the plurality of identification information profile. The storage unit 221 in any of the vehicles in the column may store one or more identification profiles in advance and may transmit them.

(Third Modification)

Figure 61:
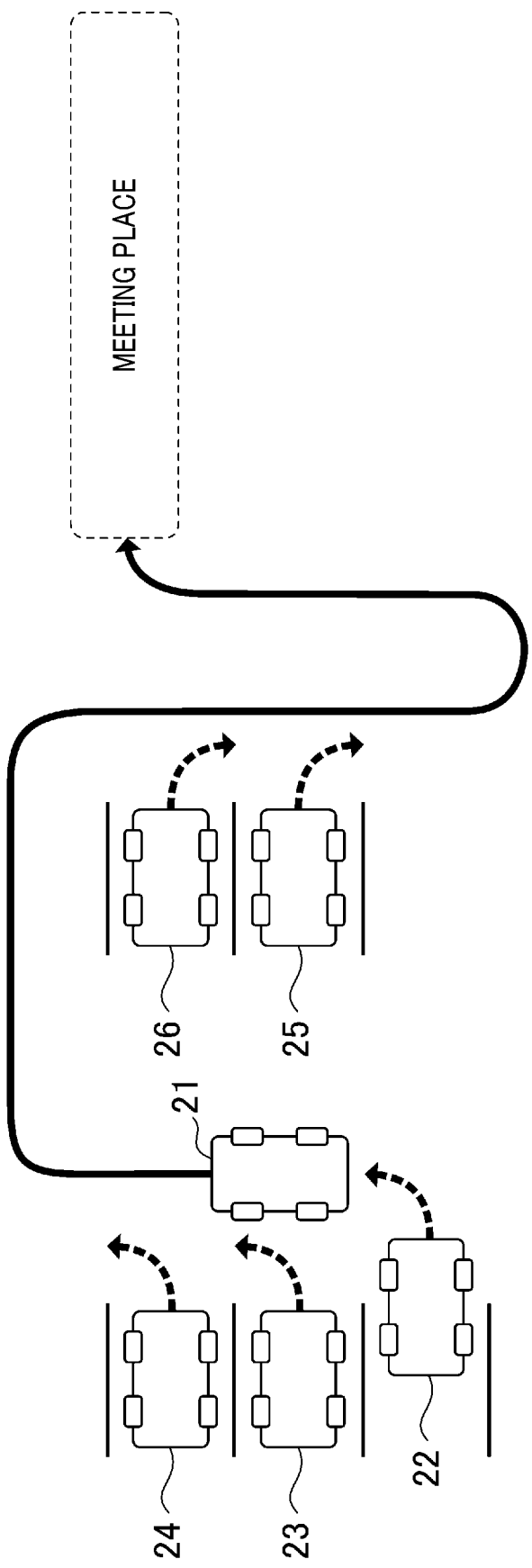
FIG. 61 is a block diagram showing an overall configuration of a parking state of the vehicle according to a third modification of the thirteenth embodiment.

Next, a third modification of the control apparatus 1 of the thirteenth embodiment will described. When executing the column organization control shown in FIG. 59, it is expected that the slave vehicles are located apart from the leading vehicle 21 such that inter-vehicle communication is unable to be performed, and wide-area wireless communication is also unable to be performed. In such a circumstance, as indicated by the solid line shown in FIG. 61, the column may be reconfigured while the leading vehicle 21 travels closely to the slave vehicles 22 to 26, that is, in a range enabling inter-vehicle communication with the slave vehicles 22 to 26.

According to such a configuration, even in a case where the slave vehicles 22 to 26 have the identification information set as inactive, the leading vehicle 21 and the slave vehicles 22 to 26 are able to form the column.

(Fourth Modification)

Next, a fourth modification of the control apparatus 1 of the vehicle according to the thirteenth embodiment will be described.

Figure 56:
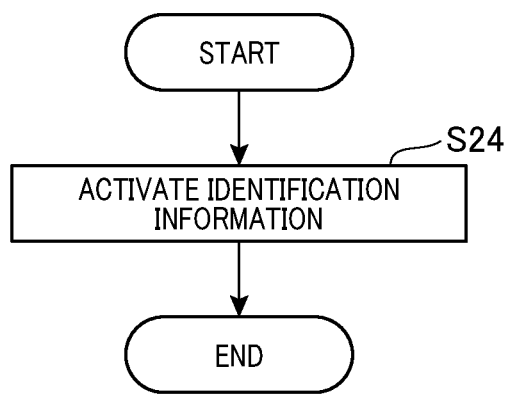
FIG. 56 is a flowchart showing processes executed by a control unit of the management apparatus according to the thirteenth embodiment.
Figure 62:
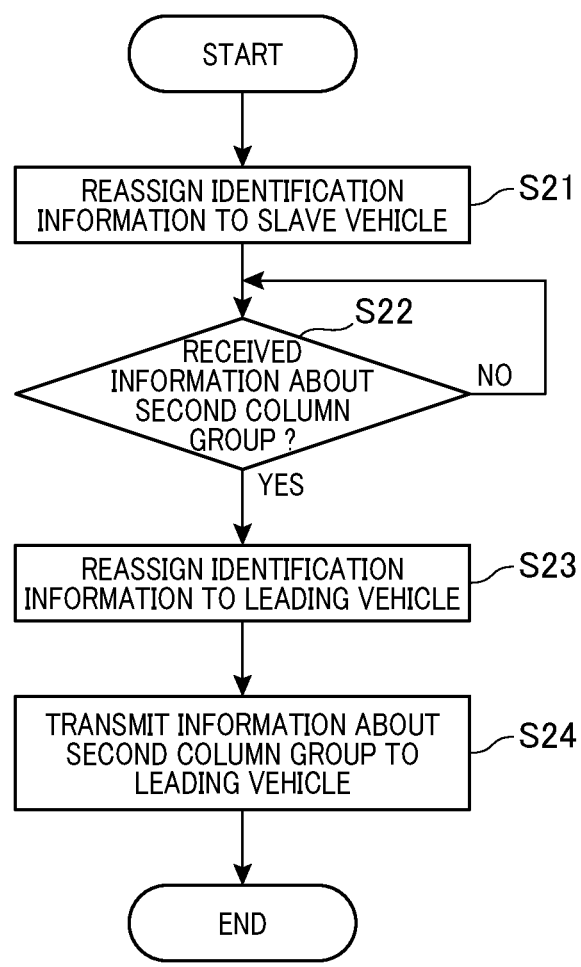
FIG. 62 is a flowchart showing processes executed by the control unit of the management apparatus of a fourth modification of the thirteenth embodiment.

The identification information setting unit 112 of the management apparatus 10 according to the present modification executes the process shown in FIG. 62 instead of the process shown in FIG. 56. As shown in FIG. 62, at step S21, the process changes the communication identification correlated to the identification information S (1) to be the communication identification IDc23 of the slave vehicle 23 from the communication identification IDc21 of the leading vehicle 21. In other words, the identification information setting unit 112 sets the identification information in the leading vehicle 21 to be inactive, and sets the identification information in the slave vehicle 23 to be active. Thus, the leading vehicle 21 is unable to perform the wide-area wireless-communication and the slave vehicle is able to perform the wide-area wireless communication. Accordingly, the control apparatus 250 of the slave vehicle 23 completes parking of the second column group G2, and thereafter transmits the information about the parking place or the like to the management apparatus 10, thereby storing the information into the storage unit 120.

Subsequently, at step S22, the identification information setting unit 112 determines whether the information about the parking location is received from the slave vehicle 23 of the second column group G2. At step S23, the identification information setting unit 112 changes the communication identification correlated to the identification information S (1) to be the communication identification IDc21 of the leading vehicle 21 from the communication identification information IDc23 of the slave vehicle 23, when the determination at step S22 is affirmative, that is, when receiving the information about the parking location from the slave vehicle 23 of the second column group G2. Specifically, the identification information setting unit 112 sets the identification information in the slave vehicle 23 to be inactive, and thereafter sets the identification information in the leading vehicle 21 again.

Subsequently, at step S24, the identification information setting unit 112 transmits the information about the parking location of the second column group G2 stored in the storage unit 120 to the leading vehicle 21 of the first column group 21. Thus, the on-vehicle control apparatus 250 of the leading vehicle 21 is able to acquire the information about the parking location or the like of the slave vehicles 23 and 24 of the second column group G2.

Thus, the identification information setting unit 112 according to the present modification sets the identification information of the slave vehicle 23 which has not arrived at the parking lots P3 and P4 yet to be active, when the leading vehicle 21 and the slave vehicle 22 of the first column group arrives the parking lots P1 and P2. Thus, according to such a configuration, even if a single identification information data S (1) is used, the leading vehicle 21 of the first column group is able to acquire the information about the parking location of the second column group G2.

Note that the identification information setting unit 112 may set the identification information in the slave vehicle 23 of which the parking location has not yet been determined, after determining the parking lots P1 and P2 for the leading vehicle 21 and the slave vehicle 22 of the first column group G1.

(Fifth Modification)

Next, a fifth modification of the control apparatus 1 of the vehicle according to the thirteenth embodiment will be described.

Figure 63:
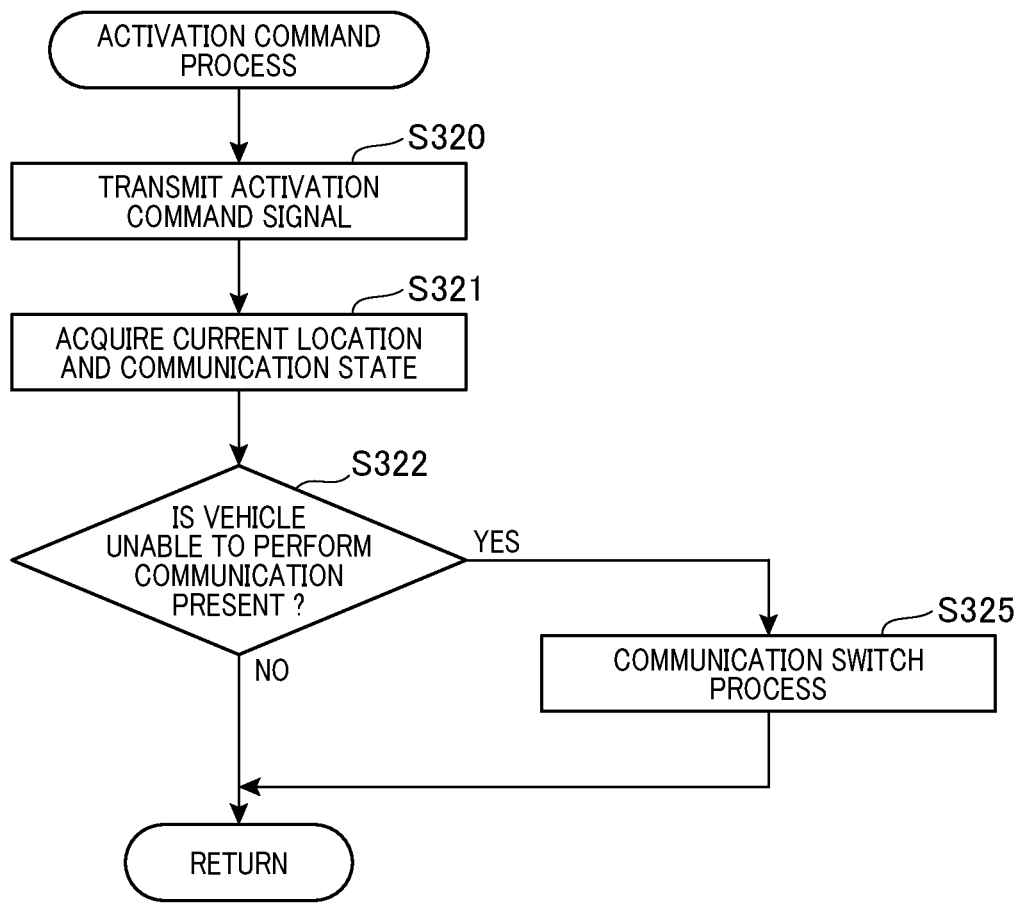
FIG. 63 is a flowchart showing processes executed by the on-vehicle control apparatus of a fifth modification of the thirteenth embodiment.

The on-vehicle control apparatus 250 of the leading vehicle 21 executes the activation command process shown in FIG. 63, instead of executing the process shown in FIG. 58. As shown in FIG. 63, at step S325, the on-vehicle control apparatus 250 of the leading vehicle 21 executes a communication switch process when the determination at step S322 is affirmative, that is, a vehicle unable to perform communication is present. The process of the communication switch process is shown in FIG. 64.

Figure 64:
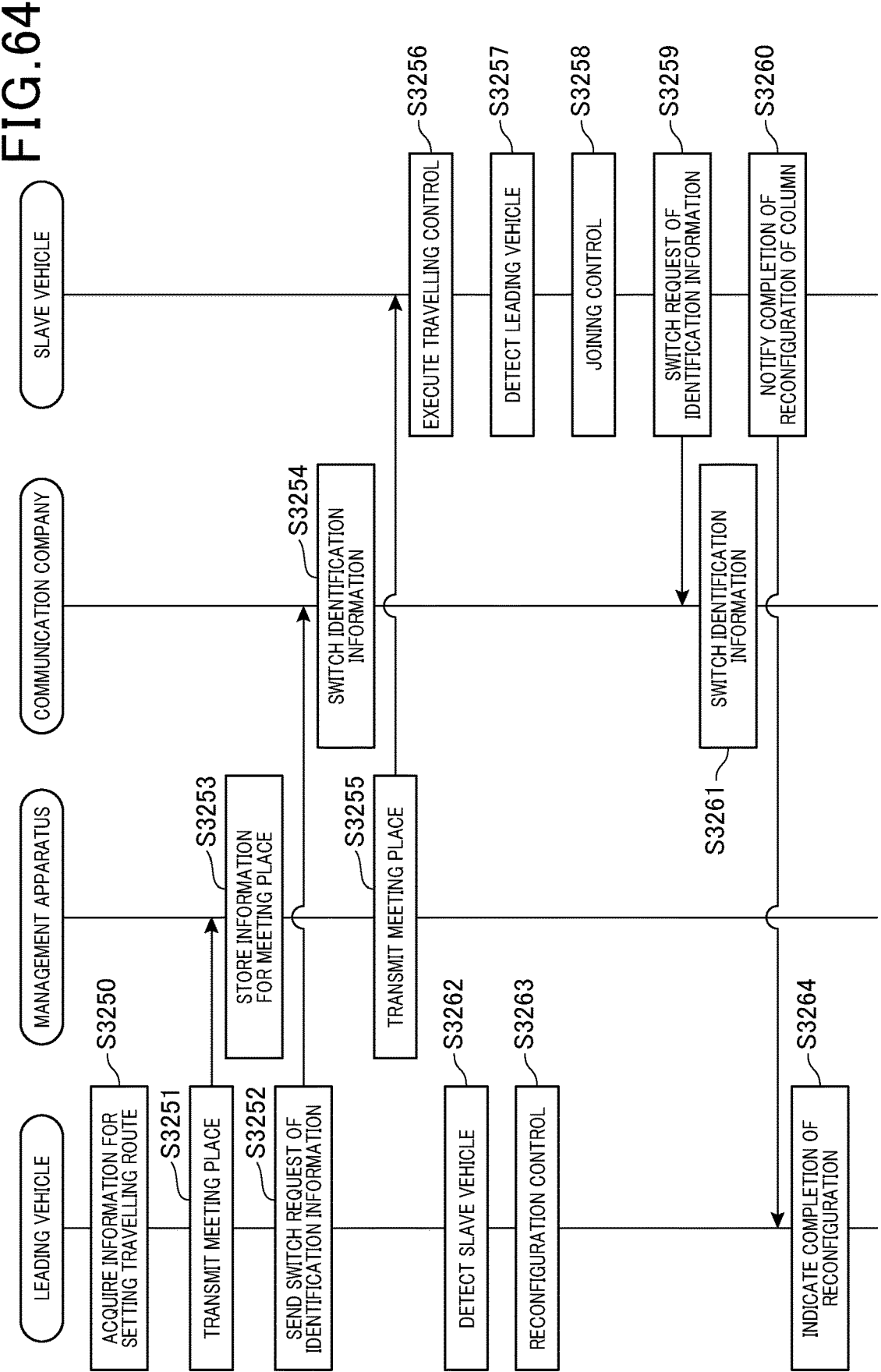
FIG. 64 is a sequence diagram showing processes executed by a leading vehicle, the management apparatus, a communication apparatus and a slave vehicle of a fifth modification of the thirteenth embodiment.

As shown in FIG. 64, at step S3250, the on-vehicle control apparatus 250 of the leading vehicle 21 acquires, in the communication switch process, necessary information for setting the travelling route to the meeting place by the network communication via the mobile communication network N. Subsequently, at step S3251, the on-vehicle control apparatus 250 of the leading vehicle 21 transmits the information about the meeting place and the meeting time. Then, the on-vehicle control apparatus 250 of the leading vehicle 21 sends the switch request of the identification information to the telecommunication company 30 at step S3252. The switch request of the identification information requests the telecommunication company 30 to switch the assignment of the identification information correlated to the identification information S (1) to the slave vehicle 23 from the leading vehicle 21.

When the control unit 110 of the management apparatus 10 receives the information about the meeting place or the meeting time which are transmitted from the leading vehicle 21, at step 3253, the process stores these items of information into the storage unit 120. At step S3254, the server 310 of the telecommunication company 30 switches the communication identification correlated to the identification information S (1) from IDc23 of the slave vehicle 23 to IDc21 of the leading vehicle 21. Thus, the wide-area wireless communication in the leading vehicle 21 via the mobile communication network N becomes unavailable, while the wide-area wireless communication in the slave vehicle 23 via the mobile communication network N becomes available.

At step S3255, the control unit 110 of the management apparatus 10 transmits the information about the meeting place and the meeting time stored in the storage unit 120 to the slave vehicle 23. The on-vehicle control apparatus 250 of the slave vehicle 23, when received the information about the meeting place and the meeting time, executes a travelling control process to have the second column group composed of the slave vehicles 23 and 24 travel to the meeting place at step S3256. Thus, the leading vehicle 21 of the first column group G1 and the slave vehicle 22 arrive the meeting place earlier and then the slave vehicles 23 and 24 of the second column group G2 arrive the meeting place.

Subsequently, when the surrounding monitoring apparatus 210 detects an approach of the first column group G1 to the leading vehicle 21 at step S3257, the on-vehicle control apparatus 250 of the slave vehicle 23 executes, at step S3258, a joining control such that the slave vehicles 23 and 24 of the second column group join the first column group G1. Thereafter, when the first column group G1 completed to join the second column group G2, the on-vehicle control apparatus 250 of the slave vehicle 23 sends the switch request of the identification information to the telecommunication company 30 at step S3259. The switch request of the identification information requests the telecommunication company 30 to switch the assignment of the identification information correlated to the identification information S (1) to the leading vehicle 21 from the slave vehicle 23. At step S3260, the on-vehicle control apparatus 250 of the slave vehicle 23 notifies the leading vehicle 21 of the first column group G1 that the reconfiguration of the column is completed, by inter-vehicle wireless communication.

At step S3261, the server 310 of the telecommunication company 30 switches the identification information correlated to the identification information S (1) from IDc23 of the slave vehicle 23 to IDc21 of the leading vehicle 21. Thus, wide-area wireless communication by the slave vehicle 23 via the mobile communication network N becomes unavailable, while wide-area wireless communication by the leading vehicle 21 via the mobile communication network N becomes available.

On the other hand, at step S3262, the on-vehicle control apparatus 250 of the leading vehicle 21 when the surrounding monitoring apparatus 210 detects, at step S3262, that the slave vehicle 23 of the second column group G2 approaches the leading vehicle 21 in the meeting place, the on-vehicle control apparatus 250 of the leading vehicle 21 executes, at step S3263, a reconfiguration control such that the slave vehicles 23 and 24 of the second column group G2 are included in the first column group G1 to reconfigure the first column group G1. Thereafter, at step S3264, the on-vehicle control apparatus 250 of the leading vehicle 21 indicates the completion of the reconfiguration of the column on the display of the car navigation apparatus 200, when a notification indicating the completion of the reconfiguration of the column is received from the slave vehicle 23 of the second column group G2 via the inter-vehicle wireless communication.

According to such a configuration, even in the case where the available identification information in the vehicles 21 to 24 is only the identification information S (1), the column can be reconfigured.

(Sixth Modification)

Next, a sixth modification of the control apparatus 1 according to the thirteenth embodiment will be described.

According to the control apparatus 1 of the present modification, in the case where the column cannot be formed because any fault occurs in the slave vehicle 23 for example, when the vehicles 21 to 24 organize the column, the organization of the column is suspended. According to the present modification, it is expected that only one identification information S (1) is used for the respective vehicles 21 to 24.

Figure 65:
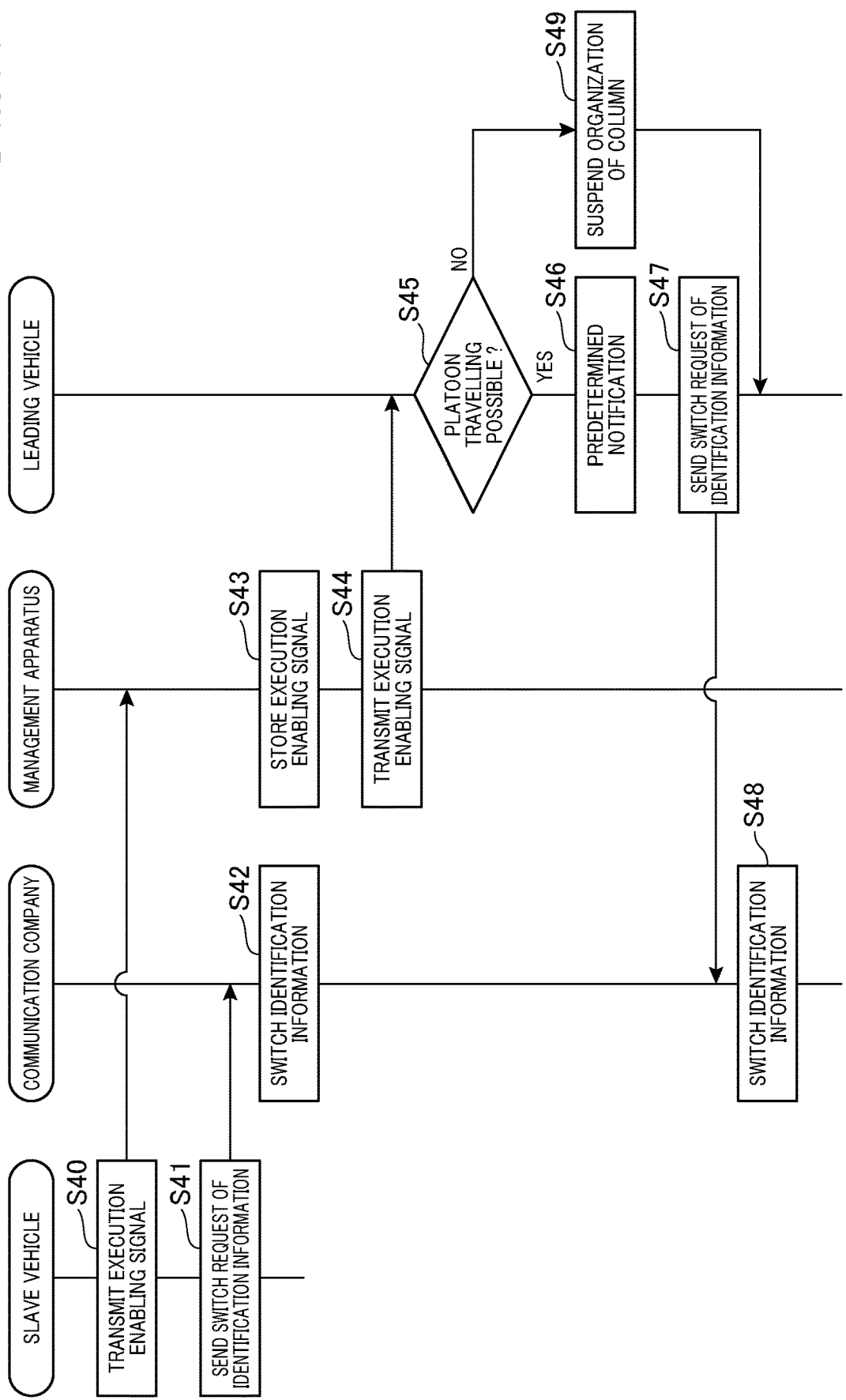
FIG. 65 is a sequence diagram showing processes executed by a leading vehicle, the management apparatus, a communication apparatus and a slave vehicle of a sixth modification of the thirteenth embodiment.

The on-vehicle control apparatus 250 of the slave vehicle 23 executes processes shown in FIG. 65 when the telecommunication company 30 activates the identification information S (1). As shown in FIG. 65, at step S40, the on-vehicle control apparatus 250 of the slave vehicle 23 transmits an execution enabling signal indicating that the platoon travelling and the communication are available to the management apparatus 10 when determined that platoon travelling is available. Moreover, the on-vehicle control apparatus 250 of the slave vehicle 23 sends the switch request of the identification information to the telecommunication company 30 at step S41. The switch request of the identification information requests the telecommunication company 30 to switch the assignment of the identification information correlated to the identification information S (1) to the leading vehicle 21 from the slave vehicle 23.

At step S42, the server 310 of the telecommunication company switches the identification information correlated to the identification information S (1) from IDc23 of the slave vehicle 23 to IDc21 of the leading vehicle 21. Thus, the wide-area wireless communication in the slave vehicle 23 via the mobile communication network N becomes unavailable, while the wide-area wireless communication in the leading vehicle 21 via the mobile communication network N becomes available.

In response to the reception of the execution enabling signal transmitted from the slave vehicle 23, the control unit 110 of the management apparatus 10 stores the execution enabling signal at step S43, and then transmits the execution enabling signal to the leading vehicle 21 in which the identification information S (1) is activated at step S44.

At step S45, the vehicle control apparatus 250 of the leading vehicle 21 determines whether the slave vehicles are able to perform the platoon travelling. Specifically, the on-vehicle control apparatus 250 of the leading vehicle 21 determines the process at step S45 to be negative, when the execution enabling signal has not been received for a period from when the identification information S (1) of the slave vehicle 23 is activated to when a predetermined time has elapsed. In this case, at step S49, the on-vehicle control apparatus 250 of the leading vehicle 21 determines that the slave vehicle 23 is unable to perform the platoon travelling, and suspends the organization of the column.

On the other hand, when the on-vehicle control apparatus 250 of the leading vehicle 21 is able to receive the execution enabling signal within the period from when the identification information S (1) of the slave vehicle 23 is activated to when a predetermined time has elapsed, the on-vehicle control apparatus 250 of the leading vehicle 21 determines the process at step S45 to be affirmative. In this case, at step S46, the on-vehicle control apparatus 250 of the leading vehicle 21 sends a predetermined notification, and performs the switch request of the identification information to the telecommunication company 30. The predetermined notification is such as a notification of enabling the column organization (lighting lamp). The switch request of the identification information requests the telecommunication company 30 to switch the assignment of the identification information correlated to the identification information S (1) to the leading vehicle 21 from the slave vehicle 23.

At step S48, the server 310 of the telecommunication company switches the identification information correlated to the identification information S (1) from IDc21 of the leading vehicle 21 to IDc23 of the slave vehicle 23. Thus, the wide-area wireless communication in the leading vehicle 21 via the mobile communication network N becomes unavailable, while the wide-area wireless communication in the slave vehicle 23 via the mobile communication network N becomes available.

According to the thirteenth embodiment, as shown in FIGS. 52A and 52B, the management apparatus 10 manages the correlation between the identification information and the communication identification of the vehicle, whereby the vehicle having the wide-area wireless communication unit 220 corresponding to the communication identification is able to perform the wide-area wireless communication. The switch request of the identification information is transmitted to the server 310 such that the identification information is applied, when activating the leading vehicle 21, to the slave vehicle 23 which is unable to perform the wide-area wireless communication because of deactivated identification information. As a result, even when the slave vehicle is parked in a separated place, the communication can resumed.

Specifically, the slave vehicle 23 turns the wide-area wireless communication unit 220 ON when the slave vehicle 23 is separated from the leading vehicle 21 and parked in the parking lot to be in a standby state. At this moment, since the identification information S (1) and the communication identification IDc23 of the slave vehicle 23 are not correlated in the management apparatus 1, the communication is unable to be performed. The leading vehicle 21 is also parked in the parking lot and enters a standby state. At this moment, the state of the wide-area wireless communication unit 220 is OFF, and the identification information S (1) and the communication identification IDc21 of the leading vehicle 21 are in a state enabling the communication.

In this state, when activating the leading vehicle 21, the leading vehicle 21 activates the wide-area wireless communication unit 220, selects the slave vehicle 23 and sends a request to the management apparatus 10 to correlate the identification information with the communication identification IDc23 of the slave vehicle 23. When the server 310 correlates, in response the request, the identification information S (1) with the communication identification IDc23 of the slave vehicle 23, the wide-area wireless communication can be performed with the mobile communication network N. Thus, while the vehicle is being parked, the slave vehicle 23 cancels the correlation of the identification information S (1) and the identification information can be utilized.

Fourteenth Embodiment

Next, a control apparatus 1 of the vehicle according to the fourteenth embodiment will be described. Hereinafter, portions different from those in the control apparatus 1 of the vehicle according to the thirteenth embodiment will mainly be described. The control apparatus 1 according to the present embodiment is a system for automatically supplying power, at a predetermined supplying location, to the vehicles 21 to 24 that travel forming the column.

Figure 66:
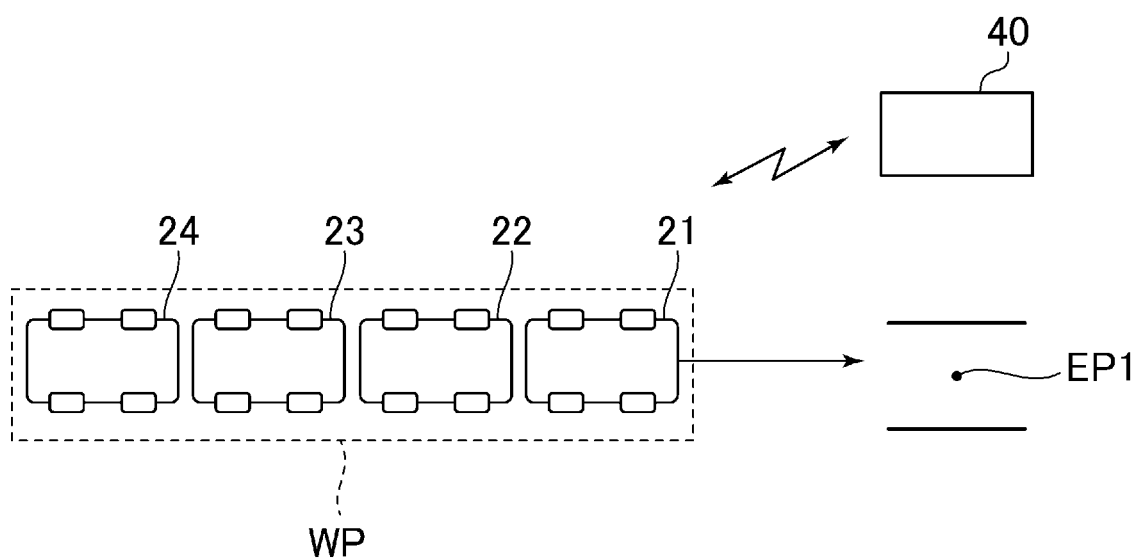
FIG. 66 is a diagram showing an example of a state of supplying power to a vehicle according to a fourteenth embodiment.

As shown in FIG. 66, the respective vehicles 21 to 24 are in a standby state at a pre-supply waiting place WP provided closely to a supply location EP1, before being supplied with power. When starting the power supply operation, the leading vehicle 21 in which the identification information S (1) being set as active firstly moves to the supply location EP1. Once the leading vehicle 21 moves to the supply location EP1, the battery mounted on the leading vehicle 21 is charged with non-contact power supply. After completing the charging, the leading vehicle 21 moves to a post-supply waiting place (not shown) and enters a standby state.

On the other hand, when starting the charging, the leading vehicle 21 transfers the identification information S (1) to the following slave vehicle 22. In the case where the leading vehicle 21 after being charged moves towards the post-supply waiting place, whereby the supply location EP1 becomes empty, the slave vehicle 22 in which the identification information S (1) is set to be active, moves to the supply location EP1 and the power supply operation is started. When activating the charging, the slave vehicle 22 transfers the identification information S (1) to the following slave vehicle 23. Also, after completing the charging, the slave vehicle 22 moves to the post-supply waiting place (not shown) and becomes in a standby state.

Thus, the respective vehicles 21 to 24 move sequentially to the supply location EP1, thereby sequentially supplying the power to the batteries in the respective vehicles 21 to 24. Note that a vehicle among the vehicles 21 to 24, in which the identification information S(1) is set to be active, performs a communication with a power supply facility 40 disposed in the supply location EP1 via the mobile communication network N, whereby the vehicle is able to exchange various information about the power supply with the power supply facility 40.

Next, with reference to FIG. 67, processes executed, when such a power supply operation is performed, by the on-vehicle control apparatus 250 in the respective vehicles 21 to 24 will be described in detail. The processes shown in FIG. 67 are executed by the on-vehicle control apparatus 250 of a vehicle in which the identification information S (1) is set to be active among the respective vehicles 21 to 24, after the respective vehicles 21 to 24 travel to the pre-supply waiting place WP.

Figure 67:
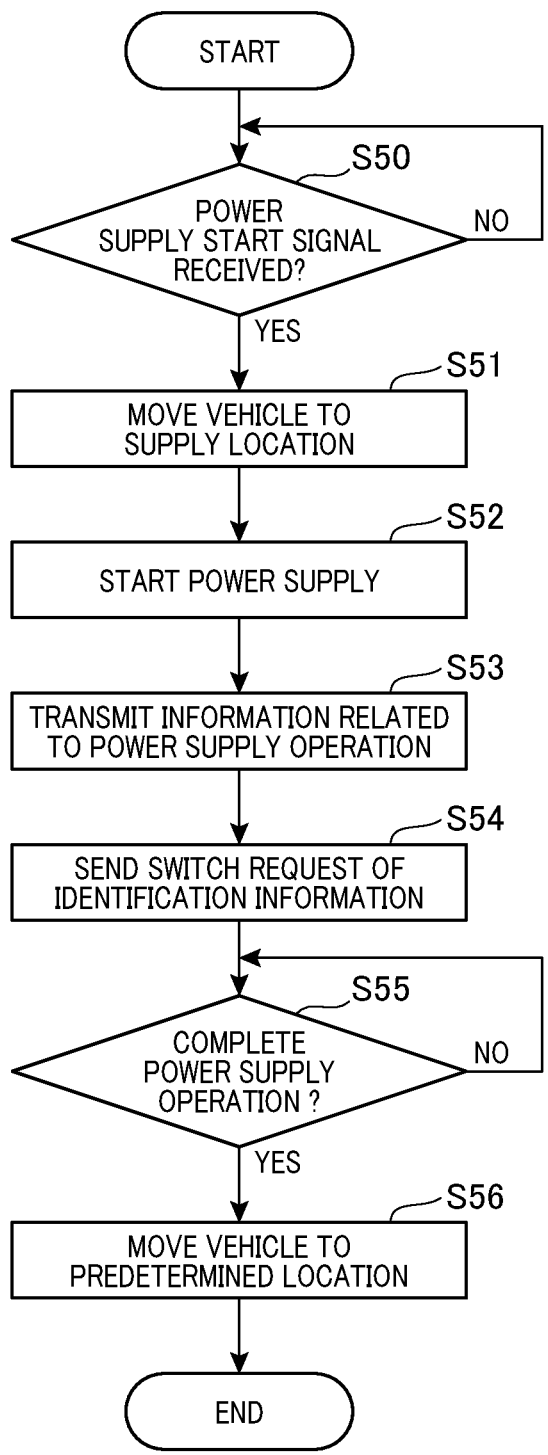
FIG. 67 is a flowchart showing processes executed by an on-vehicle control apparatus according to the fourteenth embodiment.

As shown in FIG. 67, at step S50, the on-vehicle control apparatus 250 of the respective vehicles 21 to 24 determines whether a power supply start signal transmitted from the power supply facility 40 is received. Specifically, in the case where no vehicle being supplied with power is present when the vehicles 21 to 24 arrive the pre-supply waiting place WP, since the leading vehicle 21 can be supplied with power, the power supply facility 40 transmits the power supply start signal to the leading vehicle 21. At step S50, the on-vehicle control apparatus 250 of the leading vehicle 21 determines whether the power supply start signal transmitted from the power supply facility 40 is received.

Also, the power supply facility 40 transmits the power supply start signal to the following slave vehicle 22 in the case where the leading vehicle 21 which has completed the power supply itself moves to the post-supply waiting place from the supply location EP1, thereby changing the state of the supply location EP1 to be an empty state. Further, the power supply facility 40 transmits the power supply start signal every time when the slave vehicles 22 and 23 complete the power supply. Thus, the power supply start signal is received by the slave vehicle 22, the slave vehicle 23, and the slave vehicle 24 in this order.

At step S51, the on-vehicle control apparatus 250 of the respective vehicles 21 to 24 automatically moves the vehicles to the supply location EP1, when the determination at step S50 is negative, that is, when receiving the power supply signal. Subsequently, at step S52, the on-vehicle control apparatus 250 of the respective vehicles 21 to 24 start to perform the power supply operation (i.e. charging operation), and transmits the information related to the power supply operation such as the power supply completion schedule to the management apparatus 10 at step S53. The management apparatus 10, when receiving the information related to the power supply operation such as the power supply completion schedule, transmits the information to the terminal equipment or the like of the user. The management apparatus 10 may store the received information into the memory unit 120. Thus, the user is able to recognize the information about the power supply completion schedule of the respective vehicles 21 to 24.

The on-vehicle control apparatus 250 of the respective vehicles 21 to 24 sends the switch request of the identification information S (1) to the management apparatus 10 at step S54 subsequent to step S53. The switch request of the identification information S (1) requests the management apparatus 10 to switch the assignment of the identification information correlated to the identification information S (1) to the communication identification of a vehicle to be next supplied with power from the vehicle started to be supplied with power. The identification information setting unit 112 of the management apparatus 10 requires the telecommunication company 30 to switch the communication identification of the vehicle correlated to the identification information S(1), based on the switch request of the identification information S (1), whereby the identification information S (1) in the vehicle to be next supplied with power is set to be active.

At step S55 subsequent to step S54, the on-vehicle control apparatus 250 of the respective vehicles 21 to 24 determines whether the power supply operation is completed. When the determination at step S55 is affirmative, that is, the power supply operation is completed, the on-vehicle control apparatus of the respective vehicles 21 to 24 moves the vehicles to the predetermined location such as the post-supply waiting place at step S56, and terminates the series of processes.

After completing the power supply operation of the vehicles 21 to 24, the respective vehicles 21 to 24 may form a column and travel to the parking lot P, similar to the case of the control apparatus 1 according to the thirteenth embodiment. According to the control apparatus 1 of the vehicle of the present embodiment, the following effects and advantages shown in the following (6) to (8) can be obtained.

(6) The identification setting unit 112 of the management apparatus 10 sets, every time when the vehicles 21 to 23 arrive at the supply location EP1, the identification information S (1) to be sequentially active for the vehicles 22 to 24 which are not yet arrived in the supply location EP1. That is, the process activates the identification information S (1) of vehicles which are not being supplied with power.

According to such a configuration, even when only one item of identification information S (1) capable of being used for the vehicles 21 to 24 is present, the vehicles 21 to 24 can be sequentially supplied with power.

(7) The identification information setting unit 112 of the management apparatus 10 sets, every time when the vehicles 21 to 23 arrive at the supply location EP1, that is, completed to move to the supply location EP1, the identification information S (1) which has been active in the vehicle which completed to move, to be deactivated. In other words, the identification information S (1) of the vehicle being supplied with power is set to be active. According to such a configuration, a single identification information S (1) can be utilized for the plurality of vehicles 21 to 24.

(8) The on-vehicle control apparatus 250 of the respective vehicles 21 to 24 transmits, before setting the identification information S (1) to be deactivated, the information about the power supply such as the power supply completion schedule to the management apparatus 10. The management apparatus 10 may store the received information into the memory unit 120. Thus, the information about the power supply is transmitted to the portable terminals of the user from the management apparatus 10, whereby the user is able to recognize the information about the power supply.

(First Modification)

Next, a first modification of a control apparatus 1 of a vehicle according to the fourteenth embodiment will be described. According to the control apparatus 1 of the present modification, while the leading vehicle 21 is being supplied with power for example, the identification information in the leading vehicle 21 has been set active at a time immediately before/after completing the power supply operation. Further, the identification information S (1) is set to be active in the slave vehicle 22 to which the power is supplied next to the leading vehicle 21, when completing the power supply operation of the leading vehicle 21, or immediately before completing the power supply of the leading vehicle 21, or immediately after completing the power supply of the leading vehicle 21. According to such a configuration, the power supply state of the leading vehicle 21 can be successively transmitted to the management apparatus 10.

Note that the identification information S (1) of the leading vehicle 21 may be set to be active at a predetermined timing, for example, constant interval. According to such a configuration, the power supply state of the leading vehicle 21 can be transmitted to the management apparatus 10 at a predetermined timing. The management apparatus 10 stores the power supply state into the storage unit 120, and updates the state, thereby notifying the latest power supply state to the user.

(Second Modification)

Next, a second modification of the control apparatus 1 of a vehicle according to the fourteenth embodiment will be described.

Figure 68A:
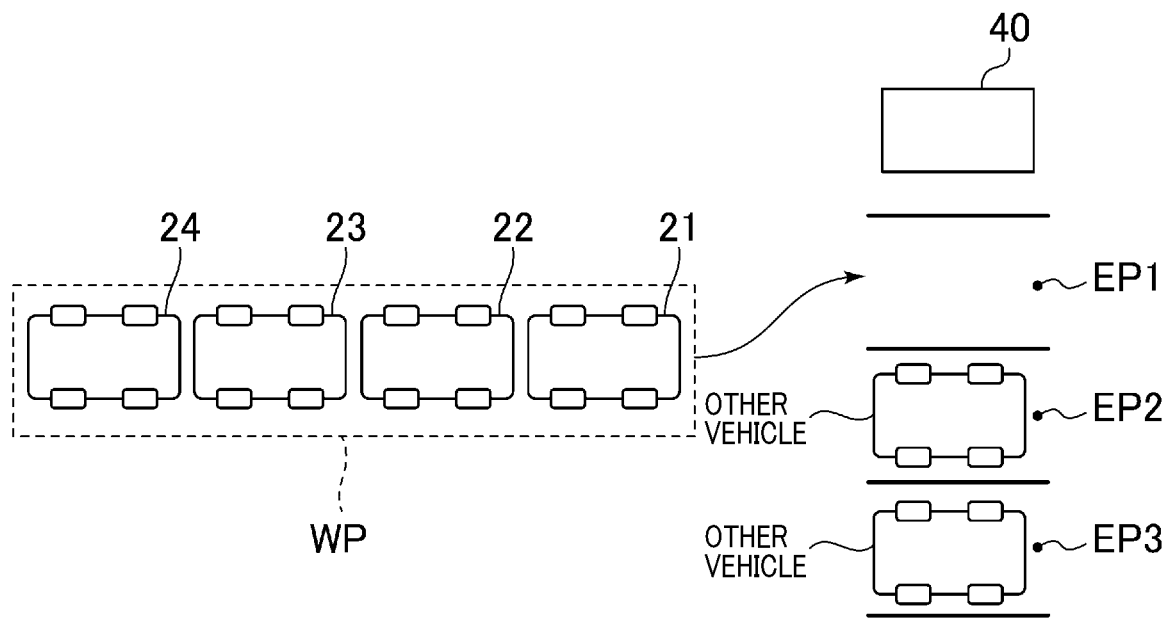
FIGS. 68A and 68B are diagrams showing examples of a state of supplying power to the vehicle according to a second modification of the fourteenth embodiment.
Figure 68B:
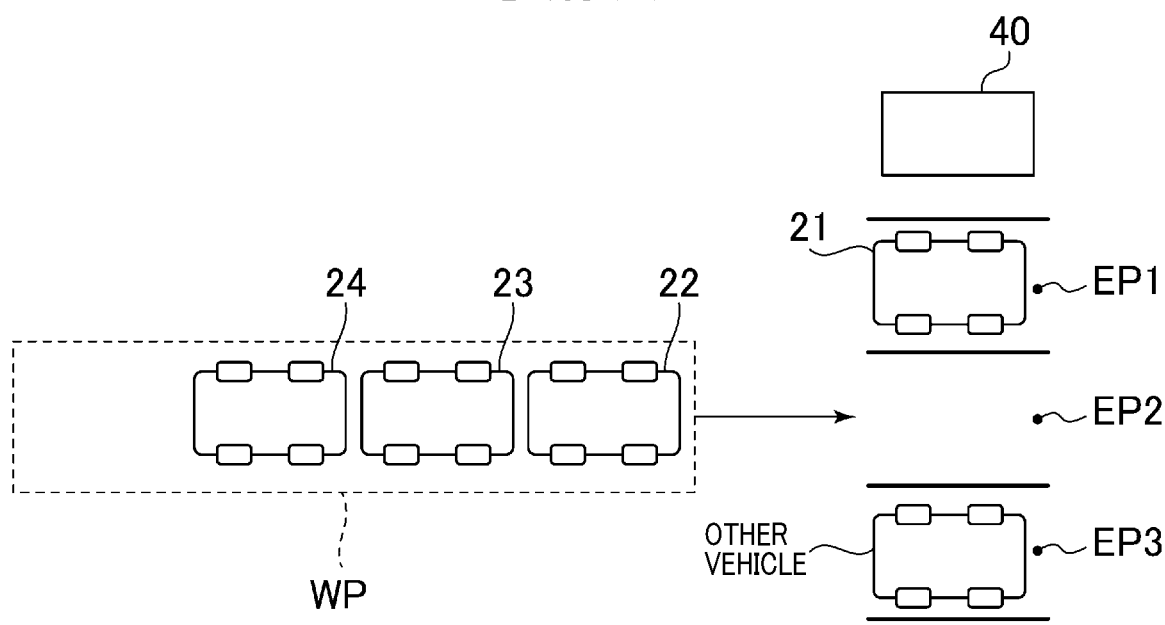

According to the control apparatus 1 of the present modification, as shown FIGS. 68A and 68B, in the case where a plurality of supply locations EP1 to EP3 are present, and only the supply location EP1 is empty, the leading vehicle 21 firstly moves to the supply location EP1 to start power supply operation. Then, when the leading vehicle 21 starts to power supply operation, the identification information S (1) of the leading vehicle 21 is set to be deactivated, and the identification information S (1) of the slave vehicle 22 is set to be activated. Other slave vehicles 22 to 24 enter a stand-by state at the pre-supply waiting place WP.

Thereafter, as shown in FIG. 68B, when the supply location EP2 is empty, the slave vehicle 22 moves to the supply location EP2 and the power supply operation is started. Then, when the power supply operation is started for the slave vehicle 22, the identification information S (1) of the slave vehicle 22 is deactivated, and the identification information S (1) of the slave vehicle 23 is activated.

According to such a configuration, the respective vehicles 21 to 24 can be supplied with power effectively in the case where a plurality of supply locations EP1 to EP3 are present.

(Other Embodiments)

Note that the respective embodiments can be embodied in the following manner.

According to the thirteenth embodiment, a case where the second column group G2 is separated from the first column group G1 was exemplified. However, a third column group may be further separated from the second column group. In this case, the second column group corresponds to major column group, and vehicles belonging to the third column group corresponds to separated vehicles.

In the control apparatus 1 according to the thirteenth embodiment, similar to the control apparatus 1 of the fourteenth embodiment, vehicles in the column may be sequentially parked in the order from front side, and each time when a vehicle completes parking, the identification information may transfer to the next vehicle. Such as configuration can be achieved by utilizing the image captured by the camera installed in the parking lot P.

The means and/or the functions provided by the control unit 110 of the management apparatus 10 and the on-vehicle control apparatus 250 of the respective vehicles 21 to 24 can be accomplished by software stored in a substantial memory device and a computer that executes the software, software only, hardware only, or a combination thereof. For example, in the case where the control unit 110 of the management apparatus 10 and the on-vehicle control apparatus 250 of the respective vehicles 21 to 24 are accomplished by electronic circuits as hardware, these circuits can be provided by digital circuit including a plurality of logic circuits, or analog circuits.

The present disclosure is not limited to the above-described embodiments. The present embodiments may be modified in various manner without departing from the scope of the present disclosure. For example, a plurality of functions included in a single element of the above-described embodiments may be distributed a plurality of elements, or functions included in a plurality of elements may be integrated to one element. A part of configurations of the above-described embodiments can be replaced by known configuration. Also, a part of configurations of the above-described embodiments can be omitted as long as problems can be solved. At least part of the above-described configuration may be added to other configurations of the above-described embodiments, or may replace other configuration of the above-described embodiments. It should be noted that various aspects inherent in the technical ideas identified by the scope of the claims are defined as embodiments of the present disclosure.

(Conclusion)

The first aspect of the present disclosure provides a control apparatus (10) that controls a plurality of vehicles (100) performing platoon travelling, each of the vehicles being provided with an inter-vehicle communication apparatus (160) that performs an inter-vehicle communication with an other vehicle included in a column of the platoon travelling, at least some of the vehicles being provided with an external communication apparatus (170) that performs external communication based on own identification information given by a telecommunication company. The control apparatus is configured to control respective vehicles such that the number of vehicles capable of simultaneously performing external communication is less than the number of vehicles included in the column.

According to such a control apparatus, the number of line contracts with the telecommunication company (i.e. the number of items of identification information data to be applied) can be lower than the number vehicles included in the column. Thus, the communication cost due to external communication can be reduced.

The control performed by the above-described control apparatus includes a process in which the identification information is assigned to the external communication apparatus of a part of the plurality of vehicles included in the column, thereby enabling external communication by the vehicle.

Note that a vehicle provided with no external communication apparatus including the identification information assigned thereto is unable to perform communication with the management apparatus installed outside the vehicle. However, the vehicle may perform inter-vehicle communication with another vehicle provided with an external communication apparatus to which the identification information is assigned, whereby communication with a management apparatus installed outside the vehicle can be accomplished via the other vehicle.

In the case where the assignment of the identification information to the external communication apparatus is always fixed, the above-described control apparatus may not be provided. In this case, according to the present disclosure, a plurality of vehicles that perform platoon travelling is provided. Each of the vehicles includes an inter-vehicle communication apparatus that performs inter-vehicle communication with other vehicles included in a column during platoon travelling. Moreover, at least some of the vehicles are provided with an external communication apparatus that performs external communication based on own identification information assigned by a telecommunication company, the number of vehicles capable of performing the external communication in the column being less the number of vehicles included in the column.

In such vehicles, since the number of line contracts can be as described in the above, the communication cost due to the external communication can be reduced.

The second aspect of the present disclosure provides a control apparatus further including a first determination unit (11) that determines whether a first group composed of one or more vehicles in the column is unable to perform inter-vehicle communication with a second group composed of other vehicles in the column; and a first assigning unit (12) that assigns the identification information to the external communication apparatus of the vehicle belonging to the first group and controls the vehicle belonging to the first group to perform external communication, when the first determination unit determines that the first group is unable to perform inter-vehicle communication.

However, according to such a configuration, in the case where the column is divided into a plurality of groups, some of the groups may be unable to perform external communication. For example, when the column is divided into a first group having no external communication apparatus in the vehicles, and a second group including a vehicle capable of performing the external communication, the vehicles in the first group are unable to obtain information through external communication.

In this respect, according to the above-described control apparatus, when the first determination unit determines that inter-vehicle communication is unable to be performed between the first column group and the second column group, the first assigning unit assigns the identification information to the external communication apparatus of the vehicle belonging to the first group to perform external communication. Thus, the vehicle belonging to the first group performs external communication and obtains necessary information.

The third aspect of the present disclosure provides a control apparatus further including: a second determination unit (11) that determines whether a fault has occurred in any of the vehicles included in the column; and a second assigning unit (12) that assigns the identification information to the external communication apparatus of a specific vehicle included in the column and controls the specific vehicle to perform external communication, when the second determination unit determines that a fault has occurred in any of the vehicles.

According to such a control apparatus, also, the number of line contracts with the telecommunication company (i.e. the number of items of identification information data to be applied) can be lower than the number of vehicles included in the column. Thus, the communication cost due to external communication can be reduced.

However, according to such a configuration, when any fault occurs in the vehicles included in the column (for example, inter-vehicle communication cannot be performed in some of the vehicles), platoon travelling may be difficult to perform.

In this respect, when the second determination unit determines that a fault has occurred in the vehicle, the second assigning unit assigns the identification information to the external communication apparatus of a specific vehicle in the column to have the specific vehicle perform the external communication.

For example, in the case where a fault occurs in an inter-vehicle communication apparatus of some of the vehicles so that inter-vehicle communication is unable to be performed with that vehicle, the second assigning unit may assign the identification information to the external communication apparatus of that vehicle. Thus, instead of using the inter-vehicle communication apparatus with that vehicle, external communication is performed whereby the platoon travelling can be maintained.

The fourth aspect of the present disclosure provides a control apparatus (1) for performing platoon travelling of a plurality of vehicles (21-24) including: a management apparatus (10) that manages the platoon travelling of the plurality of vehicles; and a subscriber identification information setting unit (112, 251) that changes a state of a subscriber identification information on a mobile communication network in the plurality of vehicles to be activated or deactivated. The plurality of vehicles are divided into groups composed of a leading vehicle (21) and at least one slave vehicle (22 to 24), the leading vehicle being capable of performing wide-area wireless communication via the management apparatus and the mobile communication network by setting the subscriber identification information to be activated, and the at least one slave vehicle being in a state where the subscriber identification information is deactivated. The slave vehicles share information necessary for performing platoon travelling, based on information directly transmitted from the leading vehicle by short-distance wireless communication or information indirectly transmitted from the leading vehicle via other slave vehicles by short-distance wireless communication. The subscriber identification information setting unit is configured to, assuming a major column group composed of the leading vehicle and the slave vehicles and a separated vehicle as the at least one slave vehicle separated from the major column group, activate the subscriber identification information of the separated vehicle when being separated.

According to the above-described configuration, the wide-area wireless communication can be performed in the separated vehicles so that the separated vehicles are able to move across the area of wide-area wireless communication. Hence, the platoon travelling can be accomplished with high flexibility. Further, since the identification information does not have to be applied to all of the vehicles, the number of required subscriber identification information items can be lower than the number of vehicles performing platoon travelling. Therefore, the communication cost when using the identification information can be reduced.

According to the present disclosure, the communication cost accompanied by the external communication can be reduced for the vehicle.

What is claimed is:

1. A plurality of control apparatus that control a corresponding plurality of vehicles performing platoon travelling, each of the vehicles being provided with (i) a corresponding one control apparatus of the plurality of control apparatus, and (ii) an inter-vehicle transmitter/receiver configured to perform wireless inter-vehicle communication using a local area network with an other vehicle of the plurality of vehicles included in a column performing the platoon travelling, at least some of the vehicles being provided with (iii) an external transmitter/receiver configured to perform wireless external communication using a wide area communication network based on identification information given by a telecommunication company,
wherein
the control apparatus are configured to control the plurality of vehicles so that a number of the vehicles capable of simultaneously performing the external communication is less than a total number of the vehicles included in the column performing the platoon travelling,
the vehicles in the column travel at respective travelling positions,
a priority is set for each of the respective travelling positions,
the control apparatus are configured to perform a process of requiring an assignment of the identification information to the external transmitter/receiver of the corresponding vehicle on which the control apparatus is provided to perform the external communication, and
the control apparatus are configured to stop the process of requiring the assignment of the identification information, when an other vehicle, of the plurality of vehicles, travelling at one of the travelling positions having a priority higher than that of the corresponding vehicle on which the control apparatus is provided, is simultaneously performing the process of requiring the assignment of the identification information.

2. The control apparatus according to claim 1, wherein the control apparatus are configured to cancel, when it is determined that a fault occurs in the external communication, an assignment of the identification information to the external transmitter/receiver of the vehicle, of the plurality of vehicles, which has been performing the external communication.

3. The control apparatus according to claim 1, wherein the control apparatus are configured to have a vehicle among the plurality of vehicles having no external transmitter/receiver travel at one of the travelling positions having a lowest priority.

4. The control apparatus according to claim 1, wherein the control apparatus are configured to adjust an execution timing of a process for changing the vehicle performing the external communication depending on a state of surroundings of the column or a state of the vehicles included in the column.

5. The control apparatus according to claim 1, wherein the control apparatus are configured to change the vehicle performing the external communication such that a pair of vehicles capable of simultaneously performing the external communications do not travel at adjacent travelling positions in a back and forth direction in the column.

6. The control apparatus according to claim 1, wherein the travelling position having a highest priority is at a frontmost position of the column.

7. The control apparatus according to claim 1, wherein the travelling position having a highest priority is at any traveling position in the column except a frontmost position and a most rear position.

8. The control apparatus according to claim 1, wherein the control apparatus are configured to stop the external communication by the vehicle to which the identification information is assigned, when the external communication is performed by a vehicle travelling at a travelling position adjacent to the vehicle to which the identification information is assigned in a back and forth direction in the column.

* * * * *